(12) United States Patent
Kim et al.

(10) Patent No.: US 11,513,667 B2
(45) Date of Patent: Nov. 29, 2022

(54) USER INTERFACE FOR AUDIO MESSAGE

(71) Applicant: Apple Inc., Cupertino, CA (US)

(72) Inventors: Andrew Seunghyun Kim, Campbell, CA (US); Patrick L. Coffman, San Francisco, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 17/027,373

(22) Filed: Sep. 21, 2020

(65) Prior Publication Data

US 2021/0352172 A1    Nov. 11, 2021

Related U.S. Application Data

(60) Provisional application No. 63/041,979, filed on Jun. 21, 2020, provisional application No. 63/023,225, filed on May 11, 2020.

(51) Int. Cl.

| G06F 3/04842 | (2022.01) |
|---|---|
| H04M 1/72412 | (2021.01) |
| G06F 3/0488 | (2022.01) |
| G06F 3/16 | (2006.01) |
| G06F 9/451 | (2018.01) |
| H04M 1/72433 | (2021.01) |

(52) U.S. Cl.
CPC ........ G06F 3/04842 (2013.01); G06F 3/0488 (2013.01); G06F 3/167 (2013.01); G06F 9/453 (2018.02); H04M 1/72412 (2021.01); H04M 1/72433 (2021.01)

(58) Field of Classification Search
CPC ........ G06F 3/167; G06F 3/048; H04M 1/724; H04L 12/18
See application file for complete search history.

(56) References Cited

U.S. PATENT DOCUMENTS

| 4,975,694 A | 12/1990 | Mclaughlin et al. |
|---|---|---|
| 5,086,385 A | 2/1992 | Launey et al. |
| 5,146,217 A | 9/1992 | Holmes et al. |
| 5,202,961 A | 4/1993 | Mills et al. |
| 5,418,528 A | 5/1995 | Hosack et al. |
| 5,483,595 A | 1/1996 | Owen |
| 5,617,526 A | 4/1997 | Oran et al. |
| 5,687,216 A | 11/1997 | Svensson |
| 5,793,366 A | 8/1998 | Mano et al. |

(Continued)

FOREIGN PATENT DOCUMENTS

| AU | 2007100826 A4 | 9/2007 |
|---|---|---|
| AU | 2008100011 A4 | 2/2008 |

(Continued)

OTHER PUBLICATIONS

"How to use popular SNS confidence (we chat) in China 2 _ voice message, press together, shake function etc.", Available at: "http://seechina365.com/2014/04/05/wechat02/", Apr. 5, 2014, 27 pages (14 pages of English Translation and 13 pages of Official Copy Only).

(Continued)

*Primary Examiner* — Ryan F Pitaro
(74) *Attorney, Agent, or Firm* — Dentons US LLP

(57) ABSTRACT

The present disclosure generally relates to managing audio messages. In some examples, user interfaces for recording and sending an audio message are described.

45 Claims, 77 Drawing Sheets

(56) References Cited

U.S. PATENT DOCUMENTS

| | | |
|---|---|---|
| 5,801,700 A | 9/1998 | Ferguson |
| 5,835,084 A | 11/1998 | Bailey et al. |
| 5,872,521 A | 2/1999 | Lopatukin et al. |
| 5,875,403 A | 2/1999 | Christal |
| 5,974,235 A | 10/1999 | Nunally et al. |
| 6,002,402 A | 12/1999 | Schacher |
| 6,014,429 A | 1/2000 | Laporta et al. |
| 6,084,529 A | 7/2000 | Lee et al. |
| 6,094,197 A | 7/2000 | Buxton et al. |
| 6,140,987 A | 10/2000 | Stein et al. |
| 6,169,911 B1 | 1/2001 | Wagner et al. |
| 6,191,807 B1 | 2/2001 | Hamada et al. |
| 6,333,973 B1 | 12/2001 | Smith et al. |
| 6,362,842 B1 | 3/2002 | Tahara et al. |
| 6,393,464 B1 | 5/2002 | Dieterman |
| 6,456,306 B1 | 9/2002 | Chin et al. |
| 6,456,841 B1 | 9/2002 | Tomimori |
| 6,483,986 B1 | 11/2002 | Krapf |
| 6,504,934 B1 | 1/2003 | Kasai et al. |
| 6,662,023 B1 | 12/2003 | Helle |
| 6,674,452 B1 | 1/2004 | Kraft et al. |
| 6,720,863 B2 | 4/2004 | Hull et al. |
| 6,721,784 B1 | 4/2004 | Leonard et al. |
| 6,726,094 B1 | 4/2004 | Rantze et al. |
| 6,728,784 B1 | 4/2004 | Mattaway |
| 6,731,308 B1 | 5/2004 | Tang et al. |
| 6,778,642 B1 | 8/2004 | Schmidt et al. |
| 6,833,848 B1 | 12/2004 | Wolff et al. |
| 6,850,781 B2 | 2/2005 | Goto |
| 6,901,439 B1 | 5/2005 | Bonasia et al. |
| 6,912,429 B1 | 6/2005 | Bilger |
| 6,931,594 B1 | 8/2005 | Jun |
| 6,934,738 B1 | 8/2005 | Furusawa et al. |
| 7,092,768 B1 | 8/2006 | Labuda |
| 7,120,455 B1 | 10/2006 | Chen et al. |
| 7,149,893 B1 | 12/2006 | Leonard et al. |
| 7,185,054 B1 | 2/2007 | Ludwig et al. |
| 7,250,955 B1 | 7/2007 | Beeman et al. |
| 7,293,280 B1 | 11/2007 | Gupta et al. |
| 7,365,736 B2 | 4/2008 | Marvit et al. |
| 7,401,351 B2 | 7/2008 | Boreczky et al. |
| 7,433,920 B2 | 10/2008 | Blagsvedt et al. |
| 7,496,385 B2 | 2/2009 | Gruen et al. |
| 7,571,014 B1 | 8/2009 | Lambourne et al. |
| 7,603,379 B2 | 10/2009 | Kang et al. |
| 7,636,578 B1 | 12/2009 | Cope et al. |
| 7,650,361 B1 | 1/2010 | Wong et al. |
| 7,656,393 B2 | 2/2010 | King et al. |
| 7,665,031 B2 | 2/2010 | Matthews et al. |
| 7,685,530 B2 | 3/2010 | Sherrard et al. |
| 7,716,593 B2 | 5/2010 | Durazo et al. |
| 7,730,223 B1 | 6/2010 | Bavor et al. |
| 7,789,225 B2 | 9/2010 | Whiteis |
| 7,797,390 B2 | 9/2010 | Hagale et al. |
| 7,831,054 B2 | 11/2010 | Bali et al. |
| 7,834,861 B2 | 11/2010 | Lee |
| 7,859,571 B1 | 12/2010 | Brown et al. |
| 7,904,814 B2 | 3/2011 | Errico et al. |
| 7,908,219 B2 | 3/2011 | Abanami et al. |
| 7,921,166 B2 | 4/2011 | Karn |
| 8,024,758 B2 | 9/2011 | Byun et al. |
| 8,028,323 B2 | 9/2011 | Weel |
| 8,031,230 B2 | 10/2011 | Takada |
| 8,116,807 B2 | 2/2012 | Matas |
| 8,121,586 B2 | 2/2012 | Araradian et al. |
| 8,150,930 B2 | 4/2012 | Satterfield et al. |
| 8,169,463 B2 | 5/2012 | Enstad et al. |
| 8,196,043 B2 | 6/2012 | Crow et al. |
| 8,209,634 B2 | 6/2012 | Klassen et al. |
| 8,214,494 B1 | 7/2012 | Slavin |
| 8,234,395 B2 | 7/2012 | Millington |
| 8,253,704 B2 | 8/2012 | Jang |
| 8,255,830 B2 | 8/2012 | Ording et al. |
| 8,280,539 B2 | 10/2012 | Jehan et al. |
| 8,290,603 B1 | 10/2012 | Lambourne |
| 8,458,780 B1 | 6/2013 | Takkallapally et al. |
| 8,516,374 B2 | 8/2013 | Fleischman et al. |
| 8,572,493 B2 | 10/2013 | Qureshi |
| 8,611,873 B2 | 12/2013 | Onyon et al. |
| 8,648,799 B1 | 2/2014 | Lloyd |
| 8,689,147 B2 | 4/2014 | Griffin et al. |
| 8,706,818 B2 | 4/2014 | Krzyzanowski et al. |
| 8,745,500 B1 | 6/2014 | Kostello et al. |
| 8,751,594 B2 | 6/2014 | Aceves |
| 8,762,844 B2 | 6/2014 | Kim et al. |
| 8,830,181 B1 | 9/2014 | Clark et al. |
| 8,848,932 B2 | 9/2014 | Poulsen et al. |
| 8,849,928 B2 | 9/2014 | Yuyama |
| 8,914,752 B1 | 12/2014 | Spiegel |
| 8,922,485 B1 | 12/2014 | Lloyd |
| 8,954,889 B2 | 2/2015 | Fujibayashi |
| 8,984,444 B2 | 3/2015 | O |
| 8,990,861 B2 | 3/2015 | Nishikawa et al. |
| 9,021,526 B1 | 4/2015 | Baron et al. |
| 9,042,556 B2 | 5/2015 | Kallai et al. |
| 9,082,018 B1 | 7/2015 | Laska et al. |
| 9,084,003 B1 | 7/2015 | Sanio et al. |
| 9,112,849 B1 | 8/2015 | Werkelin Ahlin et al. |
| 9,134,902 B2 | 9/2015 | Kang et al. |
| 9,158,974 B1 | 10/2015 | Laska et al. |
| 9,170,707 B1 | 10/2015 | Laska et al. |
| 9,185,062 B1 | 11/2015 | Yang et al. |
| 9,202,509 B2 | 12/2015 | Kallai et al. |
| 9,207,835 B1 | 12/2015 | Yang et al. |
| 9,247,363 B2 | 1/2016 | Triplett et al. |
| 9,247,380 B1 | 1/2016 | Vincent |
| 9,251,787 B1 | 2/2016 | Hart et al. |
| 9,294,853 B1 | 3/2016 | Dhaundiyal |
| 9,313,160 B1 | 4/2016 | Shamis et al. |
| 9,313,556 B1 | 4/2016 | Borel et al. |
| 9,319,782 B1 | 4/2016 | Crump et al. |
| 9,361,011 B1 | 6/2016 | Burns et al. |
| 9,374,607 B2 | 6/2016 | Bates et al. |
| D765,118 S | 8/2016 | Bachman et al. |
| 9,413,606 B1 | 8/2016 | Roberts |
| 9,433,032 B1 | 8/2016 | Ghadge et al. |
| 9,450,812 B2 | 9/2016 | Lee et al. |
| 9,483,529 B1 | 11/2016 | Pasoi et al. |
| D773,510 S | 12/2016 | Foss et al. |
| 9,519,413 B2 | 12/2016 | Bates |
| 9,582,178 B2 | 2/2017 | Grant et al. |
| 9,635,314 B2 | 4/2017 | Barkley et al. |
| D789,381 S | 6/2017 | Okumura et al. |
| 9,680,982 B2 | 6/2017 | Fiedler |
| 9,727,346 B2 | 8/2017 | Shao |
| 9,727,749 B2 | 8/2017 | Tzeng et al. |
| 9,728,230 B2 | 8/2017 | Cudak et al. |
| 9,750,116 B2 | 8/2017 | Witzgall |
| 9,794,720 B1 | 10/2017 | Kadri |
| 9,800,951 B1 | 10/2017 | Carlson et al. |
| 9,819,877 B1 | 11/2017 | Faulkner et al. |
| 9,820,323 B1 | 11/2017 | Young et al. |
| 9,858,739 B1 | 1/2018 | Johnson et al. |
| 9,898,175 B2 | 2/2018 | Fiedler |
| 9,898,250 B1 | 2/2018 | Williams et al. |
| 9,954,989 B2 | 4/2018 | Zhou |
| 10,055,094 B2 | 8/2018 | Li et al. |
| 10,068,364 B2 | 9/2018 | Cui |
| 10,091,017 B2 | 10/2018 | Landow et al. |
| 10,120,536 B2 | 11/2018 | Cha et al. |
| 10,129,044 B2 | 11/2018 | Kangshang et al. |
| 10,142,122 B1 | 11/2018 | Hill et al. |
| 10,182,138 B2 | 1/2019 | Motika et al. |
| 10,200,468 B2 | 2/2019 | Leban et al. |
| 10,219,026 B2 | 2/2019 | Eim et al. |
| 10,237,141 B2 | 3/2019 | Sasaki et al. |
| 10,282,068 B2 | 5/2019 | Dubin et al. |
| 10,284,812 B1 | 5/2019 | Van Os et al. |
| 10,284,980 B1 | 5/2019 | Woo et al. |
| 10,298,643 B1 | 5/2019 | Toal et al. |
| 10,299,300 B1 | 5/2019 | Young |
| 10,303,422 B1 | 5/2019 | Woo et al. |
| 10,306,049 B1 | 5/2019 | Bauer et al. |
| 10,310,725 B2 | 6/2019 | Smith et al. |

(56) References Cited

U.S. PATENT DOCUMENTS

| | | |
|---|---|---|
| 10,353,532 B1 | 7/2019 | Holz et al. |
| 10,362,272 B1 | 7/2019 | Van Os et al. |
| 10,389,977 B1 | 8/2019 | Van Os et al. |
| 10,409,239 B2 | 9/2019 | Reeder et al. |
| 10,410,426 B2 | 9/2019 | Kamini et al. |
| 10,416,844 B2 | 9/2019 | Yang et al. |
| 10,436,977 B2 | 10/2019 | Bergman et al. |
| 10,454,781 B2 | 10/2019 | Sasaki et al. |
| 10,474,349 B2 | 11/2019 | Jang et al. |
| 10,511,456 B2 | 12/2019 | Smith et al. |
| 10,511,559 B2 | 12/2019 | Stovicek et al. |
| 10,523,625 B1 | 12/2019 | Allen et al. |
| 10,523,976 B2 | 12/2019 | Hemmati et al. |
| 10,524,300 B2 | 12/2019 | Ueda et al. |
| 10,631,123 B2 | 4/2020 | O'keeffe |
| 10,645,294 B1 | 5/2020 | Manzari et al. |
| 10,708,653 B1 | 7/2020 | Stinson et al. |
| 10,732,819 B2 | 8/2020 | Wang et al. |
| 10,779,085 B1 | 9/2020 | Carrigan |
| 10,824,299 B2 | 11/2020 | Bai |
| 10,833,887 B2 | 11/2020 | Wu |
| 10,909,586 B2 | 2/2021 | Avedissian et al. |
| 10,924,446 B1 | 2/2021 | Paul |
| 10,963,145 B1 | 3/2021 | Voss et al. |
| 10,972,655 B1 | 4/2021 | Ostap et al. |
| 11,079,913 B1 | 8/2021 | Kim et al. |
| 11,212,449 B1 | 12/2021 | Manzari et al. |
| 11,258,619 B2 | 2/2022 | Libin |
| 11,360,634 B1 | 6/2022 | Chang et al. |
| 2001/0030597 A1 | 10/2001 | Inoue et al. |
| 2001/0033298 A1 | 10/2001 | Slotznick |
| 2001/0041007 A1 | 11/2001 | Aoki |
| 2002/0002039 A1 | 1/2002 | Qureshey et al. |
| 2002/0012526 A1 | 1/2002 | Sai et al. |
| 2002/0057262 A1 | 5/2002 | Patrick et al. |
| 2002/0057284 A1 | 5/2002 | Dalby et al. |
| 2002/0060701 A1 | 5/2002 | Naughton et al. |
| 2002/0063737 A1 | 5/2002 | Feig et al. |
| 2002/0093536 A1 | 7/2002 | Hong |
| 2002/0101446 A1 | 8/2002 | Tang et al. |
| 2002/0120869 A1 | 8/2002 | Engstrom |
| 2002/0126135 A1 | 9/2002 | Ball et al. |
| 2002/0152220 A1 | 10/2002 | Kang et al. |
| 2002/0154888 A1 | 10/2002 | Allen et al. |
| 2002/0167488 A1 | 11/2002 | Hinckley et al. |
| 2002/0180774 A1 | 12/2002 | Errico et al. |
| 2003/0028382 A1 | 2/2003 | Chambers et al. |
| 2003/0040813 A1 | 2/2003 | Gonzales et al. |
| 2003/0063130 A1 | 4/2003 | Barbieri et al. |
| 2003/0073496 A1 | 4/2003 | D'amico et al. |
| 2003/0078833 A1 | 4/2003 | Suzuki et al. |
| 2003/0093790 A1 | 5/2003 | Logan et al. |
| 2003/0110511 A1 | 6/2003 | Schutte et al. |
| 2003/0112938 A1 | 6/2003 | Kanakubo et al. |
| 2003/0120957 A1 | 6/2003 | Pathiyal |
| 2003/0225836 A1 | 12/2003 | Lee et al. |
| 2003/0229722 A1 | 12/2003 | Beyda |
| 2004/0003040 A1 | 1/2004 | Beavers et al. |
| 2004/0003051 A1 | 1/2004 | Krzyzanowski et al. |
| 2004/0015548 A1 | 1/2004 | Lee et al. |
| 2004/0015553 A1 | 1/2004 | Griffin et al. |
| 2004/0032955 A1 | 2/2004 | Hashimoto et al. |
| 2004/0078444 A1 | 4/2004 | Malik et al. |
| 2004/0131254 A1 | 7/2004 | Liang et al. |
| 2004/0172455 A1 | 9/2004 | Green et al. |
| 2004/0239763 A1 | 12/2004 | Notea et al. |
| 2004/0248598 A1 | 12/2004 | Ding et al. |
| 2004/0261010 A1 | 12/2004 | Matsuishi |
| 2004/0264916 A1 | 12/2004 | Van et al. |
| 2005/0004990 A1 | 1/2005 | Durazo et al. |
| 2005/0015286 A1 | 1/2005 | Rudnik et al. |
| 2005/0052458 A1 | 3/2005 | Lambert |
| 2005/0055412 A1 | 3/2005 | Kaminsky et al. |
| 2005/0055472 A1 | 3/2005 | Krzyzanowski et al. |
| 2005/0094610 A1 | 5/2005 | De et al. |
| 2005/0099492 A1 | 5/2005 | Orr |
| 2005/0114753 A1 | 5/2005 | Kumar et al. |
| 2005/0120306 A1 | 6/2005 | Klassen et al. |
| 2005/0124365 A1 | 6/2005 | Balasuriya et al. |
| 2005/0130631 A1 | 6/2005 | Maguire et al. |
| 2005/0138552 A1 | 6/2005 | Venolia |
| 2005/0143104 A1 | 6/2005 | Kim |
| 2005/0144247 A1 | 6/2005 | Christensen et al. |
| 2005/0144568 A1 | 6/2005 | Gruen et al. |
| 2005/0163345 A1 | 7/2005 | Van et al. |
| 2005/0169503 A1 | 8/2005 | Howell et al. |
| 2005/0181821 A1 | 8/2005 | Elomaa et al. |
| 2005/0188320 A1 | 8/2005 | Bocking |
| 2005/0193345 A1 | 9/2005 | Klassen et al. |
| 2005/0198128 A1 | 9/2005 | Anderson et al. |
| 2005/0223058 A1 | 10/2005 | Buchheit et al. |
| 2005/0223066 A1 | 10/2005 | Buchheit et al. |
| 2006/0002315 A1 | 1/2006 | Theurer et al. |
| 2006/0002523 A1 | 1/2006 | Bettis et al. |
| 2006/0005156 A1 | 1/2006 | Korpipää et al. |
| 2006/0013554 A1 | 1/2006 | Poslinski et al. |
| 2006/0019639 A1 | 1/2006 | Adams et al. |
| 2006/0031775 A1 | 2/2006 | Sattler et al. |
| 2006/0034586 A1 | 2/2006 | Millar et al. |
| 2006/0044283 A1 | 3/2006 | Eri et al. |
| 2006/0075027 A1 | 4/2006 | Zager et al. |
| 2006/0084450 A1 | 4/2006 | Dam et al. |
| 2006/0094416 A1 | 5/2006 | Endo et al. |
| 2006/0098634 A1 | 5/2006 | Umemoto et al. |
| 2006/0123353 A1 | 6/2006 | Matthews et al. |
| 2006/0128404 A1 | 6/2006 | Klassen et al. |
| 2006/0132455 A1 | 6/2006 | Rimas-ribikauskas et al. |
| 2006/0135136 A1 | 6/2006 | Kim et al. |
| 2006/0158730 A1 | 7/2006 | Kira |
| 2006/0161621 A1 | 7/2006 | Rosenberg |
| 2006/0161629 A1 | 7/2006 | Cohen et al. |
| 2006/0161870 A1 | 7/2006 | Hotelling et al. |
| 2006/0161871 A1 | 7/2006 | Hotelling et al. |
| 2006/0171453 A1 | 8/2006 | Rohlfing et al. |
| 2006/0195787 A1 | 8/2006 | Topiwala et al. |
| 2006/0221184 A1 | 10/2006 | Vallone et al. |
| 2006/0258289 A1 | 11/2006 | Dua |
| 2006/0279628 A1 | 12/2006 | Fleming |
| 2006/0280186 A1 | 12/2006 | Carlton et al. |
| 2007/0004389 A1 | 1/2007 | Wallace et al. |
| 2007/0004461 A1 | 1/2007 | Bathina et al. |
| 2007/0027682 A1 | 2/2007 | Bennett |
| 2007/0033632 A1 | 2/2007 | Baynger et al. |
| 2007/0037605 A1 | 2/2007 | Logan et al. |
| 2007/0050452 A1 | 3/2007 | Raju et al. |
| 2007/0061020 A1 | 3/2007 | Bovee et al. |
| 2007/0073823 A1 | 3/2007 | Cohen |
| 2007/0085157 A1 | 4/2007 | Fadell et al. |
| 2007/0097083 A1 | 5/2007 | Seok et al. |
| 2007/0113294 A1 | 5/2007 | Field et al. |
| 2007/0117549 A1 | 5/2007 | Arnos |
| 2007/0124403 A1 | 5/2007 | Umezawa et al. |
| 2007/0124783 A1 | 5/2007 | Ahiska et al. |
| 2007/0150834 A1 | 6/2007 | Muller et al. |
| 2007/0150836 A1 | 6/2007 | Deggelmann et al. |
| 2007/0157106 A1 | 7/2007 | Bishop |
| 2007/0162762 A1 | 7/2007 | Huh et al. |
| 2007/0173233 A1 | 7/2007 | Vander Veen et al. |
| 2007/0173267 A1 | 7/2007 | Klassen et al. |
| 2007/0174774 A1 | 7/2007 | Lerman et al. |
| 2007/0191008 A1 | 8/2007 | Bucher et al. |
| 2007/0192486 A1 | 8/2007 | Wilson et al. |
| 2007/0198111 A1 | 8/2007 | Oetzel et al. |
| 2007/0203991 A1 | 8/2007 | Fisher et al. |
| 2007/0213099 A1 | 9/2007 | Bast |
| 2007/0216659 A1 | 9/2007 | Amineh |
| 2007/0236475 A1 | 10/2007 | Wherry |
| 2007/0241945 A1 | 10/2007 | Moorer et al. |
| 2007/0271527 A1 | 11/2007 | Paas et al. |
| 2007/0300140 A1 | 12/2007 | Makela et al. |
| 2008/0014989 A1 | 1/2008 | Sandegard et al. |
| 2008/0030496 A1 | 2/2008 | Lee et al. |
| 2008/0036743 A1 | 2/2008 | Westerman et al. |
| 2008/0051065 A1 | 2/2008 | Hong |

(56) References Cited

U.S. PATENT DOCUMENTS

| | | |
|---|---|---|
| 2008/0052945 A1 | 3/2008 | Matas et al. |
| 2008/0055264 A1 | 3/2008 | Anzures et al. |
| 2008/0070593 A1 | 3/2008 | Altman et al. |
| 2008/0081558 A1 | 4/2008 | Dunko et al. |
| 2008/0084400 A1 | 4/2008 | Rosenberg |
| 2008/0091717 A1 | 4/2008 | Garbow et al. |
| 2008/0094370 A1 | 4/2008 | Ording et al. |
| 2008/0114849 A1 | 5/2008 | Yuyama |
| 2008/0122794 A1 | 5/2008 | Koiso et al. |
| 2008/0122796 A1 | 5/2008 | Jobs et al. |
| 2008/0126935 A1 | 5/2008 | Blomgren |
| 2008/0146289 A1 | 6/2008 | Korneluk et al. |
| 2008/0153459 A1 | 6/2008 | Kansal et al. |
| 2008/0155474 A1 | 6/2008 | Duhig et al. |
| 2008/0162649 A1 | 7/2008 | Lee et al. |
| 2008/0163127 A1 | 7/2008 | Newell et al. |
| 2008/0165136 A1 | 7/2008 | Christie et al. |
| 2008/0168185 A1 | 7/2008 | Robbin et al. |
| 2008/0171535 A1 | 7/2008 | Carmody et al. |
| 2008/0216022 A1 | 9/2008 | Lorch et al. |
| 2008/0250319 A1 | 10/2008 | Lee et al. |
| 2008/0261569 A1 | 10/2008 | Britt et al. |
| 2008/0268901 A1 | 10/2008 | Miramontes et al. |
| 2008/0270560 A1 | 10/2008 | Tysowski et al. |
| 2008/0273712 A1 | 11/2008 | Eichfeld et al. |
| 2008/0273713 A1 | 11/2008 | Hartung et al. |
| 2008/0285772 A1 | 11/2008 | Haulick et al. |
| 2008/0307305 A1 | 12/2008 | Klassen et al. |
| 2008/0310602 A1 | 12/2008 | Bhupati |
| 2008/0313278 A1 | 12/2008 | Hochberg |
| 2009/0002335 A1 | 1/2009 | Chaudhri |
| 2009/0003552 A1 | 1/2009 | Goldman et al. |
| 2009/0003620 A1 | 1/2009 | Mckillop et al. |
| 2009/0005011 A1 | 1/2009 | Christie et al. |
| 2009/0007188 A1 | 1/2009 | Omernick |
| 2009/0037536 A1 | 2/2009 | Braam |
| 2009/0042607 A1 | 2/2009 | Adachi et al. |
| 2009/0049502 A1 | 2/2009 | Levien et al. |
| 2009/0051648 A1 | 2/2009 | Shamaie et al. |
| 2009/0082043 A1 | 3/2009 | Lazaridis |
| 2009/0088204 A1 | 4/2009 | Culbert et al. |
| 2009/0117936 A1 | 5/2009 | Maeng |
| 2009/0125571 A1 | 5/2009 | Kiilerich et al. |
| 2009/0133070 A1 | 5/2009 | Hamano et al. |
| 2009/0144391 A1 | 6/2009 | Jung et al. |
| 2009/0153289 A1 | 6/2009 | Hope et al. |
| 2009/0164219 A1 | 6/2009 | Yeung et al. |
| 2009/0164587 A1 | 6/2009 | Gavita et al. |
| 2009/0187842 A1 | 7/2009 | Collins et al. |
| 2009/0199119 A1 | 8/2009 | Park et al. |
| 2009/0199130 A1 | 8/2009 | Tsern et al. |
| 2009/0209293 A1 | 8/2009 | Louch |
| 2009/0220206 A1 | 9/2009 | Kisliakov |
| 2009/0232028 A1 | 9/2009 | Baalbergen et al. |
| 2009/0248751 A1 | 10/2009 | Myman et al. |
| 2009/0249244 A1 | 10/2009 | Robinson et al. |
| 2009/0256780 A1 | 10/2009 | Small et al. |
| 2009/0262206 A1 | 10/2009 | Park |
| 2009/0265643 A1 | 10/2009 | Jachner et al. |
| 2009/0282362 A1 | 11/2009 | Matsumoto |
| 2009/0299810 A1 | 12/2009 | Jardine et al. |
| 2009/0304205 A1 | 12/2009 | Hardacker et al. |
| 2009/0309897 A1 | 12/2009 | Morita et al. |
| 2009/0313582 A1 | 12/2009 | Rupsingh et al. |
| 2010/0004031 A1 | 1/2010 | Kim |
| 2010/0011065 A1 | 1/2010 | Scherpa et al. |
| 2010/0039498 A1 | 2/2010 | Liu et al. |
| 2010/0058253 A1 | 3/2010 | Son |
| 2010/0070490 A1 | 3/2010 | Amidon et al. |
| 2010/0081375 A1 | 4/2010 | Rosenblatt et al. |
| 2010/0085416 A1 | 4/2010 | Hegde et al. |
| 2010/0094809 A1 | 4/2010 | Consul et al. |
| 2010/0097438 A1 | 4/2010 | Ujii |
| 2010/0106647 A1 | 4/2010 | Raman |
| 2010/0121636 A1 | 5/2010 | Burke et al. |
| 2010/0124906 A1 | 5/2010 | Hautala |
| 2010/0138007 A1 | 6/2010 | Clark et al. |
| 2010/0145485 A1 | 6/2010 | Duchene et al. |
| 2010/0162138 A1 | 6/2010 | Pascal et al. |
| 2010/0162171 A1 | 6/2010 | Felt et al. |
| 2010/0169435 A1 | 7/2010 | Osullivan et al. |
| 2010/0178873 A1 | 7/2010 | Lee et al. |
| 2010/0191575 A1 | 7/2010 | Raleigh |
| 2010/0191833 A1 | 7/2010 | Hofrichter et al. |
| 2010/0201815 A1 | 8/2010 | Anderson et al. |
| 2010/0205563 A1 | 8/2010 | Haapsaari et al. |
| 2010/0235729 A1 | 9/2010 | Kocienda et al. |
| 2010/0251119 A1 | 9/2010 | Geppert et al. |
| 2010/0251304 A1 | 9/2010 | Donoghue et al. |
| 2010/0259482 A1 | 10/2010 | Ball |
| 2010/0267370 A1 | 10/2010 | Lee |
| 2010/0273456 A1 | 10/2010 | Wolovitz et al. |
| 2010/0284389 A1 | 11/2010 | Ramsay et al. |
| 2010/0287249 A1 | 11/2010 | Yigang et al. |
| 2010/0296678 A1 | 11/2010 | Kuhn-rahloff et al. |
| 2010/0299639 A1 | 11/2010 | Ramsay et al. |
| 2010/0318917 A1 | 12/2010 | Holladay et al. |
| 2010/0318928 A1 | 12/2010 | Neuman et al. |
| 2010/0321201 A1 | 12/2010 | Huang et al. |
| 2010/0332518 A1 | 12/2010 | Song et al. |
| 2011/0040754 A1 | 2/2011 | Peto et al. |
| 2011/0040760 A1 | 2/2011 | Fleischman et al. |
| 2011/0054830 A1 | 3/2011 | Logan |
| 2011/0071656 A1 | 3/2011 | Mckiel, Jr. |
| 2011/0080356 A1 | 4/2011 | Kang et al. |
| 2011/0092190 A1 | 4/2011 | Willey et al. |
| 2011/0115875 A1 | 5/2011 | Sadwick et al. |
| 2011/0126148 A1 | 5/2011 | Krishnaraj et al. |
| 2011/0145745 A1 | 6/2011 | Hyeon et al. |
| 2011/0159469 A1 | 6/2011 | Hwang et al. |
| 2011/0159927 A1 | 6/2011 | Choi |
| 2011/0161836 A1 | 6/2011 | Mu et al. |
| 2011/0164058 A1 | 7/2011 | Lemay |
| 2011/0173545 A1 | 7/2011 | Meola et al. |
| 2011/0193995 A1 | 8/2011 | Goh et al. |
| 2011/0228084 A1 | 9/2011 | Colciago |
| 2011/0242002 A1 | 10/2011 | Kaplan et al. |
| 2011/0246942 A1 | 10/2011 | Misawa |
| 2011/0249861 A1 | 10/2011 | Tokutake |
| 2011/0252146 A1 | 10/2011 | Santamaria et al. |
| 2011/0252357 A1 | 10/2011 | Chaudhri |
| 2011/0254683 A1 | 10/2011 | Soldan et al. |
| 2011/0276901 A1 | 11/2011 | Zambetti et al. |
| 2011/0291971 A1 | 12/2011 | Masaki et al. |
| 2011/0296163 A1 | 12/2011 | Abernethy et al. |
| 2011/0304648 A1 | 12/2011 | Kim et al. |
| 2012/0002001 A1 | 1/2012 | Prentice |
| 2012/0004920 A1 | 1/2012 | Kelly et al. |
| 2012/0019610 A1 | 1/2012 | Hornyak et al. |
| 2012/0022872 A1 | 1/2012 | Gruber et al. |
| 2012/0038546 A1 | 2/2012 | Cromer et al. |
| 2012/0051560 A1 | 3/2012 | Sanders |
| 2012/0054278 A1 | 3/2012 | Taleb et al. |
| 2012/0054655 A1 | 3/2012 | Kang et al. |
| 2012/0062784 A1 | 3/2012 | Van et al. |
| 2012/0066632 A1 | 3/2012 | Sundermeyer et al. |
| 2012/0070129 A1 | 3/2012 | Lin et al. |
| 2012/0092436 A1 | 4/2012 | Pahud et al. |
| 2012/0110455 A1 | 5/2012 | Sharma et al. |
| 2012/0114108 A1 | 5/2012 | Katis et al. |
| 2012/0115608 A1 | 5/2012 | Pfeifer et al. |
| 2012/0131458 A1 | 5/2012 | Hayes et al. |
| 2012/0149405 A1 | 6/2012 | Bhat |
| 2012/0157114 A1 | 6/2012 | Alameh et al. |
| 2012/0169583 A1 | 7/2012 | Rippel et al. |
| 2012/0173383 A1 | 7/2012 | Badawiyeh et al. |
| 2012/0173767 A1 | 7/2012 | Kim et al. |
| 2012/0177339 A1 | 7/2012 | Chang et al. |
| 2012/0178431 A1 | 7/2012 | Gold |
| 2012/0185355 A1 | 7/2012 | Kilroy |
| 2012/0188394 A1 | 7/2012 | Park et al. |
| 2012/0197419 A1 | 8/2012 | Dhruv et al. |
| 2012/0210226 A1 | 8/2012 | Mccoy et al. |
| 2012/0222092 A1 | 8/2012 | Rabii |

(56) References Cited

U.S. PATENT DOCUMENTS

| | | |
|---|---|---|
| 2012/0223890 A1 | 9/2012 | Borovsky et al. |
| 2012/0223959 A1 | 9/2012 | Lengeling et al. |
| 2012/0254324 A1 | 10/2012 | Majeti et al. |
| 2012/0254325 A1 | 10/2012 | Majeti et al. |
| 2012/0260169 A1 | 10/2012 | Schwartz et al. |
| 2012/0266199 A1 | 10/2012 | Noonan et al. |
| 2012/0269361 A1 | 10/2012 | Bhow et al. |
| 2012/0272230 A1 | 10/2012 | Lee |
| 2012/0282974 A1 | 11/2012 | Green et al. |
| 2012/0293605 A1 | 11/2012 | Seferian et al. |
| 2012/0294118 A1 | 11/2012 | Haulick et al. |
| 2012/0296972 A1 | 11/2012 | Backer |
| 2012/0304079 A1 | 11/2012 | Rideout et al. |
| 2012/0306770 A1 | 12/2012 | Moore et al. |
| 2012/0311444 A1 | 12/2012 | Chaudhri |
| 2012/0311499 A1 | 12/2012 | Dellinger et al. |
| 2012/0313847 A1 | 12/2012 | Boda et al. |
| 2012/0320141 A1 | 12/2012 | Bowen et al. |
| 2013/0007617 A1 | 1/2013 | Mackenzie et al. |
| 2013/0022221 A1 | 1/2013 | Kallai et al. |
| 2013/0026293 A1 | 1/2013 | Schneider et al. |
| 2013/0027289 A1 | 1/2013 | Choi et al. |
| 2013/0047084 A1 | 2/2013 | Sanders et al. |
| 2013/0051755 A1 | 2/2013 | Brown et al. |
| 2013/0053007 A1 | 2/2013 | Cosman et al. |
| 2013/0053107 A1 | 2/2013 | Kang et al. |
| 2013/0055113 A1 | 2/2013 | Chazin et al. |
| 2013/0060352 A1 | 3/2013 | Kouda et al. |
| 2013/0067027 A1 | 3/2013 | Song et al. |
| 2013/0073584 A1 | 3/2013 | Kuper et al. |
| 2013/0080516 A1 | 3/2013 | Bologh |
| 2013/0080955 A1 | 3/2013 | Reimann et al. |
| 2013/0088413 A1 | 4/2013 | Raffle et al. |
| 2013/0091298 A1 | 4/2013 | Ozzie et al. |
| 2013/0091443 A1 | 4/2013 | Park et al. |
| 2013/0093833 A1 | 4/2013 | Al-asaaed et al. |
| 2013/0094666 A1 | 4/2013 | Haaff et al. |
| 2013/0094770 A1 | 4/2013 | Lee et al. |
| 2013/0099672 A1 | 4/2013 | Lin et al. |
| 2013/0113822 A1 | 5/2013 | Putrevu et al. |
| 2013/0117693 A1 | 5/2013 | Anderson et al. |
| 2013/0124997 A1 | 5/2013 | Speir et al. |
| 2013/0132865 A1 | 5/2013 | Li |
| 2013/0138272 A1 | 5/2013 | Louise-Babando et al. |
| 2013/0141223 A1 | 6/2013 | Brandsma et al. |
| 2013/0159858 A1 | 6/2013 | Joffray et al. |
| 2013/0162411 A1 | 6/2013 | Moses et al. |
| 2013/0162781 A1 | 6/2013 | Hubner et al. |
| 2013/0169742 A1 | 7/2013 | Wu et al. |
| 2013/0173794 A1 | 7/2013 | Agerbak et al. |
| 2013/0191454 A1 | 7/2013 | Oliver et al. |
| 2013/0194476 A1 | 8/2013 | Shimosato |
| 2013/0205375 A1 | 8/2013 | Woxblom et al. |
| 2013/0212470 A1 | 8/2013 | Karunamuni et al. |
| 2013/0216206 A1 | 8/2013 | Dubin et al. |
| 2013/0219276 A1 | 8/2013 | Shan |
| 2013/0225140 A1 | 8/2013 | Greisson |
| 2013/0225152 A1 | 8/2013 | Matthews et al. |
| 2013/0227414 A1 | 8/2013 | Hwang et al. |
| 2013/0243924 A1 | 9/2013 | Bhandari et al. |
| 2013/0246522 A1 | 9/2013 | Bilinski et al. |
| 2013/0246916 A1 | 9/2013 | Reimann et al. |
| 2013/0254714 A1 | 9/2013 | Shin et al. |
| 2013/0282180 A1 | 10/2013 | Layton |
| 2013/0282844 A1 | 10/2013 | Logan et al. |
| 2013/0283161 A1 | 10/2013 | Reimann et al. |
| 2013/0298021 A1 | 11/2013 | Park et al. |
| 2013/0310089 A1 | 11/2013 | Gianoukos et al. |
| 2013/0322634 A1 | 12/2013 | Bennett et al. |
| 2013/0324081 A1 | 12/2013 | Gargi et al. |
| 2013/0328770 A1 | 12/2013 | Parham |
| 2013/0329924 A1 | 12/2013 | Fleizach et al. |
| 2013/0331083 A1 | 12/2013 | Oslund |
| 2013/0346859 A1 | 12/2013 | Bates et al. |
| 2013/0347022 A1 | 12/2013 | Bates et al. |
| 2014/0013243 A1 | 1/2014 | Flynn et al. |
| 2014/0018053 A1 | 1/2014 | Cho et al. |
| 2014/0025798 A1 | 1/2014 | Apte et al. |
| 2014/0026074 A1 | 1/2014 | Cortes et al. |
| 2014/0032682 A1 | 1/2014 | Prado et al. |
| 2014/0037107 A1 | 2/2014 | Marino et al. |
| 2014/0047020 A1 | 2/2014 | Matus et al. |
| 2014/0049447 A1 | 2/2014 | Choi |
| 2014/0055552 A1 | 2/2014 | Song et al. |
| 2014/0059448 A1 | 2/2014 | Lee |
| 2014/0068439 A1 | 3/2014 | Lacaze et al. |
| 2014/0068486 A1 | 3/2014 | Sellers et al. |
| 2014/0070959 A1 | 3/2014 | Bhargava et al. |
| 2014/0075311 A1 | 3/2014 | Boettcher et al. |
| 2014/0075321 A1 | 3/2014 | Masera |
| 2014/0082501 A1 | 3/2014 | Bae et al. |
| 2014/0085487 A1 | 3/2014 | Park et al. |
| 2014/0092292 A1 | 4/2014 | Kuznetsov et al. |
| 2014/0105372 A1 | 4/2014 | Nowack et al. |
| 2014/0108084 A1 | 4/2014 | Bargetzi et al. |
| 2014/0108568 A1 | 4/2014 | Lee |
| 2014/0136990 A1 | 5/2014 | Gonnen et al. |
| 2014/0143737 A1 | 5/2014 | Mistry et al. |
| 2014/0150029 A1 | 5/2014 | Avedissian et al. |
| 2014/0176298 A1 | 6/2014 | Kumar et al. |
| 2014/0181202 A1 | 6/2014 | Gossain |
| 2014/0181654 A1 | 6/2014 | Kumar et al. |
| 2014/0201126 A1 | 7/2014 | Zadeh et al. |
| 2014/0207707 A1 | 7/2014 | Na et al. |
| 2014/0215356 A1 | 7/2014 | Brander et al. |
| 2014/0215365 A1 | 7/2014 | Hiraga et al. |
| 2014/0215404 A1 | 7/2014 | Kong et al. |
| 2014/0218371 A1 | 8/2014 | Du et al. |
| 2014/0218461 A1 | 8/2014 | Deland |
| 2014/0218517 A1 | 8/2014 | Kim et al. |
| 2014/0222933 A1 | 8/2014 | Stovicek et al. |
| 2014/0229835 A1 | 8/2014 | Ravine |
| 2014/0232273 A1 | 8/2014 | Sasaki et al. |
| 2014/0237361 A1 | 8/2014 | Martin et al. |
| 2014/0237419 A1 | 8/2014 | Ryu |
| 2014/0247368 A1 | 9/2014 | Chinn |
| 2014/0257532 A1 | 9/2014 | Kim et al. |
| 2014/0258854 A1 | 9/2014 | Li |
| 2014/0267002 A1 | 9/2014 | Luna |
| 2014/0267068 A1 | 9/2014 | Smith et al. |
| 2014/0267549 A1 | 9/2014 | Pinter et al. |
| 2014/0267911 A1 | 9/2014 | Grant et al. |
| 2014/0270183 A1 | 9/2014 | Luna |
| 2014/0285017 A1 | 9/2014 | Noguchi et al. |
| 2014/0293046 A1 | 10/2014 | Ni |
| 2014/0313032 A1 | 10/2014 | Sager et al. |
| 2014/0331149 A1 | 11/2014 | Labey |
| 2014/0335789 A1 | 11/2014 | Cohen et al. |
| 2014/0337791 A1 | 11/2014 | Agnetta et al. |
| 2014/0344711 A1 | 11/2014 | Hallerstrom Sjostedt et al. |
| 2014/0349754 A1 | 11/2014 | Kaneoka et al. |
| 2014/0354527 A1 | 12/2014 | Chen et al. |
| 2014/0354759 A1 | 12/2014 | Cranfill et al. |
| 2014/0363024 A1 | 12/2014 | Apodaca |
| 2014/0364056 A1 | 12/2014 | Belk et al. |
| 2014/0365904 A1 | 12/2014 | Kim et al. |
| 2014/0365980 A1 | 12/2014 | Morrison et al. |
| 2014/0368719 A1 | 12/2014 | Kaneko et al. |
| 2014/0373081 A1 | 12/2014 | Dodson et al. |
| 2014/0375747 A1 | 12/2014 | Martinez et al. |
| 2014/0375819 A1 | 12/2014 | Larsen et al. |
| 2015/0008845 A1 | 1/2015 | Kim et al. |
| 2015/0010167 A1 | 1/2015 | Arling et al. |
| 2015/0032812 A1 | 1/2015 | Dudley |
| 2015/0033149 A1 | 1/2015 | Kuchoor |
| 2015/0033361 A1 | 1/2015 | Choi et al. |
| 2015/0040029 A1 | 2/2015 | Koum et al. |
| 2015/0042576 A1 | 2/2015 | Wang |
| 2015/0042852 A1 | 2/2015 | Lee et al. |
| 2015/0052222 A1 | 2/2015 | Farrell et al. |
| 2015/0058413 A1 | 2/2015 | Ge |
| 2015/0058780 A1 | 2/2015 | Malik et al. |
| 2015/0067541 A1 | 3/2015 | Owens et al. |
| 2015/0067803 A1 | 3/2015 | Alduaiji |

(56) References Cited

U.S. PATENT DOCUMENTS

| | | |
|---|---|---|
| 2015/0071601 A1 | 3/2015 | Dabous et al. |
| 2015/0078680 A1 | 3/2015 | Shakib et al. |
| 2015/0081072 A1 | 3/2015 | Kallai et al. |
| 2015/0082225 A1 | 3/2015 | Shearer |
| 2015/0089359 A1 | 3/2015 | Brisebois |
| 2015/0092009 A1 | 4/2015 | Deluca et al. |
| 2015/0095804 A1 | 4/2015 | Grossman et al. |
| 2015/0095937 A1 | 4/2015 | Tobin |
| 2015/0106720 A1 | 4/2015 | Backer |
| 2015/0106721 A1 | 4/2015 | Cha et al. |
| 2015/0113407 A1 | 4/2015 | Hoffert et al. |
| 2015/0113418 A1 | 4/2015 | Sasaki et al. |
| 2015/0116353 A1 | 4/2015 | Miura et al. |
| 2015/0120768 A1 | 4/2015 | Wellen et al. |
| 2015/0130737 A1 | 5/2015 | Im et al. |
| 2015/0135068 A1 | 5/2015 | Chiu |
| 2015/0138101 A1 | 5/2015 | Park et al. |
| 2015/0142587 A1 | 5/2015 | Salgar et al. |
| 2015/0145435 A1 | 5/2015 | Ogawa |
| 2015/0146945 A1 | 5/2015 | Han |
| 2015/0147067 A1 | 5/2015 | Ryan et al. |
| 2015/0149599 A1 | 5/2015 | Caunter et al. |
| 2015/0159895 A1 | 6/2015 | Quam et al. |
| 2015/0160797 A1 | 6/2015 | Shearer et al. |
| 2015/0169893 A1 | 6/2015 | Desai |
| 2015/0172393 A1 | 6/2015 | Oplinger et al. |
| 2015/0172584 A1 | 6/2015 | Park et al. |
| 2015/0177914 A1 | 6/2015 | Coyner et al. |
| 2015/0180922 A1 | 6/2015 | Draznin et al. |
| 2015/0188724 A1 | 7/2015 | Kim et al. |
| 2015/0188869 A1 | 7/2015 | Smilak et al. |
| 2015/0189426 A1 | 7/2015 | Pang |
| 2015/0193130 A1 | 7/2015 | Cho et al. |
| 2015/0198938 A1 | 7/2015 | Steele et al. |
| 2015/0200715 A1 | 7/2015 | Oiwa et al. |
| 2015/0201062 A1 | 7/2015 | Shih et al. |
| 2015/0201480 A1 | 7/2015 | Ogawa |
| 2015/0205511 A1 | 7/2015 | Vinna et al. |
| 2015/0205971 A1 | 7/2015 | Sanio et al. |
| 2015/0207849 A1 | 7/2015 | Bingzhou et al. |
| 2015/0222615 A1 | 8/2015 | Allain et al. |
| 2015/0222680 A1 | 8/2015 | Grover |
| 2015/0223005 A1 | 8/2015 | Hardman et al. |
| 2015/0229650 A1 | 8/2015 | Grigg et al. |
| 2015/0229782 A1 | 8/2015 | Zuidema et al. |
| 2015/0242073 A1 | 8/2015 | Munoz et al. |
| 2015/0242597 A1 | 8/2015 | Danciu |
| 2015/0242611 A1 | 8/2015 | Cotterill |
| 2015/0242837 A1 | 8/2015 | Yarbrough et al. |
| 2015/0243163 A1 | 8/2015 | Shoemake |
| 2015/0244539 A1 | 8/2015 | Ickman |
| 2015/0248268 A1 | 9/2015 | Kumar et al. |
| 2015/0253960 A1 | 9/2015 | Lin et al. |
| 2015/0256796 A1 | 9/2015 | Ma |
| 2015/0256957 A1 | 9/2015 | Kim et al. |
| 2015/0261493 A1 | 9/2015 | Lemmon et al. |
| 2015/0264004 A1 | 9/2015 | Khoo |
| 2015/0264303 A1 | 9/2015 | Chastney et al. |
| 2015/0271120 A1 | 9/2015 | Langholz |
| 2015/0288868 A1 | 10/2015 | Slavin et al. |
| 2015/0296077 A1 | 10/2015 | Wakeyama et al. |
| 2015/0301338 A1 | 10/2015 | Van Heugten |
| 2015/0304366 A1 | 10/2015 | Bader-Natal et al. |
| 2015/0309768 A1 | 10/2015 | Van Der Heide |
| 2015/0312184 A1 | 10/2015 | Langholz et al. |
| 2015/0312185 A1 | 10/2015 | Langholz et al. |
| 2015/0312299 A1 | 10/2015 | Chen |
| 2015/0319006 A1 | 11/2015 | Plummer et al. |
| 2015/0326510 A1 | 11/2015 | Tomlinson et al. |
| 2015/0331881 A1 | 11/2015 | Myles |
| 2015/0332586 A1 | 11/2015 | Hamm et al. |
| 2015/0341227 A1 | 11/2015 | Tatzel et al. |
| 2015/0348493 A1 | 12/2015 | Chae et al. |
| 2015/0350031 A1 | 12/2015 | Burks et al. |
| 2015/0350141 A1 | 12/2015 | Yang et al. |
| 2015/0350143 A1 | 12/2015 | Lemay et al. |
| 2015/0350533 A1 | 12/2015 | Harris et al. |
| 2015/0355879 A1 | 12/2015 | Beckhardt et al. |
| 2015/0356278 A1 | 12/2015 | Britt et al. |
| 2015/0358043 A1 | 12/2015 | Jeong et al. |
| 2015/0370230 A1 | 12/2015 | Duchene et al. |
| 2015/0370426 A1 | 12/2015 | Carrigan et al. |
| 2015/0373172 A1 | 12/2015 | Boesen |
| 2015/0378522 A1 | 12/2015 | Butts |
| 2016/0004393 A1 | 1/2016 | Faaborg et al. |
| 2016/0004417 A1 | 1/2016 | Bates |
| 2016/0004499 A1 | 1/2016 | Kim et al. |
| 2016/0005281 A1 | 1/2016 | Laska et al. |
| 2016/0014059 A1 | 1/2016 | Rathod |
| 2016/0014477 A1 | 1/2016 | Siders |
| 2016/0026429 A1 | 1/2016 | Triplett |
| 2016/0029146 A1 | 1/2016 | Tembey et al. |
| 2016/0033985 A1 | 2/2016 | Gulli' et al. |
| 2016/0037140 A1 | 2/2016 | Lindsey et al. |
| 2016/0037436 A1 | 2/2016 | Spencer et al. |
| 2016/0043905 A1 | 2/2016 | Fiedler |
| 2016/0043962 A1 | 2/2016 | Kim et al. |
| 2016/0048705 A1 | 2/2016 | Yang |
| 2016/0050476 A1 | 2/2016 | Patil |
| 2016/0054841 A1 | 2/2016 | Yang et al. |
| 2016/0057173 A1 | 2/2016 | Singman et al. |
| 2016/0062487 A1 | 3/2016 | Foss et al. |
| 2016/0062567 A1 | 3/2016 | Yang et al. |
| 2016/0062589 A1 | 3/2016 | Wan et al. |
| 2016/0062606 A1 | 3/2016 | Vega et al. |
| 2016/0065832 A1 | 3/2016 | Kim et al. |
| 2016/0070244 A1 | 3/2016 | Cipollo et al. |
| 2016/0072861 A1 | 3/2016 | Woolsey et al. |
| 2016/0073185 A1 | 3/2016 | Kannappan et al. |
| 2016/0073197 A1 | 3/2016 | Hammer et al. |
| 2016/0073482 A1 | 3/2016 | Fok et al. |
| 2016/0077734 A1 | 3/2016 | Buxton et al. |
| 2016/0080552 A1 | 3/2016 | Keating et al. |
| 2016/0085412 A1 | 3/2016 | Meganathan et al. |
| 2016/0088039 A1 | 3/2016 | Millington et al. |
| 2016/0088146 A1 | 3/2016 | Ying et al. |
| 2016/0092072 A1 | 3/2016 | So et al. |
| 2016/0093180 A1 | 3/2016 | Fitzgibbon et al. |
| 2016/0093338 A1 | 3/2016 | Laska et al. |
| 2016/0099901 A1 | 4/2016 | Allen et al. |
| 2016/0099987 A1 | 4/2016 | Shamma |
| 2016/0103830 A1 | 4/2016 | Cheong et al. |
| 2016/0117402 A1 | 4/2016 | Gowel |
| 2016/0127636 A1 | 5/2016 | Ito et al. |
| 2016/0127799 A1 | 5/2016 | Alsina et al. |
| 2016/0133297 A1 | 5/2016 | Thornton et al. |
| 2016/0134942 A1 | 5/2016 | Lo |
| 2016/0139752 A1 | 5/2016 | Shim et al. |
| 2016/0139785 A1 | 5/2016 | Griffin et al. |
| 2016/0150135 A1 | 5/2016 | Chen |
| 2016/0150624 A1 | 5/2016 | Meerbeek et al. |
| 2016/0156687 A1 | 6/2016 | Leung |
| 2016/0156992 A1 | 6/2016 | Kuper |
| 2016/0165390 A1 | 6/2016 | Hartzell et al. |
| 2016/0165600 A1 | 6/2016 | Choi et al. |
| 2016/0173318 A1 | 6/2016 | Ha et al. |
| 2016/0179068 A1 | 6/2016 | Qian et al. |
| 2016/0180259 A1 | 6/2016 | Marianko et al. |
| 2016/0183046 A1 | 6/2016 | Kwon |
| 2016/0191992 A1 | 6/2016 | Kwon |
| 2016/0202866 A1 | 7/2016 | Zambetti |
| 2016/0209939 A1 | 7/2016 | Zambetti et al. |
| 2016/0210983 A1 | 7/2016 | Amada et al. |
| 2016/0212374 A1 | 7/2016 | Usbergo et al. |
| 2016/0224233 A1 | 8/2016 | Phang et al. |
| 2016/0227095 A1 | 8/2016 | Yoshizawa et al. |
| 2016/0231902 A1 | 8/2016 | Sirpal et al. |
| 2016/0239167 A1 | 8/2016 | Reimann et al. |
| 2016/0246566 A1 | 8/2016 | Fullerton et al. |
| 2016/0253145 A1 | 9/2016 | Lee et al. |
| 2016/0255706 A1 | 9/2016 | Kim et al. |
| 2016/0259459 A1 | 9/2016 | Yang et al. |
| 2016/0259528 A1 | 9/2016 | Foss et al. |
| 2016/0277885 A1 | 9/2016 | Shan et al. |

(56) References Cited

U.S. PATENT DOCUMENTS

| | | |
|---|---|---|
| 2016/0277903 A1 | 9/2016 | Poosala et al. |
| 2016/0286630 A1 | 9/2016 | Witzgall |
| 2016/0291924 A1 | 10/2016 | Bierbower et al. |
| 2016/0294958 A1 | 10/2016 | Zhang et al. |
| 2016/0295340 A1 | 10/2016 | Baker et al. |
| 2016/0299669 A1 | 10/2016 | Bates |
| 2016/0306422 A1 | 10/2016 | Parham et al. |
| 2016/0306504 A1 | 10/2016 | Brunsch et al. |
| 2016/0308920 A1 | 10/2016 | Brunsch et al. |
| 2016/0320849 A1 | 11/2016 | Koo |
| 2016/0335041 A1 | 11/2016 | Wachter et al. |
| 2016/0336531 A1 | 11/2016 | Yokoyama |
| 2016/0342386 A1 | 11/2016 | Kallai et al. |
| 2016/0345039 A1 | 11/2016 | Billmeyer |
| 2016/0351191 A1 | 12/2016 | Vilermo et al. |
| 2016/0360344 A1 | 12/2016 | Shim et al. |
| 2016/0364106 A1 | 12/2016 | Koum et al. |
| 2016/0364123 A1 | 12/2016 | Burns et al. |
| 2016/0364129 A1 | 12/2016 | Mclean et al. |
| 2016/0366481 A1 | 12/2016 | Lim et al. |
| 2016/0366531 A1 | 12/2016 | Popova |
| 2016/0380780 A1 | 12/2016 | Stephenson et al. |
| 2016/0381476 A1 | 12/2016 | Gossain et al. |
| 2017/0006162 A1 | 1/2017 | Bargetzi et al. |
| 2017/0010794 A1 | 1/2017 | Cho et al. |
| 2017/0013562 A1 | 1/2017 | Lim et al. |
| 2017/0017531 A1 | 1/2017 | Choi et al. |
| 2017/0024100 A1 | 1/2017 | Pieper et al. |
| 2017/0031552 A1 | 2/2017 | Lin |
| 2017/0031557 A1 | 2/2017 | Xiangli et al. |
| 2017/0031648 A1 | 2/2017 | So et al. |
| 2017/0041727 A1 | 2/2017 | Reimann |
| 2017/0046025 A1 | 2/2017 | Dascola et al. |
| 2017/0048817 A1 | 2/2017 | Yang et al. |
| 2017/0053008 A1 | 2/2017 | Frenkel et al. |
| 2017/0068402 A1 | 3/2017 | Lochhead et al. |
| 2017/0068507 A1 | 3/2017 | Kim et al. |
| 2017/0070346 A1 | 3/2017 | Lombardi et al. |
| 2017/0070775 A1 | 3/2017 | Taxier et al. |
| 2017/0078294 A1 | 3/2017 | Medvinsky |
| 2017/0078767 A1 | 3/2017 | Borel et al. |
| 2017/0083189 A1 | 3/2017 | Yang et al. |
| 2017/0083202 A1 | 3/2017 | Yang et al. |
| 2017/0083494 A1 | 3/2017 | Kim et al. |
| 2017/0084135 A1 | 3/2017 | Yu |
| 2017/0092085 A1 | 3/2017 | Agarwal |
| 2017/0092270 A1 | 3/2017 | Newendorp et al. |
| 2017/0094019 A1 | 3/2017 | Ahmed et al. |
| 2017/0097621 A1 | 4/2017 | Ackmann et al. |
| 2017/0099270 A1 | 4/2017 | Anson |
| 2017/0111587 A1 | 4/2017 | Herbst et al. |
| 2017/0115940 A1 | 4/2017 | Byeon |
| 2017/0134553 A1 | 5/2017 | Jeon et al. |
| 2017/0134567 A1 | 5/2017 | Jeon et al. |
| 2017/0134872 A1 | 5/2017 | Silva et al. |
| 2017/0180843 A1 | 6/2017 | Perianu et al. |
| 2017/0185277 A1 | 6/2017 | Sundermeyer et al. |
| 2017/0185373 A1 | 6/2017 | Kim et al. |
| 2017/0195772 A1 | 7/2017 | Han et al. |
| 2017/0206779 A1 | 7/2017 | Lee et al. |
| 2017/0220212 A1 | 8/2017 | Yang et al. |
| 2017/0230585 A1 | 8/2017 | Nash et al. |
| 2017/0235545 A1 | 8/2017 | Millington et al. |
| 2017/0242653 A1 | 8/2017 | Lang et al. |
| 2017/0251314 A1 | 8/2017 | Pye et al. |
| 2017/0280494 A1 | 9/2017 | Jung et al. |
| 2017/0285788 A1 | 10/2017 | Park et al. |
| 2017/0302779 A1 | 10/2017 | Zhao et al. |
| 2017/0309174 A1 | 10/2017 | Gonzales et al. |
| 2017/0322713 A1 | 11/2017 | Hwang et al. |
| 2017/0324784 A1 | 11/2017 | Taine et al. |
| 2017/0337791 A1 | 11/2017 | Gordon-Carroll |
| 2017/0352380 A1 | 12/2017 | Doumbouya et al. |
| 2017/0357382 A1 | 12/2017 | Miura et al. |
| 2017/0357425 A1 | 12/2017 | Smith et al. |
| 2017/0357434 A1 | 12/2017 | Coffman et al. |
| 2017/0357439 A1 | 12/2017 | Lemay et al. |
| 2017/0357477 A1 | 12/2017 | Im et al. |
| 2017/0359189 A1 | 12/2017 | Smith et al. |
| 2017/0359191 A1 | 12/2017 | Smith et al. |
| 2017/0359285 A1 | 12/2017 | Weinig et al. |
| 2017/0363436 A1 | 12/2017 | Eronen et al. |
| 2017/0373868 A1 | 12/2017 | Deets, Jr. |
| 2018/0014043 A1 | 1/2018 | Zhang et al. |
| 2018/0014077 A1 | 1/2018 | Hou et al. |
| 2018/0018081 A1 | 1/2018 | Dattilo-Green et al. |
| 2018/0019889 A1 | 1/2018 | Burns et al. |
| 2018/0039916 A1 | 2/2018 | Ravindra |
| 2018/0040324 A1 | 2/2018 | Wilberding |
| 2018/0047200 A1 | 2/2018 | O'hara et al. |
| 2018/0061158 A1 | 3/2018 | Greene |
| 2018/0067712 A1 | 3/2018 | Behzadi et al. |
| 2018/0069957 A1 | 3/2018 | Mushikabe et al. |
| 2018/0070144 A1 | 3/2018 | Tang et al. |
| 2018/0070187 A1 | 3/2018 | Drinkwater et al. |
| 2018/0081522 A1 | 3/2018 | Greenberg et al. |
| 2018/0088795 A1 | 3/2018 | Van Os et al. |
| 2018/0091732 A1 | 3/2018 | Wilson et al. |
| 2018/0095616 A1 | 4/2018 | Valdivia et al. |
| 2018/0101297 A1 | 4/2018 | Yang et al. |
| 2018/0109754 A1 | 4/2018 | Kwon |
| 2018/0113577 A1 | 4/2018 | Burns et al. |
| 2018/0115788 A1 | 4/2018 | Burns et al. |
| 2018/0123986 A1 | 5/2018 | Faulkner et al. |
| 2018/0124359 A1 | 5/2018 | Faulkner |
| 2018/0139374 A1 | 5/2018 | Yu |
| 2018/0157455 A1 | 6/2018 | Troy et al. |
| 2018/0191965 A1 | 7/2018 | Faulkner et al. |
| 2018/0199080 A1 | 7/2018 | Jackson et al. |
| 2018/0199164 A1 | 7/2018 | Bargetzi et al. |
| 2018/0204111 A1 | 7/2018 | Zadeh et al. |
| 2018/0205797 A1 | 7/2018 | Faulkner |
| 2018/0227341 A1 | 8/2018 | Rizzi |
| 2018/0228003 A1 | 8/2018 | O'Driscoll et al. |
| 2018/0232592 A1 | 8/2018 | Stewart et al. |
| 2018/0232705 A1 | 8/2018 | Baker et al. |
| 2018/0249047 A1 | 8/2018 | Marlatt |
| 2018/0249113 A1 | 8/2018 | Faulkner |
| 2018/0295079 A1 | 10/2018 | Longo |
| 2018/0309801 A1 | 10/2018 | Rathod |
| 2018/0329585 A1 | 11/2018 | Carrigan et al. |
| 2018/0329586 A1 | 11/2018 | Sundstrom et al. |
| 2018/0329672 A1 | 11/2018 | Sadak et al. |
| 2018/0332559 A1 | 11/2018 | Gudivada et al. |
| 2018/0335903 A1 | 11/2018 | Coffman et al. |
| 2018/0337924 A1 | 11/2018 | Graham et al. |
| 2018/0341448 A1 | 11/2018 | Behzadi et al. |
| 2018/0348764 A1 | 12/2018 | Zhang et al. |
| 2018/0351762 A1 | 12/2018 | Iyengar et al. |
| 2018/0352072 A1 | 12/2018 | Christie et al. |
| 2018/0364665 A1 | 12/2018 | Clymer et al. |
| 2018/0367484 A1 | 12/2018 | Rodriguez et al. |
| 2018/0367578 A1 | 12/2018 | Verma et al. |
| 2018/0375676 A1 | 12/2018 | Bader-natal et al. |
| 2019/0012069 A1 | 1/2019 | Bates |
| 2019/0012073 A1 | 1/2019 | Hwang |
| 2019/0012966 A1 | 1/2019 | Shi |
| 2019/0025943 A1 | 1/2019 | Jobs et al. |
| 2019/0026021 A1 | 1/2019 | Coffman et al. |
| 2019/0028419 A1 | 1/2019 | Sullivan |
| 2019/0056854 A1 | 2/2019 | Azzolin et al. |
| 2019/0068670 A1 | 2/2019 | Adam et al. |
| 2019/0089934 A1 | 3/2019 | Goulden et al. |
| 2019/0102049 A1 | 4/2019 | Anzures et al. |
| 2019/0102145 A1* | 4/2019 | Wilberding ...... H04N 21/42203 |
| 2019/0124021 A1 | 4/2019 | Demattei |
| 2019/0129661 A1 | 5/2019 | Hirota et al. |
| 2019/0130185 A1 | 5/2019 | Delaney et al. |
| 2019/0138951 A1 | 5/2019 | Brownhill et al. |
| 2019/0199993 A1 | 6/2019 | Babu et al. |
| 2019/0205861 A1 | 7/2019 | Bace |
| 2019/0208282 A1 | 7/2019 | Singh et al. |
| 2019/0228495 A1 | 7/2019 | Tremblay et al. |
| 2019/0236142 A1 | 8/2019 | Balakrishnan et al. |

(56) References Cited

U.S. PATENT DOCUMENTS

| | | |
|---|---|---|
| 2019/0265946 A1 | 8/2019 | Bae et al. |
| 2019/0286651 A1 | 9/2019 | Lee et al. |
| 2019/0294406 A1 | 9/2019 | Bierbower et al. |
| 2019/0295393 A1 | 9/2019 | Lee et al. |
| 2019/0303861 A1 | 10/2019 | Mathias et al. |
| 2019/0306607 A1 | 10/2019 | Clayton et al. |
| 2019/0339825 A1 | 11/2019 | Anzures et al. |
| 2019/0342507 A1 | 11/2019 | Dye et al. |
| 2019/0342519 A1 | 11/2019 | Van Os et al. |
| 2019/0342621 A1 | 11/2019 | Carrigan et al. |
| 2019/0342622 A1 | 11/2019 | Carrigan et al. |
| 2019/0347181 A1 | 11/2019 | Cranfill et al. |
| 2019/0361575 A1* | 11/2019 | Ni .......................... G06F 3/167 |
| 2019/0361694 A1 | 11/2019 | Gordon et al. |
| 2019/0362555 A1 | 11/2019 | Chen et al. |
| 2019/0370805 A1 | 12/2019 | Van Os et al. |
| 2020/0055515 A1 | 2/2020 | Herman et al. |
| 2020/0104018 A1 | 4/2020 | Coffman et al. |
| 2020/0106952 A1 | 4/2020 | Missig et al. |
| 2020/0106965 A1 | 4/2020 | Malia et al. |
| 2020/0135191 A1* | 4/2020 | Nourbakhsh ........... G10L 15/22 |
| 2020/0143593 A1 | 5/2020 | Rudman et al. |
| 2020/0152186 A1* | 5/2020 | Koh ........................ G10L 15/08 |
| 2020/0183548 A1 | 6/2020 | Anzures et al. |
| 2020/0186378 A1* | 6/2020 | Six ........................... H04L 67/16 |
| 2020/0195887 A1 | 6/2020 | Van Os et al. |
| 2020/0201491 A1 | 6/2020 | Coffman et al. |
| 2020/0201495 A1 | 6/2020 | Coffman et al. |
| 2020/0218486 A1 | 7/2020 | Behzadi et al. |
| 2020/0225817 A1 | 7/2020 | Coffman et al. |
| 2020/0225841 A1 | 7/2020 | Coffman et al. |
| 2020/0242788 A1 | 7/2020 | Jacobs et al. |
| 2020/0274726 A1 | 8/2020 | Setteboun et al. |
| 2020/0279279 A1 | 9/2020 | Chaudhuri |
| 2020/0296329 A1 | 9/2020 | Tang et al. |
| 2020/0302913 A1* | 9/2020 | Marcinkiewicz ....... G06F 40/40 |
| 2020/0348807 A1 | 11/2020 | Garcia et al. |
| 2020/0379711 A1 | 12/2020 | Graham et al. |
| 2020/0379712 A1 | 12/2020 | Carrigan |
| 2020/0379713 A1 | 12/2020 | Carrigan |
| 2020/0379714 A1 | 12/2020 | Graham et al. |
| 2020/0379716 A1 | 12/2020 | Carrigan et al. |
| 2020/0379729 A1 | 12/2020 | Graham et al. |
| 2020/0379730 A1 | 12/2020 | Graham et al. |
| 2020/0382332 A1 | 12/2020 | Carrigan et al. |
| 2020/0382559 A1 | 12/2020 | Kramar et al. |
| 2020/0385116 A1 | 12/2020 | Sabripour et al. |
| 2020/0395012 A1* | 12/2020 | Kim ....................... G10L 15/30 |
| 2020/0400957 A1 | 12/2020 | Van Heugten |
| 2020/0413197 A1 | 12/2020 | Carrigan et al. |
| 2021/0011588 A1 | 1/2021 | Coffman et al. |
| 2021/0043189 A1* | 2/2021 | Pyun ...................... G06F 21/32 |
| 2021/0064317 A1 | 3/2021 | Juenger et al. |
| 2021/0065134 A1 | 3/2021 | Chhabra et al. |
| 2021/0092491 A1 | 3/2021 | Carrigan et al. |
| 2021/0096703 A1 | 4/2021 | Anzures et al. |
| 2021/0097768 A1 | 4/2021 | Malia et al. |
| 2021/0099829 A1* | 4/2021 | Soto ....................... G08C 17/02 |
| 2021/0136129 A1 | 5/2021 | Ponnusamy et al. |
| 2021/0144336 A1 | 5/2021 | Van Os et al. |
| 2021/0152503 A1 | 5/2021 | Rodriguez et al. |
| 2021/0158622 A1 | 5/2021 | Leelaphattarakij et al. |
| 2021/0158830 A1* | 5/2021 | Boehlke ................... H04R 3/12 |
| 2021/0176204 A1 | 6/2021 | Geppert et al. |
| 2021/0181903 A1 | 6/2021 | Carrigan et al. |
| 2021/0195084 A1 | 6/2021 | Olajos et al. |
| 2021/0217106 A1 | 7/2021 | Hauser et al. |
| 2021/0255816 A1 | 8/2021 | Behzadi et al. |
| 2021/0255819 A1 | 8/2021 | Graham et al. |
| 2021/0263702 A1 | 8/2021 | Carrigan |
| 2021/0265032 A1 | 8/2021 | Burgess et al. |
| 2021/0266274 A1 | 8/2021 | Liu et al. |
| 2021/0323406 A1 | 10/2021 | So et al. |
| 2021/0349680 A1 | 11/2021 | Kim et al. |
| 2021/0392223 A1 | 12/2021 | Coffman et al. |
| 2021/0409359 A1 | 12/2021 | Eirinberg et al. |
| 2022/0004356 A1 | 1/2022 | Kim et al. |
| 2022/0006946 A1 | 1/2022 | Missig et al. |
| 2022/0043626 A1 | 2/2022 | Carrigan |
| 2022/0046222 A1 | 2/2022 | Meier |
| 2022/0050578 A1 | 2/2022 | Waldman et al. |
| 2022/0053142 A1 | 2/2022 | Manzari et al. |
| 2022/0100367 A1 | 3/2022 | Carrigan et al. |
| 2022/0141329 A1 | 5/2022 | Christie et al. |
| 2022/0244836 A1 | 8/2022 | O'Leary et al. |
| 2022/0247918 A1 | 8/2022 | O'Leary et al. |
| 2022/0247919 A1 | 8/2022 | O'Leary et al. |
| 2022/0279022 A1 | 9/2022 | Kramar et al. |
| 2022/0279063 A1 | 9/2022 | Coffman et al. |
| 2022/0286314 A1 | 9/2022 | Meyer et al. |
| 2022/0286549 A1 | 9/2022 | Coffman et al. |

FOREIGN PATENT DOCUMENTS

| | | |
|---|---|---|
| CN | 1641589 A | 7/2005 |
| CN | 1679019 A | 10/2005 |
| CN | 1689327 A | 10/2005 |
| CN | 1863281 A | 11/2006 |
| CN | 1890996 A | 1/2007 |
| CN | 101046721 A | 10/2007 |
| CN | 101075173 A | 11/2007 |
| CN | 101276255 A | 10/2008 |
| CN | 101431564 A | 5/2009 |
| CN | 101517557 A | 8/2009 |
| CN | 101853132 A | 10/2010 |
| CN | 101854247 A | 10/2010 |
| CN | 101917529 A | 12/2010 |
| CN | 102202192 A | 9/2011 |
| CN | 102215374 A | 10/2011 |
| CN | 102281294 A | 12/2011 |
| CN | 102301323 A | 12/2011 |
| CN | 102572369 A | 7/2012 |
| CN | 102651731 A | 8/2012 |
| CN | 102740146 A | 10/2012 |
| CN | 102915630 A | 2/2013 |
| CN | 102932216 A | 2/2013 |
| CN | 103039064 A | 4/2013 |
| CN | 103119968 A | 5/2013 |
| CN | 103136497 A | 6/2013 |
| CN | 103207674 A | 7/2013 |
| CN | 103222247 A | 7/2013 |
| CN | 103260079 A | 8/2013 |
| CN | 103309606 A | 9/2013 |
| CN | 103347116 A | 10/2013 |
| CN | 103384235 A | 11/2013 |
| CN | 103399703 A | 11/2013 |
| CN | 103440247 A | 12/2013 |
| CN | 103442774 A | 12/2013 |
| CN | 103458215 A | 12/2013 |
| CN | 103581544 A | 2/2014 |
| CN | 103583031 A | 2/2014 |
| CN | 103593154 A | 2/2014 |
| CN | 103649985 A | 3/2014 |
| CN | 103677711 A | 3/2014 |
| CN | 103685729 A | 3/2014 |
| CN | 103748610 A | 4/2014 |
| CN | 103959751 A | 7/2014 |
| CN | 104010158 A | 8/2014 |
| CN | 104076757 A | 10/2014 |
| CN | 104106036 A | 10/2014 |
| CN | 104155938 A | 11/2014 |
| CN | 104247449 A | 12/2014 |
| CN | 104284477 A | 1/2015 |
| CN | 104298188 A | 1/2015 |
| CN | 104427288 A | 3/2015 |
| CN | 104429094 A | 3/2015 |
| CN | 104469143 A | 3/2015 |
| CN | 104469512 A | 3/2015 |
| CN | 104581043 A | 4/2015 |
| CN | 104602133 A | 5/2015 |
| CN | 104684207 A | 6/2015 |
| CN | 104766021 A | 7/2015 |
| CN | 104780654 A | 7/2015 |
| CN | 104820631 A | 8/2015 |

(56) References Cited

FOREIGN PATENT DOCUMENTS

| | | |
|---|---|---|
| CN | 104898603 A | 9/2015 |
| CN | 104956417 A | 9/2015 |
| CN | 104980578 A | 10/2015 |
| CN | 105069118 A | 11/2015 |
| CN | 105094957 A | 11/2015 |
| CN | 105141498 A | 12/2015 |
| CN | 105159107 A | 12/2015 |
| CN | 105204846 A | 12/2015 |
| CN | 105263114 A | 1/2016 |
| CN | 105264473 A | 1/2016 |
| CN | 105373165 A | 3/2016 |
| CN | 105374192 A | 3/2016 |
| CN | 105389173 A | 3/2016 |
| CN | 105474580 A | 4/2016 |
| CN | 105549947 A | 5/2016 |
| CN | 105553796 A | 5/2016 |
| CN | 105554429 A | 5/2016 |
| CN | 205263700 U | 5/2016 |
| CN | 105794231 A | 7/2016 |
| CN | 105900376 A | 8/2016 |
| CN | 105940678 A | 9/2016 |
| CN | 106030700 A | 10/2016 |
| CN | 106062810 A | 10/2016 |
| CN | 106210855 A | 12/2016 |
| CN | 106383645 A | 2/2017 |
| CN | 106471793 A | 3/2017 |
| CN | 107066523 A | 8/2017 |
| CN | 107197441 A | 9/2017 |
| CN | 107533368 A | 1/2018 |
| CN | 107533417 A | 1/2018 |
| CN | 107534656 A | 1/2018 |
| CN | 107613235 A | 1/2018 |
| CN | 107704177 A | 2/2018 |
| CN | 107728876 A | 2/2018 |
| CN | 107819928 A | 3/2018 |
| CN | 107992248 A | 5/2018 |
| CN | 109117078 A | 1/2019 |
| CN | 109196825 A | 1/2019 |
| CN | 109287140 A | 1/2019 |
| CN | 109302531 A | 2/2019 |
| CN | 109347581 A | 2/2019 |
| CN | 109348052 A | 2/2019 |
| CN | 109688441 A | 4/2019 |
| CN | 109688442 A | 4/2019 |
| EP | 1133119 A2 | 9/2001 |
| EP | 1881649 A2 | 1/2008 |
| EP | 2018032 A1 | 1/2009 |
| EP | 2056568 A1 | 5/2009 |
| EP | 2237536 A1 | 10/2010 |
| EP | 2490432 A1 | 8/2012 |
| EP | 2582120 A1 | 4/2013 |
| EP | 2675195 A2 | 12/2013 |
| EP | 2750062 A2 | 7/2014 |
| EP | 2770673 A1 | 8/2014 |
| EP | 2784611 A2 | 10/2014 |
| EP | 2797391 A1 | 10/2014 |
| EP | 2879470 A1 | 6/2015 |
| EP | 2892240 A1 | 7/2015 |
| EP | 2894948 A2 | 7/2015 |
| EP | 2446619 B1 | 10/2015 |
| EP | 2933953 A1 | 10/2015 |
| EP | 2981093 A1 | 2/2016 |
| EP | 3032537 A2 | 6/2016 |
| EP | 3038427 A1 | 6/2016 |
| EP | 3057342 A1 | 8/2016 |
| EP | 3073703 A1 | 9/2016 |
| EP | 2761582 B1 | 3/2017 |
| EP | 3138300 A1 | 3/2017 |
| EP | 3276905 A1 | 1/2018 |
| EP | 3379853 A1 | 9/2018 |
| EP | 3445058 A1 | 2/2019 |
| EP | 3460770 A1 | 3/2019 |
| EP | 3038427 B1 | 12/2019 |
| EP | 3163866 B1 | 5/2020 |
| GB | 2402105 A | 12/2004 |
| GB | 2499123 A | 8/2013 |
| GB | 2512821 A | 10/2014 |
| GB | 2533101 A | 6/2016 |
| JP | 4-175921 A | 6/1992 |
| JP | 6-178356 A | 6/1994 |
| JP | 11-98249 A | 4/1999 |
| JP | 2002-153678 A | 5/2002 |
| JP | 2003-141050 A | 5/2003 |
| JP | 2005-94696 A | 4/2005 |
| JP | 2006-072489 A | 3/2006 |
| JP | 2006-135667 A | 5/2006 |
| JP | 2006-350819 A | 12/2006 |
| JP | 2007-150921 A | 6/2007 |
| JP | 2008-526156 A | 7/2008 |
| JP | 2008-546069 A | 12/2008 |
| JP | 2009-201127 A | 9/2009 |
| JP | 2010-503126 A | 1/2010 |
| JP | 2010-503332 A | 1/2010 |
| JP | 2011-065654 A | 3/2011 |
| JP | 2011-107823 A | 6/2011 |
| JP | 2011-124665 A | 6/2011 |
| JP | 2012-508530 A | 4/2012 |
| JP | 2012-123460 A | 6/2012 |
| JP | 2013-098613 A | 5/2013 |
| JP | 2014-71835 A | 4/2014 |
| JP | 2014-87126 A | 5/2014 |
| JP | 2014-160461 A | 9/2014 |
| JP | 2014-186961 A | 10/2014 |
| JP | 2015-11507 A | 1/2015 |
| JP | 2015-61318 A | 3/2015 |
| JP | 2015-70327 A | 4/2015 |
| JP | 2015-125671 A | 7/2015 |
| JP | 2015-128043 A | 7/2015 |
| JP | 2015-128326 A | 7/2015 |
| JP | 2015-149710 A | 8/2015 |
| JP | 2015-154253 A | 8/2015 |
| JP | 2015-170234 A | 9/2015 |
| JP | 2015-195222 A | 11/2015 |
| JP | 2015-211035 A | 11/2015 |
| JP | 2016-1446 A | 1/2016 |
| JP | 2016-051661 A | 4/2016 |
| JP | 2016-119600 A | 6/2016 |
| JP | 2016-174282 A | 9/2016 |
| JP | 2017-158202 A | 9/2017 |
| JP | 2017-228843 A | 12/2017 |
| JP | 2018-7158 A | 1/2018 |
| JP | 2018-56719 A | 4/2018 |
| JP | 2018-63826 A | 4/2018 |
| JP | 2019-526095 A | 9/2019 |
| KR | 2001-0091156 A | 10/2001 |
| KR | 10-2004-0089329 A | 10/2004 |
| KR | 10-2010-0036351 A | 4/2010 |
| KR | 10-2011-0022980 A | 3/2011 |
| KR | 10-2011-0093040 A | 8/2011 |
| KR | 10-2012-0059860 A | 6/2012 |
| KR | 10-2012-0079208 A | 7/2012 |
| KR | 10-2013-0115611 A | 10/2013 |
| KR | 10-2015-0005134 A | 1/2015 |
| KR | 10-2015-0043146 A | 4/2015 |
| KR | 10-1522311 B1 | 5/2015 |
| KR | 10-2015-0121177 A | 10/2015 |
| KR | 10-2015-0136440 A | 12/2015 |
| KR | 10-2016-0092363 A | 8/2016 |
| KR | 10-2016-0141847 A | 12/2016 |
| KR | 10-2017-0008601 A | 1/2017 |
| KR | 10-2017-0027435 A | 3/2017 |
| KR | 10-2017-0027999 A | 3/2017 |
| KR | 10-2017-0082022 A | 7/2017 |
| KR | 10-2017-0124954 A | 11/2017 |
| KR | 10-2018-0034637 A | 4/2018 |
| KR | 10-2019-0002658 A | 1/2019 |
| KR | 10-2019-0014495 A | 2/2019 |
| KR | 10-2019-0022883 A | 3/2019 |
| KR | 10-2019-0057414 A | 5/2019 |
| KR | 10-2020-0039030 A | 4/2020 |
| TW | 201547326 A | 12/2015 |
| WO | 2000/39964 A1 | 7/2000 |
| WO | 2004/032507 A1 | 4/2004 |
| WO | 2005/055521 A1 | 6/2005 |

(56) References Cited

FOREIGN PATENT DOCUMENTS

| | | |
|---|---|---|
| WO | 2005/060501 A2 | 7/2005 |
| WO | 2008/030972 A1 | 3/2008 |
| WO | 2009/005563 A1 | 1/2009 |
| WO | 2009/071112 A1 | 6/2009 |
| WO | 2009/086599 A1 | 7/2009 |
| WO | 2010/054373 A2 | 5/2010 |
| WO | 2010/087988 A1 | 8/2010 |
| WO | 2011027964 A1 | 3/2011 |
| WO | 2011/146605 A1 | 11/2011 |
| WO | 2011/146839 A1 | 11/2011 |
| WO | 2011/161145 A1 | 12/2011 |
| WO | 2012/004288 A1 | 1/2012 |
| WO | 2012/037170 A1 | 3/2012 |
| WO | 2012/085794 A1 | 6/2012 |
| WO | 2012/166277 A1 | 12/2012 |
| WO | 2012/166352 A1 | 12/2012 |
| WO | 2013/048880 A1 | 4/2013 |
| WO | 2013/049346 A1 | 4/2013 |
| WO | 2013/153405 A2 | 10/2013 |
| WO | 2013/169875 A2 | 11/2013 |
| WO | 2014/030320 A1 | 2/2014 |
| WO | 2014/030540 A1 | 2/2014 |
| WO | 2014/058937 A1 | 4/2014 |
| WO | 2014/107469 A2 | 7/2014 |
| WO | 2014/151089 A1 | 9/2014 |
| WO | 2014/155429 A1 | 10/2014 |
| WO | 2014/208057 A1 | 12/2014 |
| WO | 2015/008409 A1 | 1/2015 |
| WO | 2015/076930 A1 | 5/2015 |
| WO | 2015/124831 A1 | 8/2015 |
| WO | 2015/134692 A1 | 9/2015 |
| WO | 2015/179031 A1 | 11/2015 |
| WO | 2015/183755 A1 | 12/2015 |
| WO | 2015/185123 A1 | 12/2015 |
| WO | 2016/033400 A1 | 3/2016 |
| WO | 2016/052888 A1 | 4/2016 |
| WO | 2016/057117 A1 | 4/2016 |
| WO | 2016/168154 A1 | 10/2016 |
| WO | 2016/204186 A1 | 12/2016 |
| WO | 2017027526 A1 | 2/2017 |
| WO | 2017/058293 A1 | 4/2017 |
| WO | 2017/058442 A1 | 4/2017 |
| WO | 2017/147081 A1 | 8/2017 |
| WO | 2017/205657 A1 | 11/2017 |
| WO | 2017/218192 A1 | 12/2017 |
| WO | 2017218143 A1 | 12/2017 |
| WO | 2018/048510 A1 | 3/2018 |
| WO | 2018/084802 A1 | 5/2018 |
| WO | 2018/098136 A1 | 5/2018 |
| WO | 2018/144339 A2 | 8/2018 |
| WO | 2018/213401 A1 | 11/2018 |
| WO | 2018/213415 A1 | 11/2018 |
| WO | 2019/090653 A1 | 5/2019 |
| WO | 2020/063762 A1 | 4/2020 |
| WO | 2021/112983 A1 | 6/2021 |

OTHER PUBLICATIONS

"WhatsApp" users over 400 million people! I tried to investigate the most used messaging application in the world, Available at "http://www.appps.jp/2128786/", Jan. 24, 2014, 10 pages (2 pages of English Translation and 8 pages of Official Copy Only).
Ambrogi Robert, "Send Secure, Self-Destructing Messages with Wickr", Lawsites Blog, Available online at: https://www.lawsitesblog.com/2013/11/send-secure-self-destructing-messages-wickr.html, Nov. 5, 2013, 3 pages.
Applicant initiated interview summary received for U.S. Appl. No. 15/488,093, dated Jan. 14, 2020, 4 pages.
Applicant-Initiated Interview Summary received for U.S. Appl. No. 15/960,330, dated Aug. 11, 2020, 3 pages.
Applicant-Initiated Interview Summary received for U.S. Appl. No. 15/960,330, dated Jan. 21, 2021, 5 pages.
Applicant-Initiated Interview Summary received for U.S. Appl. No. 16/803,849, dated Oct. 12, 2021, 6 pages.
Board Decision received for Chinese Patent Application No. 201580029071.7, mailed on Jul. 13, 2021, 2 pages (1 page of English Translation and 1 page of Official Copy).
Brief Communication Regarding Oral Proceedings received for European Patent Application No. 17167629.9, mailed on Nov. 12, 2020, 2 pages.
Corrected Notice of Allowance received for U.S. Appl. No. 12/163,908, dated Feb. 22, 2018, 8 pages.
Corrected Notice of Allowance received for U.S. Appl. No. 14/928,865, dated Aug. 5, 2019, 2 pages.
Corrected Notice of Allowance received for U.S. Appl. No. 14/928,865, dated May 16, 2019, 2 pages.
Corrected Notice of Allowance received for U.S. Appl. No. 15/366,763, dated Jan. 2, 2020, 5 pages.
Corrected Notice of Allowance received for U.S. Appl. No. 15/366,890, dated Feb. 12, 2020, 2 pages.
Corrected Notice of Allowance received for U.S. Appl. No. 15/488,093, dated Jun. 15, 2020, 2 pages.
Corrected Notice of Allowance received for U.S. Appl. No. 15/488,093, dated Jun. 30, 2020, 2 pages.
Corrected Notice of Allowance received for U.S. Appl. No. 16/807,604, dated Oct. 4, 2021, 5 pages.
Corrected Notice of Allowance received for U.S. Appl. No. 16/836,571, dated Oct. 12, 2021, 4 pages.
Decision on Appeal received for U.S. Appl. No. 14/503,355, mailed on Aug. 25, 2020, 10 pages.
Decision to Refuse received for European Patent Application No. 15728307.8, dated Dec. 18, 2019, 14 pages.
Decision to Refuse received for European Patent Application No. 15729286.3, dated Dec. 18, 2019, 13 pages.
Decision to Refuse received for European Patent Application No. 17167629.9, dated Nov. 24, 2020, 2 pages.
Examiner's Answer to Appeal Brief received for U.S. Appl. No. 14/503,355, mailed on Apr. 17, 2020, 17 pages.
Extended European Search Report Received for European Patent Application No. 17167629.9, dated Jun. 2, 2017, 7 pages.
Final Office Action received for U.S. Appl. No. 12/163,908, dated Nov. 7, 2012, 15 pages.
Final Office Action received for U.S. Appl. No. 14/503,355, dated May 20, 2019, 27 pages.
Final Office Action received for U.S. Appl. No. 14/503,355, dated Sep. 8, 2017., 25 pages.
Final Office Action received for U.S. Appl. No. 14/928,865, dated Dec. 5, 2018, 15 pages.
Final Office Action received for U.S. Appl. No. 15/960,330, dated Nov. 10, 2020, 19 pages.
International Preliminary Report on Patentability received for PCT Patent Application No. PCT/US2015/032305, dated Dec. 15, 2016, 8 pages.
International Preliminary Reporton Patentability received for PCT Patent Application No. PCT/US2015/032309, dated Dec. 15, 2016, 8 pages.
International Search Report and Written Opinion received for PCT Patent Application No. PCT/US2015/032305, dated Sep. 10, 2015, 10 pages.
International Search Report and Written Opinion received for PCT Patent Application No. PCT/US2015/032309, dated Sep. 2, 2015, 10 pages.
International Search Report and Written Opinion received for PCT Patent Application No. PCT/US2021/031760, dated Sep. 16, 2021, 18 pages.
Minutes of Oral Proceedings received for European Patent Application No. 15728307.8, mailed on Dec. 13, 2019, 4 pages.
Minutes of Oral Proceedings received for European Patent Application No. 15729286.3, mailed on Dec. 13, 2019, 4 pages.
Mobile How to, "How to Send a Picture Message/MMS—Samsung Galaxy Note 3", Online Available at: https://www.youtube.com/watch?v=-3d0z8-KeDw, Published on Nov. 3, 2013, 1 page.
Non-Final Office Action received for U.S. Appl. No. 14/503,386, dated Jan. 7, 2015, 19 pages.
Non-Final Office Action received for U.S. Appl. No. 12/163,908, dated Apr. 7, 2017, 13 pages.

(56) References Cited

OTHER PUBLICATIONS

Non-Final Office Action received for U.S. Appl. No. 12/163,908, dated Jun. 13, 2012, 17 pages.
Non-Final Office Action received for U.S. Appl. No. 14/503,355, dated Dec. 30, 2016, 23 pages.
Non-Final Office Action received for U.S. Appl. No. 14/503,355, dated Sep. 4, 2018, 25 pages.
Non-Final Office Action received for U.S. Appl. No. 14/503,376, dated Dec. 22, 2014, 21 pages.
Non-Final Office Action received for U.S. Appl. No. 14/928,865, dated Mar. 27, 2018, 15 pages.
Non-Final Office Action received for U.S. Appl. No. 15/366,763, dated Mar. 8, 2019, 14 pages.
Non-Final Office Action received for U.S. Appl. No. 15/366,890, dated May 8, 2019, 16 pages.
Non-Final Office Action received for U.S. Appl. No. 15/488,093, dated Oct. 4, 2019, 18 pages.
Non-Final Office Action received for U.S. Appl. No. 15/960,330, dated Apr. 28, 2020, 20 pages.
Norman Don, "Affordances and Design", Jng.org, Available at: <http://jnd.org/dn.mss/affordances_and.html>, Jan. 14, 2006, 5 pages.
Notice of Acceptance received for Australian Patent Application No. 2015267259, dated Jan. 30, 2018., 3 pages.
Notice of Acceptance received for Australian Patent Application No. 2015267260, dated Jan. 30, 2018, 3 pages.
Notice of Acceptance received for Australian Patent Application No. 2018203215, dated Nov. 20, 2019, 3 pages.
Notice of Acceptance received for Australian Patent Application No. 2020201575, dated Mar. 15, 2021, 3 pages.
Notice of Allowance received for Chinese Patent Application No. 201510290133.1, dated Jan. 9, 2019, 2 pages (1 page of English Translation and 1 page of Official copy).
Notice of Allowance received for Chinese Patent Application No. 201510291012.9, dated Jan. 9, 2019, 2 pages (1 page of English Translation and 1 page of Official Copy).
Notice of Allowance received for Chinese Patent Application No. 201520365358.4, dated Nov. 20, 2015, 4 pages (2 pages of English Translation and 2 pages of Official Copy).
Notice of Allowance received for Chinese Patent Application No. 201520365843.1, dated Feb. 15, 2016, 5 pages (3 pages of English Translation and 2 pages of official Copy).
Notice of Allowance received for Chinese Patent Application No. 201580029071.7, dated Aug. 19, 2021, 5 pages (1 page of English Translation and 4 pages of Official Copy).
Notice of Allowance received for Chinese Patent Application No. 201710267617.3, dated May 8, 2021, 2 pages (1 page of English Translation and 1 page of Official Copy).
Notice of Allowance received for Japanese Patent Application No. 2017-514992, dated Feb. 15, 2019, 4 pages (1 page of English Translation and 3 pages of Official Copy).
Notice of Allowance received for Japanese Patent Application No. 2017-514993, dated Jan. 12, 2018, 4 pages (1 page of English Translation and 3 pages of Official copy).
Notice of Allowance received for Japanese Patent Application No. 2018-018497, dated Jun. 21, 2019, 4 pages (1 page of English Translation and 3 pages of Official Copy).
Notice of Allowance received for Japanese Patent Application No. 2019-050138, dated Jun. 15, 2020, 5 pages (1 page of English Translation and 4 pages of Official Copy).
Notice of Allowance received for Japanese Patent Application No. 2020-118723, dated Oct. 16, 2020, 4 pages (1 page of English Translation and 3 pages of Official Copy).
Notice of Allowance received for Japanese Patent Application No. 2020-187397, dated Sep. 10, 2021, 4 pages (1 page of English Translation and 3 pages of Official Copy).
Notice of Allowance received for U.S. Appl. No. 12/163,908, dated Nov. 30, 2017, 13 pages.
Notice of Allowance received for U.S. Appl. No. 14/503,376, dated Jul. 29, 2015, 13 pages.
Notice of Allowance received for U.S. Appl. No. 14/503,376, dated Sep. 2, 2015, 2 pages.
Notice of Allowance received for U.S. Appl. No. 14/503,376, dated Sep. 24, 2015, 5 pages.
Notice of Allowance received for U.S. Appl. No. 14/503,386, dated Jul. 30, 2015, 12 pages.
Notice of Allowance received for U.S. Appl. No. 14/503,386, dated Sep. 24, 2015, 5 pages.
Notice of Allowance received for U.S. Appl. No. 14/928,865, dated Apr. 3, 2019, 7 pages.
Notice of Allowance received for U.S. Appl. No. 14/928,865, dated Jul. 22, 2019, 7 pages.
Notice of Allowance received for U.S. Appl. No. 15/366,763, dated Oct. 8, 2019, 10 pages.
Notice of Allowance received for U.S. Appl. No. 15/366,890, dated Nov. 14, 2019, 9 pages.
Notice of Allowance received for U.S. Appl. No. 15/488,093, dated Apr. 22, 2020, 8 pages.
Notice of Allowance received for U.S. Appl. No. 15/960,330, dated Apr. 30, 2021, 18 pages.
Notice of Allowance received for U.S. Appl. No. 16/922,675, dated Sep. 27, 2021, 10 pages.
Office Action received for Australian Patent Application No. 2015100711, dated Jul. 27, 2015, 7 pages.
Office Action Received for Australian Patent Application No. 2015100711, dated Nov. 19, 2015, 6 pages.
Office Action received for Australian Patent Application No. 2015267259, dated Jun. 2, 2017, 2 pages.
Office Action received for Australian Patent Application No. 2015267260, dated Jun. 2, 2017, 2 pages.
Office Action received for Australian Patent Application No. 2016102028, dated Feb. 13, 2017, 4 pages.
Office Action received for Australian Patent Application No. 2016102029, dated Feb. 22, 2017, 4 pages.
Office Action received for Australian Patent Application No. 2018203215, dated Mar. 29, 2019, 3 pages.
Office Action received for Australian Patent Application No. 2020201575, dated Dec. 22, 2020, 3 pages.
Office Action received for Chinese Patent Application No. 201510290133.1, dated Feb. 9, 2018, 10 pages (5 pages of English Translation and 5 pages of Official Copy).
Office Action Received for Chinese Patent Application No. 201510291012.9, dated Feb. 8, 2018, 10 pages (5 pages of English Translation and 5 pages of Official Copy).
Office Action received for Chinese Patent Application No. 201520365358.4, dated Aug. 11, 2015, 4 pages (2 pages of English Translation and 2 pages of Official Copy).
Office Action received for Chinese Patent Application No. 201520365843.1, dated Aug. 25, 2015, 4 pages (2 pages of English Translation and 2 pages of Official Copy).
Office Action Received for Chinese Patent Application No. 201520365843.1, dated Nov. 16, 2015, 3 pages (2 pages of English Translation and 1 page of Official Copy).
Office Action received for Chinese Patent Application No. 201580029071.7, dated Apr. 2, 2021, 19 pages (3 pages of English Translation and 16 pages of Official Copy).
Office Action received for Chinese Patent Application No. 201580029071.7, dated Apr. 9, 2020, 33 pages (9 pages of English Translation and 24 pages of Official Copy).
Office Action received for Chinese Patent Application No. 201580029071.7, dated Jul. 2, 2019, 29 pages (8 pages of English Translation and 21 pages of Official Copy).
Office Action received for Chinese Patent Application No. 201580029071.7, dated Oct. 29, 2020, 20 pages (5 pages of English Translation and 15 pages of Official Copy).
Office Action received for Chinese Patent Application No. 201620393549.6, dated Aug. 18, 2016, 2 pages (1 page of English Translation and 1 page of Official copy).
Office Action received for Chinese Patent Application No. 201620393549.6, dated Jan. 13, 2017, 2 Pages (Official Copy only). (See Communication under 37 CFR § 1.98(a) (3)).

(56) References Cited

OTHER PUBLICATIONS

Office Action received for Chinese Patent Application No. 201620393748.7, dated Aug. 18, 2016, 2 pages (1 page of English Translation and 1 page of Official Copy).
Office Action received for Chinese Patent Application No. 201620393748.7, dated Jan. 13, 2017, 2 Pages (Official Copy only). (See Communication under 37 CFR § 1.98(a) (3)).
Office Action received for Chinese Patent Application No. 201710267617.3, dated Apr. 17, 2020, 23 pages (7 pages of English Translation and 16 pages of Official Copy).
Office Action received for Chinese Patent Application No. 201710267617.3, dated Jul. 10, 2019, 18 pages (4 pages of English Translation and 14 pages of Official copy).
Office Action received for Chinese Patent Application No. 201710267617.3, dated Nov. 2, 2020, 6 pages (3 pages of English Translation and 3 pages of Official Copy).
Office Action received for Danish Patent Application No. PA202070617, dated Sep. 24, 2021, 4 pages.
Office Action received for European Patent Application No. 15729286.3, dated Feb. 7, 2018., 7 pages.
Office Action received for European Patent Application No. 15728307.8, dated Feb. 8, 2018, 7 pages.
Office Action received for European Patent Application No. 17167629.9, dated Jan. 25, 2019, 7 pages.
Office Action received for Japanese Patent Application No. 2017-514992, dated Apr. 6, 2018, 11 pages (6 pages of English Translation and 5 Page of Official Copy).
Office Action received for Japanese Patent Application No. 2018-018497, dated Dec. 10, 2018, 8 pages (4 pages of English Translation and 4 pages of Official Copy).
Office Action received for Japanese Patent Application No. 2019-050138, dated Jan. 27, 2020, 9 pages (4 pages of English Translation and 5 pages of Official Copy).
Office Action received for Japanese Patent Application No. 2020-047952, dated Aug. 27, 2021, 13 pages (6 pages of English Translation and 7 pages of Official Copy).
Office Action received for Japanese Patent Application No. 2020-187397, dated Mar. 12, 2021, 8 pages (4 pages of English Translation and 4 pages of Official Copy).
Office Action received for Japanese Patent Application No. 2021-026630, dated Aug. 20, 2021, 7 pages (3 pages of English Translation and 4 pages of Official Copy).
Olson Parmy, "Delete by Default: Why More Snapchat-Like Messaging Is on Its Way", Forbes.com, Available Online at: https://www.forbes.com/sites/parmyolson/2013/11/22/delete-by-default-why-more-snapchat-like-messaging-is-on-its-way, Nov. 22, 2013, 6 pages.
Result of Consultation received for European Patent Application No. 15728307.8, mailed on Nov. 21, 2019, 7 pages.
Result of Consultation received for European Patent Application No. 15729286.3, mailed on Nov. 21, 2019, 6 pages.
Result of Consultation received for European Patent Application No. 17167629.9, mailed on Nov. 10, 2020, 3 pages.
Search Report and Opinion received for Danish Patent Application No. PA202170320, dated Oct. 6, 2021, 9 pages.
SOFTONIC, "Beginners Guide to WhatsApp", Retrieved from the Internet: https://www.youtube.com/watch?v=1YN36kYDgrk, Apr. 29, 2013, 2 pages.
Summons to Attend Oral Proceedings received for European Patent Application No. 15728307.8, mailed on Jun. 28, 2019, 10 pages.
Summons to Attend Oral Proceedings received for European Patent Application No. 15729286.3, mailed on Jun. 27, 2019, 9 pages.
Summons to Attend Oral Proceedings received for European Patent Application No. 17167629.9, mailed on Jun. 3, 2020, 11 pages.
WeChat Philippines, "WeChat TVC—Hold to Talk", available at <https://www.youtube.com/watch?v=E_UxteOWVSo>, May 11, 2013, 1 page.
WeChat Wiki, available on: <http://web.archive.org/web/20130514131044/http://wechat.wikia.com/wiki/WeChat_Wiki>, May 14, 2013, 12 pages.

You can use LINE perfectly if you just read this!!, How to use & set up LINE, LINE convenience book for 50 million people, Japan, EI Publishing Co., Ltd., Mar. 10, 2014, pp. 16-55 (official copy only). (See Communication under 37 CFR § 1.98(a) (3)).
YUNDANFENGQINGDEQING,"A light cloud and light breeze; How to upload multiple pictures on Sina Weibo", Baidu Experience, Available Online at: <https://jingyan.baidu.com/article/6181c3e074ad0d152ff15353.html>, Jan. 13, 2014, 12 pages (6 pages of English Translation and 6 pages of Official Copy).
Alba Davey, "Samsung Shape: for $400, Your Music Can Follow You Around the House", Online available at: https://www.popularmechanics.com/technology/audio/a9536/samsung-shape-for-400-your-music-can-follow-you-aroundnd-15997831/, Oct. 3, 2013, 5 pages.
Applicant-Initiated Interview Summary received for U.S. Appl. No. 16/922,675, dated Sep. 3, 2021, 2 pages.
Applicant-Initiated Interview Summary received for U.S. Appl. No. 17/223,794, dated Sep. 7, 2021, 3 pages.
Decision to Grant received for European Patent Application No. 19182037.2, dated Sep. 16, 2021, 3 pages.
Intention to Grant received for European Patent Application No. 19207753.5, dated Sep. 3, 2021, 8 pages.
Notice of Acceptance received for Australian Patent Application No. 2020257092, dated Aug. 27, 2021, 3 pages.
Notice of Allowance received for Chinese Patent Application No. 202011243876.0, dated Sep. 8, 2021, 4 pages (1 page of English Translation and 3 pages of Official Copy).
Notice of Allowance received for U.S. Appl. No. 16/836,571, dated Sep. 8, 2021, 25 pages.
Notice of Allowance received for U.S. Appl. No. 17/031,833, dated Sep. 20, 2021, 6 pages.
Office Action received for Australian Patent Application No. 2020217458, dated Sep. 2, 2021, 6 pages.
Office Action received for Australian Patent Application No. 2020239711, dated Sep. 13, 2021, 5 pages.
Senicar et al., "User-Centred Design and Development of an Intelligent Light Switch for Sensor Systems", Technical Gazette, vol. 26, No. 2, available online at: https://hrcak.srce.hr/file/320403, 2019, pp. 339-345.
Corrected Notice of Allowance received for U.S. Appl. No. 17/031,833, dated Aug. 2, 2021, 3 pages.
Intention to Grant received for European Patent Application No. 19729395.4, dated Jul. 23, 2021, 10 pages.
Non-Final Office Action received for U.S. Appl. No. 17/116,938, dated Jul. 30, 2021, 19 pages.
Notice of Allowance received for Japanese Patent Application No. 2018-562659, dated Jul. 30, 2021, 4 pages (1 page of English Translation and 3 pages of Official Copy).
Notice of Allowance received for Japanese Patent Application No. 2020-558885, dated Jul. 26, 2021, 4 pages (1 page of English Translation and 3 pages of Official Copy).
Notice of Allowance received for U.S. Appl. No. 16/528,941, dated Aug. 10, 2021, 5 pages.
Office Action received for Indian Patent Application No. 201814036860, dated Jul. 29, 2021, 8 pages.
Corrected Notice of Allowance received for U.S. Appl. No. 16/702,968, dated Jun. 8, 2021, 3 pages.
Corrected Notice of Allowance received for U.S. Appl. No. 16/702,968, dated Jun. 16, 2021, 4 pages.
Decision to Grant received for European Patent Application No. 18197589.7, dated Jun. 10, 2021, 2 pages.
Notice of Allowance received for U.S. Appl. No. 16/888,775, dated Jun. 3, 2021, 11 pages.
Office Action received for Australian Patent Application No. 2021100721, dated Jun. 4, 2021, 7 pages.
Office Action received for Chinese Patent Application No. 202011336156.9, dated May 20, 2021, 13 pages (7 pages of English Translation and 6 pages of Official Copy).
ANDROIDCENTRAL, "How do I respond to group messages from notification bar?", Available online at: https://forums.androidcentral.com/ask-question/952030-how-do-i-respond-group-messages-notification-bar.html, Mar. 25, 2019, 3 pages.

(56) References Cited

OTHER PUBLICATIONS

Rossignol Joe, "iOS 10 Concept Simplifies Lock Screen with Collapsed Notifications", Available online at: https://www.macrumors.com/2016/06/16/ios-10-collapsed-notifications-concept/, Jun. 16, 2016, 10 pages.
Office Action received for Australian Patent Application No. 2021204454, dated Aug. 9, 2021, 7 pages.
Office Action received for Korean Patent Application No. 10-2021-7021047, dated Aug. 13, 2021, 5 pages (2 pages of English Translation and 3 pages of Official Copy).
Corrected Notice of Allowance received for U.S. Appl. No. 16/807,604, dated Jul. 26, 2021, 3 pages.
Extended European Search Report received for European Patent Application No. 21160991.2, dated Jul. 16, 2021, 14 pages.
Intention to Grant received for European Patent Application No. 18197583.0, dated Jul. 23, 2021, 9 pages.
Minutes of the Oral Proceedings received for European Patent Application No. 19729395.4, mailed on Jul. 21, 2021, 6 pages.
Notice of Allowance received for Chinese Patent Application No. 202010742019.9, dated Jul. 6, 2021, 7 pages (4 pages of English Translation and 3 pages of Official Copy).
Notice of Allowance received for U.S. Appl. No. 16/888,775, dated Jul. 26, 2021, 5 pages.
Office Action received for Japanese Patent Application No. 2021-051415, dated Jul. 19, 2021, 4 pages (2 pages of English Translation and 2 pages of Official Copy).
Brief Communication Regarding Oral Proceedings received for European Patent Application No. 18197583.0, mailed on Feb. 18, 2021, 2 pages.
Notice of Allowance received for U.S. Appl. No. 15/910,263, dated Feb. 18, 2021, 3 pages.
Office Action received for Chinese Patent Application No. 201811152726.1, dated Jan. 28, 2021, 13 pages (7 pages of English Translation and 6 pages of Official Copy).
Office Action received for Japanese Patent Application No. 2019-194597, dated Jan. 18, 2021, 10 pages (5 pages of English Translation and 5 pages of Official Copy).
Office Action received for Korean Patent Application No. 10-2020-7032488, dated Feb. 9, 2021, 11 pages (5 pages of English Translation and 6 pages of Official Copy).
Office Action received for Chinese Patent Application No. 201910704856.X, dated Dec. 9, 2020, 23 pages (13 pages of English Translation and 10 pages of Official Copy).
Search Report and Opinion received for Danish Patent Application No. PA202070617, dated Dec. 23, 2020, 8 pages.
Corrected Notice of Allowance received for U.S. Appl. No. 16/583,981, dated Apr. 6, 2021, 3 pages.
Non-Final Office Action received for U.S. Appl. No. 16/830,838, dated Apr. 1, 2021, 13 pages.
Non-Final Office Action received for U.S. Appl. No. 16/836,571, dated Mar. 25, 2021, 28 pages.
Notice of Allowance received for Chinese Patent Application No. 201811539260.0, dated Mar. 15, 2021, 2 pages (1 page of English Translation and 1 page of Official Copy).
Notice of Allowance received for U.S. Appl. No. 16/583,981, dated Mar. 26, 2021, 10 pages.
Notice of Allowance received for U.S. Appl. No. 16/583,989, dated Apr. 1, 2021, 5 pages.
Notice of Allowance received for U.S. Appl. No. 16/584,490, dated Mar. 26, 2021, 13 pages.
Office Action received for Australian Patent Application No. 2021201403, dated Mar. 16, 2021, 3 pages.
Office Action received for European Patent Application No. 20166552.8, dated Mar. 24, 2021, 8 pages.
Corrected Notice of Allowance received for U.S. Appl. No. 15/910,263, dated Feb. 10, 2021, 3 pages.
Final Office Action received for U.S. Appl. No. 16/723,583, dated Feb. 5, 2021, 15 pages.
Final Office Action received for U.S. Appl. No. 17/026,818, dated Jan. 29, 2021, 21 pages.
Final Office Action received for U.S. Appl. No. 17/031,833, dated Jan. 26, 2021, 17 pages.
Office Action received for Chinese Patent Application No. 201710493025.3, dated Jan. 6, 2021, 17 pages (8 pages of English Translation and 9 pages of Official Copy).
Office Action received for Chinese Patent Application No. 201911128105.4, dated Jan. 4, 2021, 14 pages (7 pages of English Translation and 7 pages of Official Copy).
Office Action received for European Patent Application No. 20719301.2, dated Jan. 28, 2021, 15 pages.
Corrected Notice of Allowance received for U.S. Appl. No. 16/807,604, dated Oct. 14, 2021, 3 pages.
Corrected Notice of Allowance received for U.S. Appl. No. 16/807,604, dated Oct. 22, 2021, 3 pages.
Decision to Grant received for Danish Patent Application No. PA202070560, dated Oct. 21, 2021, 2 pages.
Notice of Allowance received for Korean Patent Application No. 10-2021-7022610, dated Oct. 13, 2021, 3 pages (1 page of English Translation and 2 pages of Official Copy).
Office Action received for Australian Patent Application No. 2021100721, dated Oct. 18, 2021, 4 pages.
Office Action received for Chinese Patent Application No. 202011450203.2, dated Sep. 1, 2021, 12 pages (6 pages of English Translation and 6 pages of Official Copy).
Office Action received for Chinese Patent Application No. 202110248576.X, dated Sep. 15, 2021, 28 pages (16 pages of English Translation and 12 pages of Official Copy).
Applicant-Initiated Interview Summary received for U.S. Appl. No. 16/723,583, dated Dec. 28, 2020, 6 pages.
Applicant-Initiated Interview Summary received for U.S. Appl. No. 16/803,849, dated Dec. 21, 2020, 5 pages.
Applicant-Initiated Interview Summary received for U.S. Appl. No. 16/807,604, dated Dec. 21, 2020, 7 pages.
Applicant-Initiated Interview Summary received for U.S. Appl. No. 16/922,675, dated Dec. 16, 2020, 3 pages.
Applicant-Initiated Interview Summary received for U.S. Appl. No. 17/026,818, dated Dec. 15, 2020, 7 pages.
Applicant-Initiated Interview Summary received for U.S. Appl. No. 17/031,833, dated Dec. 21, 2020, 5 pages.
Corrected Notice of Allowance received for U.S. Appl. No. 16/404,605, dated Dec. 23, 2020, 3 pages.
Corrected Notice of Allowance received for U.S. Appl. No. 16/584,743, dated Dec. 30, 2020, 3 pages.
Invitation to Pay Search Fees received for European Patent Application No. 20719301.2, mailed on Dec. 17, 2020, 5 pages.
Invitation to Pay Search Fees received for European Patent Application No. 20719301.2, mailed on Dec. 22, 2020, 5 pages.
Non-Final Office Action received for U.S. Appl. No. 16/583,994, dated Dec. 23, 2020, 17 pages.
Notice of Allowance received for U.S. Appl. No. 16/583,989, dated Dec. 24, 2020, 7 pages.
Office Action received for Danish Patent Application No. PA202070560, dated Dec. 11, 2020, 7 pages.
Office Action received for European Patent Application No. 18728002.9, dated Dec. 14, 2020, 15 pages.
Office Action received for European Patent Application No. 18779093.6, dated Dec. 11, 2020, 4 pages.
Office Action received for Korean Patent Application No. 10-2020-7031319, dated Dec. 8, 2020, 14 pages (6 pages of English Translation and 8 pages of Official Copy).
Office Action received for Korean Patent Application No. 10-2020-7031700, dated Dec. 15, 2020, 6 pages (2 pages of English Translation and 4 pages of official Copy).
Office Action received for Korean Patent Application No. 10-2020-7032110, dated Dec. 15, 2020, 6 pages (2 pages of English Translation and 4 pages of official Copy).
Result of Consultation received for European Patent Application No. 18197589.7, mailed on Dec. 17, 2020, 6 pages.
Advisory Action received for U.S. Appl. No. 13/038,217, dated Dec. 8, 2014, 3 pages.
Advisory Action received for U.S. Appl. No. 15/730,610, dated Oct. 24, 2019, 5 pages.

(56) References Cited

OTHER PUBLICATIONS

Advisory Action received for U.S. Appl. No. 16/404,605, dated Apr. 15, 2020, 10 pages.
Apple, "Iphone User's Guide", iPhone first generation, Available at: http://pocketpccentral.net/iphone/products/1 g_iphone.htm, Jun. 29, 2007, 124 pages.
Applicant Initiated Interview Summary received for U.S. Appl. No. 16/404,605, dated Nov. 13, 2019, 3 pages.
Applicant Initiated Interview Summary received for U.S. Appl. No. 16/702,968, dated Jul. 1, 2020, 5 pages.
Applicant Initiated Interview Summary received for U.S. Appl. No. 16/790,619, dated Jul. 28, 2020, 3 pages.
Applicant-Initiated Interview Summary received for U.S. Appl. No. 15/730,610, dated Aug. 25, 2020, 6 pages.
Applicant-Initiated Interview Summary received for U.S. Appl. No. 16/528,941, dated Jun. 19, 2020, 3 pages.
Applicant-Initiated Interview Summary received for U.S. Appl. No. 16/584,743, dated May 1, 2020, 5 pages.
Applicant-Initiated Interview Summary received for U.S. Appl. No. 16/586,002, dated Apr. 28, 2020, 5 pages.
Applicant-Initiated Interview Summary received for U.S. Appl. No. 16/702,968, dated Sep. 28, 2020, 6 pages.
Applicant-Initiated Interview Summary received for U.S. Appl. No. 16/799,481, dated Jul. 24, 2020, 3 pages.
Applicant-Initiated Interview Summary received for U.S. Appl. No. 16/803,849, dated Aug. 21, 2020, 5 pages.
Applicant-Initiated Interview Summary received for U.S. Appl. No. 16/807,604, dated Jul. 24, 2020, 5 pages.
Benjamin Jeff, "iOS 10: How to use the new Home app to control HomeKit devices [Video]", Available online at: https://9to5mac.com/2016/09/23/ios-10-how-to-use-new-home-app-control-homekit-devices-video, Sep. 23, 2016, 36 pages.
Bennett Stephen, "ES2: Logic's Most Sophisticated Virtual Analogue Synth", Logic Notes & Techniques, Jun. 2007, 6 pages.
Call Me, "Samsung R3 højttaler giver dig en lækker 360 graders lydoplevelse—med WiFi og Bluetooth | Call me", 0:24/3:22, Available Online at: https://www.youtube.com/watch?v=4Uv_sOhrlro, Sep. 22, 2016, 3 pages.
Certificate of Examination received for Australian Patent Application No. 2019100487, dated Jan. 7, 2020, 2 pages.
Certificate of Examination received for Australian Patent Application No. 2019100499, dated Aug. 15, 2019, 2 pages.
Certificate of Examination received for Australian Patent Application No. 2019101062, dated Jun. 2, 2020, 2 pages.
Certificate of Examination received for Australian Patent Application No. 2020100303, dated Apr. 17, 2020, 2 pages.
Certificate of Examination received for Australian Patent Application No. 2020101324, dated Sep. 7, 2020, 2 pages.
Certification of Examination received for Australian Patent Application No. 2017100666, dated Jan. 29, 2018, 2 pages.
Corrected International Search Report and Written Opinion received for PCT Patent Application No. PCT/US2017/035293, dated Dec. 8, 2017, 21 pages.
Corrected Notice of Allowance received for U.S. Appl. No. 15/427,516, dated Apr. 29, 2019, 2 pages.
Corrected Notice of Allowance received for U.S. Appl. No. 15/427,516, dated May 8, 2019, 2 pages.
Corrected Notice of Allowance received for U.S. Appl. No. 16/109,552, dated Jun. 13, 2019, 2 pages.
Corrected Notice of Allowance received for U.S. Appl. No. 16/143,379, dated Dec. 18, 2019, 2 pages.
Corrected Notice of Allowance received for U.S. Appl. No. 16/143,379, dated Feb. 14, 2020, 2 pages.
Corrected Notice of Allowance received for U.S. Appl. No. 16/143,379, dated Mar. 3, 2020, 2 pages.
Corrected Notice of Allowance received for U.S. Appl. No. 16/143,379, dated Mar. 12, 2020, 2 pages.
Corrected Notice of Allowance received for U.S. Appl. No. 16/144,572, dated Mar. 21, 2019, 3 pages.
Corrected Notice of Allowance received for U.S. Appl. No. 16/147,432, dated Jan. 18, 2019, 3 pages.
Corrected Notice of Allowance received for U.S. Appl. No. 16/147,432, dated Jul. 16, 2019, 3 pages.
Corrected Notice of Allowance received for U.S. Appl. No. 16/511,578, dated Feb. 13, 2020, 3 pages.
Corrected Notice of Allowance received for U.S. Appl. No. 16/143,379, dated Aug. 15, 2019, 2 pages.
Corrected Notice of Aiiowance received for U.S. Appl. No. 16/143,379, dated Nov. 12, 2019, 2 pages.
Corrected Notice of Allowance received for U.S. Appl. No. 16/143,379, dated Oct. 16, 2019, 2 pages.
Corrected Search Report and Opinion received for Danish Patent Application No. PA201870364, dated Sep. 5, 2018, 13 pages.
CRUTNACKER, "Amazon Echo Tips and Tricks: Playing Music Demonstration", Available Online at: https://www.youtube.com/watch?v=W_bqq2ynUII, Nov. 4, 2015, 1 page.
Decision to Grant received for Danish Patent Application No. PA201670601, dated Jun. 21, 2019, 2 pages.
Decision to Grant received for Danish Patent Application No. PA201670602, dated Nov. 30, 2018, 2 pages.
Decision to Grant received for Danish Patent Application No. PA201670604, dated Aug. 22, 2018, 2 pages.
Decision to Grant received for Danish Patent Application No. PA201670605, dated Nov. 29, 2018, 2 pages.
Decision to Grant received for Danish Patent Application No. PA201770392, dated Oct. 24, 2018, 2 pages.
Decision to Grant received for Danish Patent Application No. PA201770401, dated Oct. 24, 2018, 2 pages.
Decision to Grant received for Danish Patent Application No. PA201770403, dated Oct. 24, 2018, 2 pages.
Decision to Grant received for Danish Patent Application No. PA201770404, dated Nov. 11, 2019, 3 pages.
Decision to Grant received for Danish Patent Application No. PA201770406, dated May 15, 2020, 2 pages.
Decision to Grant received for Danish Patent Application No. PA201870293, dated Dec. 3, 2018, 2 pages.
Decision to Grant received for Danish Patent Application No. PA201870362, dated May 15, 2020, 2 pages.
DETROITBORG, "Apple Music: Walkthrough", YouTube Video, online available at: "https://www.youtube.com/watch?v=NLgjodiAtbQ", Jun. 30, 2015, 1 page.
Extended European Search Report (includes Supplementary European Search Report and Search Opinion) received for European Patent Application No. 17813777.4, dated Mar. 25, 2019, 8 pages.
Extended European Search Report received for European Patent Application No. 18197583.0, dated Jun. 4, 2019, 20 pages.
Extended European Search Report received for European Patent Application No. 18197589.7, dated Jan. 7, 2019, 9 pages.
Extended European Search Report received for European Patent Application No. 19182037.2, dated Oct. 31, 2019, 8 pages.
Extended European Search Report received for European Patent Application No. 19207753.5, dated Dec. 18, 2019, 9 pages.
Extended European Search Report received for European Patent Application No. 20158824.1, dated Aug. 10, 2020, 13 pages.
Extended European Search Report received for European Patent Application No. 20166552.8, dated Jun. 12, 2020, 9 pages.
Final Office Action received for U.S. Appl. No. 13/038,217, dated May 6, 2014, 11 pages.
Final Office Action received for U.S. Appl. No. 13/489,245, dated Mar. 28, 2014, 23 pages.
Final Office Action received for U.S. Appl. No. 13/489,245, dated Oct. 16, 2019, 25 pages.
Final Office Action received for U.S. Appl. No. 13/489,245, dated Sep. 27, 2018, 25 pages.
Final Office Action received for U.S. Appl. No. 15/730,610, dated Aug. 6, 2019, 28 pages.
Final Office Action received for U.S. Appl. No. 15/910,263, dated Aug. 28, 2019, 32 pages.
Final Office Action received for U.S. Appl. No. 16/404,605, dated Feb. 10, 2020, 21 pages.
Final Office Action received for U.S. Appl. No. 16/528,941, dated Jul. 13, 2020, 15 pages.

(56) References Cited

OTHER PUBLICATIONS

Final Office Action received for U.S. Appl. No. 16/702,968, dated Jul. 27, 2020, 21 pages.
Final Office Action received for U.S. Appl. No. 16/803,849, dated Sep. 24, 2020, 29 pages.
Final Office Action received for U.S. Appl. No. 16/807,604, dated Aug. 19, 2020, 35 pages.
Finkelstein Ellen, "Temporarily Override Object Snap Settings", AutoCAD Tips Blog, Apr. 9, 2007, 4 pages.
Free Virtual Classic Analogue Mono Synth, Samsara Cycle Audio Releases DEISK-O, Jan. 2, 2011, 3 pages.
Google, "Google Home Help, Listen to music", Datasheet [online], Available Online at: https://web.archive.org/web/20170326051235/https:/support.google.com/googlehome/answer/7030379?hl=en&ref_topic=7030084, Mar. 26, 2017, 3 pages.
Hoffberger Chase, "Spotify's Collaborative Playlists Let Friends Listen Together", Evolver.fm, Available online at: http://www.evolver.fm/2011/08/22/spotify-collaborative-playlists/, Aug. 22, 2011, 4 pages.
IDB, "HomeCam is the Best Way to View Multiple HomeKit Cameras on iPhone & Apple TV", Available online at: https://www.youtube.com/watch?v=6x2oCHgSVUU, Feb. 20, 2018, 3 pages.
Intention to Grant received for Danish Patent Application No. PA201670601, dated Apr. 10, 2019, 2 pages.
Intention to Grant received for Danish Patent Application No. PA201670602, dated Aug. 1, 2018, 2 pages.
Intention to Grant received for Danish Patent Application No. PA201670604, dated Jun. 14, 2018, 2 pages.
Intention to Grant received for Danish Patent Application No. PA201670604, dated Mar. 15, 2018, 2 pages.
Intention to Grant received for Danish Patent Application No. PA201670605, dated Aug. 1, 2018, 2 pages.
Intention to Grant received for Danish Patent Application No. PA201770392, dated Aug. 31, 2018, 2 pages.
Intention to Grant received for Danish Patent Application No. PA201770392, dated Jul. 2, 2018, 2 pages.
Intention to Grant received for Danish Patent Application No. PA201770401, dated Jun. 14, 2018, 2 pages.
Intention to Grant received for Danish Patent Application No. PA201770401, dated Sep. 17, 2018, 2 pages.
Intention to Grant received for Danish Patent Application No. PA201770403, dated May 7, 2018, 2 pages.
Intention to Grant received for Danish Patent Application No. PA201770403, dated Oct. 3, 2018, 2 pages.
Intention to Grant received for Danish Patent Application No. PA201770404, dated Sep. 23, 2019, 3 pages.
Intention to Grant received for Danish Patent Application No. PA201770406, dated Feb. 6, 2020, 3 pages.
Intention to Grant received for Danish Patent Application No. PA201770408, dated Nov. 30, 2018, 3 pages.
Intention to Grant received for Danish Patent Application No. PA201870293, dated Aug. 31, 2018, 2 pages.
Intention to Grant received for Danish Patent Application No. PA201870362, dated Feb. 14, 2020, 2 pages.
Intention to Grant received for Danish Patent Application No. PA201870435, dated Jul. 1, 2020, 2 pages.
International Preliminary Report on Patentability received for PCT Patent Application No. PCT/US2012/025314, dated Sep. 12, 2013, Sep. 12, 2013, 8 pages.
International Preliminary Report on Patentability received for PCT Patent Application No. PCT/US2017/035293, dated Dec. 27, 2018, 16 pages.
International Preliminary Report on Patentability received for PCT Patent Application No. PCT/US2018/032158, dated Nov. 21, 2019, 12 pages.
International Preliminary Report on Patentability received for PCT Patent Application No. PCT/US2018/032904, dated Nov. 28, 2019, 14 pages.
International Preliminary Report on Patentability received for PCT Patent Application No. PCT/US2018/048151, dated Apr. 9, 2020, 14 pages.
International Search Report and Written Opinion received for PCT Patent Application No. PCT/US2012/025314, dated May 14, 2012, 10 pages.
International Search Report and Written Opinion received for PCT Patent Application No. PCT/US2017/035293, dated Oct. 10, 2017, 25 pages.
International Search Report and Written Opinion received for PCT Patent Application No. PCT/US2018/032158, dated Nov. 2, 2018, 19 pages.
International Search Report and Written Opinion received for PCT Patent Application No. PCT/US2018/032904, dated Oct. 1, 2018, 21 pages.
International Search Report and Written Opinion received for PCT Patent Application No. PCT/US2018/048151, dated Jan. 10, 2019, 23 pages.
International Search Report and Written Opinion received for PCT Patent Application No. PCT/US2019/030963, dated Oct. 17, 2019, 21 pages.
International Search Report and Written Opinion received for PCT Patent Application No. PCT/US2019/031202, dated Oct. 4, 2019, 19 pages.
International Search Report and written Opinion received for PCT Patent Application No. PCT/US2020/024390, dated Aug. 17, 2020, 22 pages.
Invitation to Pay Addition Fees and Partial International Search Report received for PCT Patent Application No. PCT/US2018/032904, dated Jul. 31, 2018, 18 pages.
Invitation to Pay Addition Fees received for PCT Patent Application No. PCT/US2017/035293, mailed on Aug. 17, 2017, 3 pages.
Invitation to Pay Additional Fees received for PCT Patent Application No. PCT/US2020/024390, mailed on Jun. 26, 2020, 15 pages.
Invitation to Pay Additional Fees received for PCT Patent Application No. PCT/US2018/032158, mailed on Sep. 10, 2018, 16 pages.
Invitation to Pay Additional Fees received for PCT Patent Application No. PCT/US2018/048151, mailed on Nov. 6, 2018, 18 pages.
Invitation to Pay Additional Fees received for PCT Patent Application No. PCT/US2019/030963, mailed on Aug. 22, 2019, 12 pages.
Invitation to Pay Additional Fees received for PCT Patent Application No. PCT/US2019/031202, mailed on Aug. 8, 2019, 12 pages.
Invitation to Pay Search Fees received for European Patent Application No. 18728002.9, mailed on Sep. 2, 2020, 8 pages.
ITJUNGLES, "iPhone 6: How to Pair with Another Bluetooth Device", Available Online at: https://www.youtube.com/watch?v=9setanYtHAk, Aug. 5, 2015, 3 pages.
Jarvie, "Alexa plays me music", Available online at: https://www.youtube.com/watch?v=bR2ZC8Sy8YQ, Feb. 23, 2015, 1 page.
Kim et al., "An Energy Efficient Transmission Scheme for Real-Time Data in Wireless Sensor Networks", Sensors, vol. 15, in Sensors 2015, May 20, 2015, 25 pages.
Non-Final Office Action received for U.S. Appl. No. 16/035,422, dated Nov. 30, 2018, 13 pages.
Non-Final Office Action received for U.S. Appl. No. 13/038,217, dated Sep. 13, 2013, Sep. 13, 2013, 16 pages.
Non-Final Office Action received for U.S. Appl. No. 13/489,245, dated Apr. 8, 2019, 27 pages.
Non-Final Office Action received for U.S. Appl. No. 13/489,245, dated Dec. 27, 2017, 22 pages.
Non-Final Office Action received for U.S. Appl. No. 13/489,245, dated Nov. 20, 2013, 25 pages.
Non-Final Office Action received for U.S. Appl. No. 15/427,516, dated Aug. 28, 2018, 11 pages.
Non-Final Office Action received for U.S. Appl. No. 15/730,610, dated Apr. 15, 2020, 36 pages.
Non-Final Office Action received for U.S. Appl. No. 15/730,610, dated Feb. 1, 2019, 22 pages.
Non-Final Office Action received for U.S. Appl. No. 15/910,263, dated Jun. 15, 2020, 38 pages.

(56) References Cited

OTHER PUBLICATIONS

Non-Final Office Action received for U.S. Appl. No. 15/910,263, dated Mar. 4, 2019, 26 pages.
Non-Final Office Action received for U.S. Appl. No. 16/109,552, dated Oct. 17, 2018, 16 pages.
Non-Final Office Action received for U.S. Appl. No. 16/144,572, dated Nov. 30, 2018, 8 pages.
Non-Final Office Action received for U.S. Appl. No. 16/383,403, dated Aug. 23, 2019, 10 pages.
Non-Final Office Action received for U.S. Appl. No. 16/404,605, dated Jun. 24, 2020, 18 pages.
Non-Final Office Action received for U.S. Appl. No. 16/404,605, dated Aug. 1, 2019, 19 pages.
Non-Final Office Action received for U.S. Appl. No. 16/404,612, dated Feb. 28, 2020, 13 pages.
Non-Final Office Action received for U.S. Appl. No. 16/528,941, dated Jan. 30, 2020, 14 pages.
Non-Final Office Action received for U.S. Appl. No. 16/584,743, dated Feb. 6, 2020, 15 pages.
Non-Final Office Action received for U.S. Appl. No. 16/586,002, dated Feb. 20, 2020, 15 pages.
Non-Final Office Action received for U.S. Appl. No. 16/702,968, dated Apr. 8, 2020, 20 pages.
Non-Final Office Action received for U.S. Appl. No. 16/790,619, dated May 4, 2020, 13 pages.
Non-Final Office Action received for U.S. Appl. No. 16/799,481, dated May 1, 2020, 13 pages.
Non-Final Office Action received for U.S. Appl. No. 16/803,849, dated Jul. 13, 2020, 23 pages.
Non-Final Office Action received for U.S. Appl. No. 16/807,604, dated Jun. 2, 2020, 28 pages.
Non-Final Office Action received for U.S. Appl. No. 16/143,379, dated Mar. 14, 2019, 10 pages.
Notice of Acceptance received for Australian Patent Application No. 2018223051, dated Oct. 30, 2018, 3 pages.
Notice of Acceptance received for Australian Patent Application No. 2018236872, dated Jul. 9, 2019, 3 pages.
Notice of Allowance received for Australian Patent Application No. 2017286129, dated Dec. 10, 2018, 3 pages.
Notice of Allowance received for Chinese Patent Application No. 201811151702.4, dated Jul. 6, 2020, 6 pages (3 pages of English Translation and 3 pages of Official Copy).
Notice of Allowance received for Chinese Patent Application No. 201811152097.2, dated Oct. 28, 2019, 6 pages (3 pages of English Translation and 3 pages of Official Copy).
Notice of Allowance received for Chinese Patent Application No. 201880001436.9, dated May 8, 2020, 3 pages (2 pages of English Translation and 1 page of Official Copy).
Notice of Allowance received for Danish Patent Application No. PA201770408, dated Feb. 8, 2019, 2 pages.
Notice of Allowance received for Japanese Patent Application No. 2018-183504, dated Sep. 27, 2019, 4 pages (1 page of English Translation and 3 pages of Official Copy).
Notice of Allowance received for Korean Patent Application No. 10-2018-7034909, dated Sep. 30, 2019, 4 pages (1 page of English Translation and 3 pages of Official Copy).
Notice of Allowance received for Korean Patent Application No. 10-2019-7038093, dated Aug. 10, 2020, 5 pages (2 pages of English Translation and 3 pages of Official Copy).
Notice of Allowance received for U.S. Appl. No. 16/035,422, dated Apr. 10, 2019, 6 pages.
Notice of Allowance received for U.S. Appl. No. 15/427,516, dated Mar. 4, 2019, 7 pages.
Notice of Allowance received for U.S. Appl. No. 16/109,552, dated Mar. 13, 2019, 25 pages.
Notice of Allowance received for U.S. Appl. No. 16/109,552, dated May 13, 2019, 2 pages.
Notice of Allowance received for U.S. Appl. No. 16/143,379, dated Jan. 29, 2020, 5 pages.
Notice of Allowance received for U.S. Appl. No. 16/144,572, dated Feb. 28, 2019, 7 pages.
Notice of Allowance received for U.S. Appl. No. 16/147,432, dated Dec. 18, 2018, 13 pages.
Notice of Allowance received for U.S. Appl. No. 16/147,432, dated May 20, 2019, 6 pages.
Notice of Allowance received for U.S. Appl. No. 16/383,403, dated Jan. 10, 2020, 11 pages.
Notice of Allowance received for U.S. Appl. No. 16/404,605, dated Sep. 18, 2020, 5 pages.
Notice of Allowance received for U.S. Appl. No. 16/404,612, dated Jul. 13, 2020, 6 pages.
Notice of Allowance received for U.S. Appl. No. 16/404,612. dated Aug. 7, 2019, 9 pages.
Notice of Allowance received for U.S. Appl. No. 16/511,578, dated Nov. 18, 2019, 12 pages.
Notice of Allowance received for U.S. Appl. No. 16/584,743, dated Aug. 7, 2020, 8 pages.
Notice of Allowance received for U.S. Appl. No. 16/586,002, dated Jun. 9, 2020, 5 pages.
Notice of Allowance received for U.S. Appl. No. 16/790,619, dated Sep. 8, 2020, 6 pages.
Notice of Allowance received for U.S. Appl. No. 16/799,481, dated Sep. 8, 2020, 6 pages.
Notice of Allowance received for U.S. Appl. No. 16/143,379, dated Jun. 26, 2019, 5 pages.
Notice of Allowance received for U.S. Appl. No. 16/143,379, dated Sep. 25, 2019, 5 pages.
Office Action received for Australian Patent Application No. 2017100666, dated Jul. 27, 2017, 4 pages.
Office Action received for Australian Patent Application No. 2017286129, dated Oct. 18, 2018, 3 pages.
Office Action received for Australian Patent Application No. 2018236870, dated Jul. 29, 2019, 7 pages.
Office Action received for Australian Patent Application No. 2018236870, dated Nov. 21, 2018, 10 pages.
Office Action received for Australian Patent Application No. 2018236870, dated Oct. 31, 2019, 8 pages.
Office Action received for Australian Patent Application No. 2018236872, dated Nov. 23, 2018, 4 pages.
Office Action received for Australian Patent Application No. 2019100487, dated Aug. 16, 2019, 5 pages.
Office Action received for Australian Patent Application No. 2019100499, dated Jun. 28, 2019, 4 pages.
Office Action received for Australian Patent Application No. 2019100523, dated Jan. 23, 2020, 3 pages.
Office Action received for Australian Patent Application No. 2019100523, dated Mar. 2, 2020, 3 pages.
Office Action received for Australian Patent Application No. 2019100523, dated Sep. 2, 2019, 3 pages.
Office Action received for Australian Patent Application No. 2019101062, dated Apr. 22, 2020, 2 pages.
Office Action received for Australian Patent Application No. 2019101062, dated Dec. 5, 2019, 3 pages.
Office Action received for Australian Patent Application No. 2019201853, dated Apr. 23, 2020, 5 pages.
Office Action received for Australian Patent Application No. 2019201853, dated Aug. 10, 2020, 4 pages.
Office Action received for Australian Patent Application No. 2019201853, dated Aug. 16, 2019, 5 pages.
Office Action received for Australian Patent Application No. 2019201853, dated Dec. 9, 2019, 5 pages.
Office Action received for Australian Patent Application No. 2020100886, dated Aug. 5, 2020, 6 pages.
Office Action received for Chinese Patent Application No. 201710493025.3, dated Dec. 6, 2019, 11 pages (5 pages of English Translation and 6 pages of Official Copy).
Office Action received for Chinese Patent Application No. 201710493025.3, dated Jul. 10, 2020, 17 pages (9 pages of English Translation and 8 pages of Official Copy).
Office Action received for Chinese Patent Application No. 201710493025.3, dated Sep. 19, 2017, 2 pages (1 page of English Translation and 1 page of official copy).

(56) References Cited

OTHER PUBLICATIONS

Office Action received for Chinese Patent Application No. 201810730279.7, dated Jul. 6, 2020, 7 pages (4 pages of English Translation and 3 pages of Official Copy).
Office Action received for Chinese Patent Application No. 201810730279.7, dated Mar. 4, 2020, 14 pages (8 pages of English Translation and 6 pages of Official Copy).
Office Action received for Chinese Patent Application No. 201810730279.7, dated May 7, 2019, 15 pages (8 pages of English Translation and 7 pages of Official Copy).
Office Action received for Chinese Patent Application No. 201810730279.7, dated Nov. 5, 2019, 14 pages (8 pages of English Translation and 6 pages of Official Copy).
Office Action received for Chinese Patent Application No. 201811151702.4, dated Mar. 4, 2020, 13 pages (8 pages of English Translation and 5 pages of Official Copy).
Office Action received for Chinese Patent Application No. 201811151702.4, dated May 7, 2019, 16 pages (8 pages of English Translation and 8 pages of Official Copy).
Office Action received for Chinese Patent Application No. 201811151702.4, dated Oct. 9, 2019, 11 pages (6 pages of English Translation and 5 pages of Official Copy).
Office Action received for Chinese Patent Application No. 201811152097.2, dated May 7, 2019, 18 pages (9 pages of English Translation and 9 pages of Official Copy).
Office Action received for Chinese Patent Application No. 201811152726.1, dated Apr. 22, 2019, 15 pages (7 pages of English Translation and 8 pages of Official Copy).
Office Action received for Chinese Patent Application No. 201811152726.1, dated Mar. 18, 2020, 12 pages (7 pages of English Translation and 5 pages of Official Copy).
Office Action received for Chinese Patent Application No. 201811152726.1, dated Oct. 24, 2019, 14 pages (8 pages of English Translation and 6 pages of Official Copy).
Office Action received for Chinese Patent Application No. 201811539259.8, dated Apr. 3, 2020, 10 pages (6 pages of English Translation and 4 pages of Official Copy).
Office Action received for Chinese Patent Application No. 201811539259.8, dated Sep. 3, 2020, 10 pages (6 pages of English Translation and 4 pages of Official Copy).
Office Action received for Chinese Patent Application No. 201811539259.8, dated Sep. 18, 2019, 12 pages (6 pages of English Translation and 6 pages of Official Copy).
Office Action received for Chinese Patent Application No. 201811539260.0, dated Jun. 3, 2020, 8 pages (5 pages of English Translation and 3 pages of Official Copy).
Office Action received for Chinese Patent Application No. 201811539260.0, dated Oct. 8, 2019, 14 pages (7 pages of English Translation and 7 pages of Official Copy).
Office Action received for Chinese Patent Application No. 201880001436.9, dated Apr. 28, 2019, 19 pages (11 pages of English Translation and 8 pages of Official copy).
Office Action received for Chinese Patent Application No. 201880001436.9, dated Nov. 6, 2019, 24 pages (15 pages of English Translation and 9 pages of Official Copy).
Office Action received for Chinese Patent Application No. 201880056514.5, dated Sep. 2, 2020, 7 pages (1 page of English Translation and 6 pages of Official Copy).
Office Action received for Chinese Patent Application No. 201910400180.5, dated Jun. 1, 2020, 11 pages (5 pages of English Translation and 6 pages of Official Copy).
Office Action received for Chinese Patent Application No. 201910704856.X, dated May 27, 2020, 26 pages (14 pages of English Translation and 12 pages of Official Copy).
Office Action received for Chinese Patent Application No. 201911128105.4, dated Jul. 3, 2020, 18 pages (9 pages of English Translation and 9 pages of Official Copy).
Office Action received for Chinese Patent Application No. 202010125114.4, dated Aug. 21, 2020, 16 pages (8 pages of English Translation and 8 pages of Official Copy).

Office Action Received for Danish Patent Application No. PA201670601, dated Apr. 10, 2018, 3 pages.
Office Action received for Danish Patent Application No. PA201670601, dated Aug. 9, 2018, 2 pages.
Office Action Received for Danish Patent Application No. PA201670601, dated Dec. 11, 2018, 3 pages.
Office Action Received for Danish Patent Application No. PA201670601, dated Feb. 6, 2017, 5 pages.
Office Action Received for Danish Patent Application No. PA201670601, dated Oct. 21, 2016, 9 pages.
Office Action Received for Danish Patent Application No. PA201670601, dated Sep. 26, 2017, 3 pages.
Office Action received for Danish Patent Application No. PA201670602, dated Apr. 16, 2018, 3 pages.
Office Action received for Danish Patent Application No. PA201670602, dated Feb. 9, 2017, 3 pages.
Office Action received for Danish Patent Application No. PA201670602, dated Oct. 25, 2016, 9 pages.
Office Action received for Danish Patent Application No. PA201670602, dated Sep. 26, 2017, 3 pages.
Office Action received for Danish Patent Application No. PA201670603, dated Nov. 1, 2016, 9 pages.
Office Action received for Danish Patent Application No. PA201670604, dated Feb. 19, 2018, 3 pages.
Office Action received for Danish Patent Application No. PA201670604, dated Jun. 9, 2017, 3 pages.
Office Action received for Danish Patent Application No. PA201670604, dated Nov. 8, 2016, 8 pages.
Office Action received for Danish Patent Application No. PA201670605, dated Apr. 9, 2018, 2 pages.
Office Action received for Danish Patent Application No. PA201670605, dated Feb. 19, 2018, 2 pages.
Office Action received for Danish Patent Application No. PA201670605, dated Jun. 13, 2017, 4 pages.
Office Action received for Danish Patent Application No. PA201670605, dated Nov. 14, 2016, 8 pages.
Office Action received for Danish Patent Application No. PA201770392, dated Apr. 17, 2018, 2 pages.
Office Action received for Danish Patent Application No. PA201770392, dated Dec. 8, 2017, 4 pages.
Office Action received for Danish Patent Application No. PA201770392, dated Jun. 20, 2017, 11 pages.
Office Action received for Danish Patent Application No. PA201770401, dated Jan. 31, 2018, 3 pages.
Office Action received for Danish Patent Application No. PA201770401, dated May 17, 2018, 3 pages.
Office Action received for Danish Patent Application No. PA201770402, dated Apr. 16, 2018, 5 pages.
Office Action received for Danish Patent Application No. PA201770402, dated Dec. 18, 2017, 6 pages.
Office Action received for Danish Patent Application No. PA201770402, dated Jun. 19, 2017, 11 pages.
Office Action received for Danish Patent Application No. PA201770403, dated Dec. 12, 2017, 3 pages.
Office Action received for Danish Patent Application No. PA201770403, dated Jun. 16, 2017, 8 pages.
Office Action received for Danish Patent Application No. PA201770404, dated Aug. 8, 2018, 4 pages.
Office Action received for Danish Patent Application No. PA201770404, dated Dec. 1, 2017, 5 pages.
Office Action received for Danish Patent Application No. PA201770404, dated Feb. 21, 2019, 2 pages.
Office Action received for Danish Patent Application No. PA201770404, dated May 1, 2019, 2 pages.
Office Action received for Danish Patent Application No. PA201770406, dated Feb. 27, 2018, 7 pages.
Office Action received for Danish Patent Application No. PA201770406, dated Jan. 25, 2019, 8 pages.
Office Action received for Danish Patent Application No. PA201770406, dated Jun. 22, 2017, 11 pages.
Office Action received for Danish Patent Application No. PA201770406, dated Mar. 26, 2019, 3 pages.

(56) References Cited

OTHER PUBLICATIONS

Office Action received for Danish Patent Application No. PA201770406, dated Nov. 11, 2019, 4 pages.
Office Action received for Danish Patent Application No. PA201770408, dated Dec. 21, 2017, 6 pages.
Office Action received for Danish Patent Application No. PA201770408, dated Jun. 20, 2017, 9 pages.
Office Action received for Danish Patent Application No. PA201770408, dated May 3, 2018, 7 pages.
Office Action received for Danish Patent Application No. PA201770410, dated Apr. 9, 2018, 5 pages.
Office Action received for Danish Patent Application No. PA201770410, dated Jun. 23, 2017, 9 pages.
Office Action received for Danish Patent Application No. PA201770410, dated Nov. 22, 2018, 5 pages.
Office Action received for Danish Patent Application No. PA201870060, dated Jan. 15, 2019, 4 pages.
Office Action received for Danish Patent Application No. PA201870060, dated Jul. 25, 2019, 2 pages.
Office Action received for Danish Patent Application No. PA201870293, dated Jul. 17, 2018, 2 pages.
Office Action received for Danish Patent Application No. PA201870293, dated Jun. 19, 2018, 8 pages.
Office Action received for Danish Patent Application No. PA201870362, dated Aug. 22, 2019, 4 pages.
Office Action received for Danish Patent Application No. PA201870362, dated Dec. 18, 2018, 2 pages.
Office Action received for Danish Patent Application No. PA201870363, dated Mar. 26, 2019, 3 pages.
Office Action received for Danish Patent Application No. PA201870364, dated Jan. 28, 2019, 8 pages.
Office Action received for Danish Patent Application No. PA201870364, dated Jun. 11, 2019, 11 pages.
Office Action received for Danish Patent Application No. PA201870419, dated Feb. 27, 2020, 8 pages.
Office Action received for Danish Patent Application No. PA201870419, dated Sep. 30, 2019, 4 pages.
Office Action received for Danish Patent Application No. PA201870435, dated Feb. 6, 2020, 3 pages.
Office Action received for Danish Patent Application No. PA201870435, dated May 2, 2019, 3 pages.
Office Action received for Danish Patent Application No. PA201870435, dated May 25, 2020, 3 pages.
Office Action received for Danish Patent Application No. PA201870598, dated May 1, 2019, 3 pages.
Office Action received for Danish Patent Application No. PA201870598, dated Nov. 8, 2019, 4 pages.
Office Action received for European Patent Application No. 17813777.4, dated Jan. 3, 2020, 5 pages.
Office Action received for European Patent Application No. 18197583.0, dated Feb. 28, 2020, 8 pages.
Office Action received for European Patent Application No. 18197589.7, dated Oct. 1, 2019, 5 pages.
Office Action received for European Patent Application No. 19182037.2, dated Jun. 16, 2020, 6 pages.
Office Action received for European Patent Application No. 19729395.4, dated Jul. 15, 2020, 4 pages.
Office Action received for European Patent Application No. 19729395.4, dated Sep. 29, 2020, 10 pages.
Office Action received for Japanese Patent Application No. 2018-562659, dated Dec. 6, 2019, 7 pages (3 pages of English Translation and 4 pages of Official Copy).
Office Action received for Japanese Patent Application No. 2018-562659, dated Jul. 26, 2019, 9 pages (4 pages of English Translation and 5 pages of Official Copy).
Office Action received for Japanese Patent Application No. 2018-562659, dated May 28, 2020, 5 pages (3 pages of English Translation and 2 pages of Official Copy).

Office Action received for Korean Patent Application No. 10-2019-7038093, dated Feb. 13, 2020, 11 pages (5 pages of English Translation and 6 pages of Official Copy).
Partial European Search Report received for European Patent Application No. 20158824.1, dated May 8, 2020, 14 pages.
Partial European Search Report received for European Patent Application No. 18197583.0, dated Jan. 14, 2019, 18 pages.
PartyShare—turn your Xperia into a jukebox, Available at: https://forum.xda-developers.com/crossdevice-dev/sony/app-partyshare-xperia-jukebox-t2877807, Sep. 15, 2014, 5 pages.
Plaisant et al., "Touchscreen Toggle Switches: Push or slide? Design Issues and Usability Study", Technical Report CAR-TR-521, CS-TR-2557, Nov. 1990, pp. 1-10.
Review: Samsung Radiant R3 Wireless Speakers, Available Online at: https://www.youtube.com/watch?v=ZBICVE1WdKE, Jan. 19, 2016, 3 pages.
Richards, "TN Audio Mixer and Master Volume Control with Automatic Configuration", Technical Disclosure Bulletin, vol. 37, No. 01, Jan. 1, 1994, pp. 485-486.
Samsung, "Samsung R3 Wireless 360° Smart Speaker (Black)", User Manual ver. 1.0 (ENGLISH), User manual [online], Available Online at: https://www.samsung.com/uk/support/model/WAM3500/XU/, Dec. 16, 2016, 3 pages.
Search Report and Opinion received for Danish Patent Application No. PA201770401, dated Jun. 19, 2017, 6 pages.
Search Report and Opinion received for Danish Patent Application No. PA201870060 dated Apr. 30, 2018, 7 pages.
Search Report and Opinion received for Danish Patent Application No. PA201870362, dated Sep. 7, 2018, 9 pages.
Search Report and Opinion received for Danish Patent Application No. PA201870363, dated Sep. 11, 2018, 12 pages.
Search Report and Opinion received for Danish Patent Application No. PA201870364, dated Sep. 4, 2018, 12 pages.
Search Report and Opinion received for Danish Patent Application No. PA201870419, dated Aug. 27, 2018, 7 pages.
Search Report and Opinion received for Danish Patent Application No. PA201870419, dated Sep. 10, 2018, 9 pages.
Search Report and Opinion received for Danish Patent Application No. PA201870435, dated Oct. 26, 2018, 9 pages.
Search Report and Opinion received for Danish Patent Application No. PA201870598, dated Dec. 5, 2018, 8 pages.
Search Report received for Danish Patent Application No. PA201770404, dated Jun. 20, 2017, 8 pages.
Search Report received for Danish Patent Application No. PA201770409, dated Jun. 20, 2017, 9 pages.
Seifert Dan, "Google Home review: Home is where the smart is", The Verge, Available Online at: https://www.theverge.com/2016/11/3/13504658/google-home-review-speaker-assistant-amazon-echo-competitor, Nov. 3, 2016, 11 pages.
Seifi Joe, "Pianist Pro Review", available at: http://www.appsafari.com/productivity/11529/pianist-pro/, Apr. 24, 2010, 9 pages.
SMARTTRICKS, "Top 3 Music Player For Android", Available online at: <https://www.youtube.com/watch?v=He7RTn4CL34>, Feb. 22, 2017, 4 pages.
SolarWinds Network Configuration Manager Administrator Guide, Available online at: https://web.archive.org/web/20141031133207/http://www.solarwinds.com/documentation/orionNCM/docs/OrionNCMAdministratorGuide.pdf, Oct. 31, 2014, 466 pages.
Sonos, "Sonos Controller App for iPad Product Guide", Available online at: https://www.sonos.com/documents/productguides/en/iPadGuide_EN.pdf, Nov. 2014, 47 pages.
Summons to Attend Oral Proceedings received for European Patent Application No. 17813777.4, mailed on Jun. 18, 2020, 8 pages.
Summons to Attend Oral Proceedings received for European Patent Application No. 18197583.0, mailed on Aug. 14, 2020, 12 pages.
Summons to attend Oral proceedings received for European Patent Application No. 18197589.7, mailed on Apr. 9, 2020, 7 pages.
Tedeschi Bob, "Stoking a Music Fan's Fancy With Apps That Rock", available at: http://www.nytimes.com/2010/05/20/technology/personaltech/20smart.html, May 19, 2010, 3 pages.
The Single Keyboard Piano, available at: http://moocowmusic.com/PianistPro/Manual/ManualSingleKeyboardPiano.html, Sep. 26, 2010, 4 pages.

(56) References Cited

OTHER PUBLICATIONS

The Single Keyboard Piano, available at: http://web.archive.org/web/20100926023929/http://moocowmusic.com/PianistPro/Manual/ManualSingleKeyboardPiano.html, Sep. 26, 2010, 3 pages.
Woolsey Amanda, "Apple Watch Tips—How to Add and Play Music", Available online at: https://www.youtube.com/watch?v=E0QEuqMaoi8, Apr. 26, 2015, 3 pages.
Corrected Notice of Allowance received for U.S. Appl. No. 16/836,571, dated Nov. 18, 2021, 3 pages.
Extended European Search Report received for European Patent Application No. 21197457.1, dated Nov. 15, 2021, 8 pages.
Intention to Grant received for Danish Patent Application No. PA202070617, dated Nov. 15, 2021, 2 pages.
Non-Final received for U.S. Appl. No. 17/461,103, dated Nov. 22, 2021, 15 pages.
Notice of Allowance received for Japanese Patent Application No. 2019-194597, dated Nov. 19, 2021, 4 pages (1 page of English Translation and 3 pages of Official Copy).
Petternitter, "User Restricted Collaborative Playlists—The Spotify Community", Downloaded from: https://community.spotify.com/t5/Archived-Ideas/User-restricted-collaborative-playlists/idi-p/70721, May 28, 2012, 4 pages.
Boxer David, "Change the permissions of the Google Drive file or folder or Share the file or folder", Blake School Website, Online Available at: https://support.blakeschool.org/hc/en-us/articles/231790648-Change-the-permissions-of-the-Google-Drive-file-or-folder-or-Share-the-file-or-folder, Oct. 31, 2016, 2 pages.
Brief Communication Regarding Oral Proceedings received for European Patent Application No. 19182037.2, mailed on Apr. 15, 2021, 2 pages.
Customize Notifications and Content on Your Galaxy Phone's Lock Screen, Online Available at:—https://www.samsung.com/US/support/answer/ANS00062636, Oct. 4, 2017, 5 pages.
Intention to Grant received for Danish Patent Application No. PA202070560, dated Apr. 26, 2021, 2 pages.
Invitation to Pay Search Fees received for European Patent Application No. 19728558.8, mailed on Apr. 20, 2021, 4 pages.
Non-Final Office Action received for U.S. Appl. No. 16/922,675, dated May 4, 2021, 23 pages.
Notice of Allowance received for Korean Patent Application No. 10-2020-7031700, dated Apr. 21, 2021, 4 pages (2 pages of English Translation and 2 pages of Official Copy).
Notice of Allowance received for U.S. Appl. No. 16/702,968, dated Apr. 21, 2021, 20 pages.
Notice of Allowance received for U.S. Appl. No. 16/807,604, dated Apr. 30, 2021, 25 pages.
Office Action received for Chinese Patent Application No. 201910704856.X, dated Apr. 6, 2021, 13 pages (7 pages of English Translation and 6 pages of Official Copy).
Office Action received for Chinese Patent Application No. 202011243876.0, dated Apr. 6, 2021, 11 pages (5 pages of English Translation and 6 pages of Official Copy).
Office Action received for Danish Patent Application No. PA201970533, dated Apr. 20, 2021, 2 pages.
Smart Home App—What is the Widget, Online Available at: https://support.vivinl.com/s/article/Vivint-Smart-Home-App-What-is-the-Widget, Jan. 26, 2019, 4 pages.
Gookin Dan, "Lock Screen Settings on Your Android Phone", Online Available at: https://www.dummies.com/consumer-electronics/smartphones/droid/lock-screen-settings-on-your-android-phone/, Sep. 23, 2015, 6 pages.
Stroud Forrest, "Screen Lock Meaning & Definition", Online Available at: https://www.webopedia.com/definitions/screen-lock, Jan. 30, 2014, 3 pages.
Corrected Notice of Allowance received for U.S. Appl. No. 16/702,968, dated Jun. 28, 2021, 4 pages.
Corrected Notice of Allowance received for U.S. Appl. No. 16/807,604, dated Jun. 28, 2021, 3 pages.
Extended Search Report received for European Patent Application No. 21161005.0, dated Jun. 14, 2021, 12 pages.
Non-Final Office Action received for U.S. Appl. No. 17/223,794, dated Jun. 16, 2021, 32 pages.
Notice of Allowance received for Korean Patent Application No. 10-2020-7032488, dated Jun. 16, 2021, 4 pages (1 page of English Translation and 3 pages of Official Copy).
Notice of Allowance received for U.S. Appl. No. 16/583,994, dated Jun. 24, 2021, 10 pages.
Notice of Allowance received for U.S. Appl. No. 17/031,833, dated Jun. 25, 2021, 15 pages.
Office Action received for Chinese Patent Application No. 202010125114.4, dated Jun. 7, 2021, 7 pages (4 pages of English Translation and 3 pages of Official Copy).
Office Action received for European Patent Application No. 19728558.8, dated Jun. 21, 2021, 9 pages.
Office Action received for Japanese Patent Application No. 2020-560927, dated Jun. 10, 2021, 5 pages (2 pages of English Translation and 3 pages of Official Copy).
Result of Consultation received for European Patent Application No. 19729395.4, mailed on Jun. 22, 2021, 3 pages.
Result of Consultation received for European Patent Application No. 19729395.4, mailed on Jun. 23, 2021, 3 pages.
Applicant-Initiated Interview Summary received for U.S. Appl. No. 17/121,610, dated Oct. 29, 2021, 2 pages.
Corrected Notice of Allowance received for U.S. Appl. No. 16/836,571, dated Nov. 4, 2021, 4 pages.
Final Office Action received for U.S. Appl. No. 16/803,849, dated Nov. 2, 2021, 37 pages.
Non-Final Office Action received for U.S. Appl. No. 16/817,328, dated Oct. 29, 2021, 9 pages.
Notice of Acceptance received for Australian Patent Application No. 2021201403, dated Oct. 22, 2021, 3 pages.
Notice of Allowance received for U.S. Appl. No. 17/157,166, dated Nov. 16, 2021, 6 pages.
Office Action received for European Patent Application No. 18733381.0, dated Oct. 29, 2021, 9 pages.
Office Action received for European Patent Application No. 20205496.1, dated Nov. 10, 2021, 5 pages.
Applicant Initiated Interview Summary received for U.S. Appl. No. 16/817,328, dated Dec. 21, 2021, 3 pages.
Certificate of Examination received for Australian Patent Application No. 2021100721, dated Dec. 16, 2021, 2 pages.
Notice of Acceptance received for Australian Patent Application No. 2020239711, dated Dec. 16, 2021, 3 pages.
Office Action received for Australian Patent Application No. 2019267527, dated Dec. 2, 2021, 4 pages.
Office Action received for Australian Patent Application No. 2020282362, dated Nov. 25, 2021, 3 pages.
Office Action received for Indian Patent Application No. 202014041529, dated Dec. 6, 2021, 6 pages.
Office Action received for Japanese Patent Application No. 2020-159840, dated Dec. 10, 2021, 13 pages (7 pages of English Translation and 6 pages of Official Copy).
Office Action received for Japanese Patent Application No. 2020-560927, dated Dec. 1, 2021, 3 pages (1 page of English Translation and 2 pages of Official Copy).
Summons to Attend Oral Proceedings received for European Patent Application No. 20187610.9, mailed on Dec. 16, 2021, 12 pages.
Applicant-Initiated Interview Summary received for U.S. Appl. No. 16/836,571, dated Jul. 7, 2021, 6 pages.
Corrected Notice of Allowance received for U.S. Appl. No. 16/583,994, dated Jul. 6, 2021, 3 pages.
Invitation to Pay Search Fees received for European Patent Application No. 18733381.0, mailed on Jun. 30, 2021, 4 pages.
Non-Final Office Action received for U.S. Appl. No. 17/157,166, dated Jul. 9, 2021, 12 pages.
Office Action received for Australian Patent Application No. 2019267527, dated Jun. 24, 2021, 8 pages.
Advisory Action received for U.S. Appl. No. 16/583,989, dated Sep. 22, 2020, 5 pages.
Akshay, "Control your SmartThings compatible devices on the Gear S2 and S3 with the Smarter Things app", Online available at: https://iotgadgets.com/2017/09/control-smartthings-compatible-devices-gear-s2-s3-smarter-things-app/, Sep. 7, 2017, 4 pages.

(56) References Cited

OTHER PUBLICATIONS

Applicant Initiated Interview Summary received for U.S. Appl. No. 16/583,989, dated Aug. 3, 2020, 6 pages.
Applicant Initiated Interview Summary received for U.S. Appl. No. 16/583,989, dated Mar. 25, 2020, 4 pages.
Applicant Initiated Interview Summary received for U.S. Appl. No. 16/583,994, dated Apr. 3, 2020, 5 pages.
Applicant Initiated Interview Summary received for U.S. Appl. No. 16/584,490, dated Jul. 28, 2020, 4 pages.
Applicant-Initiated Interview Summary received for U.S. Appl. No. 16/583,981, dated Mar. 9, 2020, 5 pages.
Applicant-Initiated Interview Summary received for U.S. Appl. No. 16/583,981, dated Sep. 14, 2020, 6 pages.
Applicant-Initiated Interview Summary received for U.S. Appl. No. 16/583,994, dated Nov. 24, 2020, 4 pages.
Applicant-Initiated Interview Summary received for U.S. Appl. No. 16/584,490, dated Jan. 31, 2020, 4 pages.
Applicant-Initiated Interview Summary received for U.S. Appl. No. 16/922,675, dated Nov. 2, 2020, 3 pages.
Brief Communication Regarding Oral Proceedings received for European Patent Application No. 17813777.4, mailed on Nov. 23, 2020, 6 pages.
Corrected Notice of Allowance received for U.S. Appl. No. 15/730,610, dated Nov. 27, 2020, 3 pages.
Examiner Initiated-Interview Summary received for U.S. Appl. No. 16/528,941, dated Dec. 1, 2020, 2 pages.
Final Office Action received for U.S. Appl. No. 16/583,981, dated Apr. 16, 2020, 19 pages.
Final Office Action received for U.S. Appl. No. 16/583,989, dated Jul. 10, 2020, 23 pages.
Final Office Action received for U.S. Appl. No. 16/583,994, dated Jul. 23, 2020, 16 pages.
Final Office Action received for U.S. Appl. No. 16/584,490, dated May 1, 2020, 48 pages.
Final Office Action received for U.S. Appl. No. 16/922,675, dated Dec. 3, 2020, 21 pages.
Final Office Action received for U.S. Appl. No. 16/922,675, dated Nov. 30, 2020, 12 pages.
International Search Report and Written Opinion received for PCT Patent Application No. PCT/US2020/026044, dated Sep. 9, 2020, 26 pages.
International Search Report and Written Opinion received for PCT Patent Application No. PCT/US2020/035426, dated Sep. 11, 2020, 12 pages.
International Search Report and Written Opinion received for PCT Patent Application No. PCT/US2020/035446, dated Nov. 10, 2020, 20 pages.
International Search Report and Written Opinion received for PCT Patent Application No. PCT/US2020/035488, dated Nov. 17, 2020, 21 pages.
Invitation to Pay Additional Fees received for PCT Patent Application No. PCT/US2020/026044, mailed on Jun. 25, 2020, 12 pages.
Invitation to Pay Additional Fees received for PCT Patent Application No. PCT/US2020/035446, mailed on Sep. 11, 2020, 12 pages.
Invitation to Pay Additional Fees received for PCT Patent Application No. PCT/US2020/035488, mailed on Sep. 23, 2020, 15 pages.
Locklear Mallory, "Samsung to bring SmartThings control to its Gear smartwatches", Online available at: https://www.engadget.com/2018-01-08-samsung-smartthings-app-gear-smartwatches.html, Jan. 8, 2018, 12 pages.
Low Cherlynn, "So you bought a smartwatch. Now what?", Online available at: https://www.engadget.com/2018-02-06-how-to-set-up-your-smartwatch.html, Feb. 6, 2018, 19 pages.
NBC News, ""NBC News—YouTube Democratic Debate (full),"", Online available at https://www.youtube.com/watch?v=ti2Nokoq1J4, Jan. 17, 2016, 1 page.

Non-Final Office Action received for U.S. Appl. No. 16/528,941, dated Dec. 7, 2020, 15 pages.
Non-Final Office Action received for U.S. Appl. No. 16/583,981, dated Dec. 6, 2019, 14 pages.
Non-Final Office Action received for U.S. Appl. No. 16/583,989, dated Jan. 24, 2020, 20 pages.
Non-Final Office Action received for U.S. Appl. No. 16/583,994, dated Dec. 30, 2019, 14 pages.
Non-Final Office Action received for U.S. Appl. No. 16/584,490, dated Dec. 10, 2019, 27 pages.
Non-Final Office Action received for U.S. Appl. No. 16/723,583, dated Aug. 13, 2020, 13 pages.
Non-Final Office Action received for U.S. Appl. No. 16/922,675, dated Aug. 13, 2020, 17 pages.
Non-Final Office Action received for U.S. Appl. No. 17/031,833, dated Dec. 7, 2020, 13 pages.
Notice of Allowance received for U.S. Appl. No. 16/584,490, dated Aug. 27, 2020, 13 pages.
Office Action received for Australian Patent Application No. 2019266225, dated Nov. 23, 2020, 4 pages.
Office Action received for Australian Patent Application No. 2020257092, dated Nov. 30, 2020, 6 pages.
Office Action received for Danish Patent Application No. PA201970533, dated Jul. 17, 2020, 6 pages.
Result of Consultation received for European Patent Application No. 18197589.7, mailed on Dec. 1, 2020, 9 pages.
Samsung, "Control an individual smart device on your watch", Online Available at: https://www.samsung.com/us/support/troubleshooting/TSG01003208/, Nov. 9, 2018, 1 page.
Samsung, "Problems with SmartThings on your Samsung Smartwatch", Online Available at: https://www.samsung.com/us/support/troubleshooting/TSG01003169/#smartthings-error-on-samsung-smartwatch, Nov. 9, 2018, 10 pages.
Samsung, "Samsung—User manual—Galaxy Watch", Online available at: https://content.abt.com/documents/90234/SM-R810NZDAXAR-use.pdf, Aug. 24, 2018, 102 pages.
Search Report and Opinion received for Danish Patent Application No. PA201970533, dated Oct. 25, 2019, 9 pages.
Summons to Attend Oral Proceedings received for European Patent Application No. 19182037.2, mailed on Nov. 24, 2020, 12 pages.
Notice of Allowance received for Korean Patent Application No. 10-2020-7031319, dated Apr. 6, 2021, 5 pages (2 pages of English Translation and 3 pages of Official Copy).
Office Action received for Chinese Patent Application No. 202010125114.4, dated Mar. 1, 2021, 15 pages (9 pages of English Translation and 6 pages of Official Copy).
Office Action received for Japanese Patent Application No. 2018-562659, dated Mar. 12, 2021, 79 pages (34 pages of English Translation and 45 pages of Official Copy).
Supplemental Notice of Allowance received for U.S. Appl. No. 16/584,490, dated Apr. 13, 2021, 2 pages.
Certificate of Examination received for Australian Patent Application No. 2020100886, dated Dec. 22, 2020, 2 pages.
Intention to Grant received for European Patent Application No. 18197589.7, dated Jan. 21, 2021, 8 pages.
Notice of Acceptance received for Australian Patent Application No. 2019266225, dated Dec. 23, 2020, 3 pages.
Notice of Allowance received for Chinese Patent Application No. 201880056514.5, dated Jan. 11, 2021, 2 pages (1 page of English Translation and 1 page of Official Copy).
Notice of Allowance received for U.S. Appl. No. 15/910,263, dated Jan. 22, 2021, 33 pages.
Notice of Allowance received for U.S. Appl. No. 16/922,675, dated Jan. 21, 2021, 7 pages.
Applicant-Initiated Interview Summary received for U.S. Appl. No. 17/116,938, dated Dec. 13, 2021, 3 pages.
Corrected Notice of Allowance received for U.S. Appl. No. 16/836,571, dated Dec. 6, 2021, 5 pages.
Corrected Notice of Allowance received for U.S. Appl. No. 17/157,166, dated Dec. 9, 2021, 4 pages.
Corrected Notice of Allowance received for U.S. Appl. No. 17/157,166, dated Dec. 15, 2021, 4 pages.

(56) References Cited

OTHER PUBLICATIONS

Decision to Grant received for European Patent Application No. 19729395.4, dated Dec. 9, 2021, 2 pages.
Ex Parte Quayle Action received for U.S. Appl. No. 17/121,610, mailed on Dec. 9, 2021, 7 pages.
Final Office Action received for U.S. Appl. No. 16/830,838, dated Dec. 9, 2021, 16 pages.
International Preliminary Report on Patentability received for PCT Patent Application No. PCT/US2020/024390, dated Dec. 9, 2021, 20 pages.
International Preliminary Report on Patentability received for PCT Patent Application No. PCT/US2020/026044, dated Dec. 9, 2021, 18 pages.
International Preliminary Report on Patentability received for PCT Patent Application No. PCT/US2020/035426, dated Dec. 9, 2021, 10 pages.
International Preliminary Report on Patentability received for PCT Patent Application No. PCT/US2020/035446, dated Dec. 9, 2021, 14 pages.
International Preliminary Report on Patentability received for PCT Patent Application No. PCT/US2020/035488, dated Dec. 9, 2021, 16 pages.
Notice of Allowance received for Chinese Patent Application No. 202010125114.4, dated Nov. 24, 2021, 2 pages (1 page of English Translation and 1 page of Official Copy).
Notice of Allowance received for Korean Patent Application No. 10-2021-7021047, dated Dec. 6, 2021, 3 pages (1 page of English Translation and 2 pages of Official Copy).
Notice of Allowance received for Korean Patent Application No. 10-2021-7035472, dated Nov. 23, 2021, 4 pages (2 pages of English Translation and 2 pages of Official Copy).
Summons to Attend Oral Proceedings received for European Patent Application 20158824.1, mailed on Dec. 7, 2021, 6 pages.
Intention to Grant received for European Patent Application No. 19182037.2, dated May 4, 2021, 9 pages.
Non-Final Office Action received for U.S. Appl. No. 16/803,849, dated May 14, 2021, 34 pages.
Non-Final Office Action received for U.S. Appl. No. 17/121,610, dated May 13, 2021, 17 pages.
Notice of Allowance received for U.S. Appl. No. 16/528,941, dated May 19, 2021, 5 pages.
Notice of Allowance received for U.S. Appl. No. 17/026,818, dated May 13, 2021, 10 pages.
Office Action received for Chinese Patent Application No. 201811152726.1, dated Apr. 28, 2021, 14 pages (3 pages of English Translation and 11 pages of Official Copy).
Office Action received for European Patent Application No. 19207753.5, dated May 10, 2021, 4 pages.
Applicant-Initiated Interview Summary received for U.S. Appl. No. 16/528,941, dated Nov. 10, 2020, 2 pages.
International Search Report and Written Opinion received for PCT Patent Application No. PCT/US2020/024390, dated Oct. 23, 2020, 26 pages.
Office Action received for Australian Patent Application No. 2019268111, dated Oct. 27, 2020, 7 pages.
Applicant-Initiated Interview Summary received for U.S. Appl. No. 16/583,994, dated May 28, 2021, 5 pages.
Applicant-Initiated Interview Summary received for U.S. Appl. No. 16/830,838, dated May 24, 2021, 3 pages.
Applicant-Initiated Interview Summary received for U.S. Appl. No. 17/031,833, dated May 24, 2021, 6 pages.
Corrected Notice of Allowance received for U.S. Appl. No. 16/583,981, dated May 17, 2021, 3 pages.
Corrected Notice of Allowance received for U.S. Appl. No. 16/702,968, dated May 26, 2021, 4 pages.
Corrected Notice of Allowance received for U.S. Appl. No. 16/702,968, dated May 28, 2021, 4 pages.
Corrected Notice of Allowance received for U.S. Appl. No. 16/807,604, dated May 28, 2021, 3 pages.

Notice of Allowance received for Chinese Patent Application No. 201710493025.3, dated May 7, 2021, 6 pages (3 pages of English Translation and 3 pages of Official Copy).
Office Action received for Chinese Patent Application No. 201911128105.4, dated Apr. 8, 2021, 10 pages (5 pages of English Translation and 5 pages of Official Copy).
Office Action received for European Patent Application No. 20158824.1, dated May 18, 2021, 10 pages.
Office Action received for European Patent Application No. 20187610.9, dated May 21, 2021, 7 pages.
Corrected Notice of Allowance received for U.S. Appl. No. 15/910,263, dated Mar. 17, 2021, 3 pages.
Corrected Notice of Allowance received for U.S. Appl. No. 15/910,263, dated Mar. 18, 2021, 3 pages.
Extended European Search Report received for European Patent Application No. 20205496.1, dated Mar. 11, 2021, 11 pages.
Minutes of the Oral Proceedings received for European Patent Application No. 18197583.0, mailed on Mar. 9, 2021, 6 pages.
Notice of Acceptance received for Australian Patent Application No. 2021200789, dated Feb. 26, 2021, 3 pages.
Notice of Allowance received for Korean Patent Application No. 10-2020-7032110, dated Mar. 8, 2021, 4 pages (1 page of English Translation and 3 pages of Official Copy).
Office Action received for Chinese Patent Application No. 202010742019.9, dated Feb. 3, 2021, 17 pages (9 pages of English Translation and 8 pages of Official Copy).
Office Action received for Danish Patent Application No. PA202070560, dated Mar. 10, 2021, 7 pages.
Office Action received for Japanese Patent Application No. 2020-047952, dated Feb. 8, 2021, 6 pages (3 pages of English Translation and 3 pages of Official Copy).
Result of Consultation received for European Patent Application No. 19182037.2, mailed on Mar. 22, 2021, 5 pages.
Summons to Attend Oral Proceedings received for European Patent Application No. 19729395.4, mailed on Mar. 11, 2021, 7 pages.
Summons to Attend Oral Proceedings received for European Patent Application No. 19729395.4, mailed on Mar. 19, 2021, 9 pages.
Applicant-Initiated Interview Summary received for U.S. Appl. No. 15/910,263, dated Nov. 18, 2020, 6 pages.
Extended European Search Report received for European Patent Application No. 20187610.9, dated Nov. 16, 2020, 7 pages.
International Preliminary Report on Patentability received for PCT Patent Application No. PCT/US2019/030963, dated Nov. 19, 2020, 12 pages.
International Preliminary Report on Patentability received for PCT Patent Application No. PCT/US2019/031202, dated Nov. 19, 2020, 13 pages.
Non-Final Office Action received for U.S. Appl. No. 17/026,818, dated Nov. 25, 2020, 20 pages.
Notice of Allowance received for Chinese Patent Application No. 201810730279.7, dated Nov. 5, 2020, 2 pages (1 page of English translation and 1 page of Official Copy).
Notice of Allowance received for Chinese Patent Application No. 201910400180.5, dated Nov. 5, 2020, 2 pages (1 page of English Translation and 1 page of Official Copy).
Notice of Allowance received for U.S. Appl. No. 16/584,743, dated Nov. 16, 2020, 7 pages.
Office Action received for Chinese Patent Application No. 201811152726.1, dated Oct. 29, 2020, 12 pages (6 pages of English Translation and 6 pages of Official Copy).
Office Action received for Chinese Patent Application No. 201811539260.0, dated Nov. 4, 2020, 9 pages (5 pages of English Translation and 4 pages of Official Copy).
Office Action received for European Patent Application No. 19207753.5, dated Nov. 12, 2020, 5 pages.
Supplemental Notice of Allowance received for U.S. Appl. No. 16/584,743, dated Nov. 25, 2020, 2 pages.
Corrected Notice of Allowance received for U.S. Appl. No. 16/790,619, dated Oct. 13, 2020, 3 pages.
Corrected Notice of Allowance received for U.S. Appl. No. 16/799,481, dated Oct. 27, 2020, 3 pages.
Decision to Grant received for Danish Patent Application No. PA201870435, dated Oct. 20, 2020, 2 pages.

(56) References Cited

OTHER PUBLICATIONS

Notice of Allowance received for U.S. Appl. No. 15/730,610, dated Oct. 21, 2020, 29 pages.
Applicant-Initiated Interview Summary received for U.S. Appl. No. 17/026,818, dated Mar. 8, 2021, 4 pages.
Notice of Acceptance received for Australian Patent Application No. 2019268111, dated Feb. 18, 2021, 3 pages.
Office Action received for Australian Patent Application No. 2020257092, dated Mar. 3, 2021, 7 pages.
Office Action received for Chinese Patent Application No. 202010126661.4, dated Feb. 3, 2021, 16 pages (9 pages of English Translation and 7 pages of Official Copy).
Result of Consultation received for European Patent Application No. 18197583.0, mailed on Feb. 24, 2021, 3 pages.
Applicant-Initiated Interview Summary received for U.S. Appl. No. 16/830,838, dated Apr. 6, 2022, 2 pages.
Applicant-Initiated Interview Summary received for U.S. Appl. No. 17/168,069, dated Nov. 17, 2021, 2 pages.
Corrected Notice of Allowance received for U.S. Appl. No. 17/121,610, dated Mar. 31, 2022, 3 pages.
Corrected Notice of Allowance received for U.S. Appl. No. 17/168,069, dated Feb. 9, 2022, 2 pages.
International Search Report and Written Opinion received for PCT Patent Application No. PCT/US2021/048358, dated Feb. 24, 2022, 21 pages.
Invitation to Pay Additional Fees received for PCT Patent Application No. PCT/US2021/048358, mailed on Dec. 23, 2021, 14 pages.
Non-Final Office Action received for U.S. Appl. No. 17/168,069, dated Jul. 21, 2021, 17 pages.
Notice of Acceptance received for Australian Patent Application No. 2022201369, dated Mar. 17, 2022, 3 pages.
Notice of Allowance received for U.S. Appl. No. 17/168,069, dated Jan. 19, 2022, 12 pages.
Notice of Allowance received for U.S. Appl. No. 17/168,069, dated Mar. 22, 2022, 5 pages.
Office Action received for Chinese Patent Application No. 202110818370.6, dated Mar. 2, 2022, 13 pages (7 pages of English Translation and 6 pages of Official Copy).
Office Action received for Indian Patent Application No. 202118046028, dated Apr. 6, 2022, 6 pages.
Office Action received for Japanese Patent Application No. 2020-159840, dated Mar. 28, 2022, 6 pages (3 pages of English Translation and 3 pages of Official Copy).
Office Action received for Korean Patent Application No. 10-2022-7008567, dated Mar. 28, 2022, 5 pages (2 pages of English Translation and 3 pages of Official Copy).
Supplemental Notice of Allowance received for U.S. Appl. No. 17/168,069, dated Feb. 2, 2022, 2 pages.
Applicant-Initiated Interview Summary received for U.S. Appl. No. 16/936,164, dated Mar. 22, 2022, 4 pages.
Applicant-Initiated Interview Summary received for U.S. Appl. No. 17/476,404, dated Mar. 18, 2022, 2 pages.
Corrected Notice of Allowance received for U.S. Appl. No. 16/836,571, dated Mar. 25, 2022, 2 pages.
Notice of Allowance received for Chinese Patent Application No. 202110248576.X, dated Mar. 21, 2022, 2 pages (1 page of English Translation and 1 page of Official Copy).
Notice of Allowance received for Japanese Patent Application No. 2021-563716, dated Mar. 14, 2022, 4 pages (1 page of English Translation and 3 pages of Official Copy).
Notice of Allowance received for U.S. Appl. No. 17/157,166, dated Mar. 30, 2022, 6 pages.
Notice of Allowance received for U.S. Appl. No. 17/461,103, dated Mar. 17, 2022, 10 pages.
Office Action received for Chinese Patent Application No. 202010126661.4, dated Mar. 4, 2022, 13 pages (8 pages of English Translation and 5 pages of Official Copy).
Office Action received for European Patent Application No. 18779093.6, dated Mar. 17, 2022, 4 pages.

Office Action received for European Patent Application No. 21160991.2, dated Mar. 24, 2022, 11 pages.
Applicant-Initiated Interview Summary received for U.S. Appl. No. 17/461,103, dated Jan. 26, 2022, 6 pages.
Intention to Grant received for European Patent Application No. 18197583.0, dated Jan. 17, 2022, 9 pages.
Summons to Attend Oral Proceedings received for European Patent Application No. 19728558.8, mailed on Jan. 18, 2022, 9 pages.
Summons to Attend Oral Proceedings received for European Patent Application No. 20187610.9, mailed on Jan. 27, 2022, 2 pages.
Corrected Notice of Allowance received for U.S. Appl. No. 17/461,103, dated May 10, 2022, 2 pages.
Final Office Action received for U.S. Appl. No. 17/476,404, dated May 5, 2022, 30 pages.
Notice of Allowance received for U.S. Appl. No. 16/803,849, dated May 17, 2022, 12 pages.
Office Action received for Australian Patent Application No. 2020217458, dated May 10, 2022, 3 pages.
Office Action received for Chinese Patent Application No. 202110328597.2, dated Apr. 15, 2022, 18 pages (9 pages of English Translation and 9 pages of Official Copy).
Office Action received for Danish Patent Application No. PA202170320, dated May 3, 2022, 3 pages.
Corrected Notice of Allowance received for U.S. Appl. No. 17/157,166, dated Jan. 5, 2022, 4 pages.
Decision to Grant received for Japanese Patent Application No. 2021-051415, dated Jan. 6, 2022, 3 pages (1 page of English Translation and 2 pages of Official Copy).
Non-Final Office Action received for U.S. Appl. No. 16/936,164, dated Jan. 18, 2022, 18 pages.
Notice of Acceptance received for Australian Patent Application No. 2020282362, dated Jan. 4, 2022, 3 pages.
Notice of Acceptance received for Australian Patent Application No. 2020285524, dated Dec. 17, 2021, 3 pages.
Notice of Allowance received for Chinese Patent Application No. 202011336156.9, dated Jan. 6, 2022, 3 pages (2 pages of English Translation and 1 pages of Official Copy).
Notice of Allowance received for Japanese Patent Application No. 2021-026630, dated Jan. 7, 2022, 4 pages (1 page of English Translation and 3 pages of Official Copy).
Notice of Allowance received for Korean Patent Application No. 10-2021-7039234, dated Dec. 20, 2021, 4 pages (1 page of English Translation and 3 pages of Official Copy).
Notice of Allowance received for U.S. Appl. No. 16/888,775, dated Jan. 12, 2022, 5 pages.
Corrected Notice of Allowance received for U.S. Appl. No. 16/922,675, dated Mar. 4, 2022, 6 pages.
Notice of Acceptance received for Australian Patent Application No. 2021204454, dated Feb. 25, 2022, 3 pages.
Notice of Allowance received for U.S. Appl. No. 17/121,610, dated Mar. 11, 2022, 5 pages.
Office Action received for Australian Patent Application No. 2019267527, dated Mar. 3, 2022, 3 pages.
Office Action received for Australian Patent Application No. 2021203903, dated Feb. 24, 2022, 3 pages.
Summons to Attend Oral Proceedings received for European Patent Application No. 15728307.8, mailed on Mar. 7, 2022, 4 pages.
Summons to Attend Oral Proceedings received for European Patent Application No. 15729286.3, mailed on Mar. 10, 2022, 3 pages.
Decision to Grant received for European Patent Application No. 18197583.0, dated Feb. 3, 2022, 3 pages.
Intention to Grant received for European Patent Application No. 19207753.5, dated Jan. 28, 2022, 8 pages.
Non-Final Office Action received for U.S. Appl. No. 17/476,404, dated Feb. 8, 2022, 26 pages.
Notice of Allowance received for U.S. Appl. No. 16/836,571, dated Feb. 14, 2022, 31 pages.
Notice of Allowance received for U.S. Appl. No. 16/922,675, dated Feb. 10, 2022, 8 pages.
Office Action received for Chinese Patent Application No. 201910400179.2, dated Dec. 27, 2021, 32 pages (13 pages of English Translation and 19 pages of Official Copy).

(56) References Cited

OTHER PUBLICATIONS

Office Action received for Korean Patent Application No. 10-2021-7029861, dated Jan. 25, 2022, 11 pages (5 pages of English Translation and 6 pages of Official Copy).
Applicant-Initiated Interview Summary received for U.S. Appl. No. 16/803,849, dated Feb. 28, 2022, 9 pages.
COMPUTERADV, "Sonos App Navigation & Menu on iPhone", Available online at: https://www.youtube.com/watch?v=Jhz9XvWQ204, Aug. 4, 2015, 1 page.
Final Office Action received for U.S. Appl. No. 17/116,938, dated Mar. 1, 2022, 27 pages.
HOWCAST, "How to Create and Edit Playlists on iPhone", YouTube, Available online at: https://www.youtube.com/watch?v=YPOnKUvcso4, Mar. 13, 2014, 3 pages.
Non-Final Office Action received for U.S. Appl. No. 17/176,908, dated Feb. 24, 2022, 28 pages.
Noriega, Josh, "How to Store and Listen to Music Directly from Your Android Wear Smartwatch", Guiding Tech, Available online at: https://www.guidingtech.com/55254/listen-music-android-wear-smartwatch, Jan. 15, 2016, 16 pages.
Notice of Allowance received for U.S. Appl. No. 16/817,328, dated Feb. 16, 2022, 9 pages.
Office Action received for European Patent Application No. 20719301.2, dated Feb. 21, 2022, 9 pages.
Sandrahoutz, "How Do I Delete a Playlist From a Synced Ipod but Not Remove it From the Library in itunes", Apple Communities Website, Available online at: https://discussions.apple.com/thread/7503609, Mar. 23, 2016, 2 pages.
Sharepoint at Rackspace, "SharePoint 2013: How to Edit a List or Library Using Quick Edit", Available online at: https://www.youtube.com/watch?v=foZXcFC1k80, Oct. 10, 2014, 1 page.
SUPERTUNETV, "Ipod Nano 6G—Sync Selected Playlist iTunes", YouTube, Available online at: https://www.youtube.com/watch?v=xU 3rYRabt_l, Sep. 10, 2012, 3 pages.
Whitwam, Ryan, "How to Sync and Play Music on Your Android Wear Watch", Available online at: https://www.greenbot.com/article/2997520/how-to-sync-and-play-music-on-your-android-wear-watch.html, Nov. 2, 2015, 4 pages.
Corrected Notice of Allowance received for U.S. Appl. No. 17/157,166, dated Apr. 13, 2022, 4 pages.
Corrected Notice of Allowance received for U.S. Appl. No. 17/157,166, dated Apr. 25, 2022, 4 pages.
Corrected Notice of Allowance received for U.S. Appl. No. 17/461,103, dated Apr. 14, 2022, 2 pages.
Notice of Allowance received for U.S. Appl. No. 16/817,328, dated Apr. 18, 2022, 8 pages.
Office Action received for Australian Patent Application No. 2021202815, dated Apr. 11, 2022, 2 pages.
Office Action received for Australian Patent Application No. 2021203669, dated Apr. 5, 2022, 3 pages.
Office Action received for Chinese Patent Application No. 202110235995.X, dated Mar. 22, 2022, 17 pages (9 pages of English Translation and 8 pages of Official Copy).
Office Action received for Chinese Patent Application No. 202110328602.X, dated Mar. 24, 2022, 6 pages (3 pages of English Translation and 3 pages of Official Copy).
Office Action received for European Patent Application No. 21161005.0, dated Apr. 22, 2022, 11 pages.
Supplemental Notice of Allowance received for U.S. Appl. No. 17/168,069, dated Apr. 20, 2022, 2 pages.
Notice of Allowance received for Korean Patent Application No. 10-2020-0123805, dated Jun. 19, 2022, 5 pages (2 pages of English Translation and 3 pages of Official Copy).
Notice of Allowance received for Japanese Patent Application No. 2020-159840, dated Jul. 8, 2022, 4 pages (1 page of English Translation and 3 pages of Official Copy).
Applicant-Initiated Interview Summary received for U.S. Appl. No. 17/176,908, dated Jun. 14, 2022, 6 pages.
Abdulezer et al., "Skype For Dummies", Available Online at: https://ixn.es/Skype%20For%20Dummies.pdf, 2007, 361 pages.
Applicant-Initiated Interview Summary received for U.S. Appl. No. 16/936,164, dated Aug. 23, 2022, 5 pages.
Applicant-Initiated Interview Summary received for U.S. Appl. No. 17/116,938, dated Jun. 14, 2022, 2 pages.
Applicant-Initiated Interview Summary received for U.S. Appl. No. 17/476,404, dated Jul. 27, 2022, 6 pages.
Applicant-Initiated Interview Summary received for U.S. Appl. No. 17/482,987, dated Apr. 11, 2022, 4 pages.
Applicant-Initiated Interview Summary received for U.S. Appl. No. 17/483,564, dated Jul. 21, 2022, 5 pages.
Applicant-Initiated Interview Summary received for U.S. Appl. No. 17/483,564, dated Mar. 14, 2022, 2 pages.
Applicant-Initiated Interview Summary received for U.S. Appl. No. 17/483,679, dated Apr. 29, 2022, 2 pages.
Applicant-Initiated Interview Summary received for U.S. Appl. No. 17/483,679, dated Aug. 23, 2022, 3 pages.
Applicant-Initiated Interview Summary received for U.S. Appl. No. 17/484,899, dated Apr. 27, 2022, 5 pages.
Applicant-Initiated Interview Summary received for U.S. Appl. No. 17/484,907, dated Jan. 10, 2022, 2 pages.
Brief Communication Regarding Oral Proceedings received for European Patent Application No. 19728558.8, dated Jul. 5, 2022, 1 page.
Brief Communication Regarding Oral Proceedings received for European Patent Application No. 20158824.1, dated May 30, 2022, 1 page.
Brief Communication Regarding Oral Proceedings received for European Patent Application No. 20187610.9, dated May 31, 2022, 1 page.
Corrected Notice of Allowance received for U.S. Appl. No. 16/803,849, dated Jul. 7, 2022, 3 pages.
Corrected Notice of Allowance received for U.S. Appl. No. 16/803,849, dated Jun. 8, 2022, 3 pages.
Corrected Notice of Allowance received for U.S. Appl. No. 17/121,610, dated Jun. 7, 2022, 4 pages.
Corrected Notice of Allowance received for U.S. Appl. No. 17/121,610, dated May 20, 2022, 4 pages.
Corrected Notice of Allowance received for U.S. Appl. No. 17/157,166, dated Jun. 29, 2022, 4 pages.
Corrected Notice of Allowance received for U.S. Appl. No. 17/461,103, dated Aug. 3, 2022, 2 pages.
Corrected Notice of Allowance received for U.S. Appl. No. 17/483,549, dated Aug. 24, 2022, 3 pages.
Corrected Notice of Allowance received for U.S. Appl. No. 17/483,582, dated Feb. 15, 2022, 2 pages.
Corrected Notice of Allowance received for U.S. Appl. No. 17/484,907, dated Aug. 26, 2022, 2 pages.
Corrected Notice of Allowance received for U.S. Appl. No. 17/484,907, dated Jun. 15, 2022, 2 pages.
Corrected Notice of Allowance received for U.S. Appl. No. 17/484,907, dated Mar. 18, 2022, 2 pages.
Decision to Grant received for European Patent Application No. 19207753.5, dated Jun. 2, 2022, 3 pages.
Decision to Refuse received for European Patent Application No. 20187610.9, dated Jul. 19, 2022, 13 pages.
Farmboyreef, "Apple Watch Controlling Your TV", Available online at: https://www.youtube.com/watch?v=xaJPGOWm3Tg, Jun. 23, 2015, 3 pages.
Final Office Action received for U.S. Appl. No. 16/936,164, dated Jul. 6, 2022, 21 pages.
Final Office Action received for U.S. Appl. No. 17/483,564, dated Apr. 18, 2022, 23 pages.
Final Office Action received for U.S. Appl. No. 17/483,679, dated May 24, 2022, 21 pages.
Final Office Action received for U.S. Appl. No. 17/484,899, dated May 12, 2022, 29 pages.
Gil, Lory, "How to control Apple TV with your Apple Watch", Available online at: https://www.imore.com/how-control-your-apple-tv-remote-app%ADapple-watch], Jun. 6, 2016, 24 pages.
HOBBYISTSOFTWARELTD,"VLC Remote", Online available at: https://watchaware.com/watch-apps/297244048, 2016, 7 pages.

(56) References Cited

OTHER PUBLICATIONS

"HuddleCamHD SimplTrack2 Auto Tracking Camera Installation & Operation Manual", Available Online at: https://huddlecamhd.com/wp-content/uploads/2021/01/SimplTrack2-User-Manual-v1_2-6-20.pdf, Jun. 2020, 41 pages.
Intention to Grant received for Danish Patent Application No. PA202170320, dated Jul. 27, 2022, 2 pages.
Intention to Grant received for European Patent Application No. 20158824.1, dated Aug. 11, 2022, 10 pages.
International Search Report and Written Opinion received for PCT Patent Application No. PCT/US2022/014271, dated Jul. 4, 2022, 23 pages.
Invitation to Pay Additional Fees and Partial International Search Report received for PCT Patent Application No. PCT/US2022/014271, dated May 12, 2022, 20 pages.
Klein, Matt, "How to Add, Remove, and Rearrange Apps on the Apple Watch's Dock", Available online at: https://www.howtogeek.com/279796/how-to-add-remove-and-rearrange-apps-on-the-apple-watch%E2%80%99s-dock/, Nov. 18, 2016, 10 pages.
Minutes of the Oral Proceedings received for European Patent Application No. 20187610.9, dated Jun. 7, 2022, 6 pages.
Nikolov, Anton, "Design principle: Consistency", Available online at: https://uxdesign.cc/design-principle-consistency-6b0cf7e7339f, Apr. 8, 2017, 9 pages.
Non-Final Office Action received for U.S. Appl. No. 16/830,838, dated Jun. 9, 2022, 17 pages.
Non-Final Office Action received for U.S. Appl. No. 16/922,675, dated Jun. 8, 2022, 21 pages.
Non-Final Office Action received for U.S. Appl. No. 17/116,938, dated Aug. 1, 2022, 15 pages.
Non-Final Office Action received for U.S. Appl. No. 17/314,948, dated Aug. 1, 2022, 33 pages.
Non-Final Office Action received for U.S. Appl. No. 17/479,897, dated Aug. 30, 2022, 10 pages.
Non-Final Office Action received for U.S. Appl. No. 17/482,987, dated Jan. 18, 2022, 25 pages.
Non-Final Office Action received for U.S. Appl. No. 17/483,549, dated Jan. 11, 2022, 5 pages.
Non-Final Office Action received for U.S. Appl. No. 17/483,564, dated Jan. 6, 2022, 23 pages.
Non-Final Office Action received for U.S. Appl. No. 17/483,679, dated Feb. 1, 2022, 19 pages.
Non-Final Office Action received for U.S. Appl. No. 17/484,899, dated Jan. 24, 2022, 24 pages.
Non-Final Office Action received for U.S. Appl. No. 17/484,907, dated Nov. 19, 2021, 24 pages.
Notice of Acceptance received for Australian Patent Application No. 2021202815, dated Jun. 16, 2022, 3 pages.
Notice of Acceptance received for Australian Patent Application No. 2021203669, dated May 25, 2022, 3 pages.
Notice of Acceptance received for Australian Patent Application No. 2021203903, dated May 25, 2022, 3 pages.
Notice of Acceptance received for Australian Patent Application No. 2022202458, dated May 6, 2022, 3 pages.
Notice of Allowance received for Japanese Patent Application No. 2020-560927, dated May 30, 2022, 3 pages (1 page of English Translation and 2 pages of Official Copy).
Notice of Allowance received for Japanese Patent Application No. 2021-571464, dated May 30, 2022, 4 pages (1 page of English Translation and 3 pages of Official Copy).
Notice of Allowance received for Japanese Patent Application No. 2022-079682, dated Jul. 15, 2022, 4 pages (1 page of English Translation and 3 pages of Official Copy).
Notice of Allowance received for Japanese Patent Application No. 2022-102840, dated Aug. 19, 2022, 4 pages (1 page of English Translation and 3 pages of Official Copy).
Notice of Allowance received for Korean Patent Application No. 10-2022-7008567, dated Jul. 4, 2022, 9 pages (2 pages of English Translation and 7 pages of Official Copy).
Notice of Allowance received for U.S. Appl. No. 17/121,610, dated Jul. 7, 2022, 5 pages.
Notice of Allowance received for U.S. Appl. No. 17/121,610, dated Jul. 13, 2022, 4 pages.
Notice of Allowance received for U.S. Appl. No. 17/461,103, dated Jun. 20, 2022, 6 pages.
Notice of Allowance received for U.S. Appl. No. 17/482,987, dated Jun. 23, 2022, 9 pages.
Notice of Allowance received for U.S. Appl. No. 17/482,987, dated May 11, 2022,10 pages.
Notice of Allowance received for U.S. Appl. No. 17/483,549, dated Apr. 15, 2022, 10 pages.
Notice of Allowance received for U.S. Appl. No. 17/483,582, dated Apr. 19, 2022, 5 pages.
Notice of Allowance received for U.S. Appl. No. 17/483,582, dated Jan. 20, 2022, 10 pages.
Notice of Allowance received for U.S. Appl. No. 17/484,907, dated Jul. 25, 2022, 10 pages.
Notice of Allowance received for U.S. Appl. No. 17/484,907, dated Mar. 2, 2022, 13 pages.
Notice of Allowance received for U.S. Appl. No. 17/484,907, dated May 20, 2022, 13 pages.
Office Action received for Australian Patent Application No. 2019267527, dated Jun. 15, 2022, 3 pages.
Office Action received for Australian Patent Application No. 2020217458, dated Aug. 2, 2022, 4 pages.
Office Action received for Chinese Patent Application No. 202010126661.4, dated Jun. 2, 2022, 11 pages (7 pages of English Translation and 4 pages of Official Copy).
Office Action received for Chinese Patent Application No. 202011450203.2, dated Apr. 20, 2022, 9 pages (5 pages of English Translation and 4 pages of Official Copy).
Office Action received for Chinese Patent Application No. 202110327012.5, dated Apr. 29, 2022, 17 pages (10 pages of English Translation and 7 pages of Official Copy).
Office Action received for Chinese Patent Application No. 202110328601.5, dated Apr. 27, 2022, 25 pages (14 pages of English Translation and 11 pages of Official Copy).
Office Action received for Chinese Patent Application No. 202110818370.6, dated Jun. 22, 2022, 7 pages (4 pages of English Translation and 3 pages of Official Copy).
Office Action received for Chinese Patent Application No. 202110819254.6, dated May 16, 2022, 16 pages (8 pages of English Translation and 8 pages of Official Copy).
Office Action received for Chinese Patent Application No. 202111612841.4, dated Jul. 22, 2022, 13 pages (7 pages of English Translation and 6 pages of Official Copy).
Office Action received for European Patent Application No. 20158824.1, dated Jun. 13, 2022, 5 pages.
Office Action received for Japanese Patent Application No. 2020-047952, dated Jul. 1, 2022, 8 pages (4 pages of English Translation and 4 pages of Official Copy).
Office Action received for Korean Patent Application No. 10-2021-7017731, dated May 30, 2022, 5 pages (2 pages of English Translation and 3 pages of Official Copy).
Office Action received for Korean Patent Application No. 10-2022-7006175, dated May 27, 2022, 7 pages (3 pages of English Translation and 4 pages of Official Copy).
Ojeda-Zapata, Julio, "Five Apps That Play Podcasts Directly from Your Apple Watch", Available online at: https://tidbits.com/2018/04/09/five-apps-that-play-podcasts-directly-from-your-apple-watch/, Apr. 9, 2018, 12 pages.
"Pairing Your Apple Watch With Your AppleTV", Available online at: https://www.youtube.com/watch?v=C4t8YFSJ-UY, Apr. 27, 2015, 3 pages.
Result of Consultation received for European Patent Application No. 19728558.8, dated Jun. 28, 2022, 4 pages.
Result of Consultation received for European Patent Application No. 20158824.1, dated May 17, 2022, 7 pages.
Result of Consultation received for European Patent Application No. 20187610.9, dated Jun. 1, 2022, 3 pages.

(56) References Cited

OTHER PUBLICATIONS

Singh, Ajit, "Mytunz: Free Iphone Media Player App With Sleep Timer, Gesture Control", Available online at: https://www.ilovefreesoftware.com/01/iphone/mytunz-free-iphone-media-player-app.html, Jul. 1, 2014, 6 pages.
Summons to Attend Oral Proceedings received for European Patent Application No. 18728002.9, mailed on Jun. 3, 2022, 15 pages.
Techniqued, "How to Sent Voice Messages in WhatsApp", Published on YouTube.com, Available at: https://www.youtube.com/watch?v=mkJqY0984vO, Aug. 12, 2013, 1 page.
Whitney, Lance, "How to Listen to Music on Your Apple Watch", Available Online at: https://medium.com/pcmag-access/how-to-listen-to-music-on-your-apple-watch-f48a6c20dd52#:~:text=On%20your%20iPhone%2C%20go%20to,.%E2%80%9D%20Tap%20on%20Add%20Music., Mar. 2, 2018, 13 pages.
Applicant-Initiated Interview Summary received for U.S. Appl. No. 17/484,899, dated Sep. 1, 2022, 5 pages.
Non-Final Office Action received for U.S. Appl. No. 17/476,404, dated Sep. 14, 2022, 31 pages.
Notice of Acceptance received for Australian Patent Application No. 2020217458, dated Sep. 7, 2022, 3 pages.
Notice of Allowance received for Chinese Patent Application No. 202110818370.6, dated Sep. 2, 2022, 7 pages (4 pages of English Translation and 3 pages of Official Copy).
Office Action received for European Patent Application No. 21197457.1, dated Sep. 2, 2022, 8 pages.
Summons to Attend Oral Proceedings received for European Patent Application No. 20205496.1, mailed Sept. 8, 2022, 9 pages.

\* cited by examiner

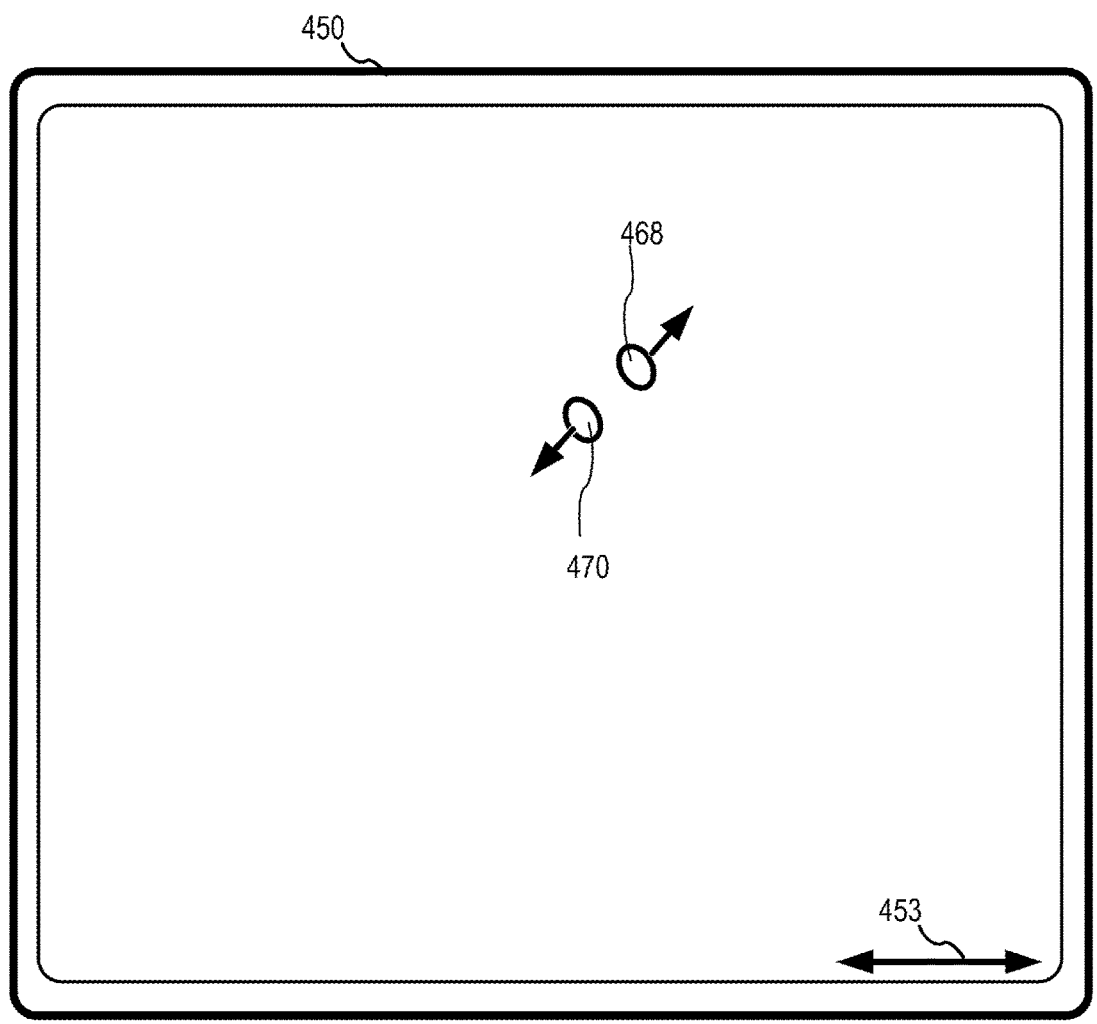
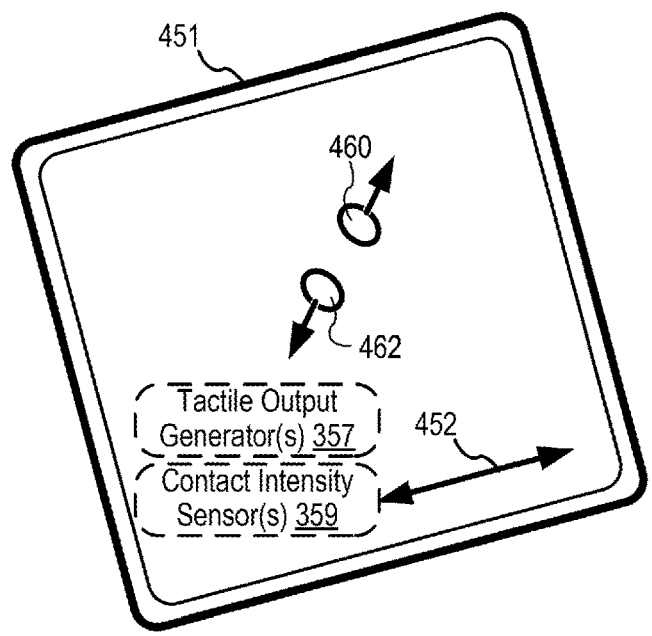
*FIG. 4B*

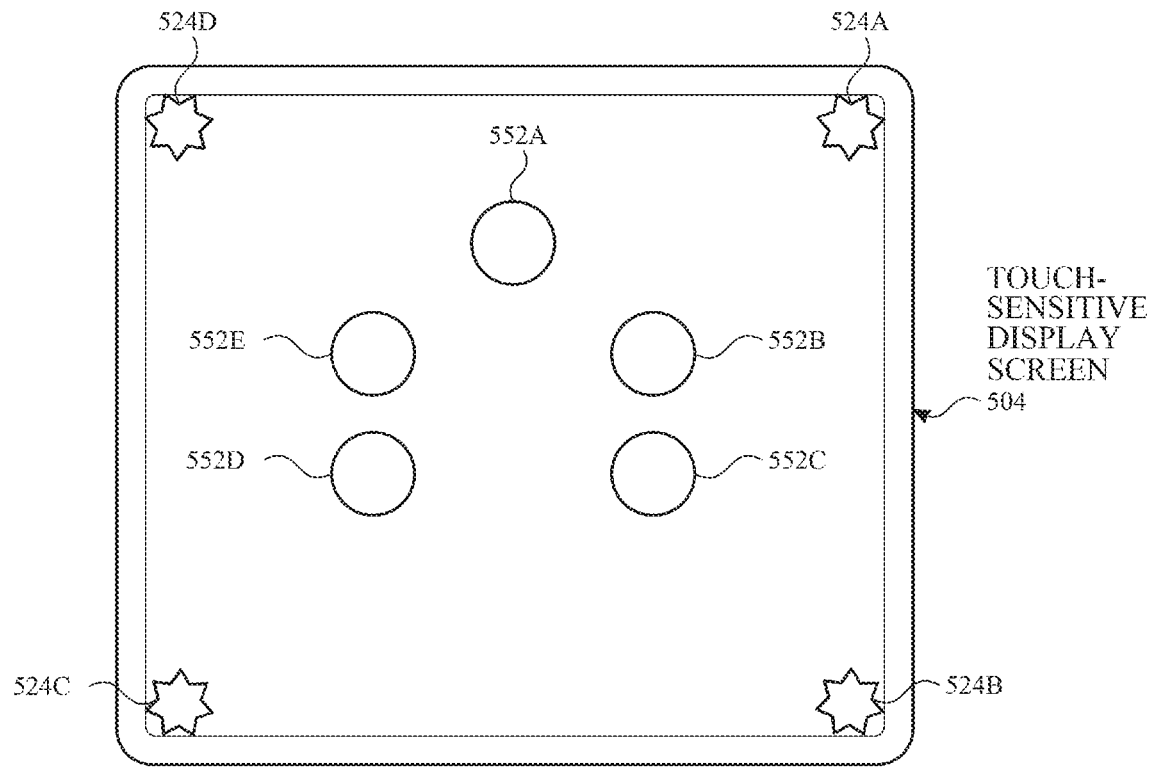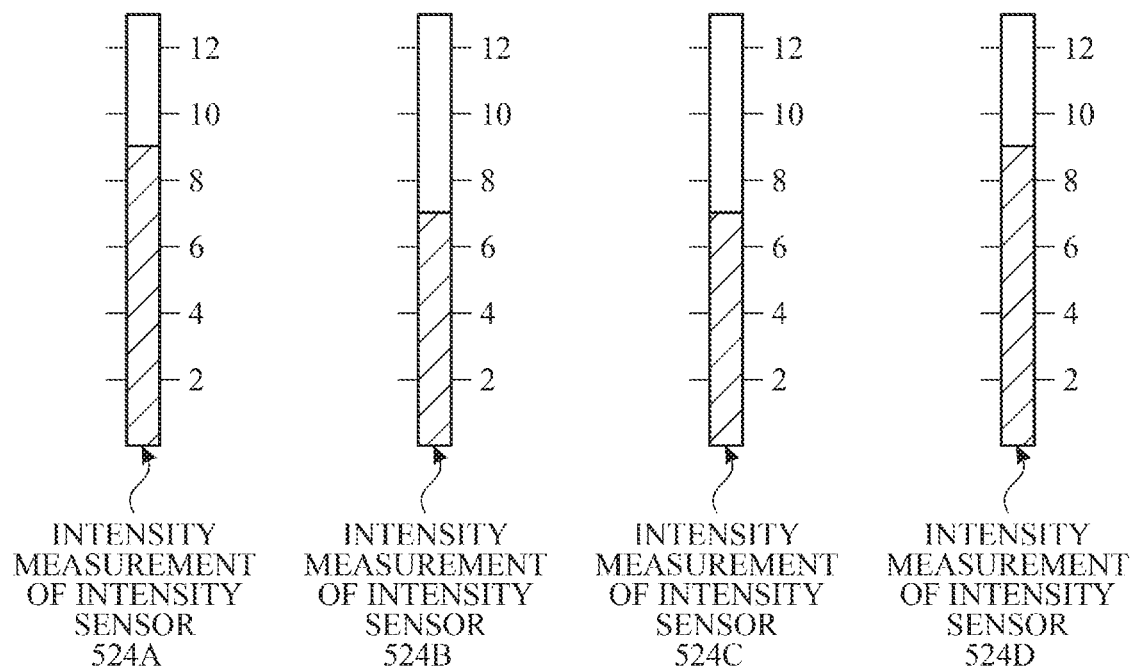
FIG. 5C

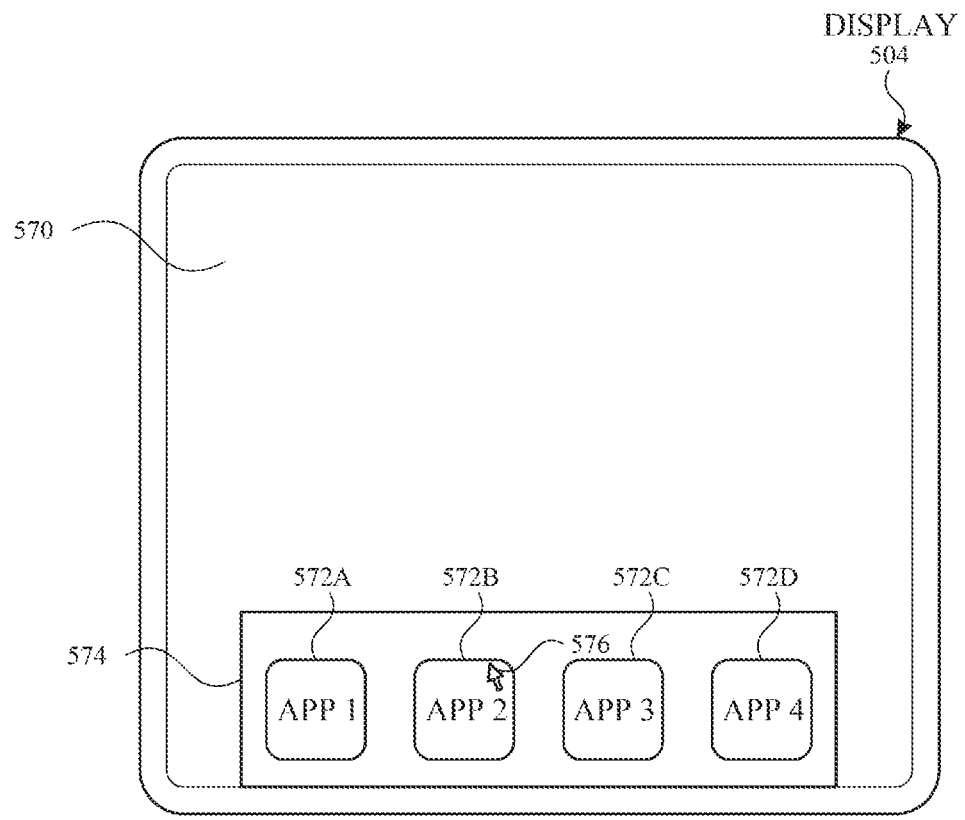
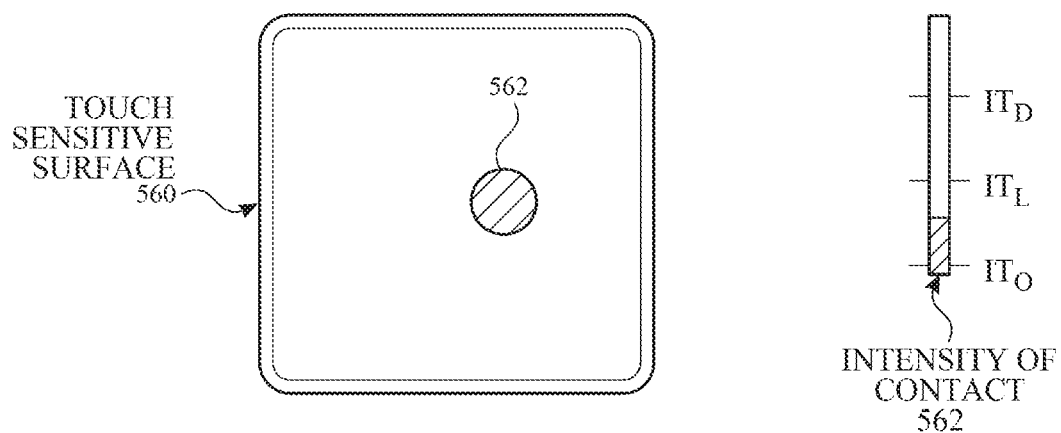
FIG. 5E

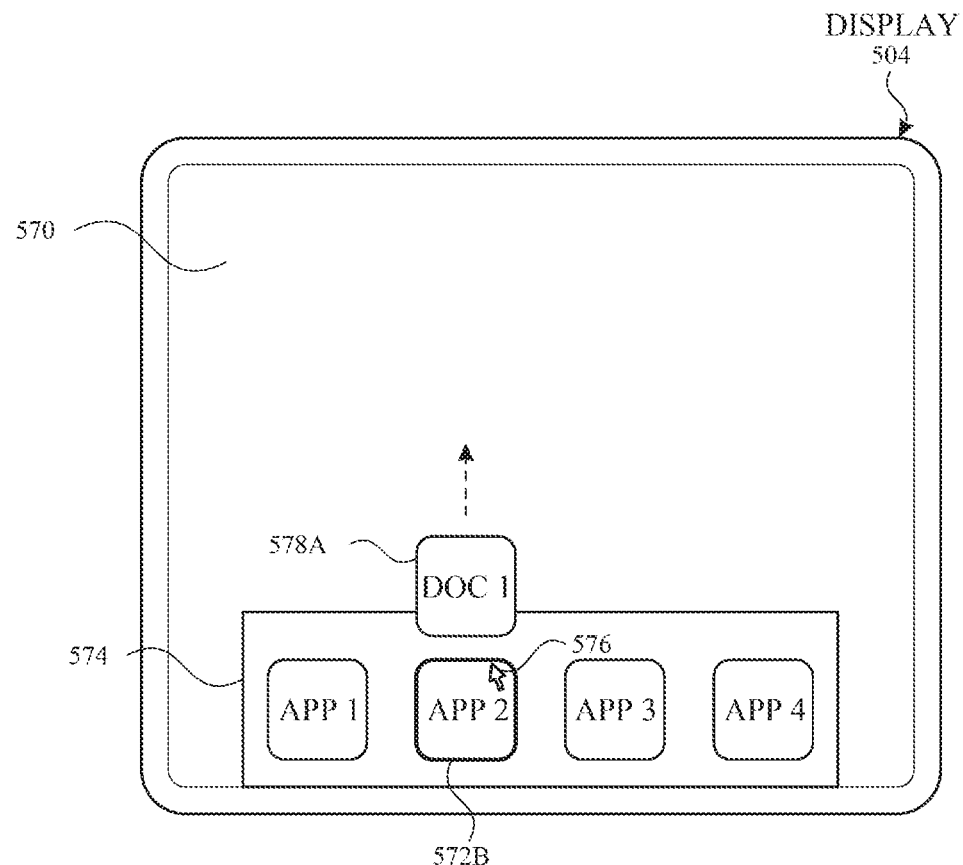
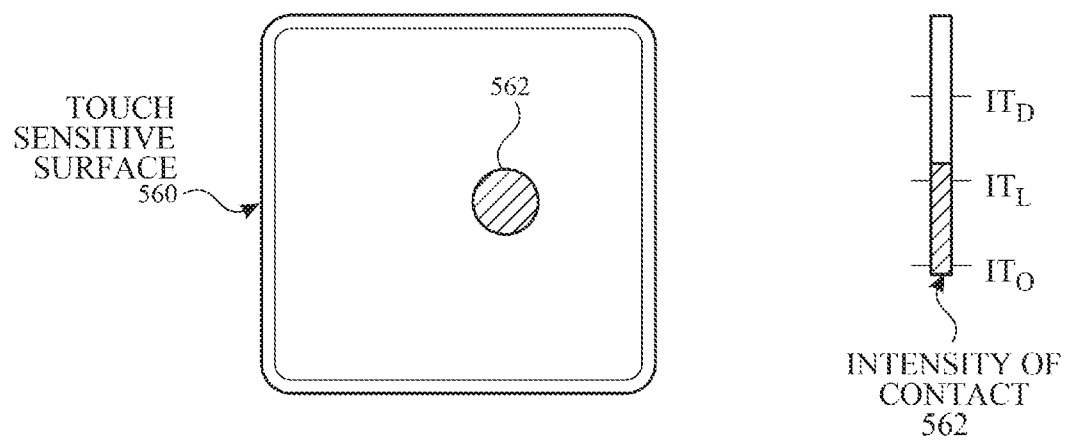
FIG. 5F

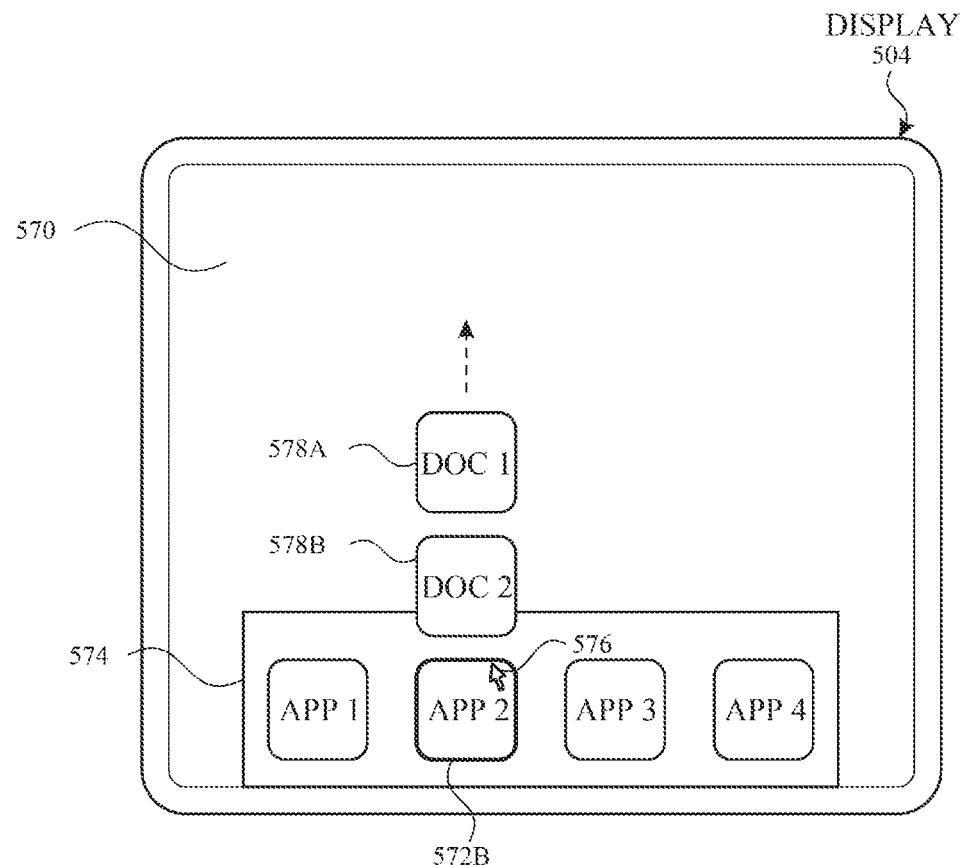
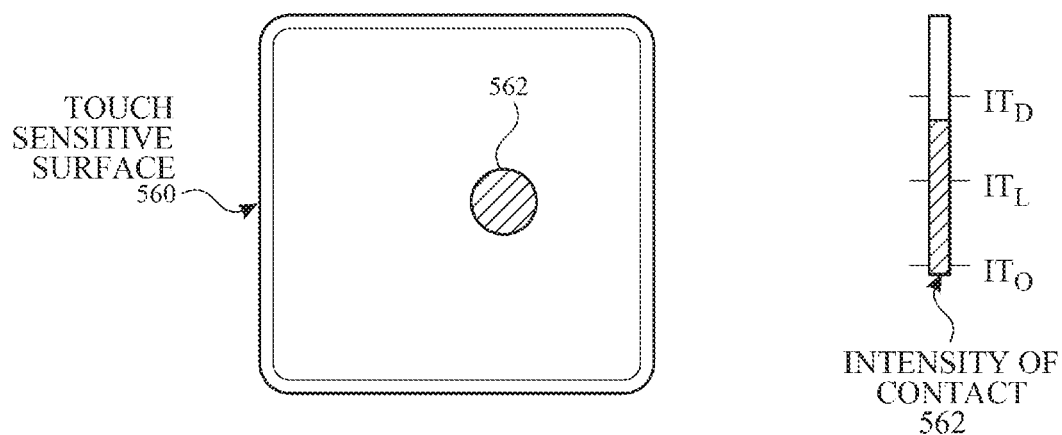
*FIG. 5G*

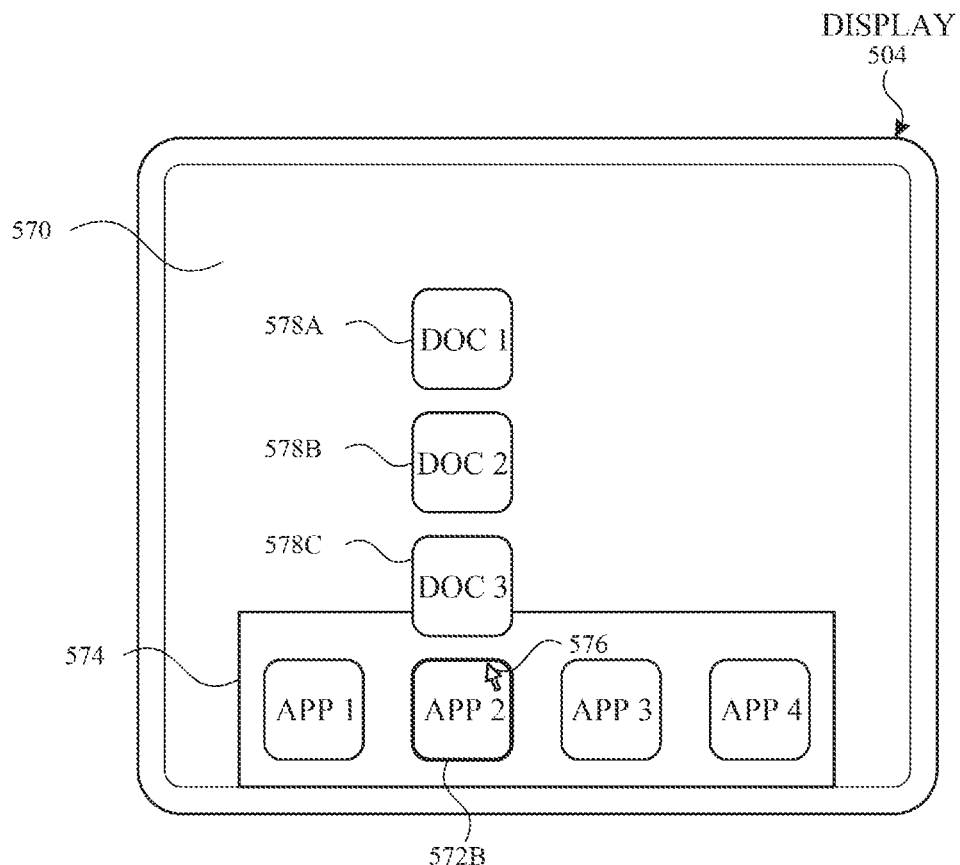
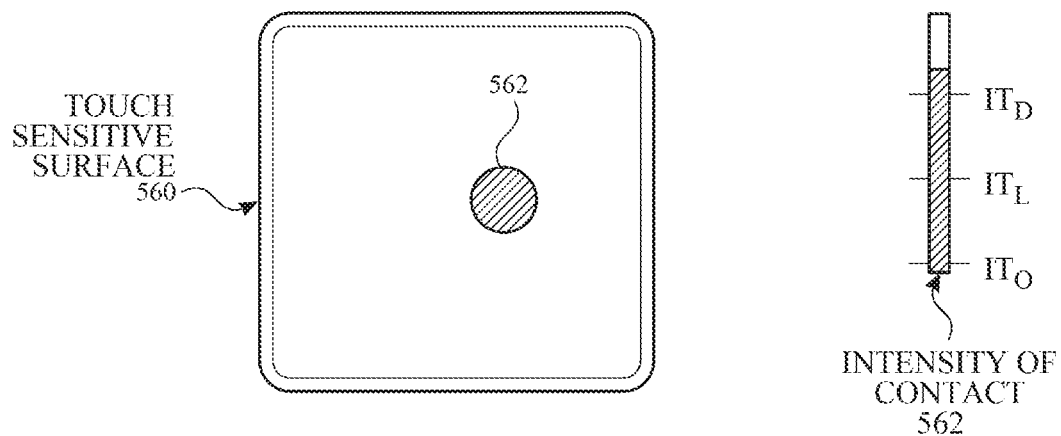
FIG. 5H

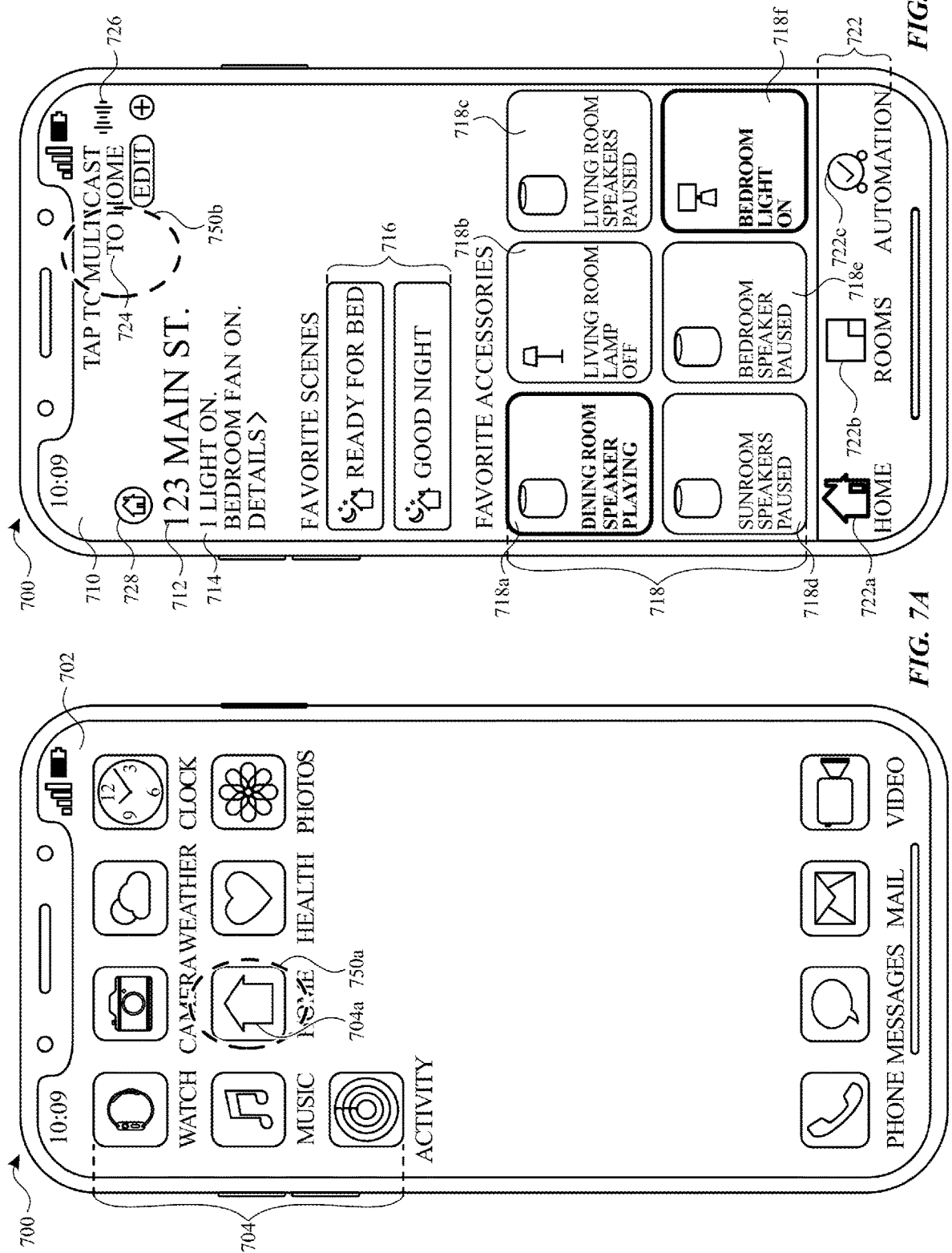

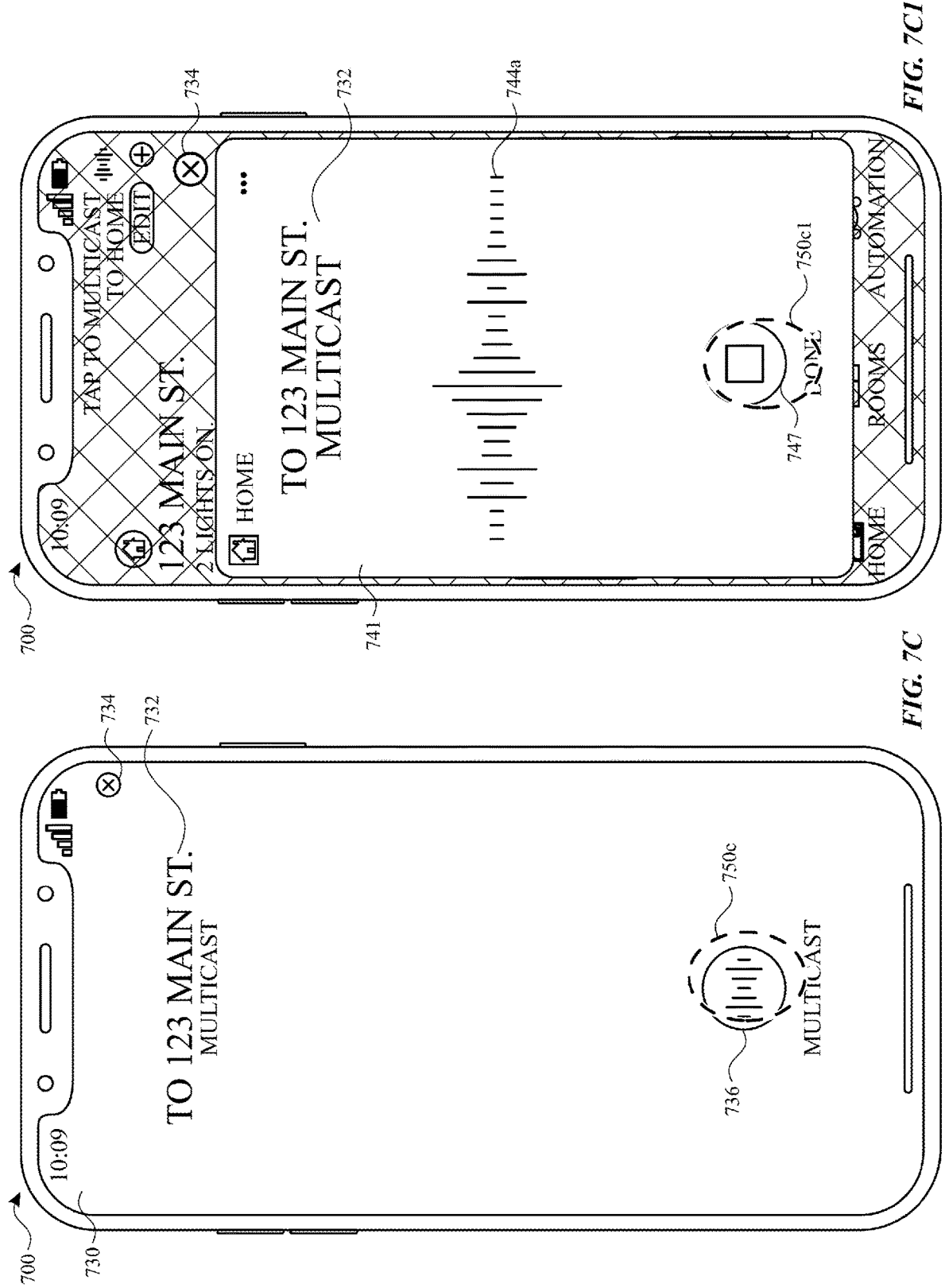

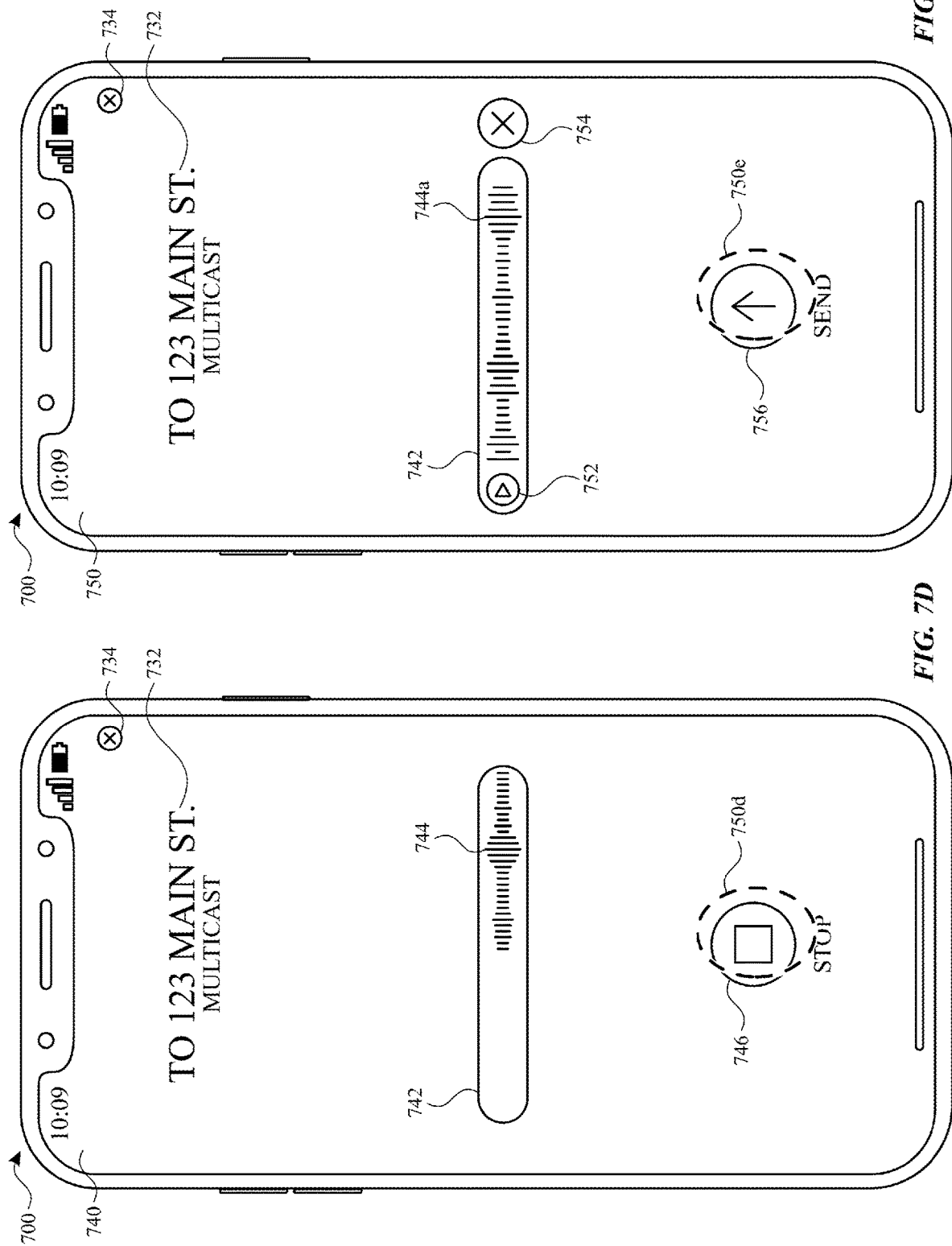

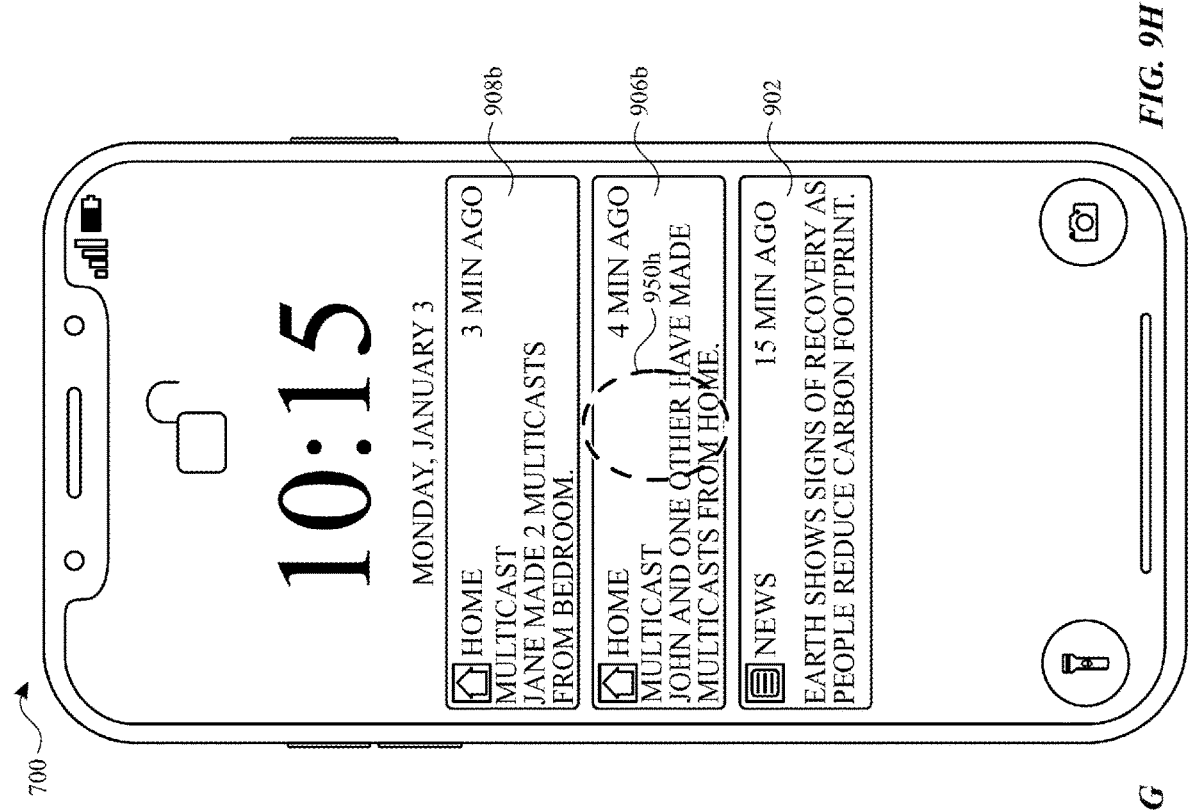
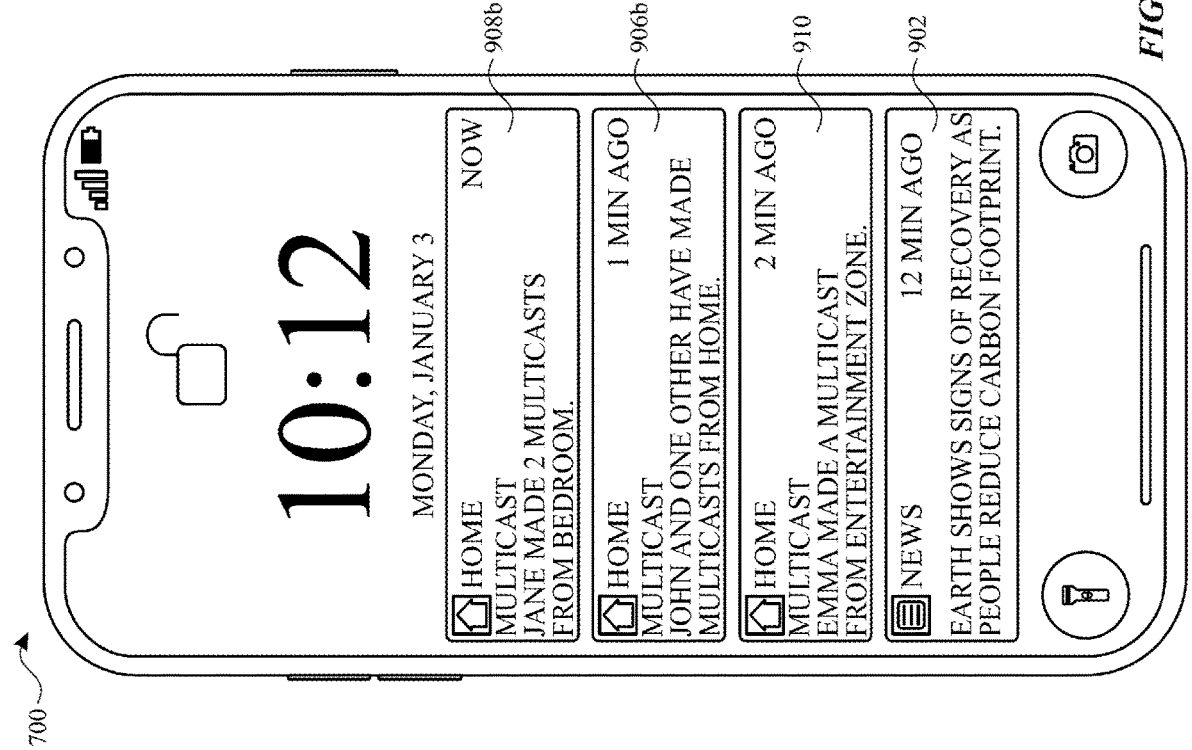

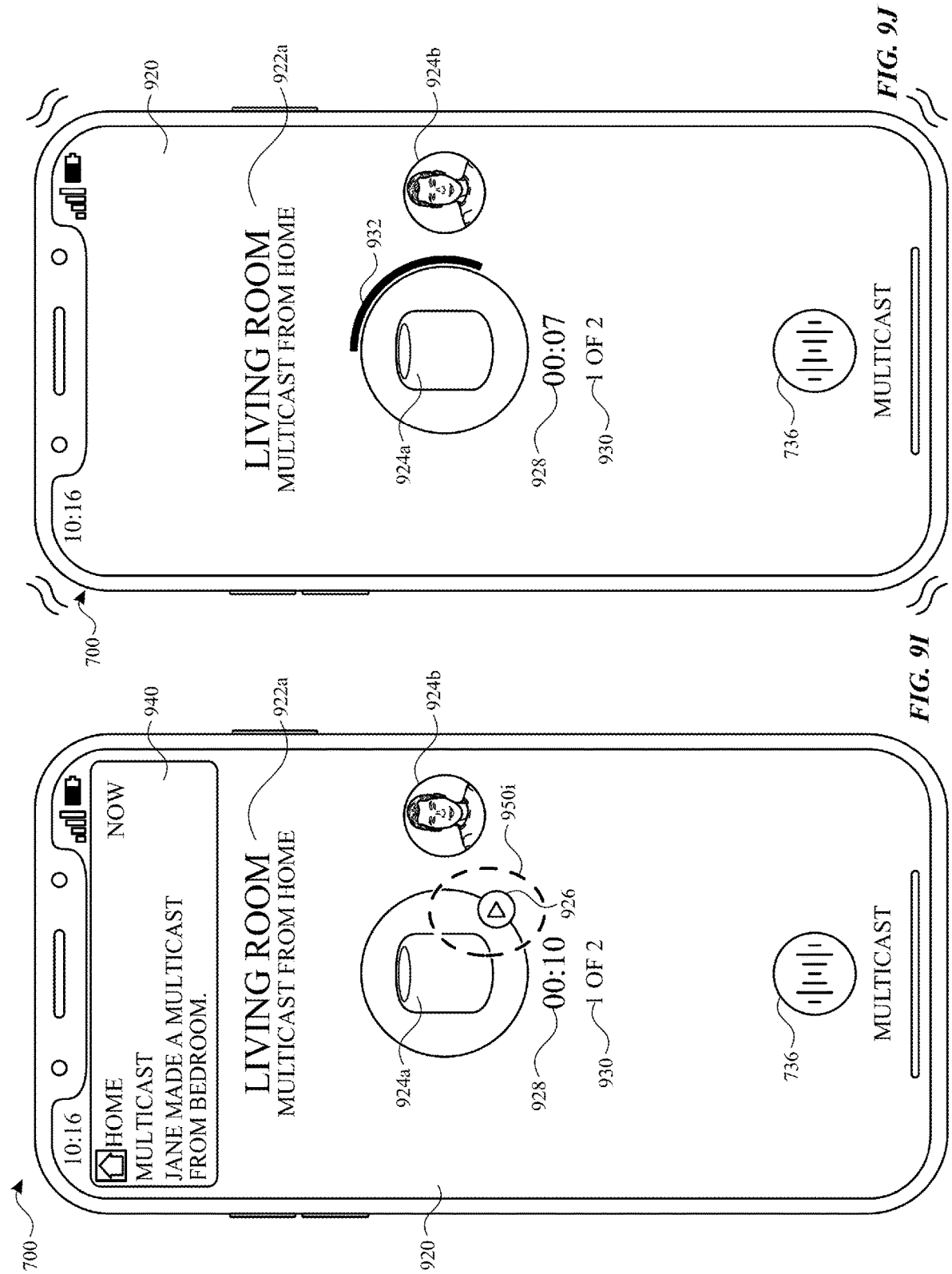

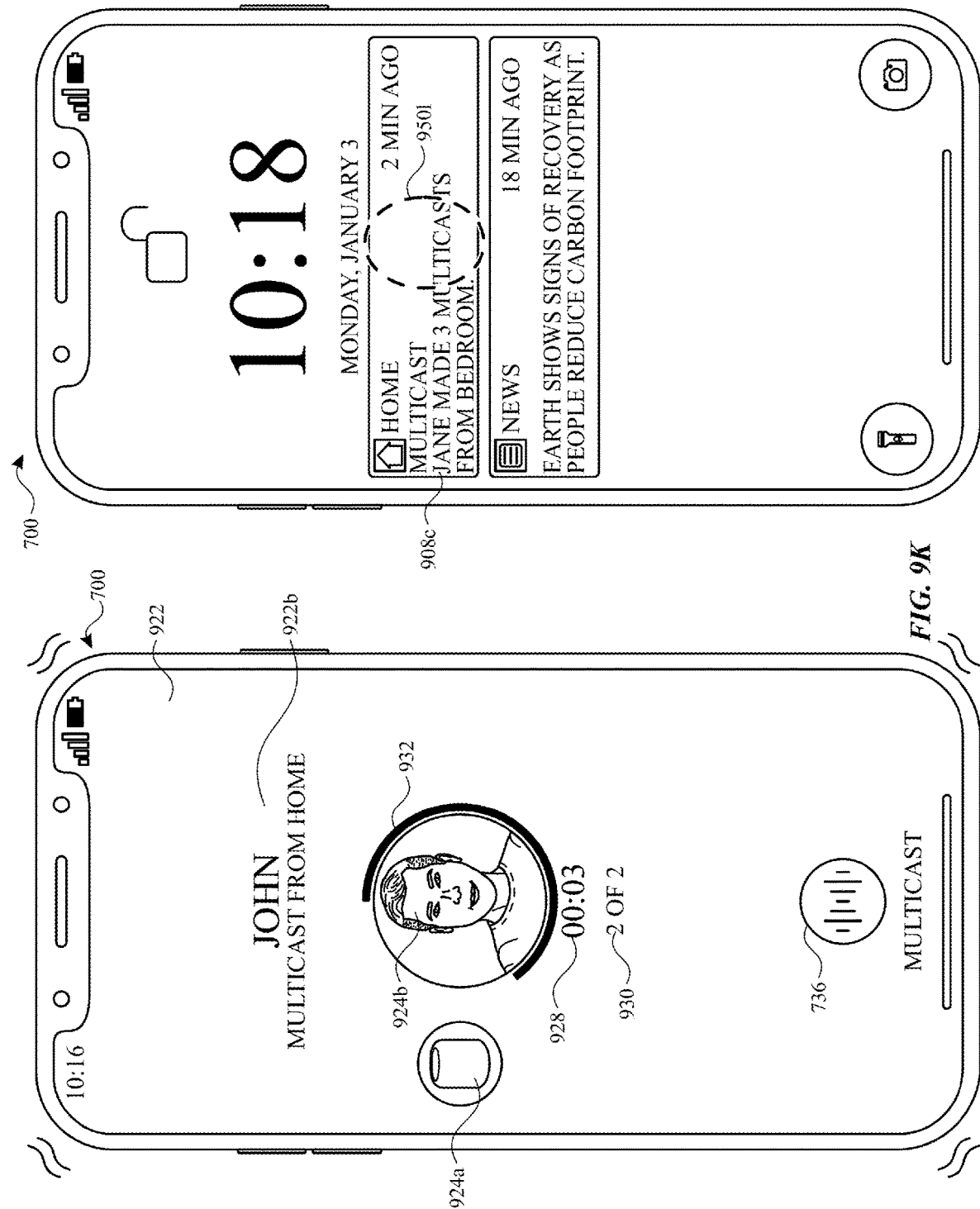

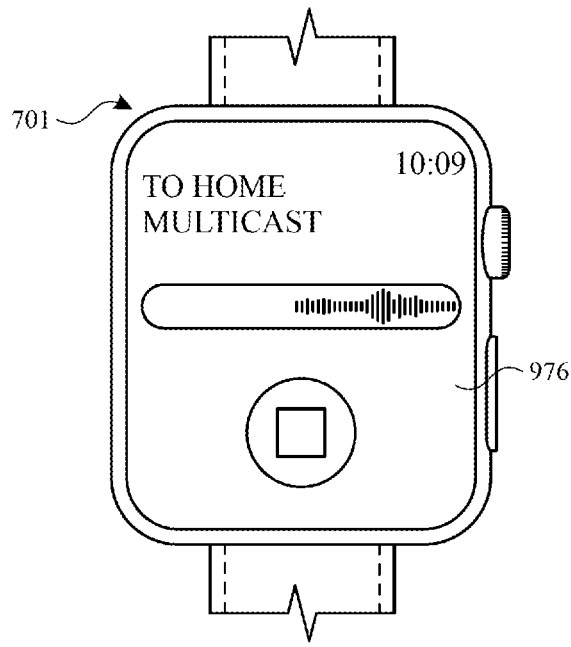
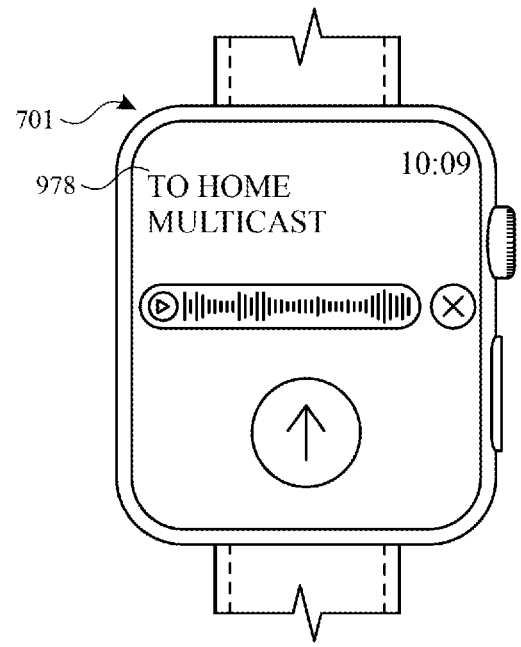
*FIG. 9T*  *FIG. 9U*
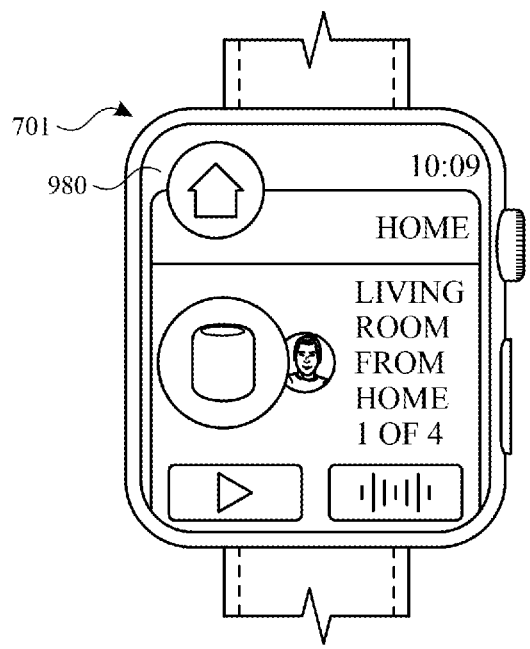
*FIG. 9V*

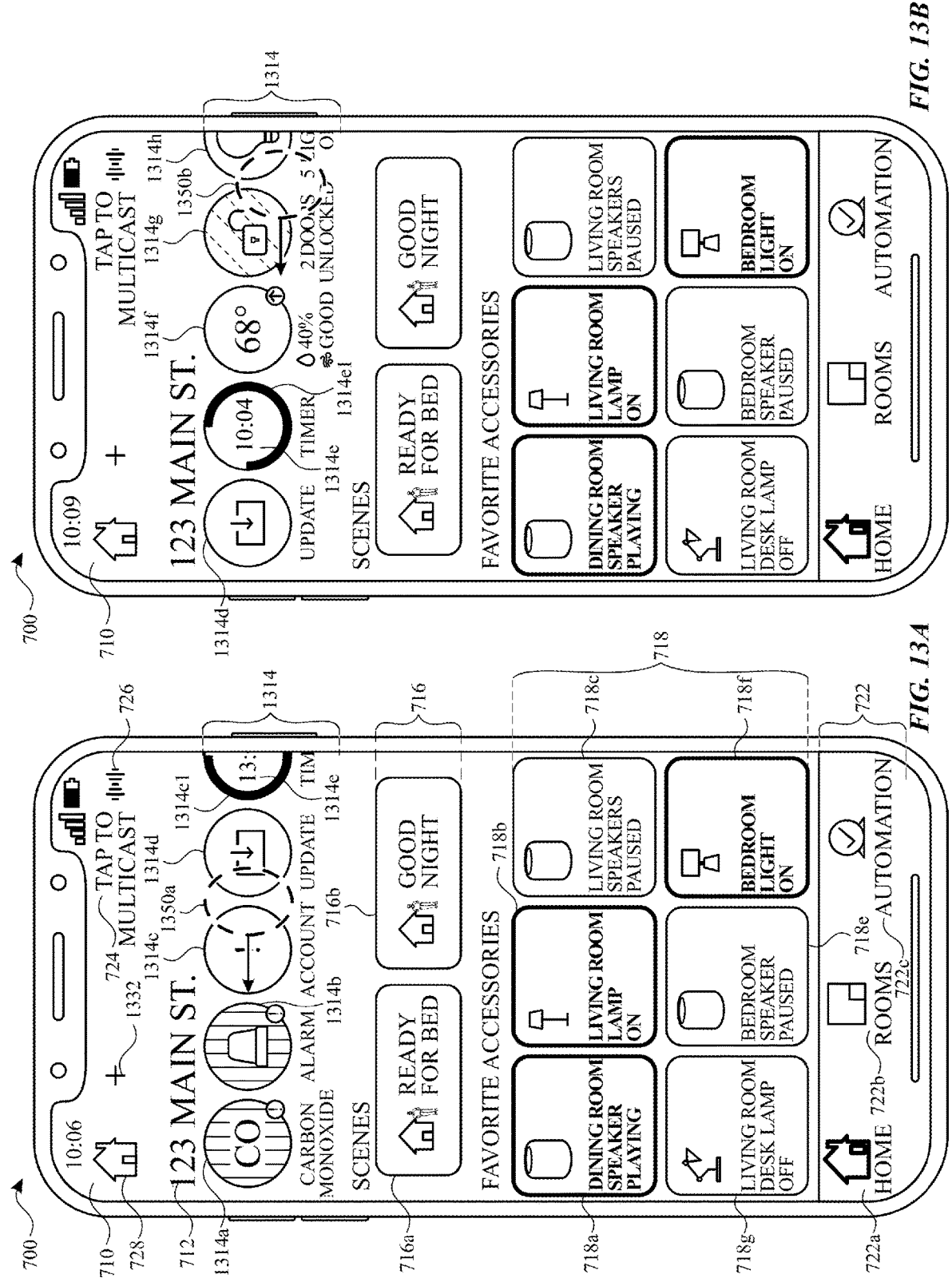

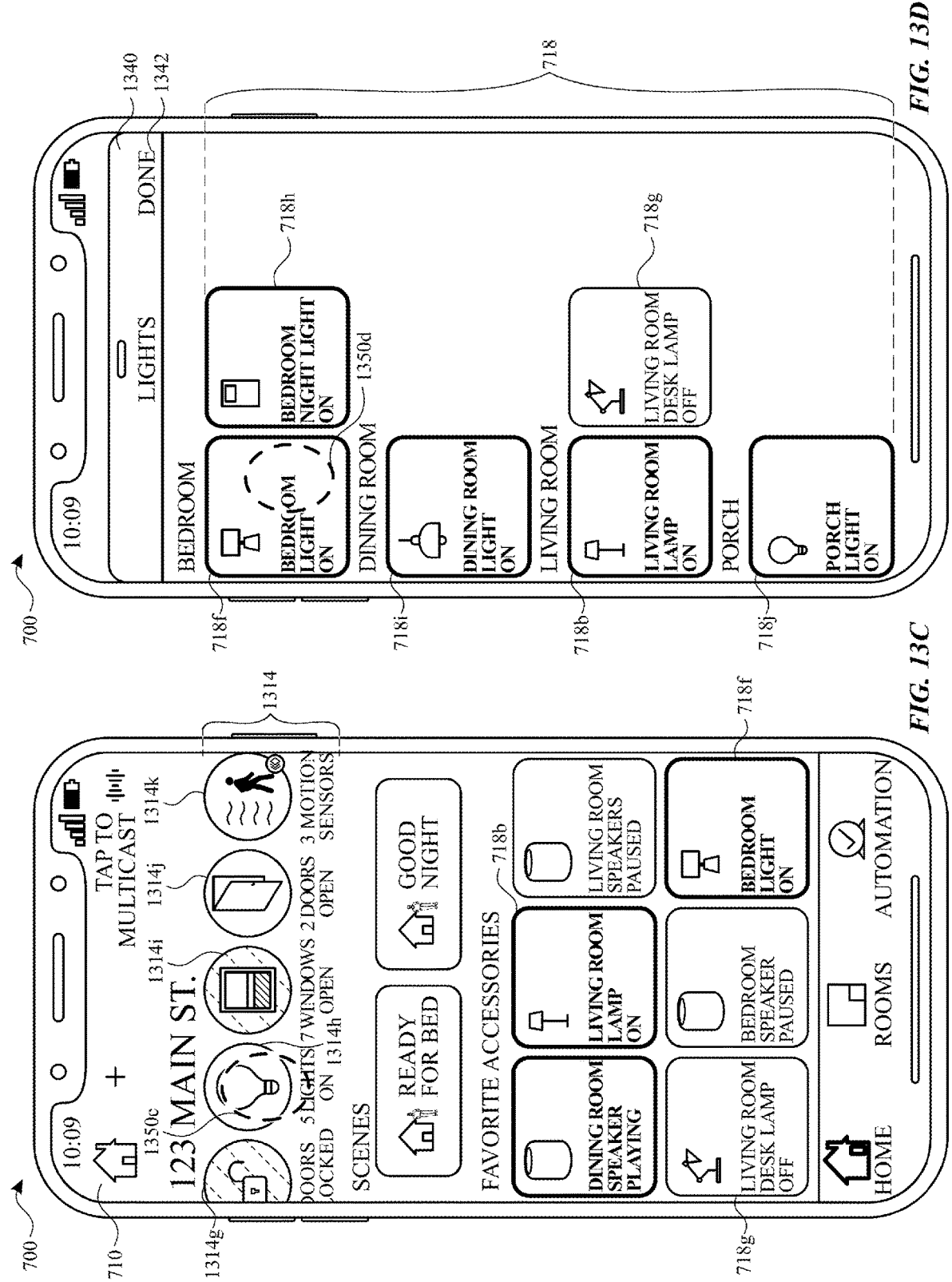

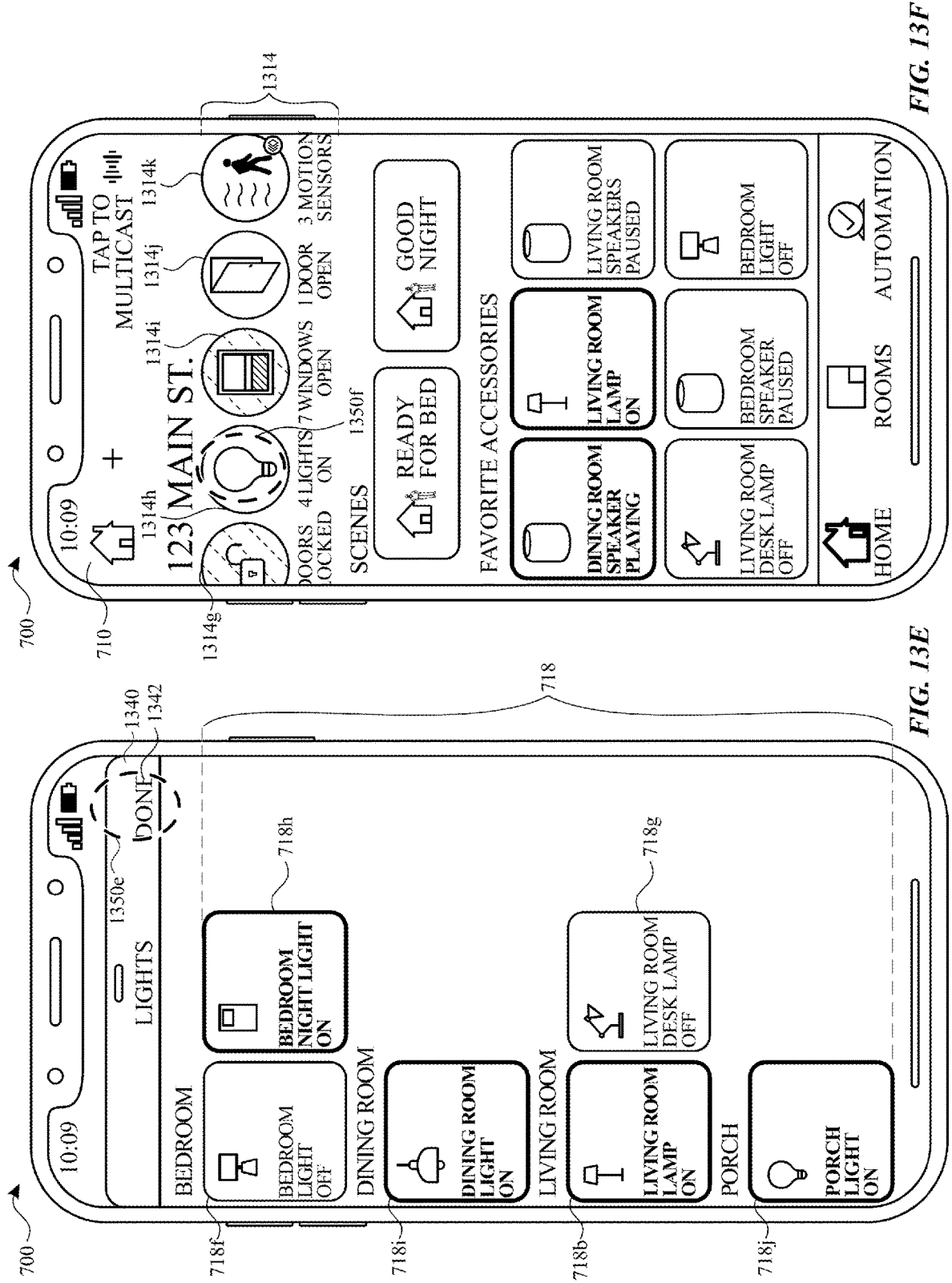

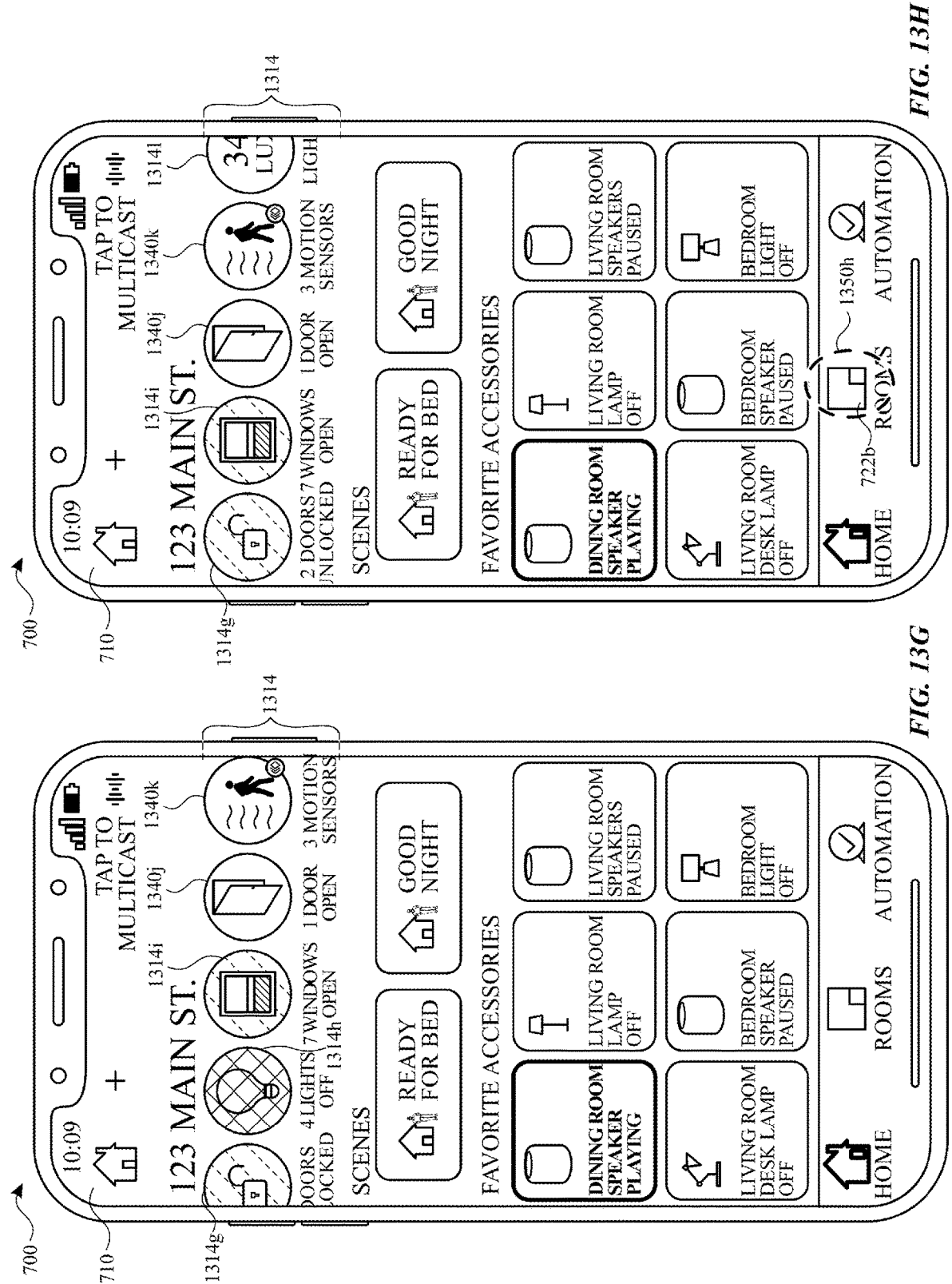

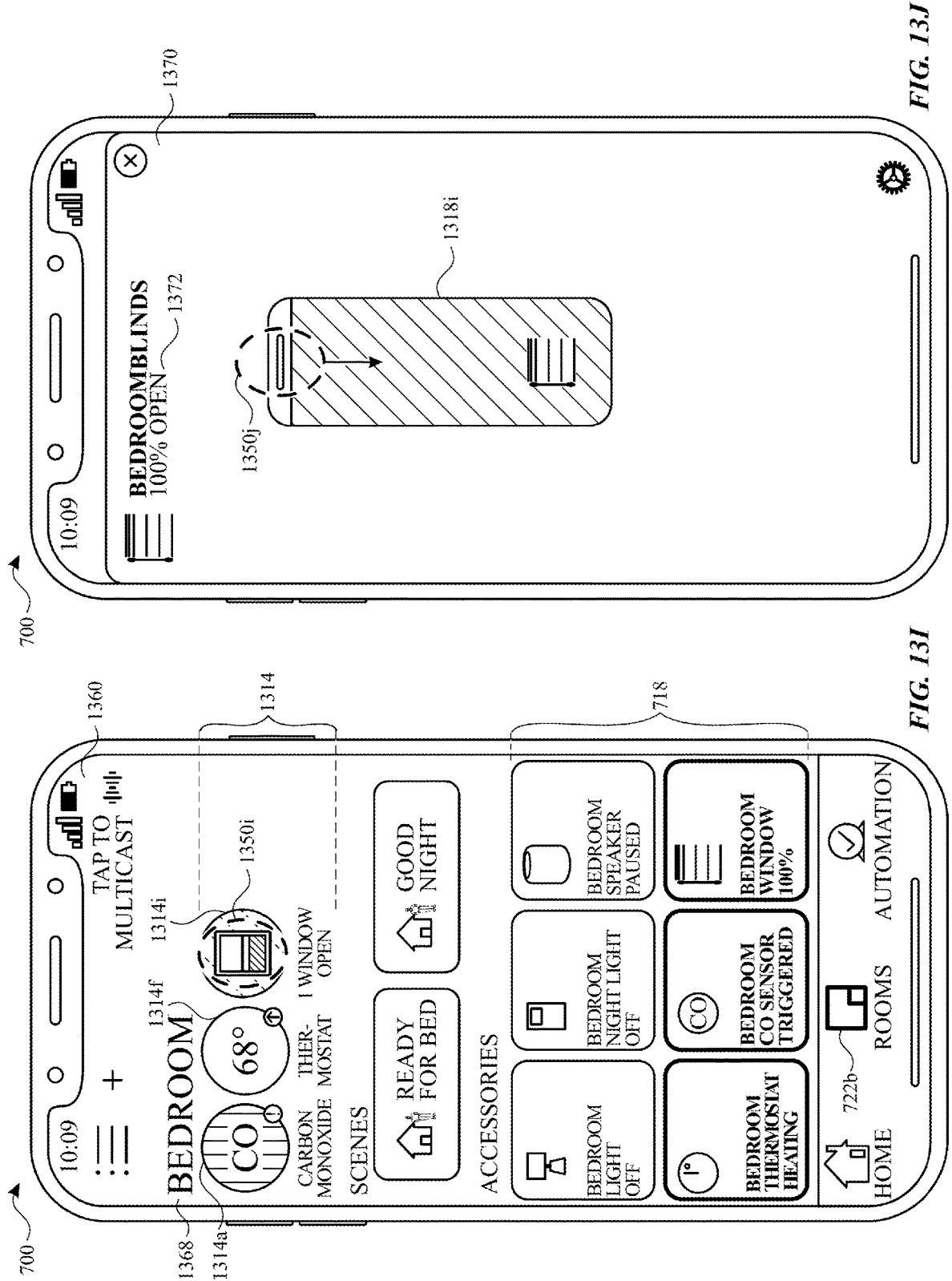

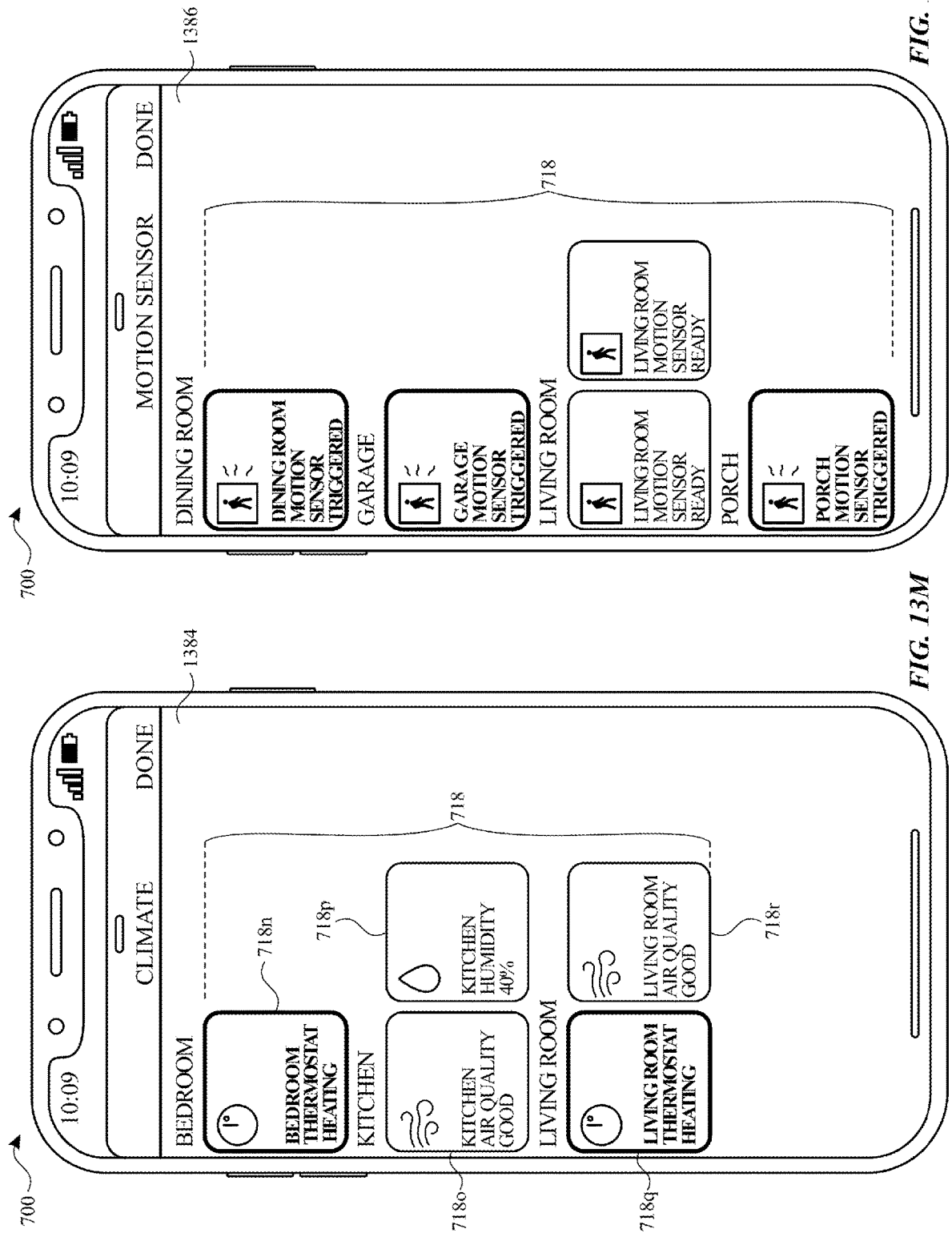

1400

1402
Display, via the display generation component, a first status indicator that indicates that a plurality of accessory devices of a first accessory type are in a first state, where the plurality of accessory devices of the first accessory type includes:

1404
A first accessory device that is the first accessory type and is in the first state.

1406
A second accessory device that is the first accessory type and is in the first state, where the second accessory device is different from the first accessory device.

1408
While displaying the first status indicator, detect a gesture.

1410
In response to detecting the gesture:

1412
In accordance with a determination that the gesture is a first type of gesture and is directed to the first status indicator, cause the first accessory device and the second accessory device to change to a second state that is different from the first state.

1414
In accordance with a determination that the gesture is a second type of gesture that is different from the first type of gesture and is directed to the first status indicator, display, via the display generation component, a first accessory control user interface object corresponding to the first accessory device, where selection of the first accessory control user interface object causes the first accessory device to change to the second state without causing the second accessory device to change to the second state.

*FIG. 14*

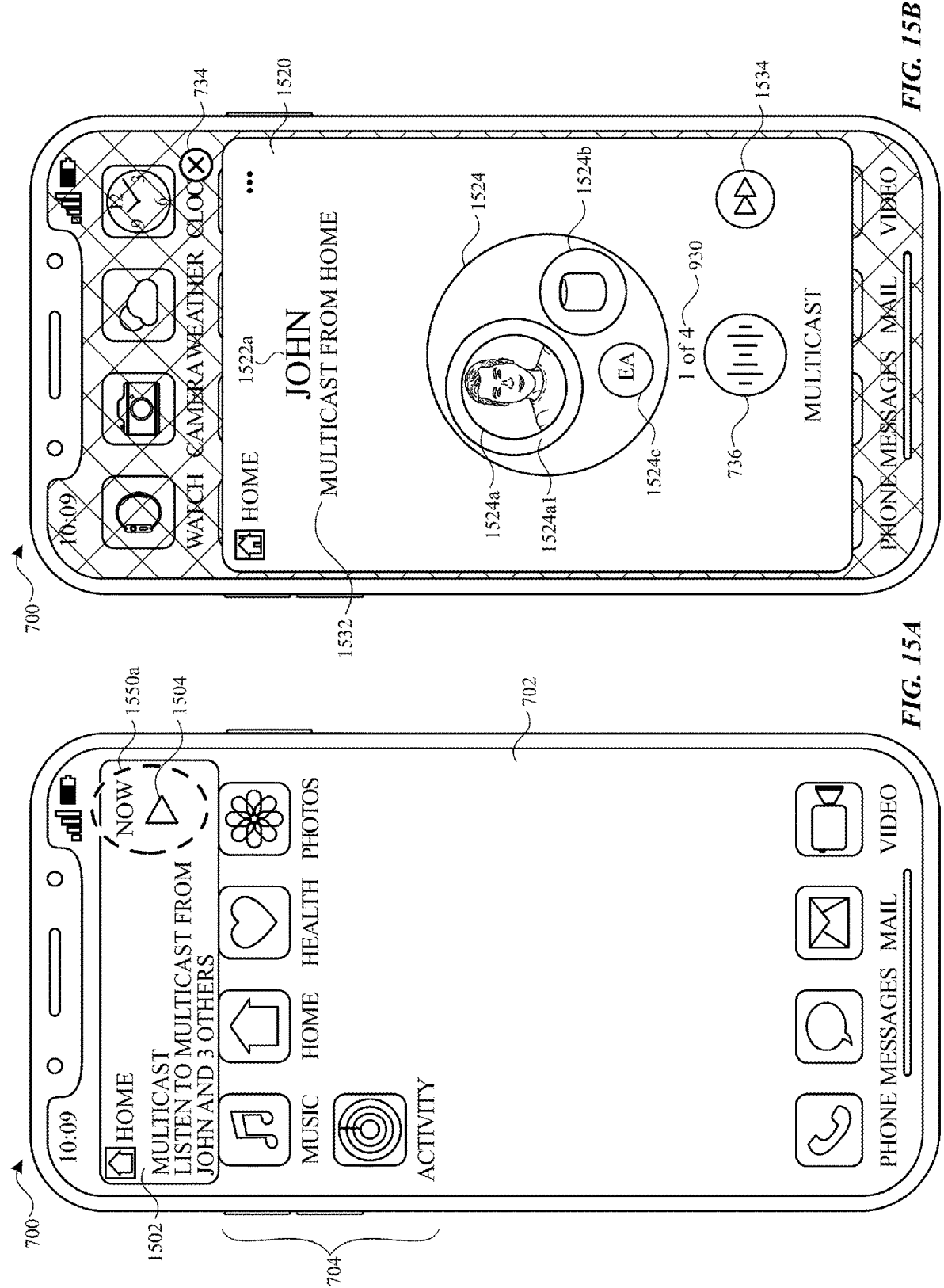

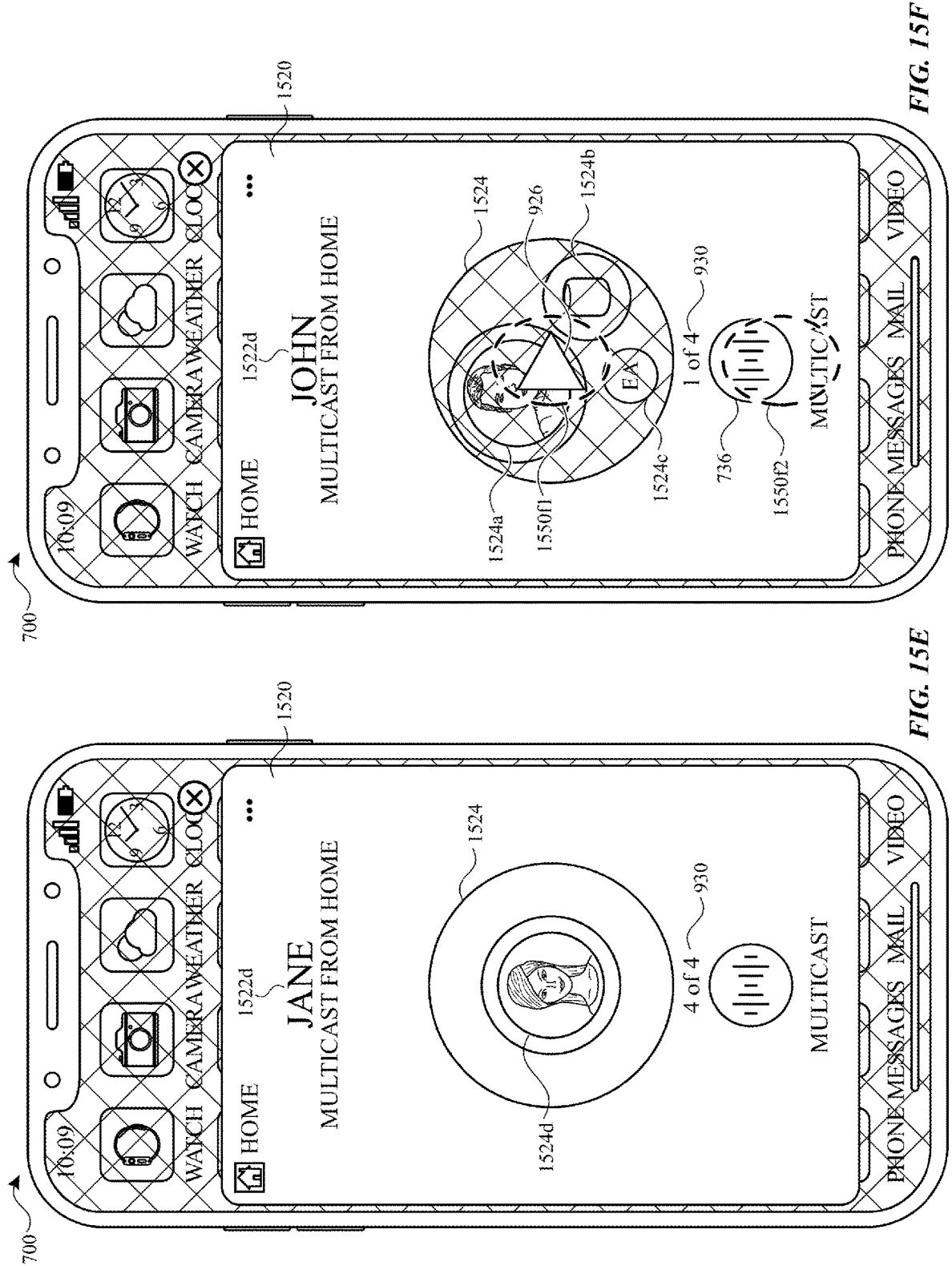

USER INTERFACE FOR AUDIO MESSAGE

CROSS-REFERENCE TO RELATED APPLICATIONS

This application claims priority to U.S. Provisional Patent Application Ser. No. 63/041,979, filed on Jun. 21, 2020, titled "USER INTERFACE FOR AUDIO MESSAGE," and U.S. Provisional Patent Application Ser. No. 63/023,225, filed on May 11, 2020, titled "USER INTERFACE FOR AUDIO MESSAGE," the contents of which are hereby incorporated by reference in their entireties.

FIELD

The present disclosure relates generally to computer user interfaces, and more specifically to techniques for managing audio messages.

BACKGROUND

Users send instant messages to communicate with other users using alphanumeric text. Such messaging techniques typically require the user to enter text using a keyboard or for a device to transcribe audio into text to be subsequently sent. Users interact with external devices using mobile devices. Such interactions often are cumbersome and require the user to interact with multiple external devices individually.

BRIEF SUMMARY

Current techniques for managing audio messages using electronic devices are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for managing audio messages. Such methods and interfaces optionally complement or replace other methods for managing messages. Such methods and interfaces reduce the cognitive burden on a user and produce a more efficient human-machine interface. For battery-operated computing devices, such methods and interfaces conserve power and increase the time between battery charges. Such methods and interfaces enable messages to be transmitted that include the tone of the message (e.g., importance, seriousness, sarcastic, sad, cheerful), rather than just the words of the message, and enable the recipient to recognize the speaker of the message by the speaker's own voice. Such methods and interfaces also reduce or eliminate the need to provide input using a keyboard or to correct a transcription using input.

Current techniques for managing statuses of external devices at a mobile device are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for managing external devices. Such methods and interfaces optionally complement or replace other methods for managing external devices, such as allowing a user to manage external devices individual or managing external devices at the same time via a single input. Such methods and interfaces reduce the cognitive burden on a user and produce a more efficient human-machine interface. For battery-operated computing devices, such methods and interfaces conserve power and increase the time between battery charges.

In accordance with some embodiments, a method is described. The method is performed at a computer system that is in communication with a display generation component. The method comprises: displaying, via the display generation component, a first user interface that includes: a first selectable user interface object, wherein selection of the first selectable user interface object initiates a process for recording and sending a first audio message to a set of external devices, wherein the set of external devices includes a first set of one or more external devices and a second set of one or more external devices; and a first accessory control user interface object corresponding to a first external accessory device, wherein selection of the first accessory control user interface object initiates a process to transmit an instruction to change a state of the first external accessory device; while displaying the first user interface, receiving an input that corresponds to a request to display a second user interface; and in response to receiving the request to display the second user interface, displaying the second user interface, wherein the second user interface includes: a second selectable user interface object, wherein selection of the second selectable user interface object initiates a process for recording and sending a second audio message to the second set of one or more external devices without sending the second audio message to the first set of one or more external devices; and a second accessory control user interface object corresponding to a second external accessory device, wherein selection of the second accessory control user interface object initiates a process to transmit an instruction to change a state of the second external accessory device.

In accordance with some embodiments, a non-transitory computer-readable storage medium is described. The non-transitory computer-readable storage medium stores one or more programs configured to be executed by one or more processors of a computer system in communication with a display generation component, the one or more programs including instructions for: displaying, via the display generation component, a first user interface that includes: a first selectable user interface object, wherein selection of the first selectable user interface object initiates a process for recording and sending a first audio message to a set of external devices, wherein the set of external devices includes a first set of one or more external devices and a second set of one or more external devices; and a first accessory control user interface object corresponding to a first external accessory device, wherein selection of the first accessory control user interface object initiates a process to transmit an instruction to change a state of the first external accessory device; while displaying the first user interface, receiving an input that corresponds to a request to display a second user interface; and in response to receiving the request to display the second user interface, displaying the second user interface, wherein the second user interface includes: a second selectable user interface object, wherein selection of the second selectable user interface object initiates a process for recording and sending a second audio message to the second set of one or more external devices without sending the second audio message to the first set of one or more external devices; and a second accessory control user interface object corresponding to a second external accessory device, wherein selection of the second accessory control user interface object initiates a process to transmit an instruction to change a state of the second external accessory device.

In accordance with some embodiments, a transitory computer-readable storage medium is described. The transitory computer-readable storage medium stores one or more programs configured to be executed by one or more processors of a computer system in communication with a display generation component, the one or more programs including instructions for: displaying, via the display generation component, a first user interface that includes: a first selectable user interface object, wherein selection of the first selectable user interface object initiates a process for recording and sending a first audio message to a set of external devices, wherein the set of external devices includes a first set of one or more external devices and a second set of one or more external devices; and a first accessory control user interface object corresponding to a first external accessory device, wherein selection of the first accessory control user interface object initiates a process to transmit an instruction to change a state of the first external accessory device; while displaying the first user interface, receiving an input that corresponds to a request to display a second user interface; and in response to receiving the request to display the second user interface, displaying the second user interface, wherein the second user interface includes: a second selectable user interface object, wherein selection of the second selectable user interface object initiates a process for recording and sending a second audio message to the second set of one or more external devices without sending the second audio message to the first set of one or more external devices; and a second accessory control user interface object corresponding to a second external accessory device, wherein selection of the second accessory control user interface object initiates a process to transmit an instruction to change a state of the second external accessory device.

In accordance with some embodiments, a computer system is described. The computer system comprises: one or more processors, wherein the computer system is in communication with a display generation component; and memory storing one or more programs configured to be executed by the one or more processors, the one or more programs including instructions for: displaying, via the display generation component, a first user interface that includes: a first selectable user interface object, wherein selection of the first selectable user interface object initiates a process for recording and sending a first audio message to a set of external devices, wherein the set of external devices includes a first set of one or more external devices and a second set of one or more external devices; and a first accessory control user interface object corresponding to a first external accessory device, wherein selection of the first accessory control user interface object initiates a process to transmit an instruction to change a state of the first external accessory device; while displaying the first user interface, receiving an input that corresponds to a request to display a second user interface; and in response to receiving the request to display the second user interface, displaying the second user interface, wherein the second user interface includes: a second selectable user interface object, wherein selection of the second selectable user interface object initiates a process for recording and sending a second audio message to the second set of one or more external devices without sending the second audio message to the first set of one or more external devices; and a second accessory control user interface object corresponding to a second external accessory device, wherein selection of the second accessory control user interface object initiates a process to transmit an instruction to change a state of the second external accessory device.

In accordance with some embodiments, a computer system is described. The computer system comprising: means for displaying, via a display generation component that is in communication with the computer system, a first user interface that includes: a first selectable user interface object, wherein selection of the first selectable user interface object initiates a process for recording and sending a first audio message to a set of external devices, wherein the set of external devices includes a first set of one or more external devices and a second set of one or more external devices; and a first accessory control user interface object corresponding to a first external accessory device, wherein selection of the first accessory control user interface object initiates a process to transmit an instruction to change a state of the first external accessory device; means, while displaying the first user interface, for receiving an input that corresponds to a request to display a second user interface; and means, responsive to receiving the request to display the second user interface, for displaying the second user interface, wherein the second user interface includes: a second selectable user interface object, wherein selection of the second selectable user interface object initiates a process for recording and sending a second audio message to the second set of one or more external devices without sending the second audio message to the first set of one or more external devices; and a second accessory control user interface object corresponding to a second external accessory device, wherein selection of the second accessory control user interface object initiates a process to transmit an instruction to change a state of the second external accessory device.

In accordance with some embodiments, a method is described. The method is performed at a computer system in communication with a display generation component. The method comprises: receiving first data corresponding to first media; displaying, via the display generation component, until an end of a first time period, a first notification with an indication of the first media; after receiving the first data, receiving second data corresponding to second media, wherein the second media is different from the first media; and in accordance with a determination that the second media meets a set of one or more criteria and in accordance with a determination based on (1) a time that the second data was received and (2) a time that the first data was received, displaying, via the display generation component, until an end of a second time period, a second notification with an indication of the first media, wherein an end of the first time period is different from an end of the second time period.

In accordance with some embodiments, a non-transitory computer-readable storage medium is described. The non-transitory computer-readable storage medium stores one or more programs configured to be executed by one or more processors of a computer system in communication with a display generation component, the one or more programs including instructions for: receiving first data corresponding to first media; displaying, via the display generation component, until an end of a first time period, a first notification with an indication of the first media; after receiving the first data, receiving second data corresponding to second media, wherein the second media is different from the first media; and in accordance with a determination that the second media meets a set of one or more criteria and in accordance with a determination based on (1) a time that the second data was received and (2) a time that the first data was received, displaying, via the display generation component, until an end of a second time period, a second notification with an indication of the first media, wherein an end of the first time period is different from an end of the second time period.

In accordance with some embodiments, a transitory computer-readable storage medium is described. The transitory computer-readable storage medium stores one or more programs configured to be executed by one or more processors of a computer system in communication with a display generation component, the one or more programs including instructions for: receiving first data corresponding to first media; displaying, via the display generation component, until an end of a first time period, a first notification with an indication of the first media; after receiving the first data, receiving second data corresponding to second media, wherein the second media is different from the first media; and in accordance with a determination that the second media meets a set of one or more criteria and in accordance with a determination based on (1) a time that the second data was received and (2) a time that the first data was received, displaying, via the display generation component, until an end of a second time period, a second notification with an indication of the first media, wherein an end of the first time period is different from an end of the second time period.

In accordance with some embodiments, a computer system is described. The computer system comprises: one or more processors, wherein the computer system is in communication with a display generation component; and memory storing one or more programs configured to be executed by the one or more processors, the one or more programs including instructions for: receiving first data corresponding to first media; displaying, via the display generation component, until an end of a first time period, a first notification with an indication of the first media; after receiving the first data, receiving second data corresponding to second media, wherein the second media is different from the first media; and in accordance with a determination that the second media meets a set of one or more criteria and in accordance with a determination based on (1) a time that the second data was received and (2) a time that the first data was received, displaying, via the display generation component, until an end of a second time period, a second notification with an indication of the first media, wherein an end of the first time period is different from an end of the second time period.

In accordance with some embodiments, a computer system is described. The computer system comprises: means for receiving first data corresponding to first media; means for displaying, via a generation component that is in communication with the computer system, until an end of a first time period, a first notification with an indication of the first media; means, after receiving the first data, for receiving second data corresponding to second media, wherein the second media is different from the first media; and means, in accordance with a determination that the second media meets a set of one or more criteria and in accordance with a determination based on (1) a time that the second data was received and (2) a time that the first data was received, for displaying, via the display generation component, until an end of a second time period, a second notification with an indication of the first media, wherein an end of the first time period is different from an end of the second time period.

In accordance with some embodiments, a method is described. The method is performed at an electronic device having one or more microphones, one or more speakers, and one or more display devices. The method comprises: receiving voice input via the one or more microphones; and displaying a visual indication of the voice input, wherein: in accordance with a determination that a portion of the voice input corresponds to voice input that is to be transmitted to one or more devices displaying, via the one or more display devices, the visual indication includes displaying the visual indication with a first set of one or more colors; and in accordance with a determination that the voice input does not include an instruction to transmit any portion of the voice input to other devices, displaying, via the one or more display devices, the visual indication includes displaying the visual indication with a second set of one or more colors that is different from the first set of one or more colors.

In accordance with some embodiments, a non-transitory computer-readable storage medium is described. The non-transitory computer-readable storage medium stores one or more programs configured to be executed by one or more processors of an electronic device having one or more microphones, one or more speakers, and one or more display devices, the one or more programs including instructions for: receiving voice input via the one or more microphones; and displaying a visual indication of the voice input, wherein: in accordance with a determination that a portion of the voice input corresponds to voice input that is to be transmitted to one or more devices displaying, via the one or more display devices, the visual indication includes displaying the visual indication with a first set of one or more colors; and in accordance with a determination that the voice input does not include an instruction to transmit any portion of the voice input to other devices, displaying, via the one or more display devices, the visual indication includes displaying the visual indication with a second set of one or more colors that is different from the first set of one or more colors.

In accordance with some embodiments, a transitory computer-readable storage medium is described. The transitory computer-readable storage medium stores one or more programs configured to be executed by one or more processors of an electronic device having one or more microphones, one or more speakers, and one or more display devices, the one or more programs including instructions for: receiving voice input via the one or more microphones; and displaying a visual indication of the voice input, wherein: in accordance with a determination that a portion of the voice input corresponds to voice input that is to be transmitted to one or more devices displaying, via the one or more display devices, the visual indication includes displaying the visual indication with a first set of one or more colors; and in accordance with a determination that the voice input does not include an instruction to transmit any portion of the voice input to other devices, displaying, via the one or more display devices, the visual indication includes displaying the visual indication with a second set of one or more colors that is different from the first set of one or more colors.

In accordance with some embodiments, an electronic device is described. The electronic device comprises: one or more microphones; one or more speakers; one or more display devices; one or more processors; and memory storing one or more programs configured to be executed by the one or more processors, the one or more programs including instructions for: receiving voice input via the one or more microphones; and displaying a visual indication of the voice input, wherein: in accordance with a determination that a portion of the voice input corresponds to voice input that is to be transmitted to one or more devices displaying, via the one or more display devices, the visual indication includes displaying the visual indication with a first set of one or more colors; and in accordance with a determination that the voice input does not include an instruction to transmit any portion of the voice input to other devices, displaying, via the one or more display devices, the visual indication includes displaying the visual indication with a second set of one or more colors that is different from the first set of one or more colors.

In accordance with some embodiments, an electronic device is described. The electronic device comprises: one or more microphones; one or more speakers; one or more display devices; means for receiving voice input via the one or more microphones; and means displaying a visual indication of the voice input, wherein: in accordance with a determination that a portion of the voice input corresponds to voice input that is to be transmitted to one or more devices displaying, via the one or more display devices, the visual indication includes displaying the visual indication with a first set of one or more colors; and in accordance with a determination that the voice input does not include an instruction to transmit any portion of the voice input to other devices, displaying, via the one or more display devices, the visual indication includes displaying the visual indication with a second set of one or more colors that is different from the first set of one or more colors.

In accordance with some embodiments, a method is described. The method is performed at a computer system, wherein the computer system is in communication with a display generation component and one or more input devices. The method comprises: displaying, via the display generation component, a first status that indicates that a plurality of accessory devices of a first accessory type are in a first state, wherein the plurality of accessory devices of the first accessory type includes: a first accessory device that is the first accessory type and is in the first state; and a second accessory device that is the first accessory type and is in the first state, wherein the second accessory device is different from the first accessory device; while displaying the first status indicator, detecting a gesture; and in response to detecting the gesture: in accordance with a determination that the gesture is a first type of gesture and is directed to the first status indicator, causing the first accessory device and the second accessory device to change to a second state that is different from the first state; and in accordance with a determination that the gesture is a second type of gesture that is different from the first type of gesture and is directed to the first status indicator, displaying, via the display generation component, a first accessory control user interface object corresponding to the first accessory device, wherein selection of the first accessory control user interface object causes the first accessory device to change to the second state without causing the second accessory device to change to the second state.

In accordance with some embodiments, a non-transitory computer-readable storage medium is described. The non-transitory computer-readable storage medium stores one or more programs configured to be executed by one or more processors of a computer system, wherein the computer system is in communication with a display generation component and one or more input devices, the one or more programs including instructions for: displaying, via the display generation component, a first status that indicates that a plurality of accessory devices of a first accessory type are in a first state, wherein the plurality of accessory devices of the first accessory type includes: a first accessory device that is the first accessory type and is in the first state; and a second accessory device that is the first accessory type and is in the first state, wherein the second accessory device is different from the first accessory device; while displaying the first status indicator, detecting a gesture; and in response to detecting the gesture: in accordance with a determination that the gesture is a first type of gesture and is directed to the first status indicator, causing the first accessory device and the second accessory device to change to a second state that is different from the first state; and in accordance with a determination that the gesture is a second type of gesture that is different from the first type of gesture and is directed to the first status indicator, displaying, via the display generation component, a first accessory control user interface object corresponding to the first accessory device, wherein selection of the first accessory control user interface object causes the first accessory device to change to the second state without causing the second accessory device to change to the second state.

In accordance with some embodiments, a transitory computer-readable storage medium is described. The transitory computer-readable storage medium stores one or more programs configured to be executed by one or more processors of a computer system, wherein the computer system is in communication with a display generation component and one or more input devices, the one or more programs including instructions for: displaying, via the display generation component, a first status that indicates that a plurality of accessory devices of a first accessory type are in a first state, wherein the plurality of accessory devices of the first accessory type includes: a first accessory device that is the first accessory type and is in the first state; and a second accessory device that is the first accessory type and is in the first state, wherein the second accessory device is different from the first accessory device; while displaying the first status indicator, detecting a gesture; and in response to detecting the gesture: in accordance with a determination that the gesture is a first type of gesture and is directed to the first status indicator, causing the first accessory device and the second accessory device to change to a second state that is different from the first state; and in accordance with a determination that the gesture is a second type of gesture that is different from the first type of gesture and is directed to the first status indicator, displaying, via the display generation component, a first accessory control user interface object corresponding to the first accessory device, wherein selection of the first accessory control user interface object causes the first accessory device to change to the second state without causing the second accessory device to change to the second state.

In accordance with some embodiments, a computer system is described. The computer system comprises: one or more processors, wherein the computer system is in communication with a display generation component and one or more input devices; and memory storing one or more programs configured to be executed by the one or more processors, the one or more programs including instructions for: displaying, via the display generation component, a first status that indicates that a plurality of accessory devices of a first accessory type are in a first state, wherein the plurality of accessory devices of the first accessory type includes: a first accessory device that is the first accessory type and is in the first state; and a second accessory device that is the first accessory type and is in the first state, wherein the second accessory device is different from the first accessory device; while displaying the first status indicator, detecting a gesture; and in response to detecting the gesture: in accordance with a determination that the gesture is a first type of gesture and is directed to the first status indicator, causing the first accessory device and the second accessory device to change to a second state that is different from the first state; and in accordance with a determination that the gesture is a second type of gesture that is different from the first type of gesture and is directed to the first status indicator, displaying, via the display generation component, a first accessory control user interface object corresponding to the first accessory device, wherein selection of the first accessory control user interface object causes the first accessory device to change to the second state without causing the second accessory device to change to the second state.

In accordance with some embodiments, a computer system is described. The computer system comprising: means for, displaying, via the display generation component, a first status that indicates that a plurality of accessory devices of a first accessory type are in a first state, wherein the plurality of accessory devices of the first accessory type includes: a first accessory device that is the first accessory type and is in the first state; and a second accessory device that is the first accessory type and is in the first state, wherein the second accessory device is different from the first accessory device; means, while displaying the first status indicator, for detecting a gesture; and means, responsive to detecting the gesture, for: in accordance with a determination that the gesture is a first type of gesture and is directed to the first status indicator, causing the first accessory device and the second accessory device to change to a second state that is different from the first state; and in accordance with a determination that the gesture is a second type of gesture that is different from the first type of gesture and is directed to the first status indicator, displaying, via the display generation component, a first accessory control user interface object corresponding to the first accessory device, wherein selection of the first accessory control user interface object causes the first accessory device to change to the second state without causing the second accessory device to change to the second state In accordance with some embodiments, a method is described. The method is performed at a computer system that is in communication with a display generation component and one or more inputs devices. The method comprises: displaying, via the display generation component, a media user interface that includes: at a first location, a first representation of a first media message, and at a second location different from the first location, a second representation of a second media message; in response to displaying the media user interface and not based on user input corresponding to the media user interface, playing the first media message; and in response to detecting completion of playing through the first media message: displaying, the second representation of the second media message without displaying, via the display generation component, a representation corresponding to the first media message.

In accordance with some embodiments, a non-transitory computer-readable storage medium is described. The non-transitory computer-readable storage medium stores one or more programs configured to be executed by one or more processors of a computer system, wherein the computer system is in communication with a display generation component and one or more input devices, the one or more programs including instructions for: displaying, via the display generation component, a media user interface that includes: at a first location, a first representation of a first media message, and at a second location different from the first location, a second representation of a second media message; in response to displaying the media user interface and not based on user input corresponding to the media user interface, playing the first media message; and in response to detecting completion of playing through the first media message: displaying, the second representation of the second media message without displaying, via the display generation component, a representation corresponding to the first media message.

In accordance with some embodiments, a transitory computer-readable storage medium is described. The transitory computer-readable storage medium stores one or more programs configured to be executed by one or more processors of a computer system, wherein the computer system is in communication with a display generation component and one or more input devices, the one or more programs including instructions for: displaying, via the display generation component, a media user interface that includes: at a first location, a first representation of a first media message, and at a second location different from the first location, a second representation of a second media message; in response to displaying the media user interface and not based on user input corresponding to the media user interface, playing the first media message; and in response to detecting completion of playing through the first media message: displaying, the second representation of the second media message without displaying, via the display generation component, a representation corresponding to the first media message.

In accordance with some embodiments, a computer system is described. The computer system comprises: one or more processors, wherein the computer system is in communication with a display generation component and one or more input devices; and memory storing one or more programs configured to be executed by the one or more processors, the one or more programs including instructions for: displaying, via the display generation component, a media user interface that includes: at a first location, a first representation of a first media message, and at a second location different from the first location, a second representation of a second media message; in response to displaying the media user interface and not based on user input corresponding to the media user interface, playing the first media message; and in response to detecting completion of playing through the first media message: displaying, the second representation of the second media message without displaying, via the display generation component, a representation corresponding to the first media message.

In accordance with some embodiments, a computer system is described. The computer system is in communication with a display generation component and one or more inputs devices. The computer system comprises: means for displaying, via the display generation component, a media user interface that includes: at a first location, a first representation of a first media message, and at a second location different from the first location, a second representation of a second media message; means, responsive to displaying the media user interface and not based on user input corresponding to the media user interface, for playing the first media message; and means, responsive to detecting completion of playing through the first media message, for: displaying, the second representation of the second media message without displaying, via the display generation component, a representation corresponding to the first media message.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing audio messages, thereby increasing the effectiveness, efficiency, and user satisfaction with such devices. Such methods and interfaces may complement or replace other methods for managing audio messages.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 5C-5D illustrate exemplary components of a personal electronic device having a touch-sensitive display and intensity sensors in accordance with some embodiments.

FIGS. 5E-5H illustrate exemplary components and user interfaces of a personal electronic device in accordance with some embodiments.

FIG. 14 is a flow diagram illustrating a method for managing external devices in accordance with some embodiments.

FIGS. 15A-15F illustrate exemplary user interfaces for playing back audio messages in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing audio messages. The techniques for managing audio messages increase the efficiency of the devices (e.g., reduce unnecessary display), increase information provided about external devices (e.g., displaying the source of audio messages), and increase privacy (by providing visual feedback to the user of the state of the device about audio input received). Such techniques can reduce the cognitive burden on a user who uses audio messages, thereby enhancing productivity. Further, such techniques can reduce processor and battery power otherwise wasted on redundant user inputs.

Below, FIGS. 1A-1B, 2, 3, 4A-4B, and 5A-5J provide a description of exemplary devices for performing the techniques for sending and receiving audio messages. FIG. 6 is a diagram illustrating a physical structure and an exemplary set of devices for performing the techniques for sending and receiving audio messages, in accordance with some embodiments.

Figure 7F:
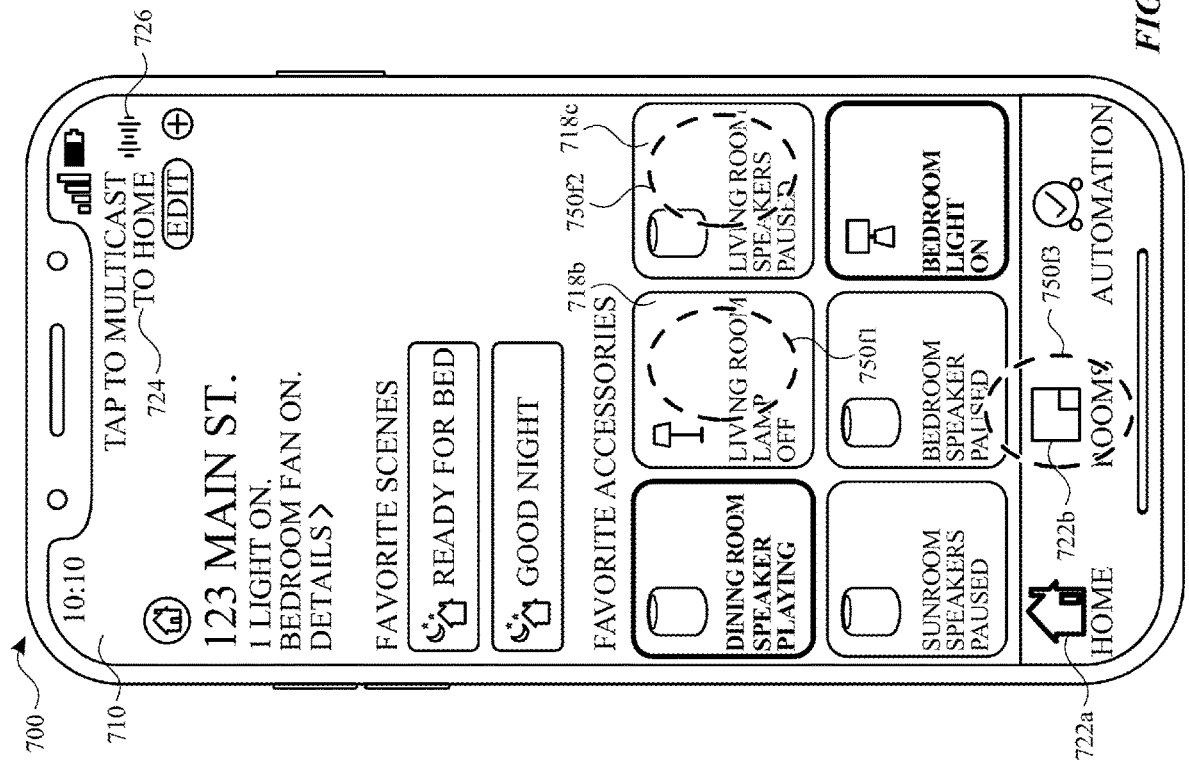
FIGS. 7A-7AH illustrate exemplary user interfaces for sending an audio message in accordance with some embodiments.
Figure 7G:
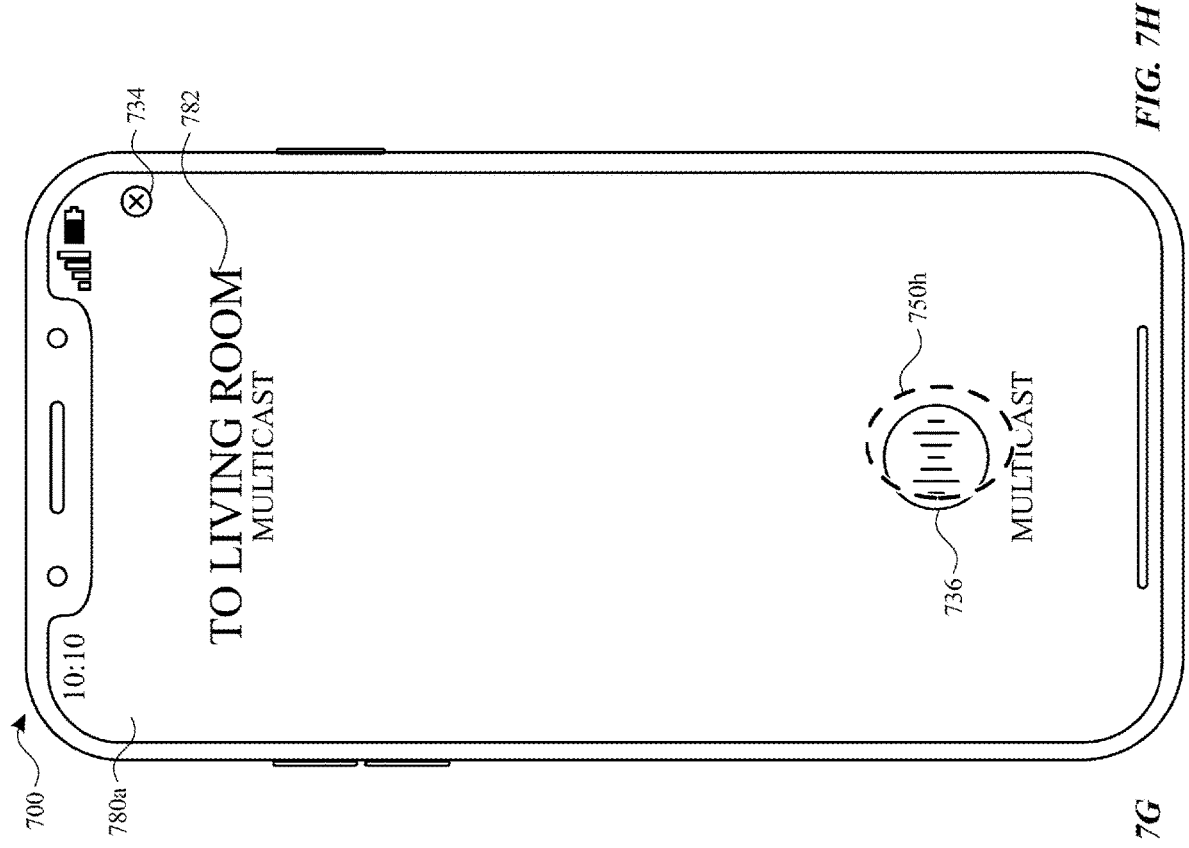
Figure 7H:
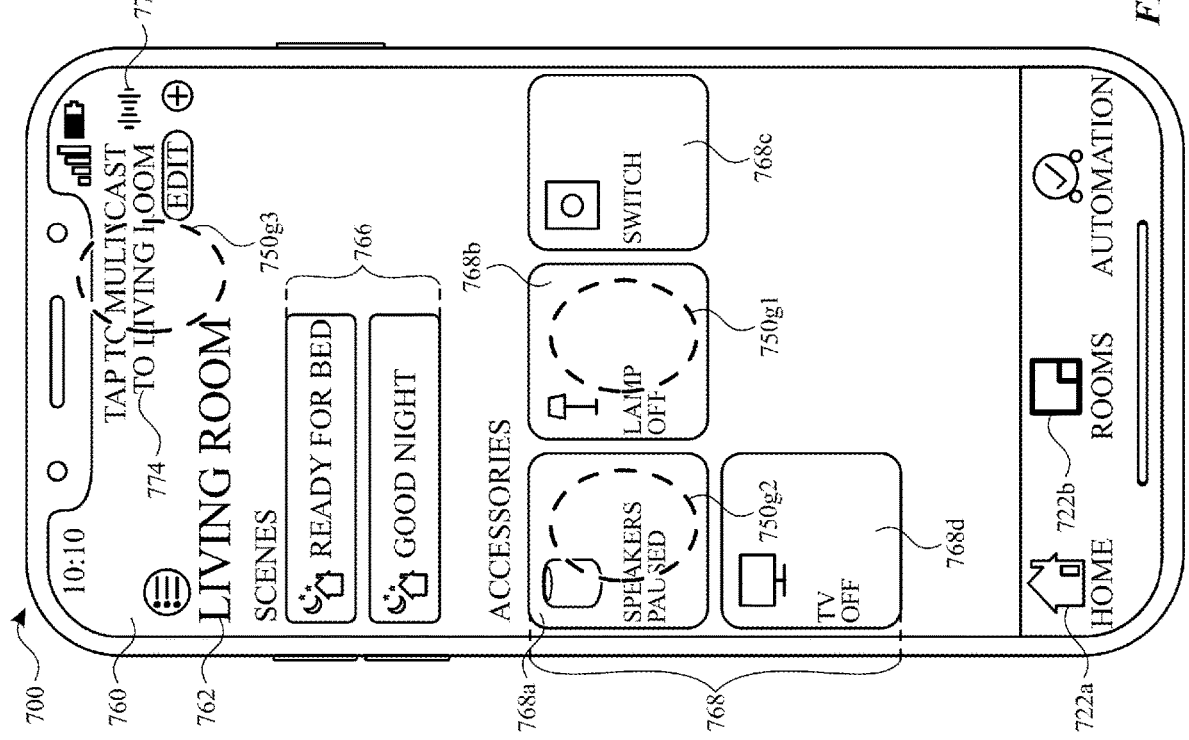
Figure 7I:
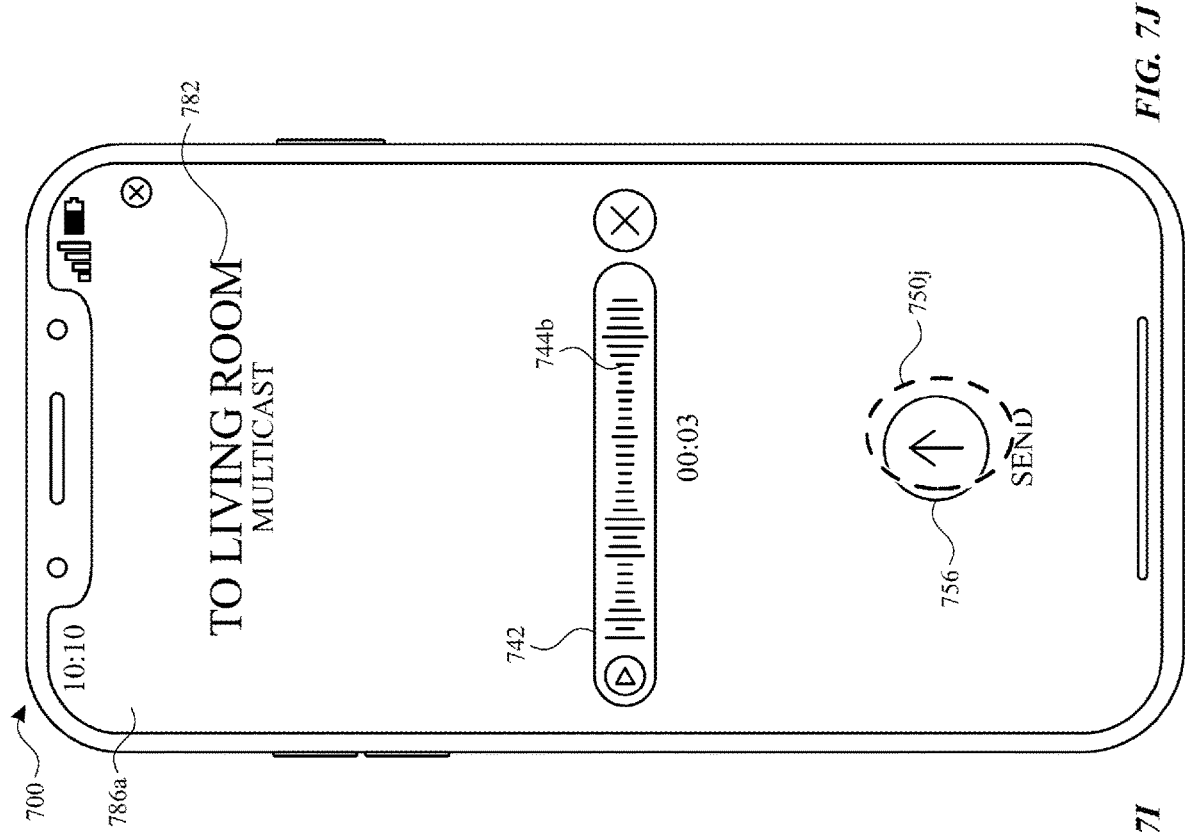
Figure 7J:
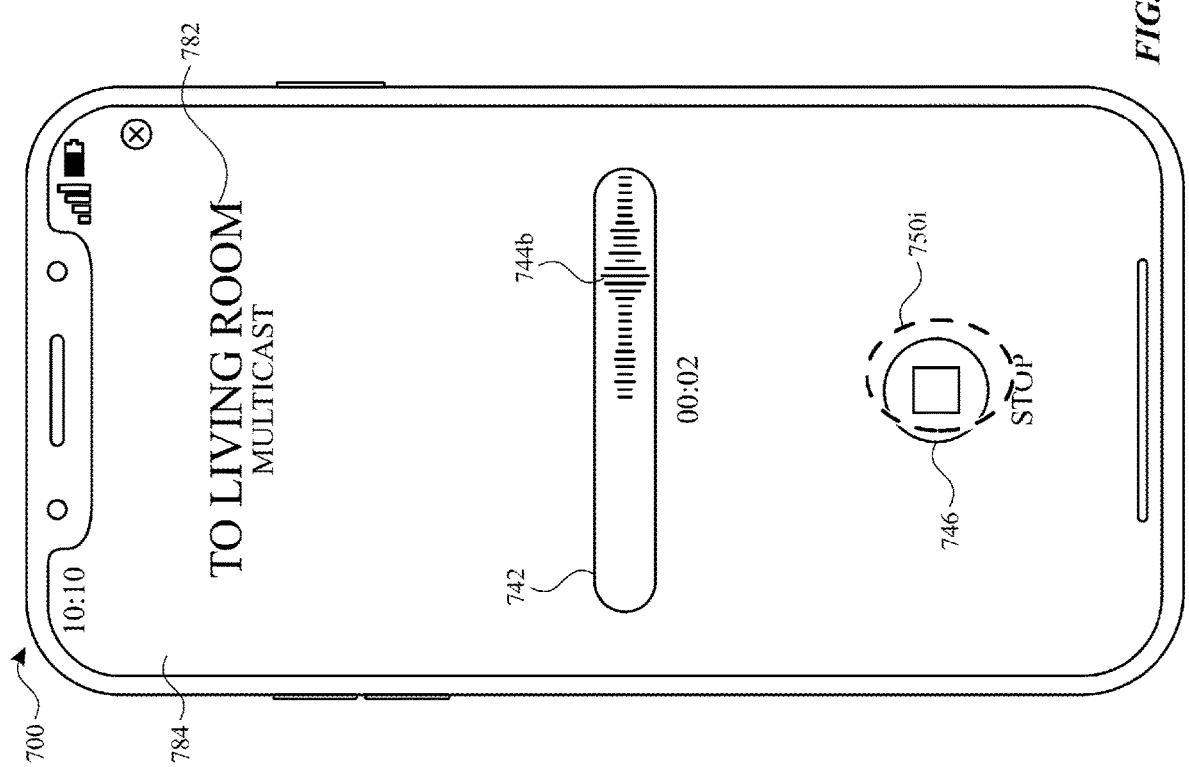
Figure 7L:
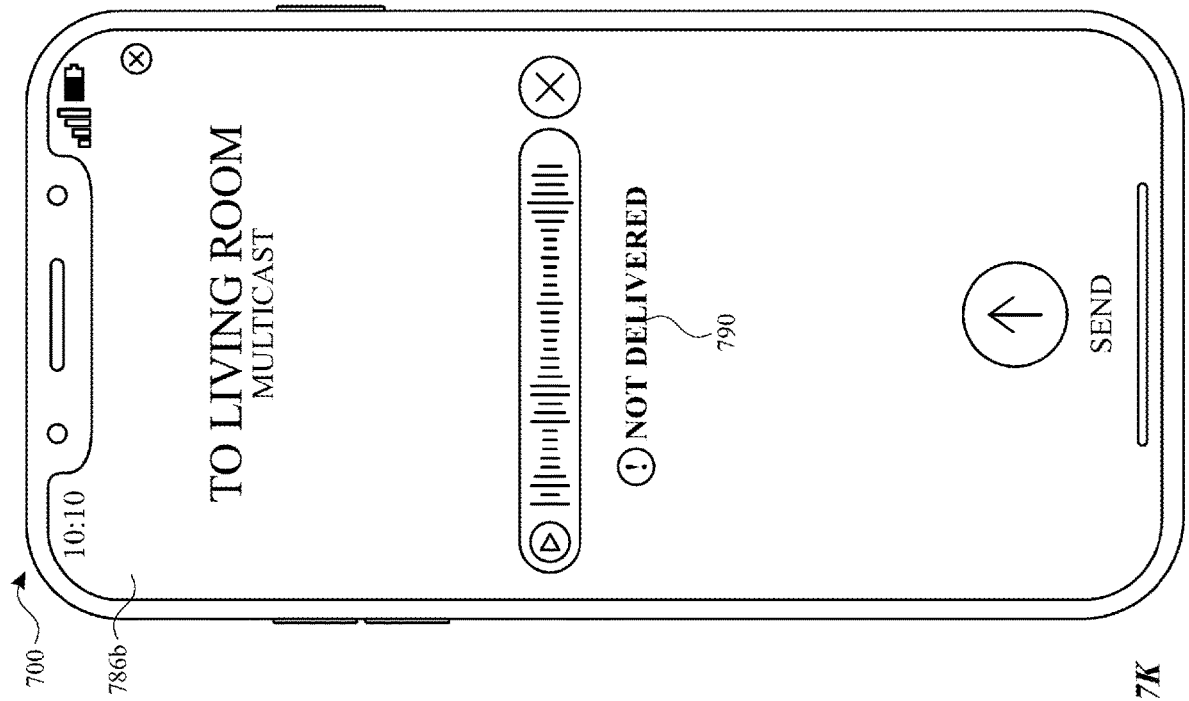
Figure 7K:
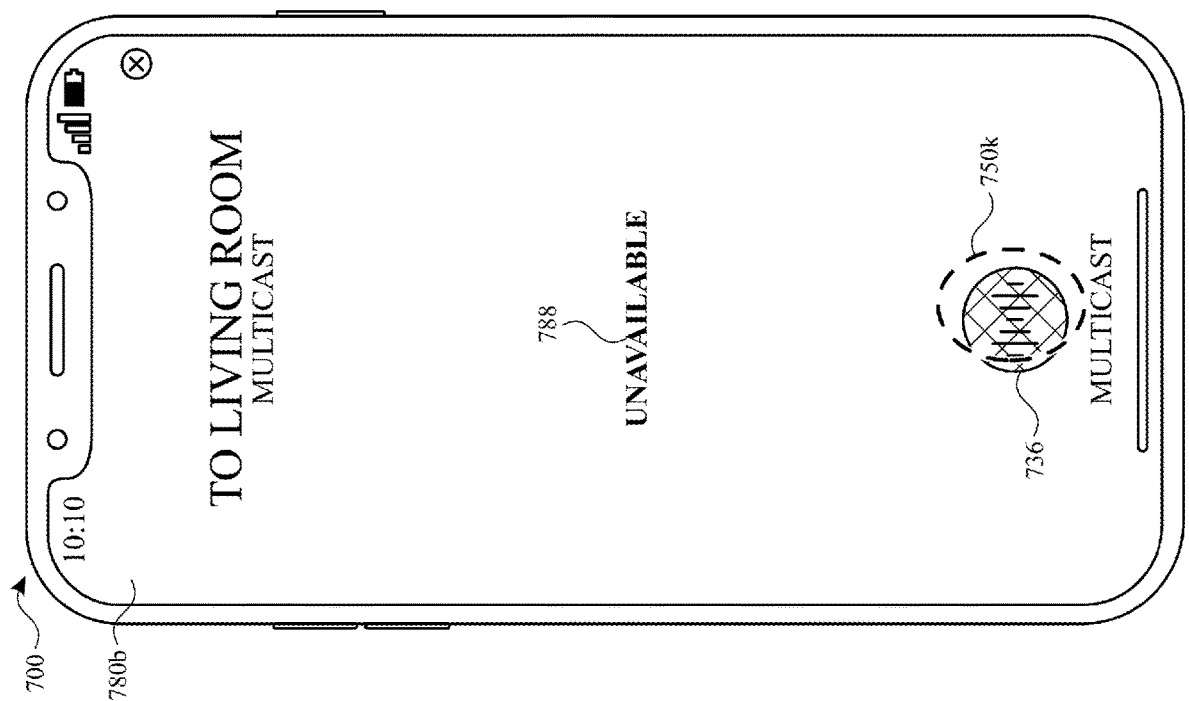
Figure 7M:
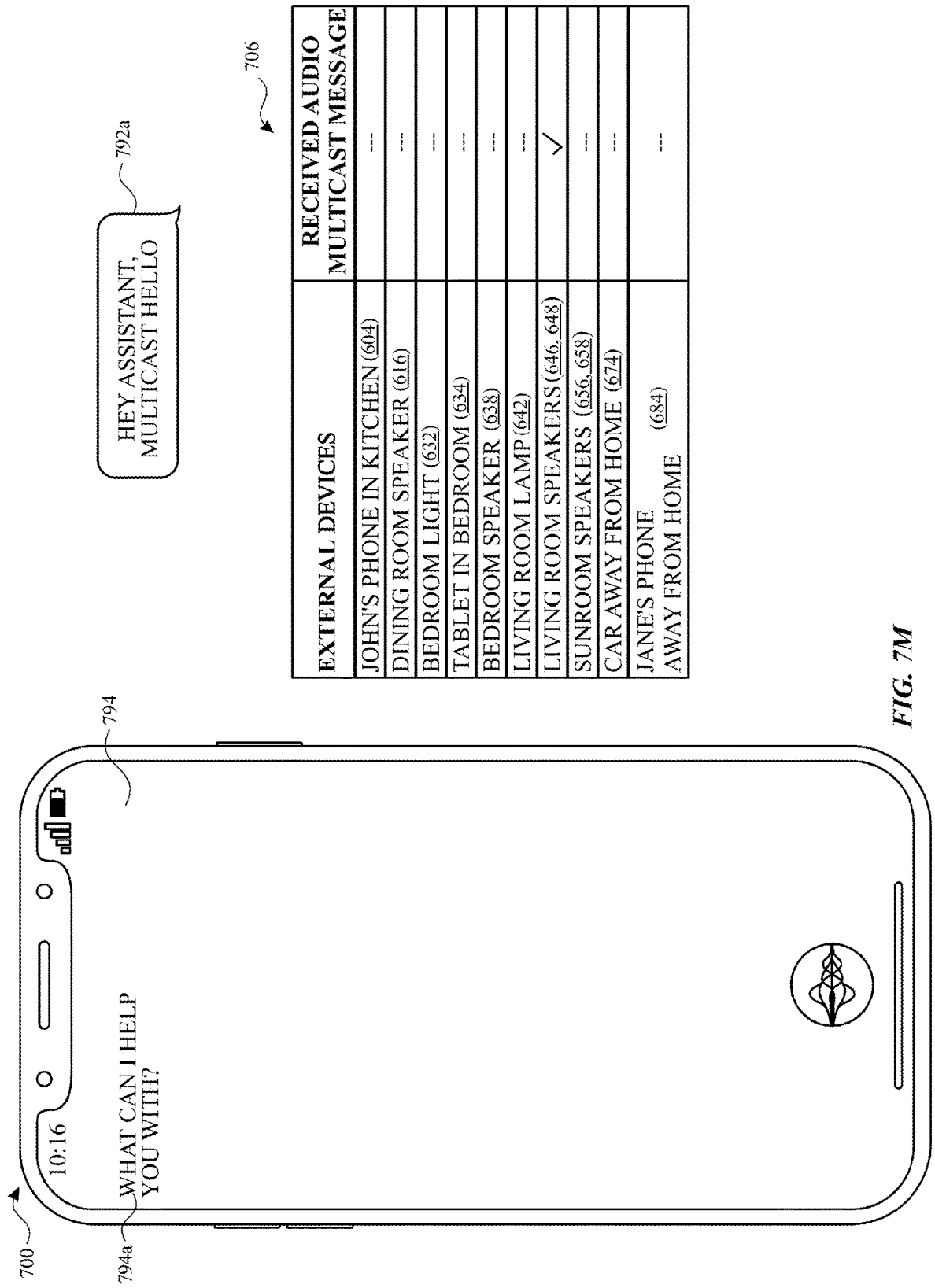
Figure 7N:
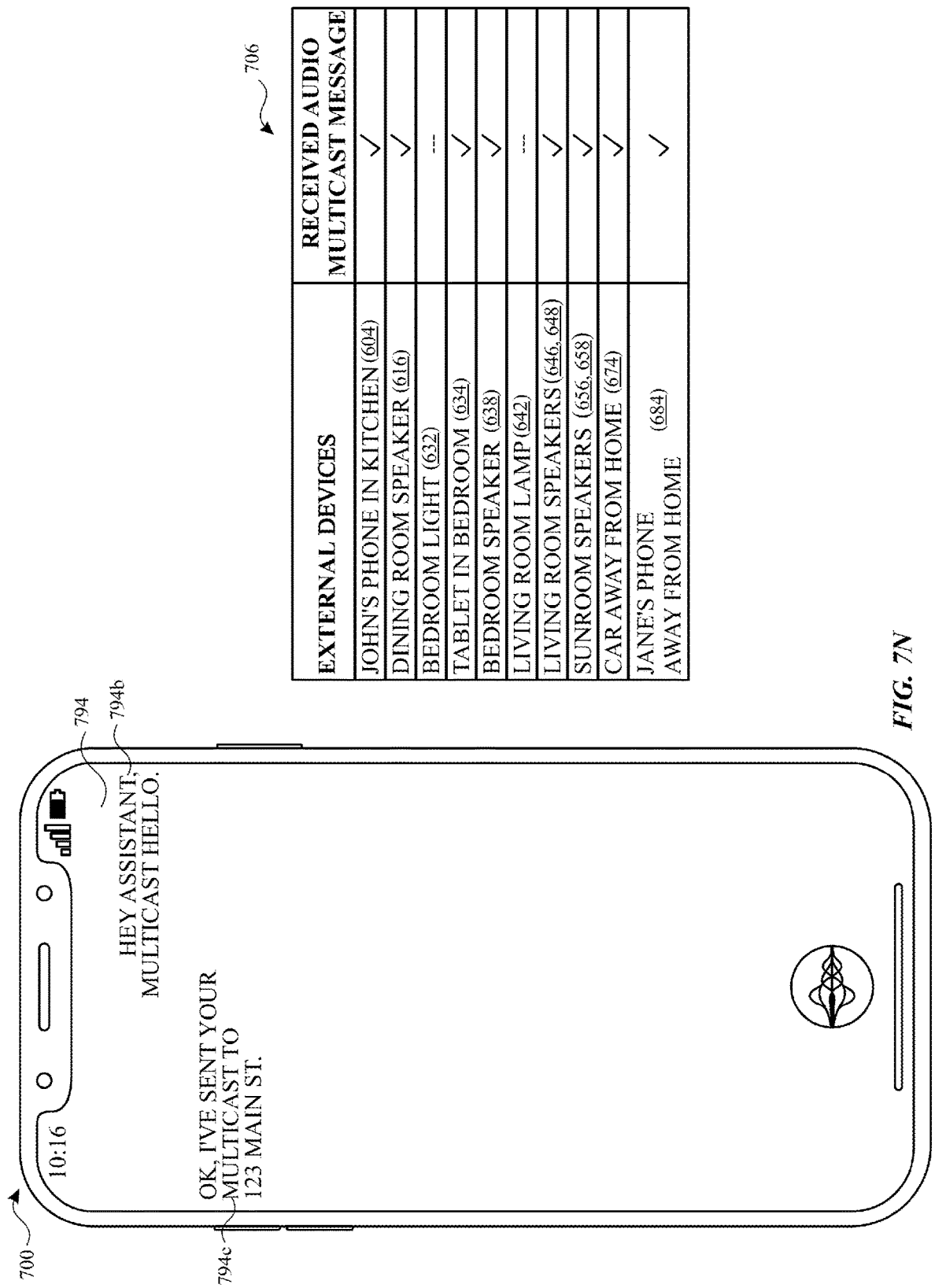
Figure 7P:
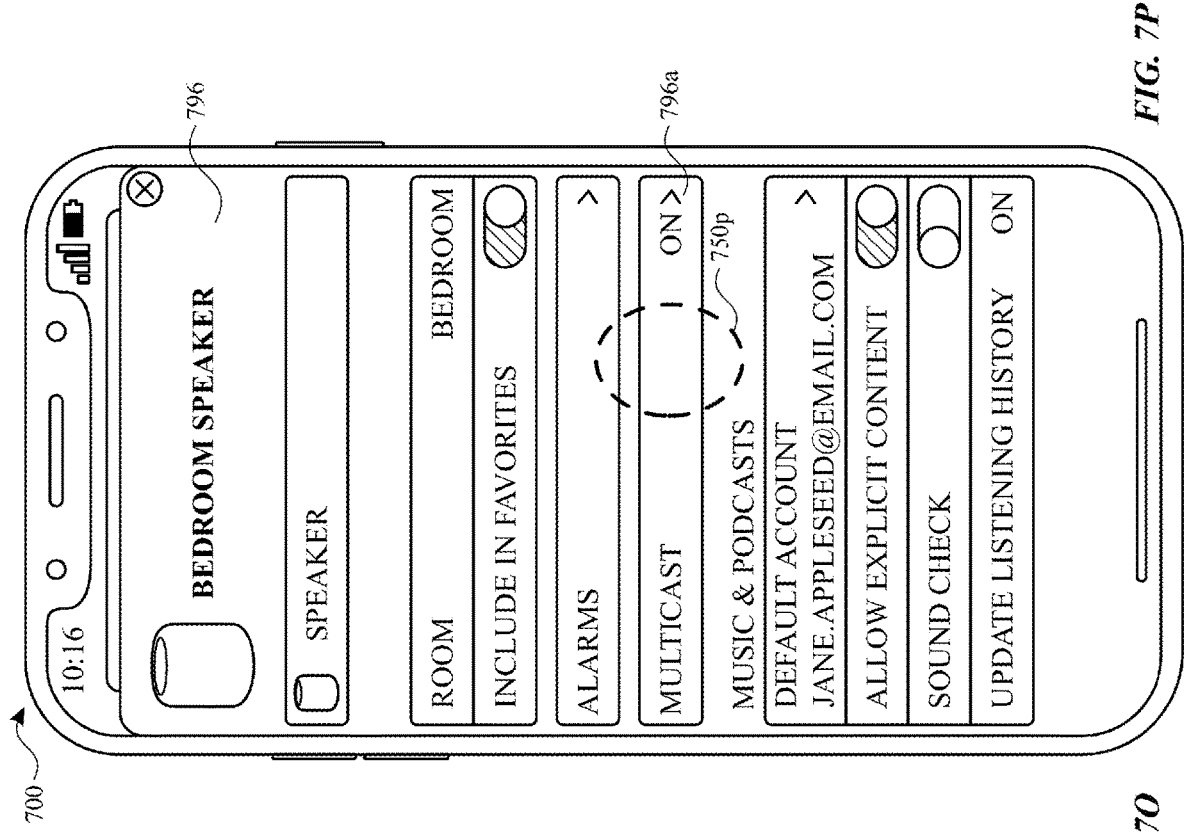
Figure 7O:
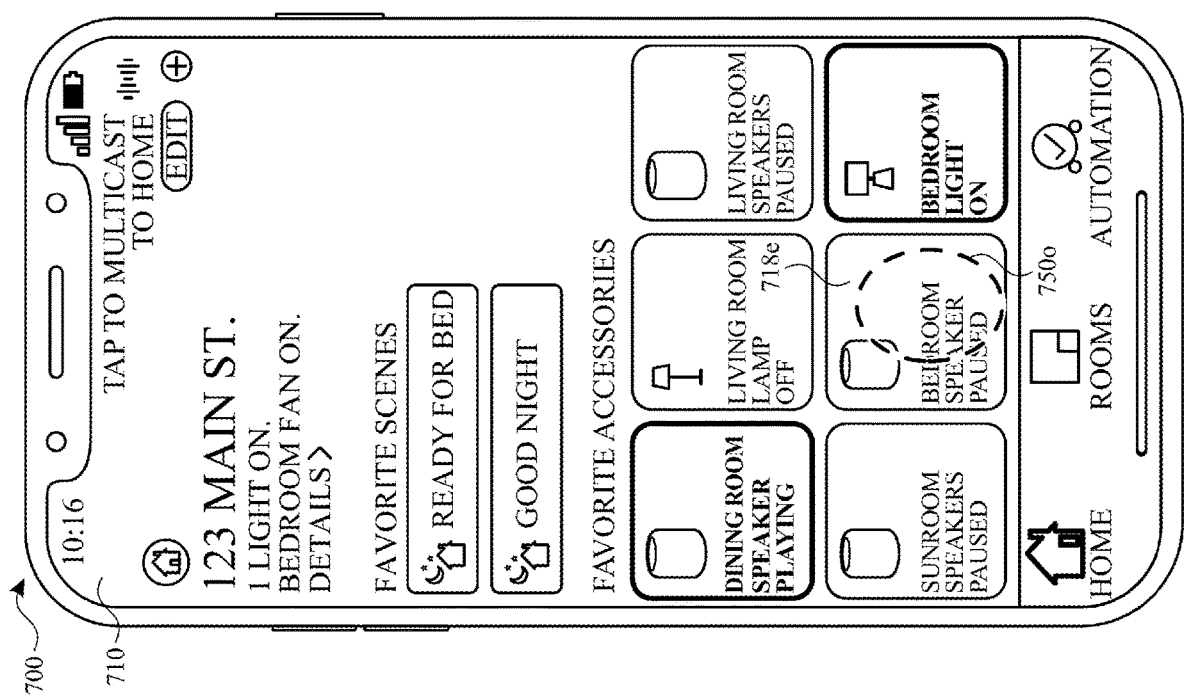
Figure 7R:
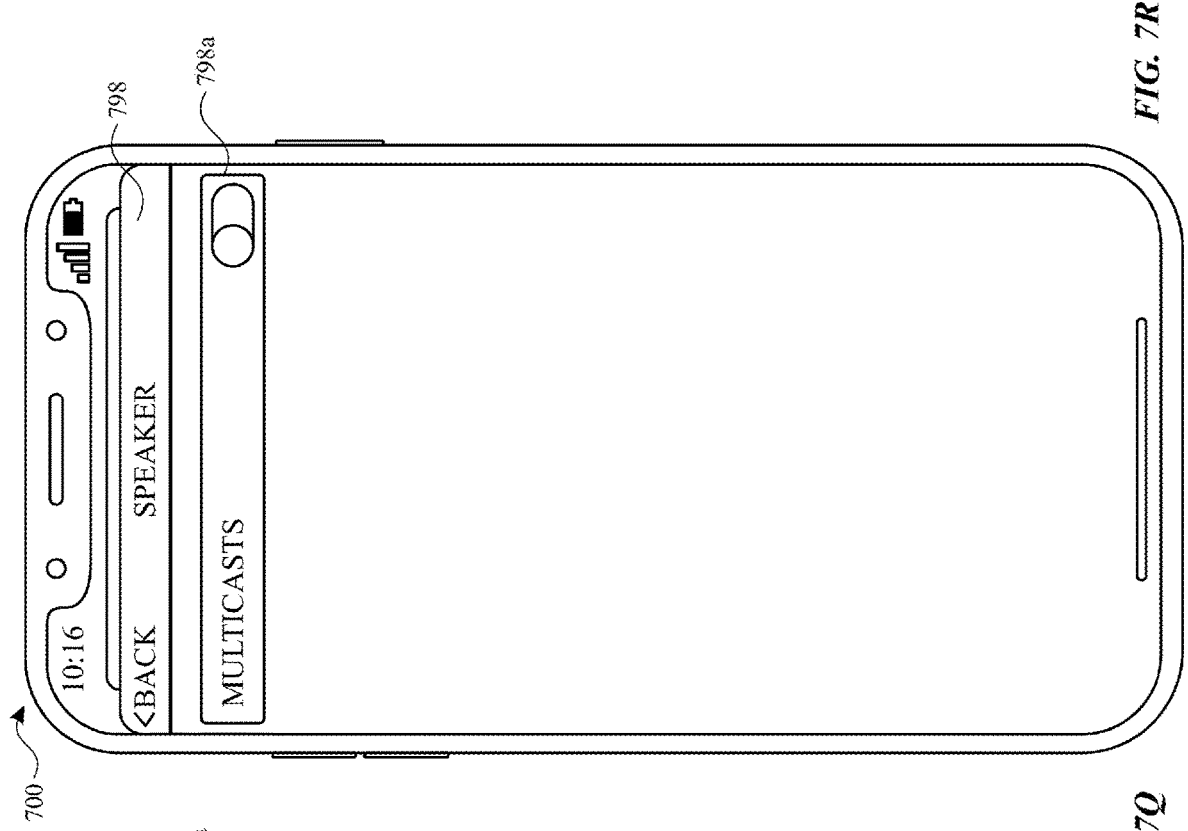
Figure 7Q:
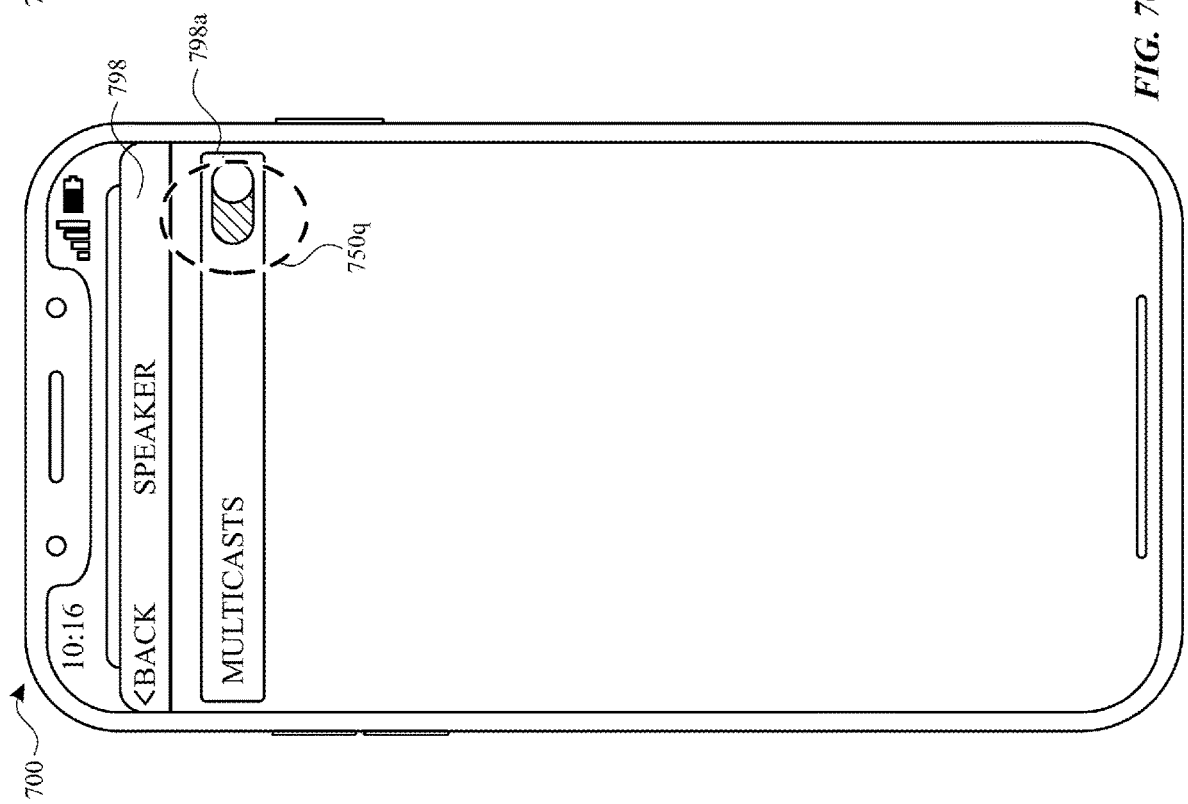
Figure 7S:
Figure 7T:
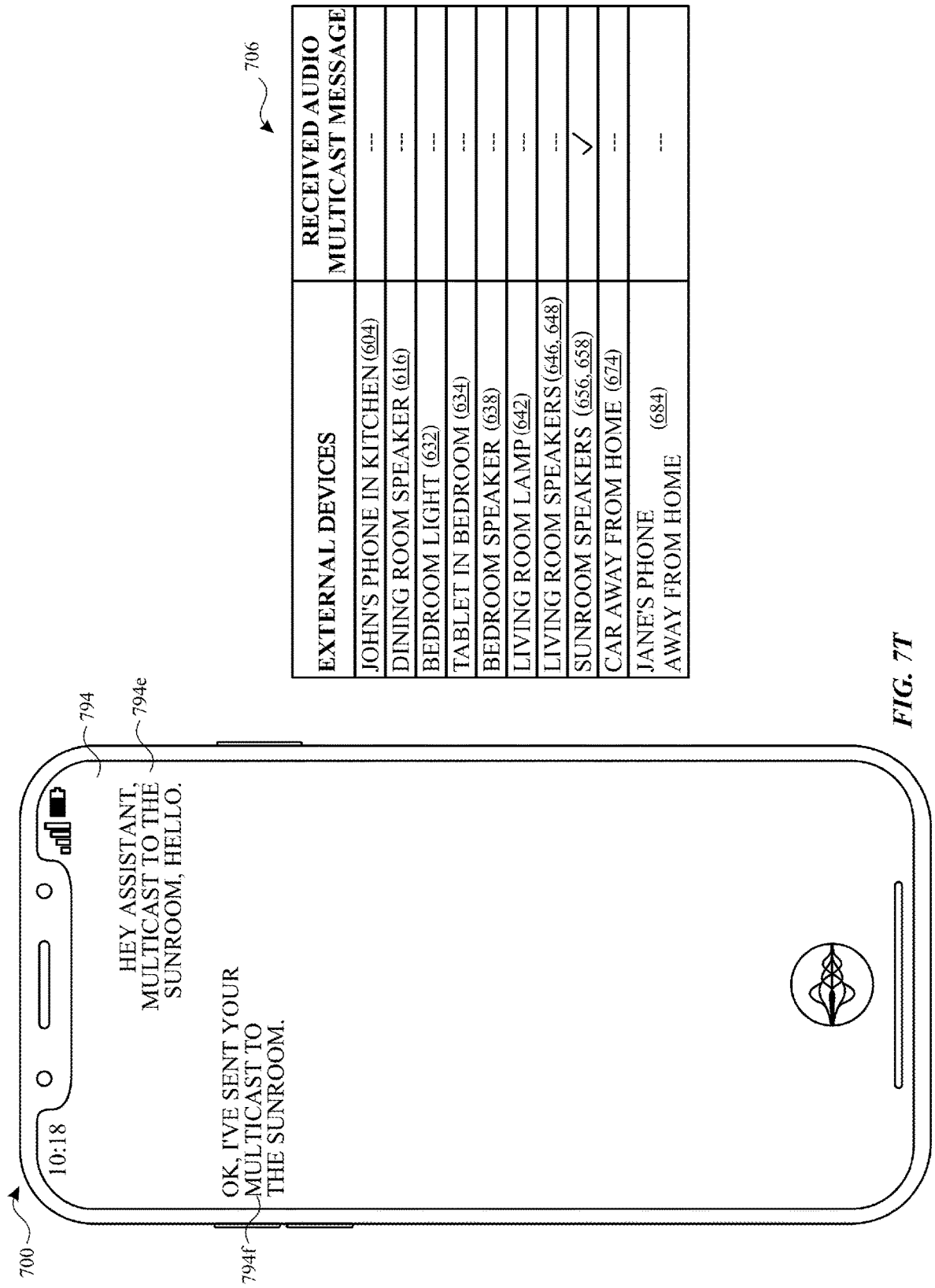
Figure 7U:
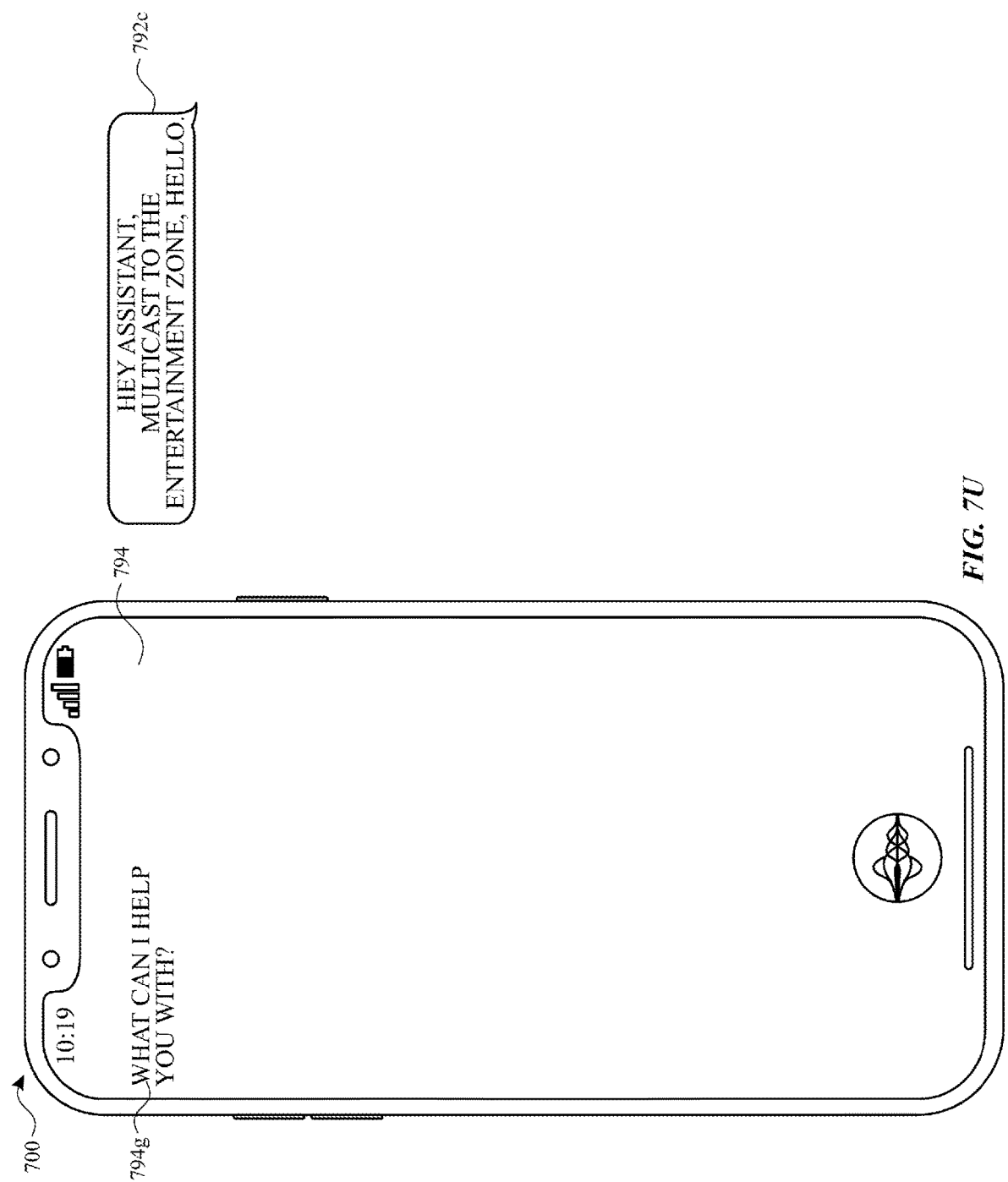
Figure 7V:
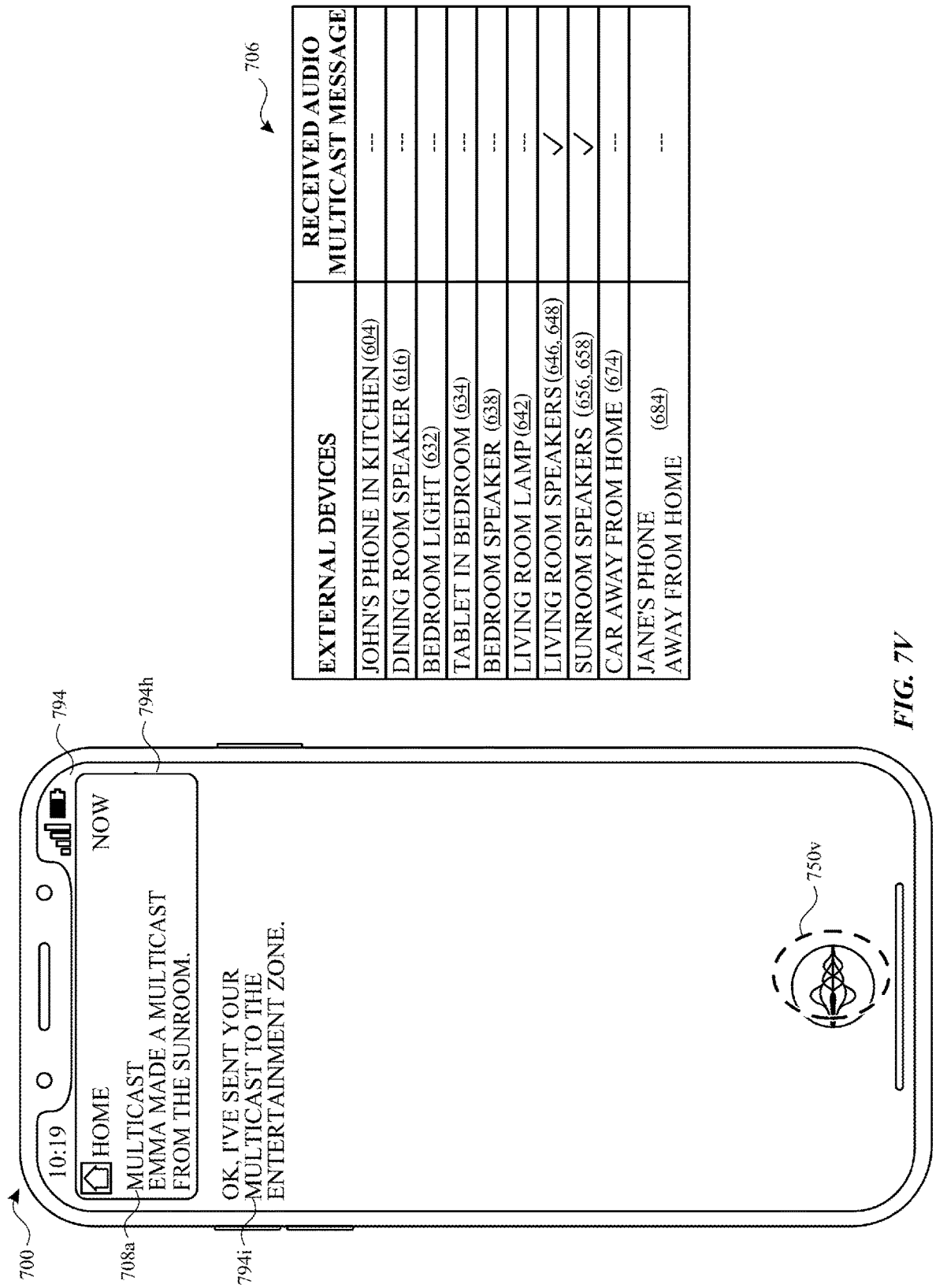
Figure 7W:
Figure 7X:
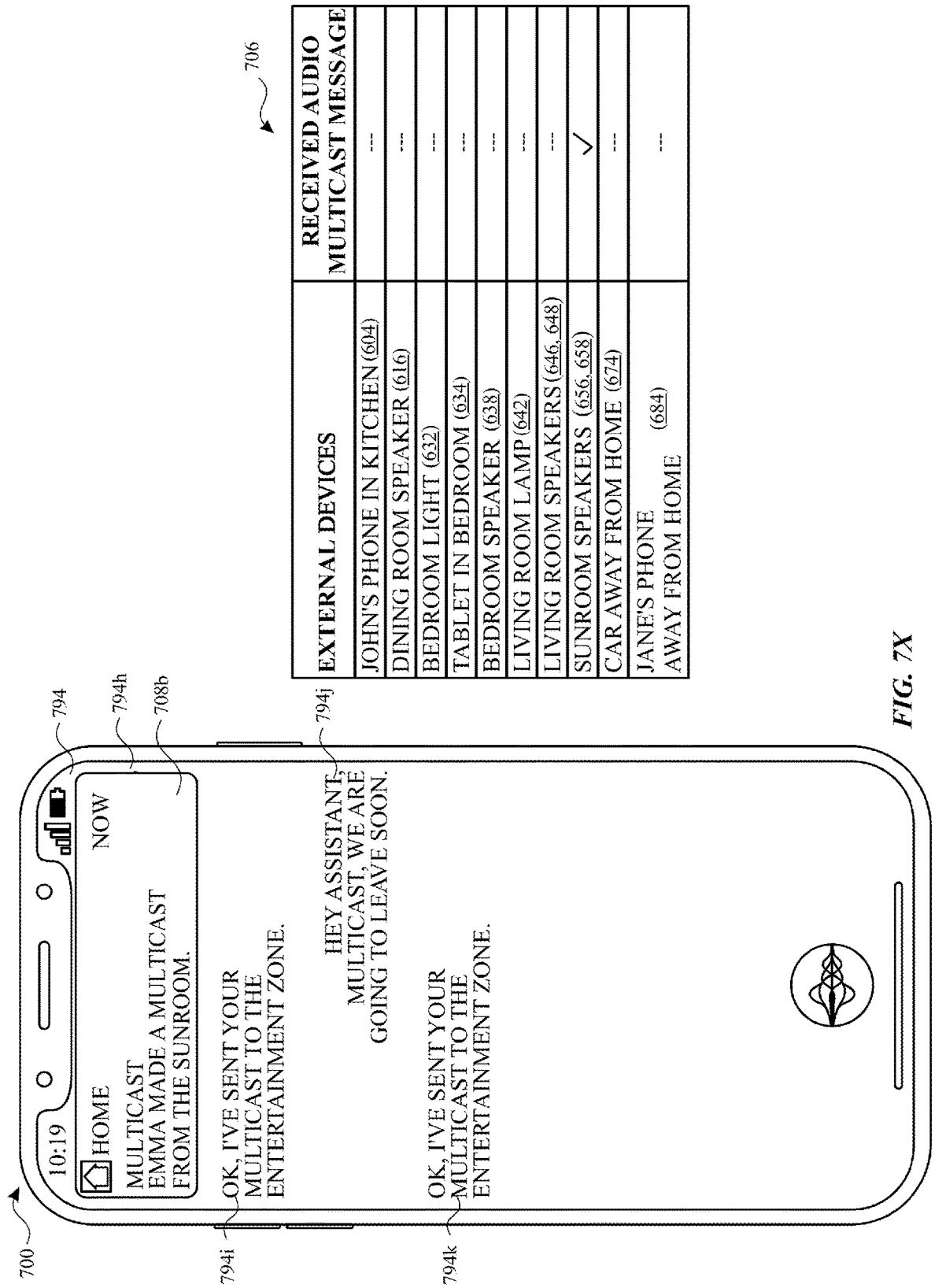
Figure 7Y:
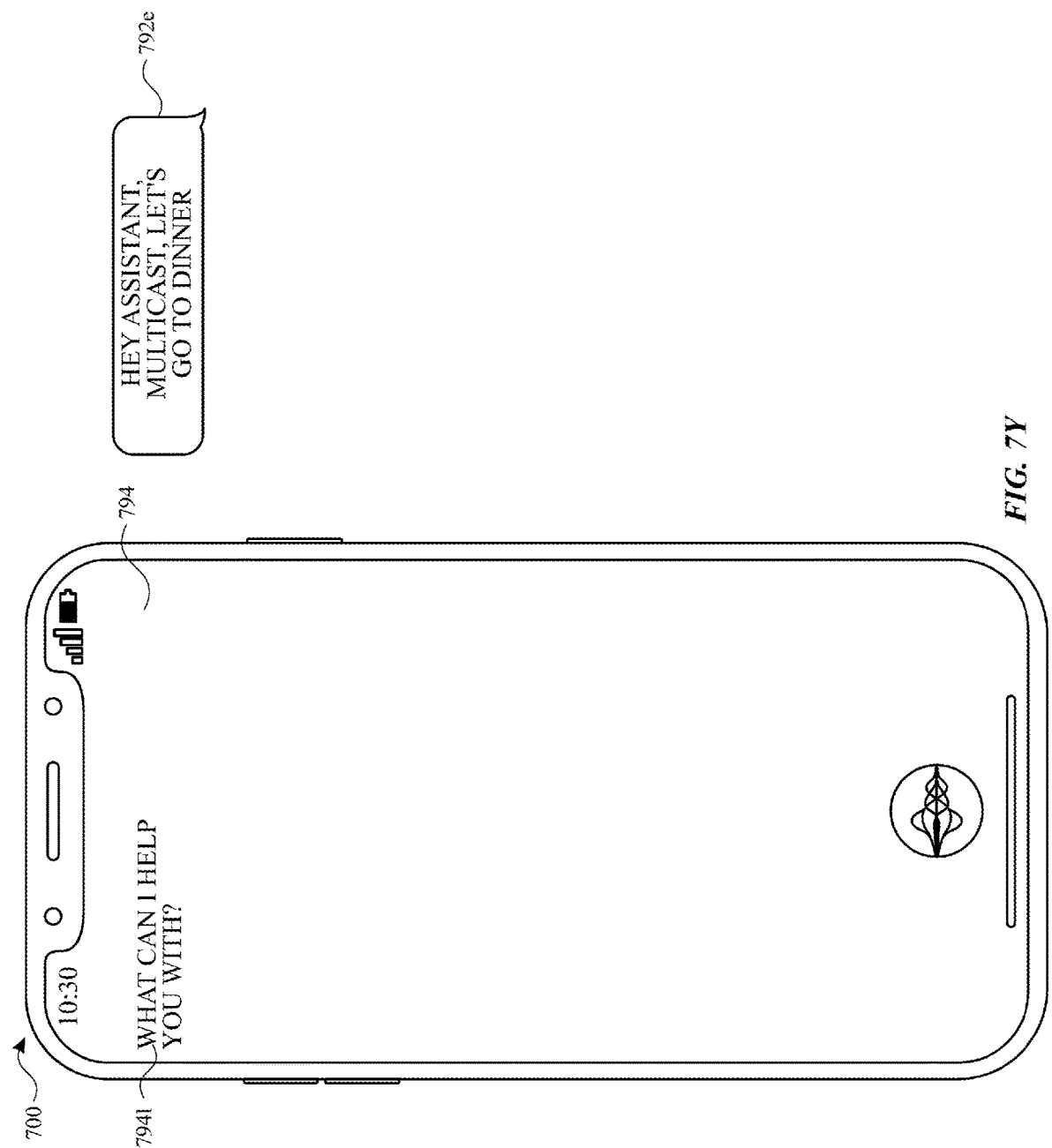
Figure 7Z:
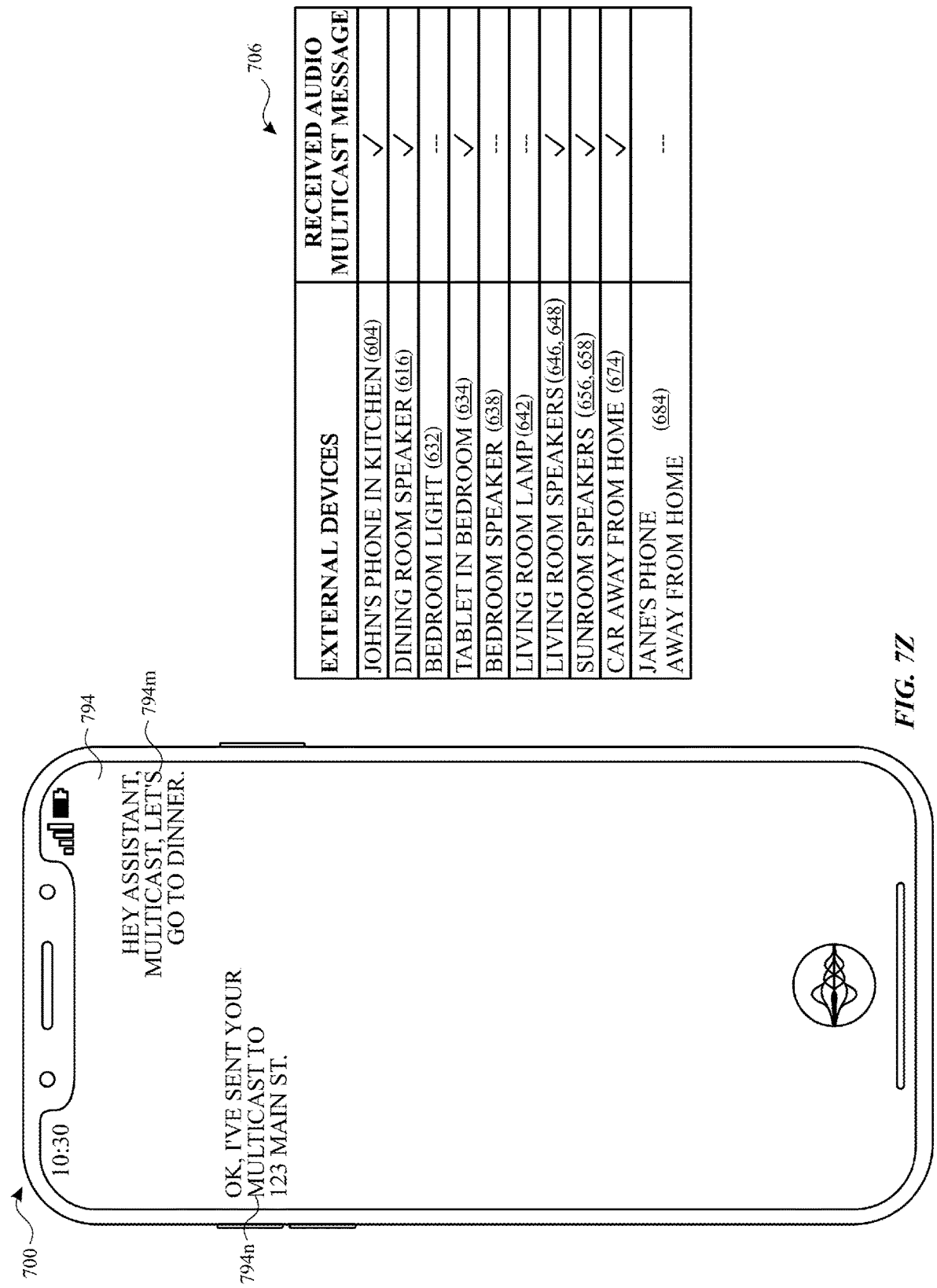
Figure 7A:
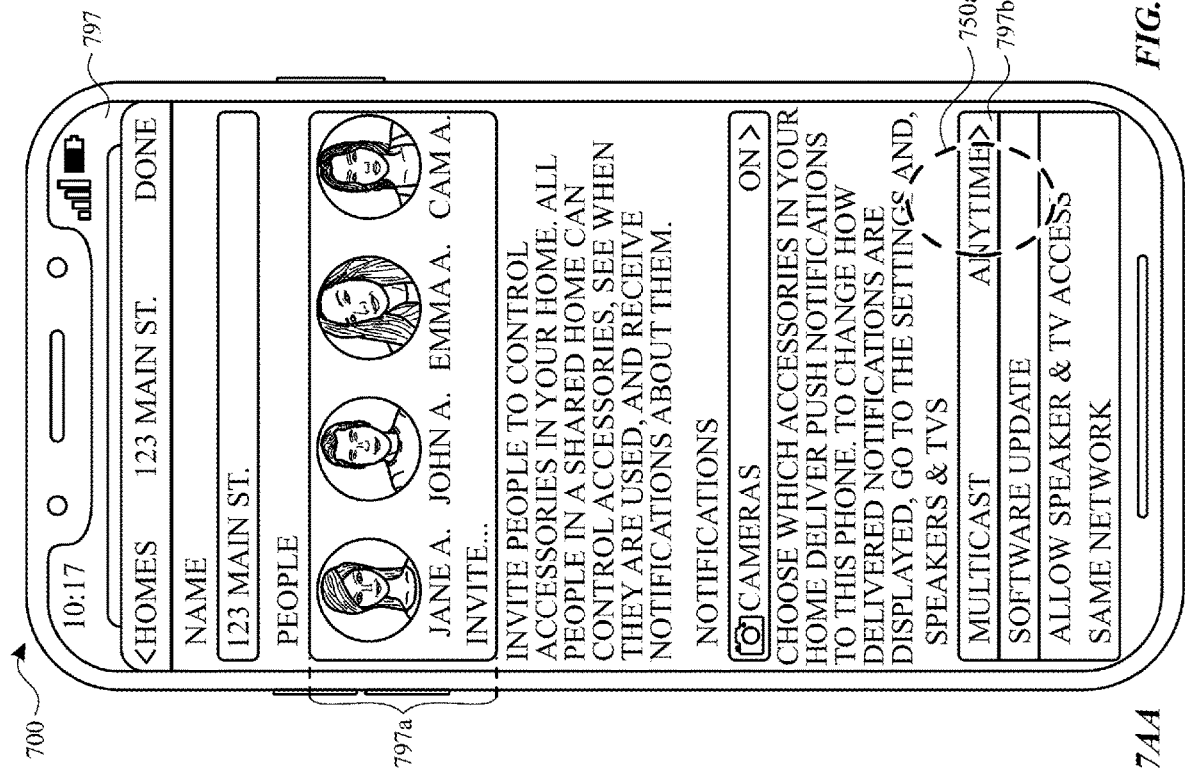
Figure 7A:
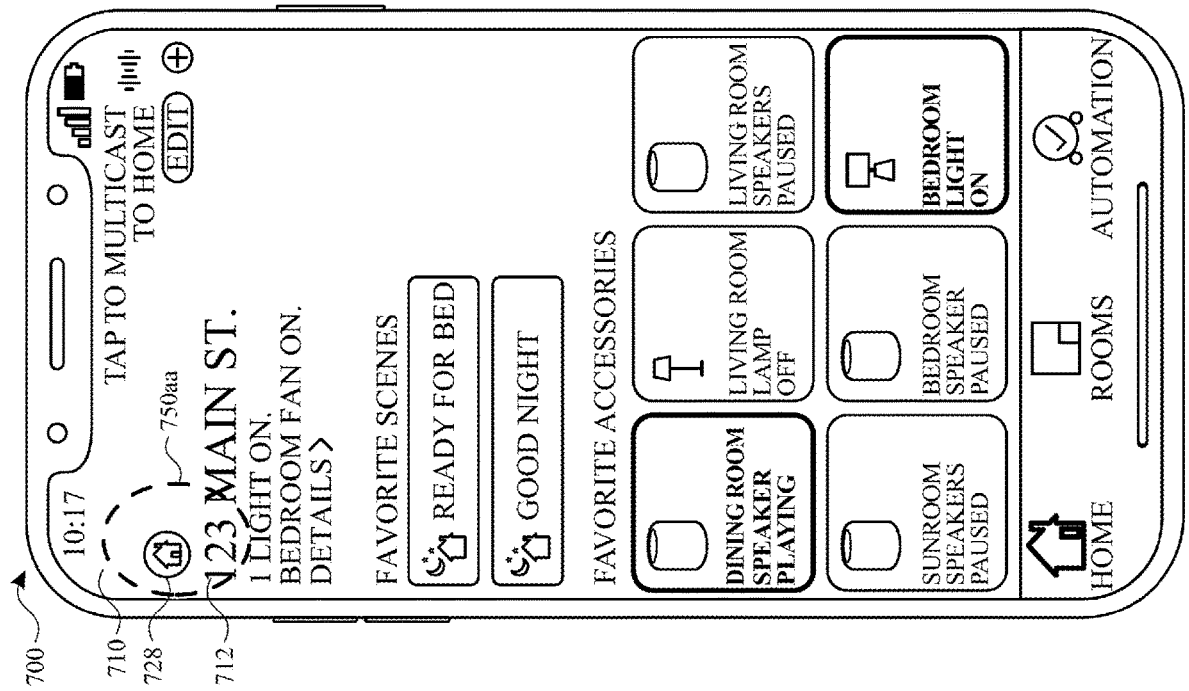
Figure 7A:
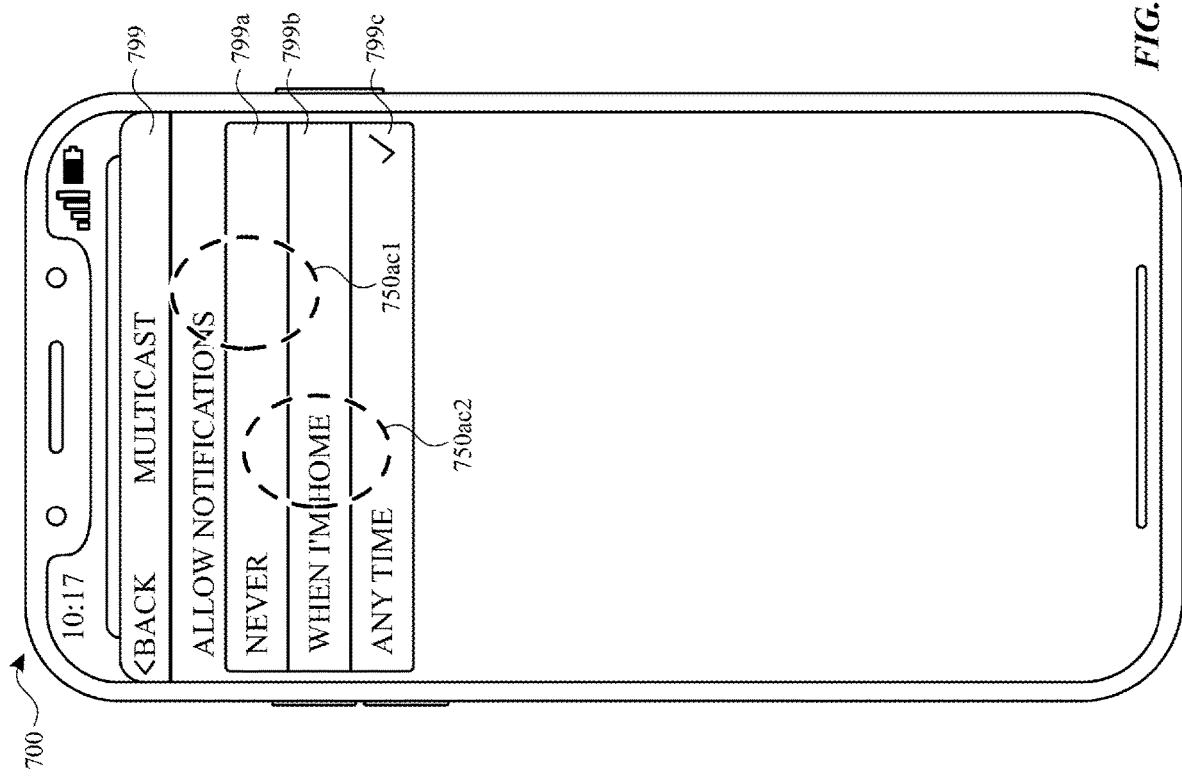
Figure 7A:
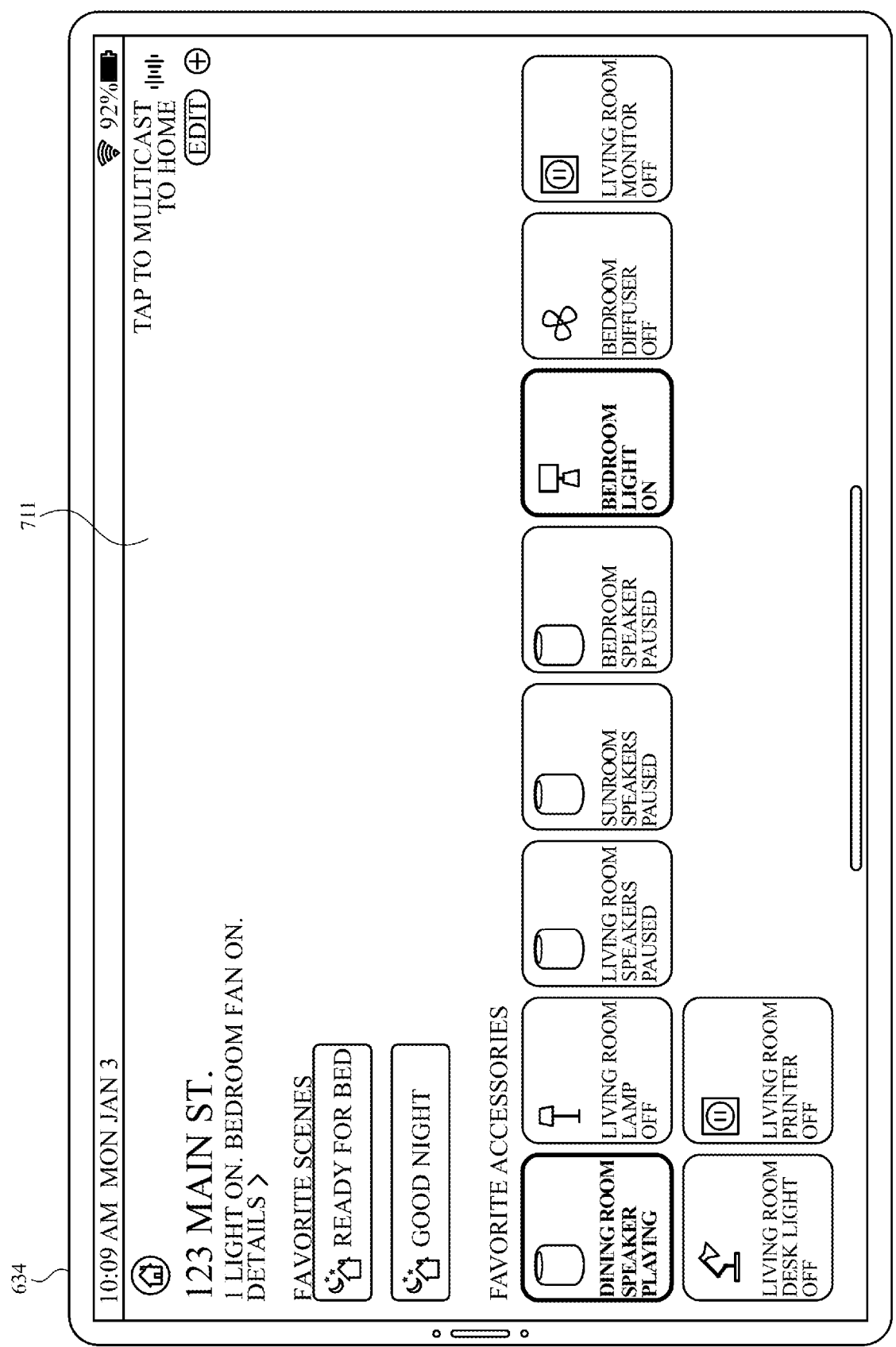
Figure 7A:
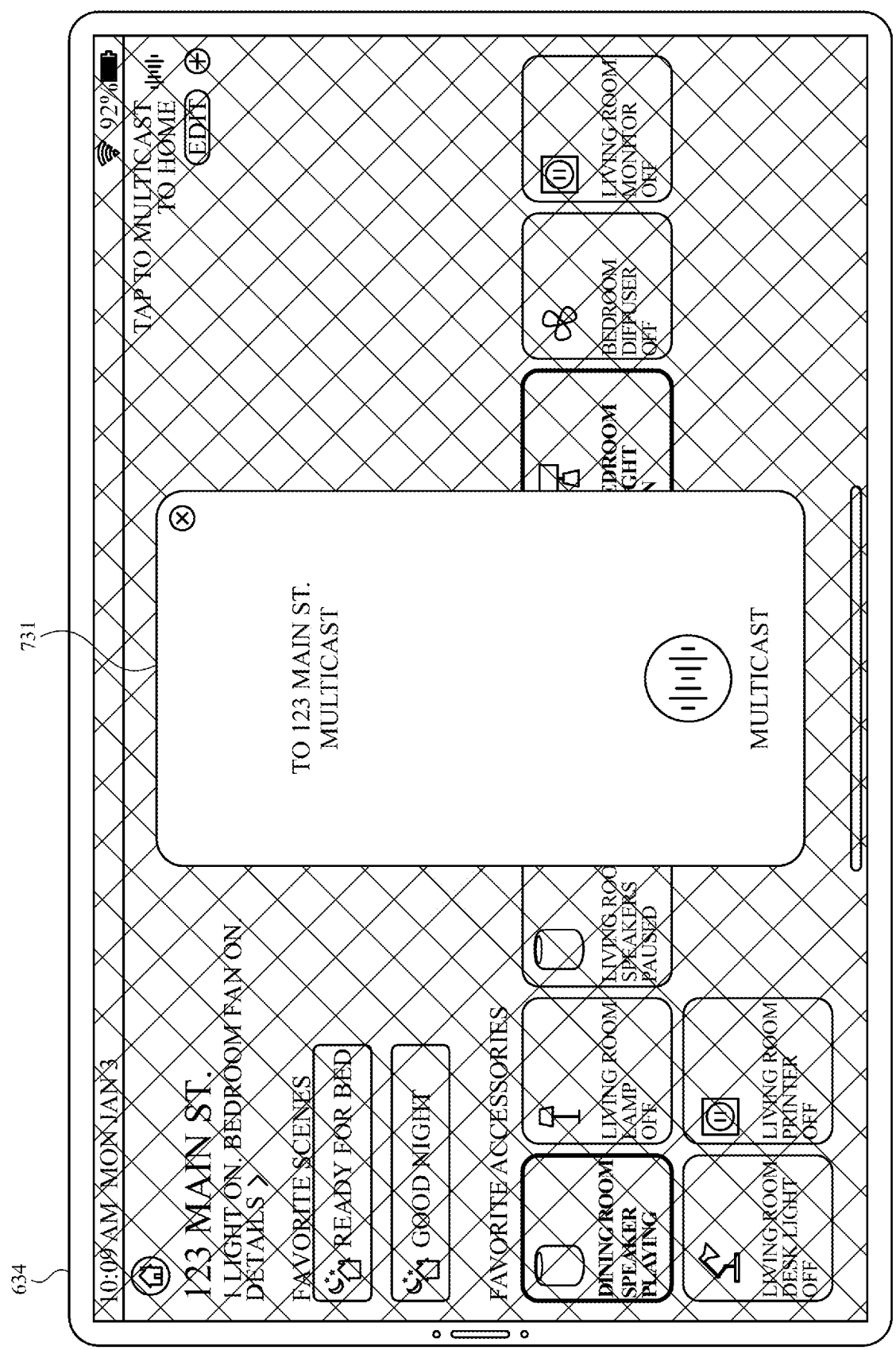
Figure 7A:
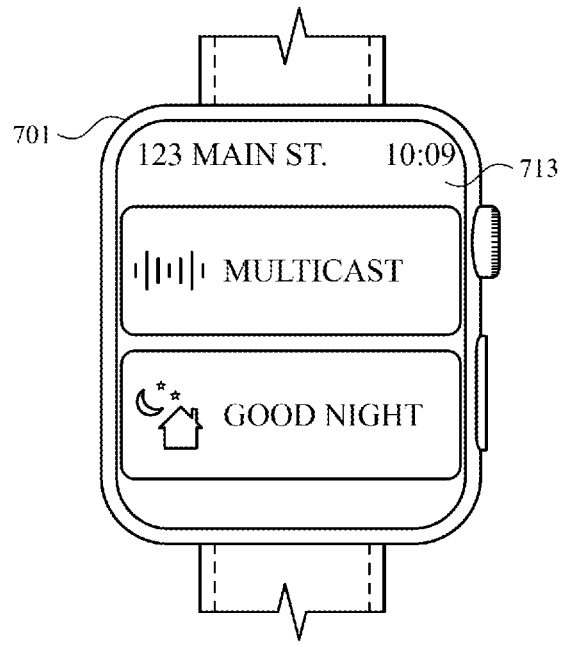
Figure 7A:
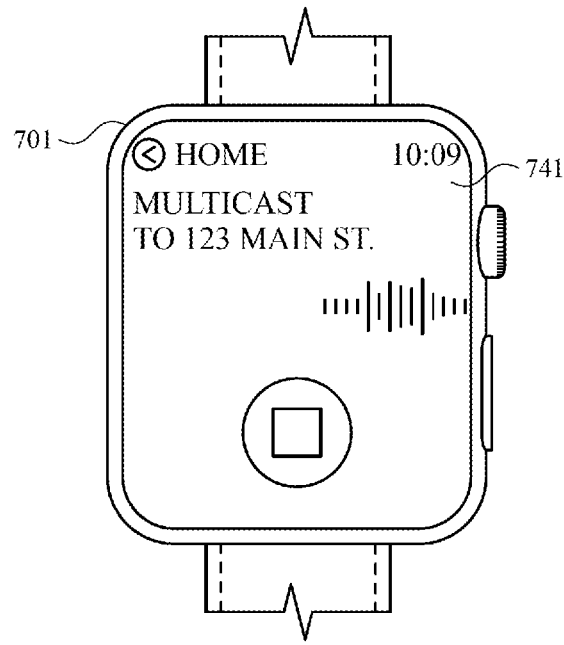
Figure 7A:
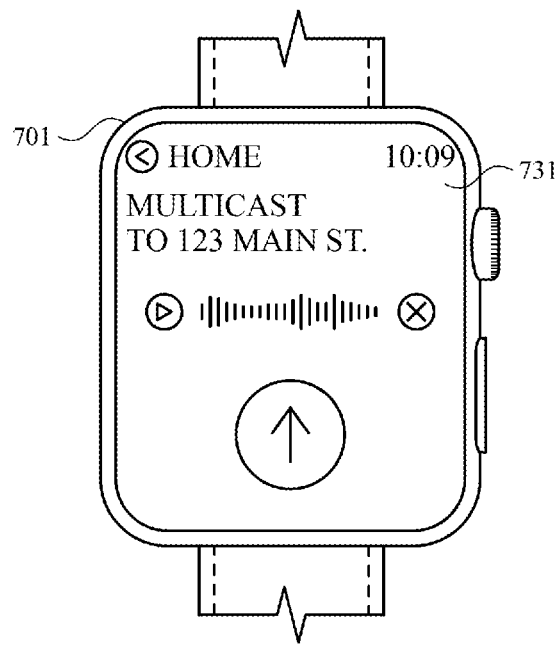
Figure 8A:
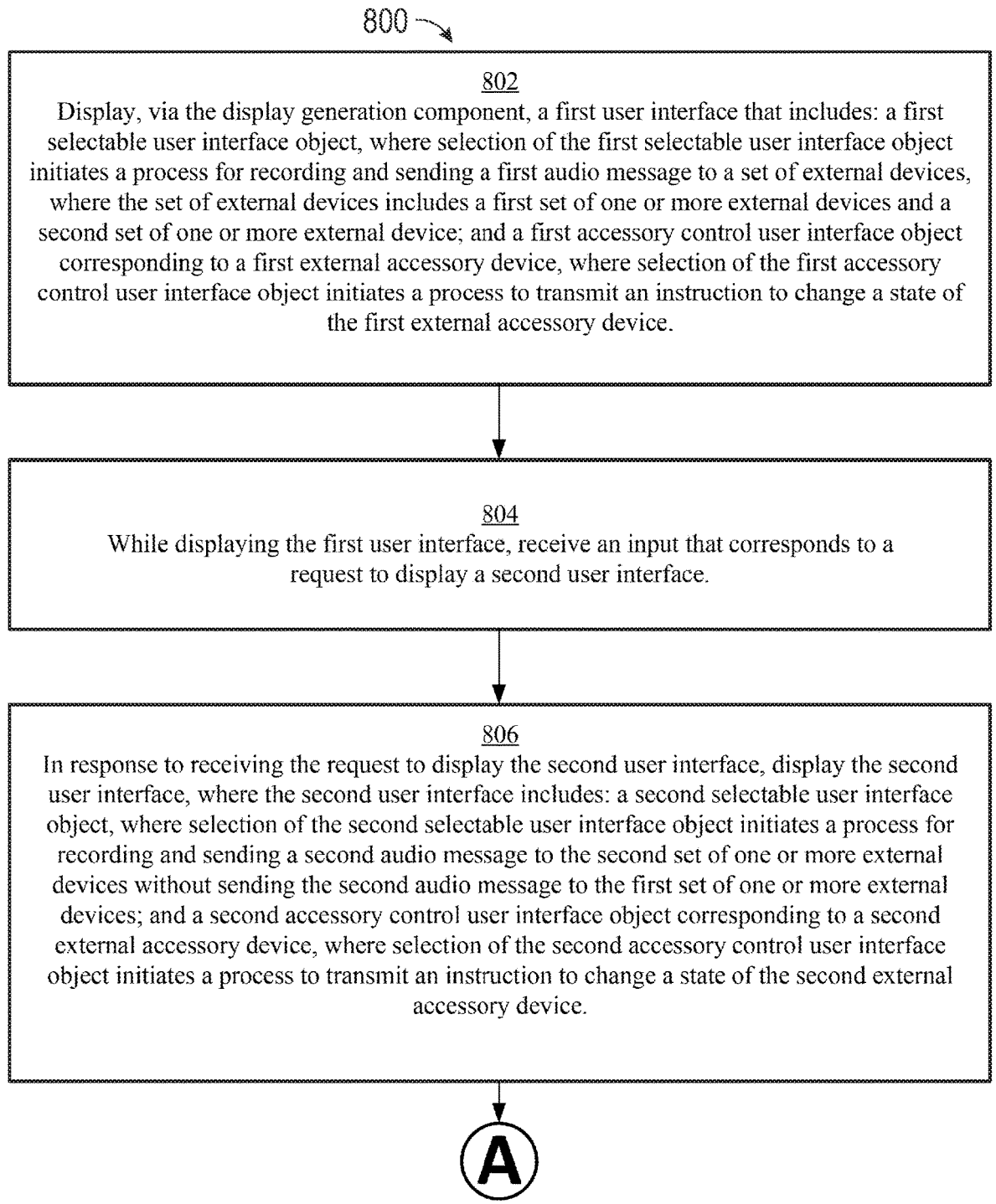
FIGS. 8A-8B are a flow diagram illustrating a method for sending an audio message in accordance with some embodiments.
Figure 8B:
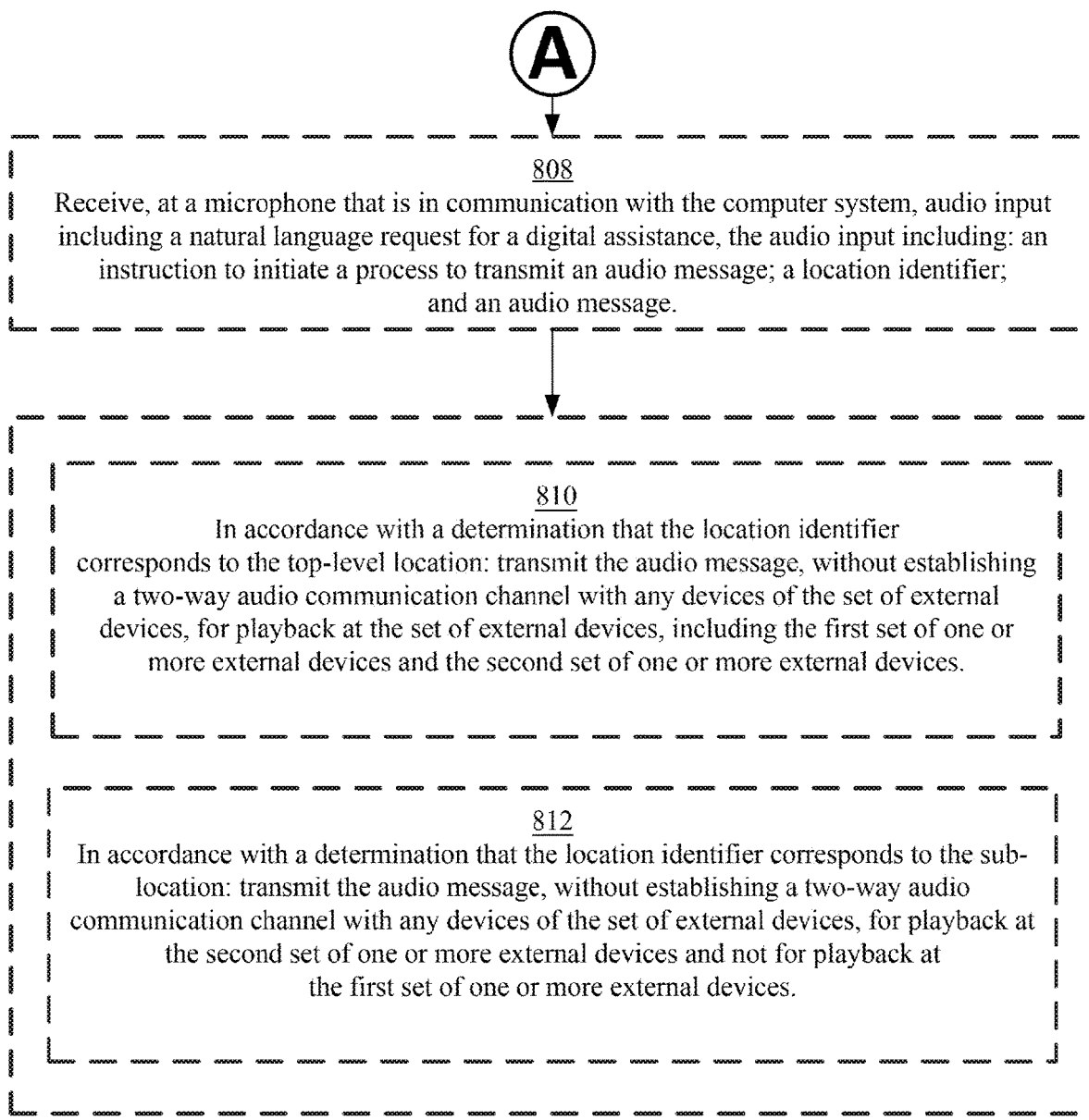

FIGS. 7A-7AH illustrate exemplary user interfaces for sending an audio message, in accordance with some embodiments. FIGS. 8A-8B are a flow diagram illustrating a method for sending an audio message, in accordance with some embodiments. The user interfaces in FIGS. 7A-7AH are used to illustrate the processes described below, including the processes in FIGS. 8A-8B.

Figures 9A, 9B:
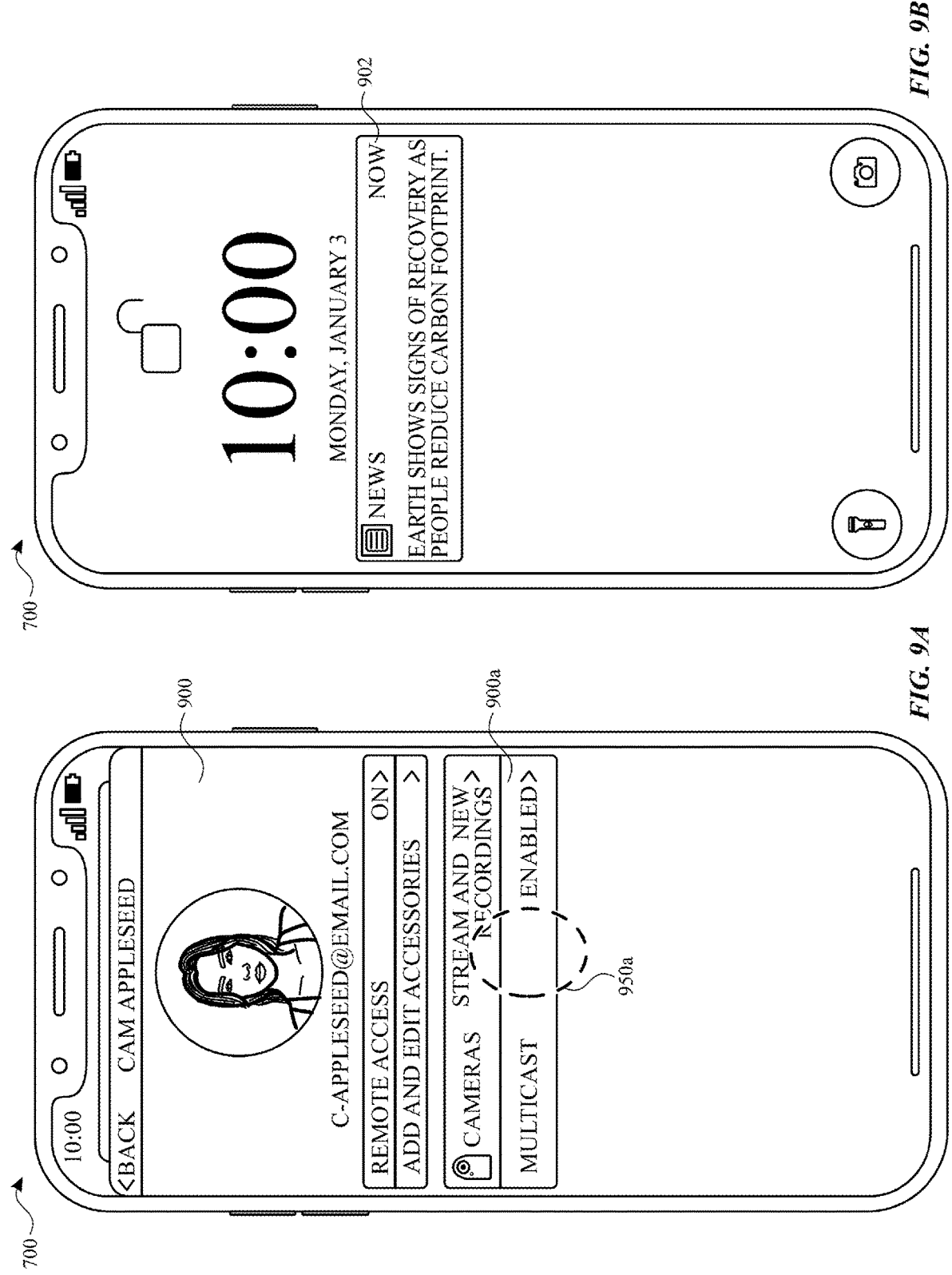
FIGS. 9A-9X illustrate exemplary user interfaces for displaying notifications in accordance with some embodiments.
Figure 9C:
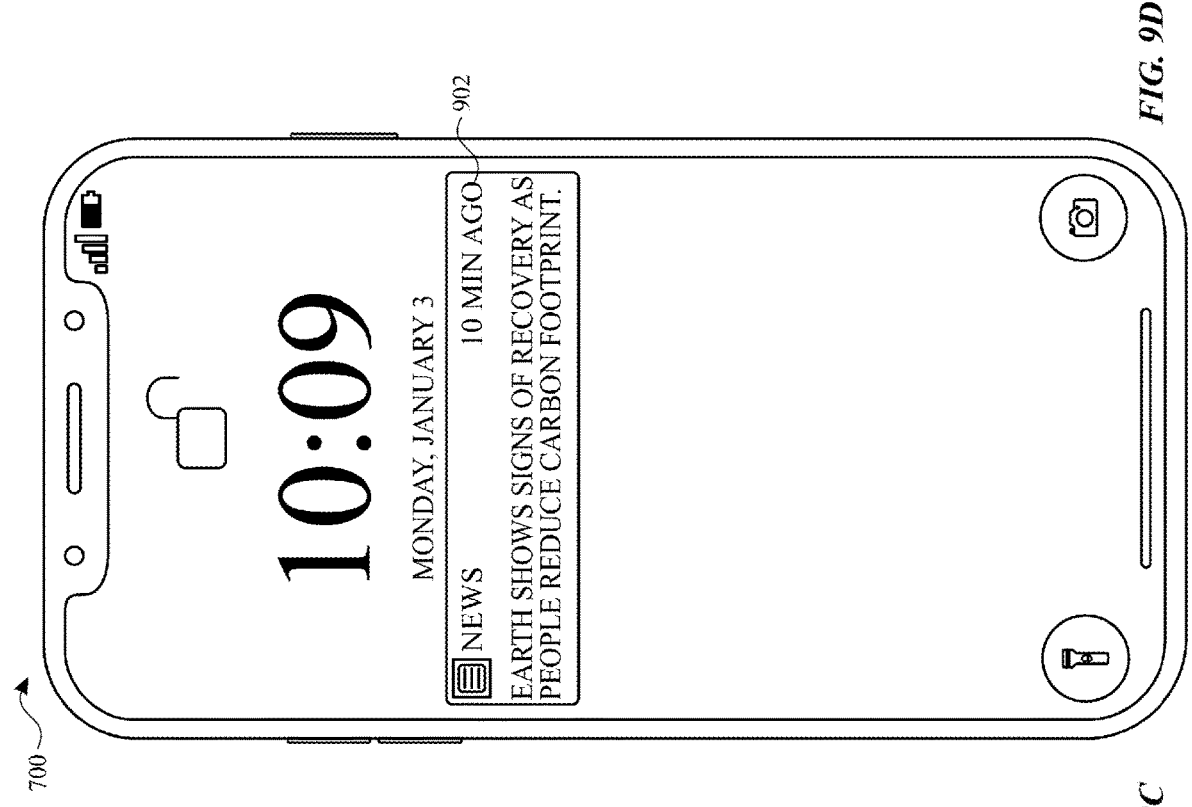
Figure 9D:
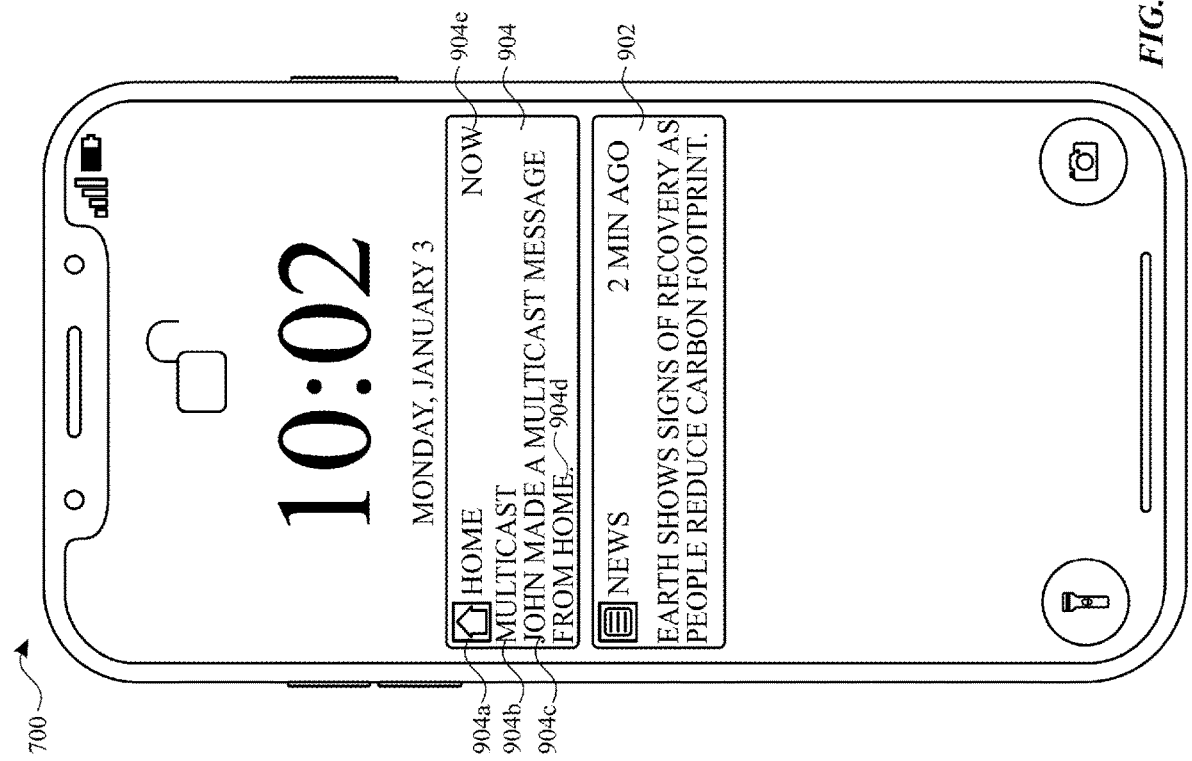
Figure 9F:
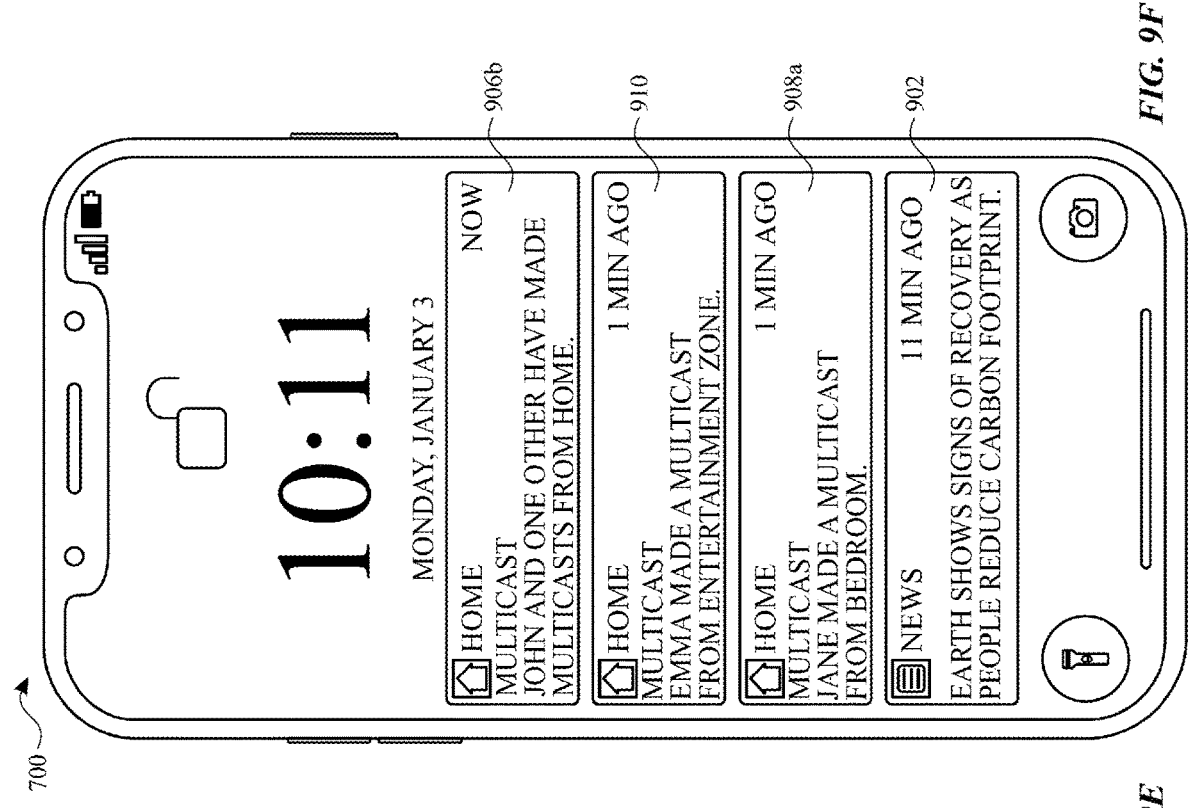
Figure 9E:
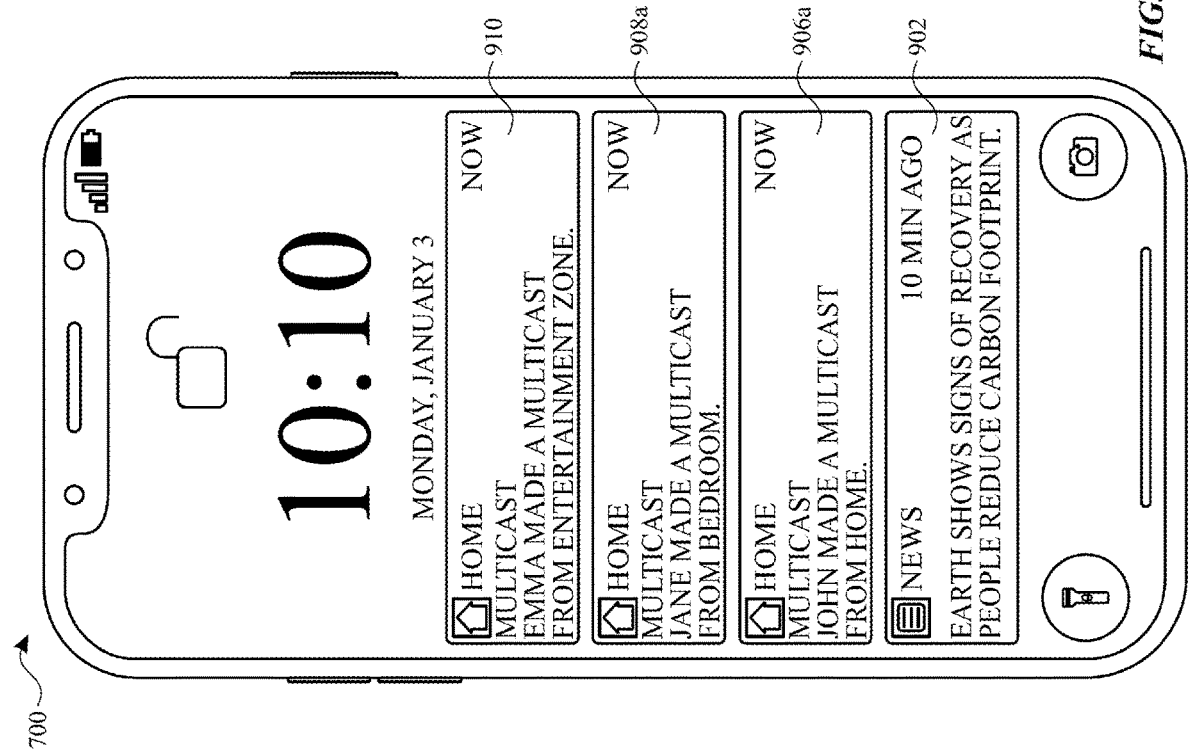
Figure 9N:
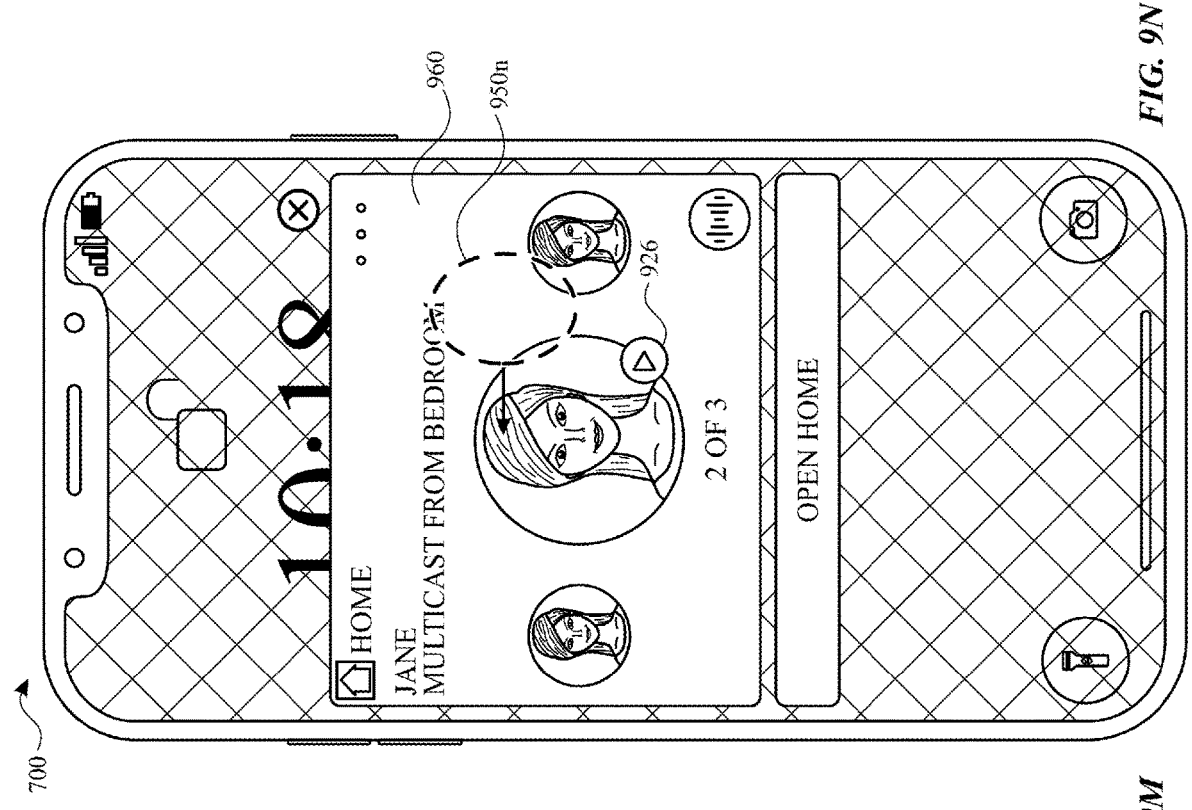
Figure 9M:
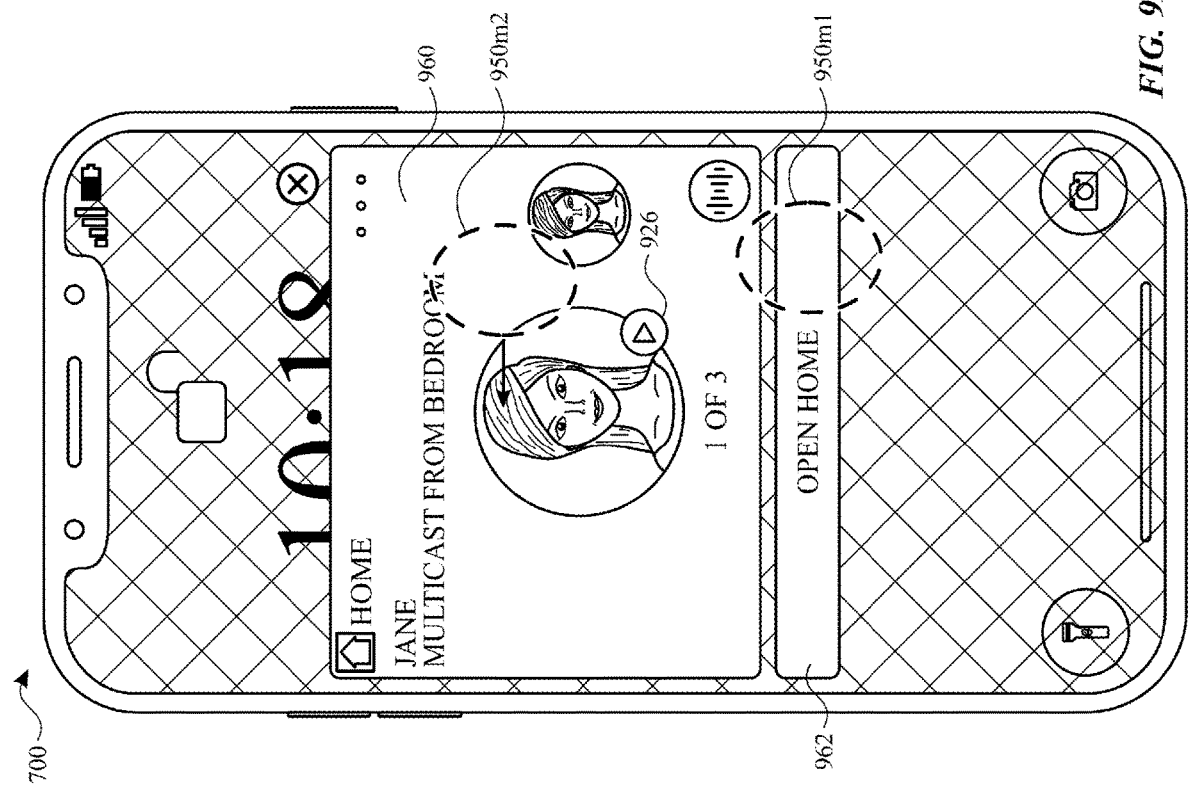
Figure 9O:
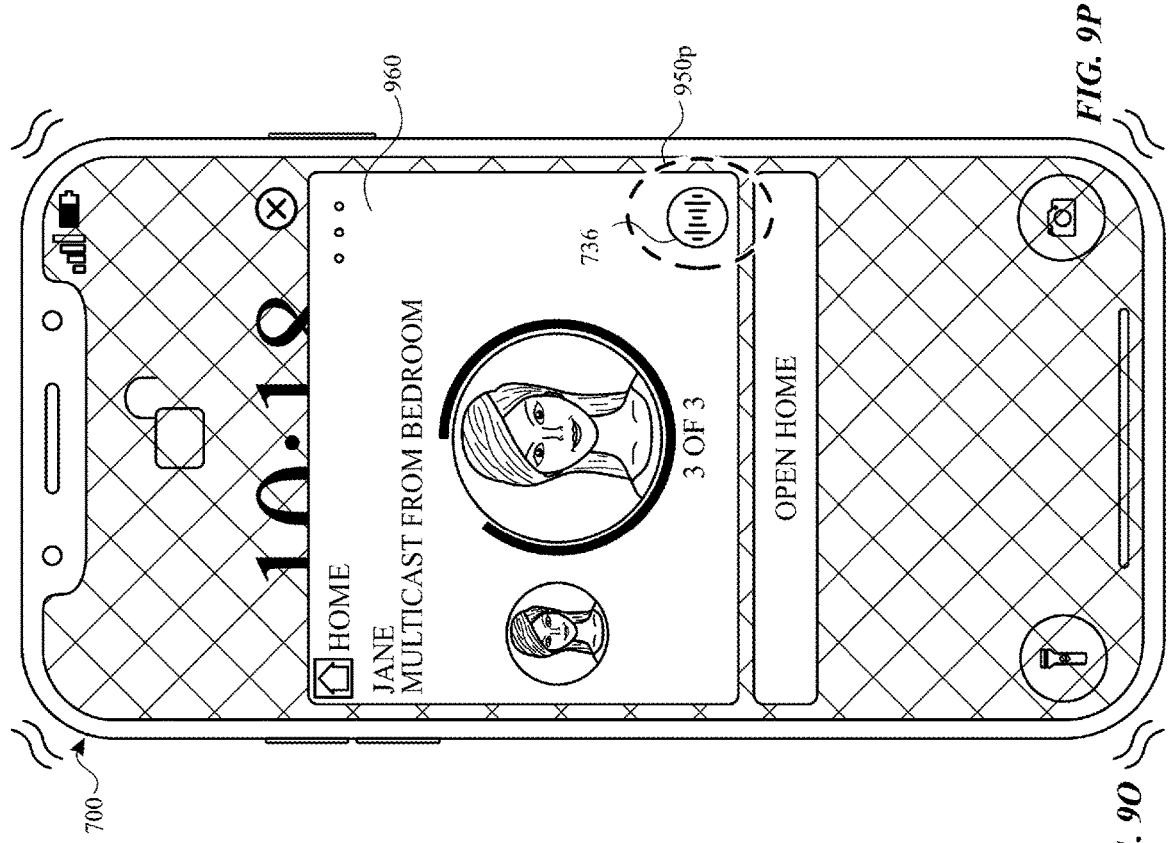
Figure 9P:
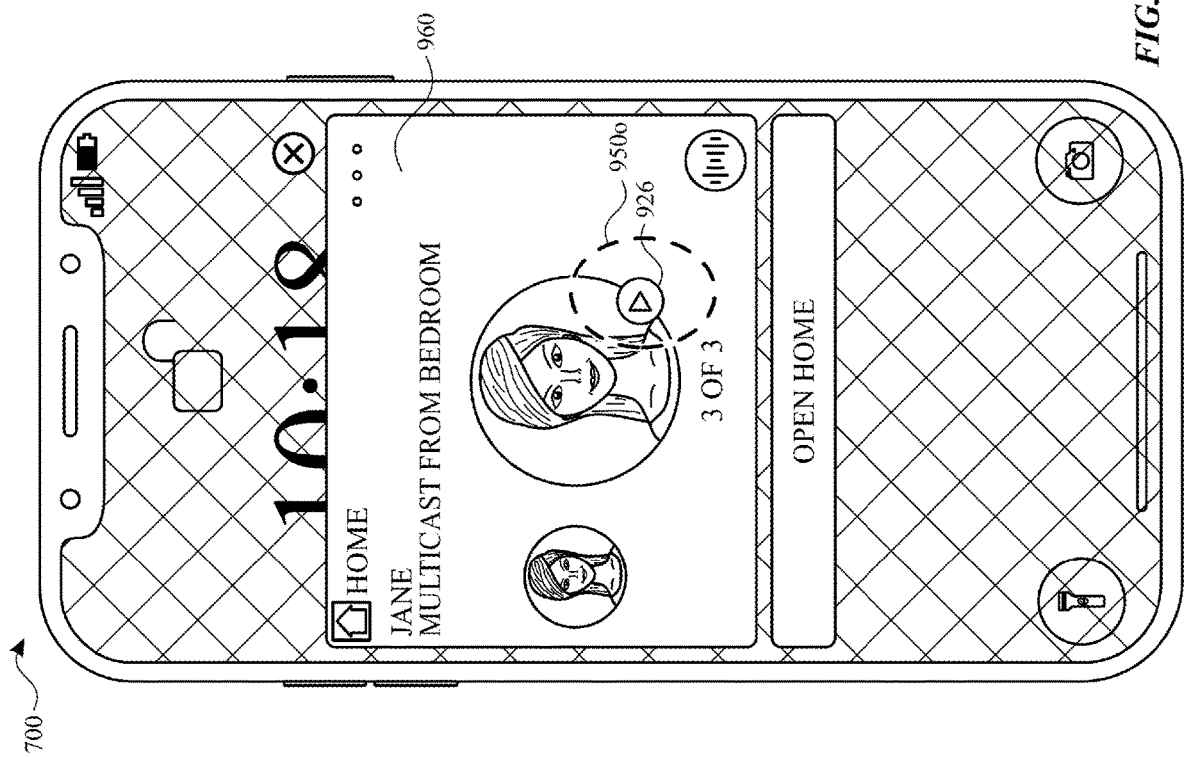
Figure 9Q:
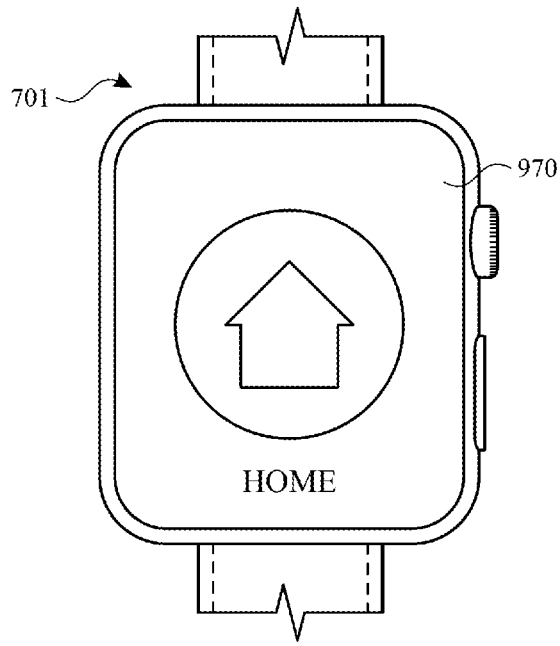
Figure 9R:
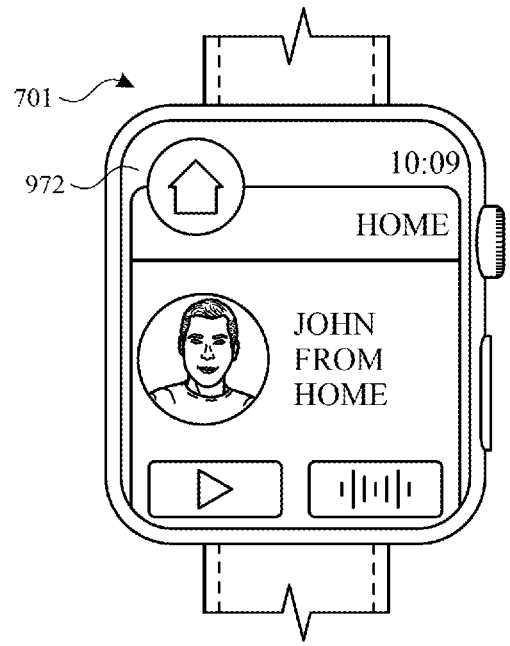
Figure 9S:
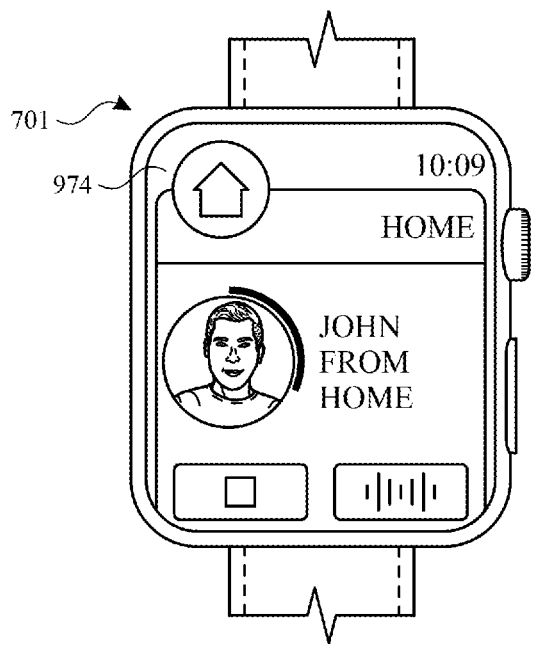
Figure 9W:
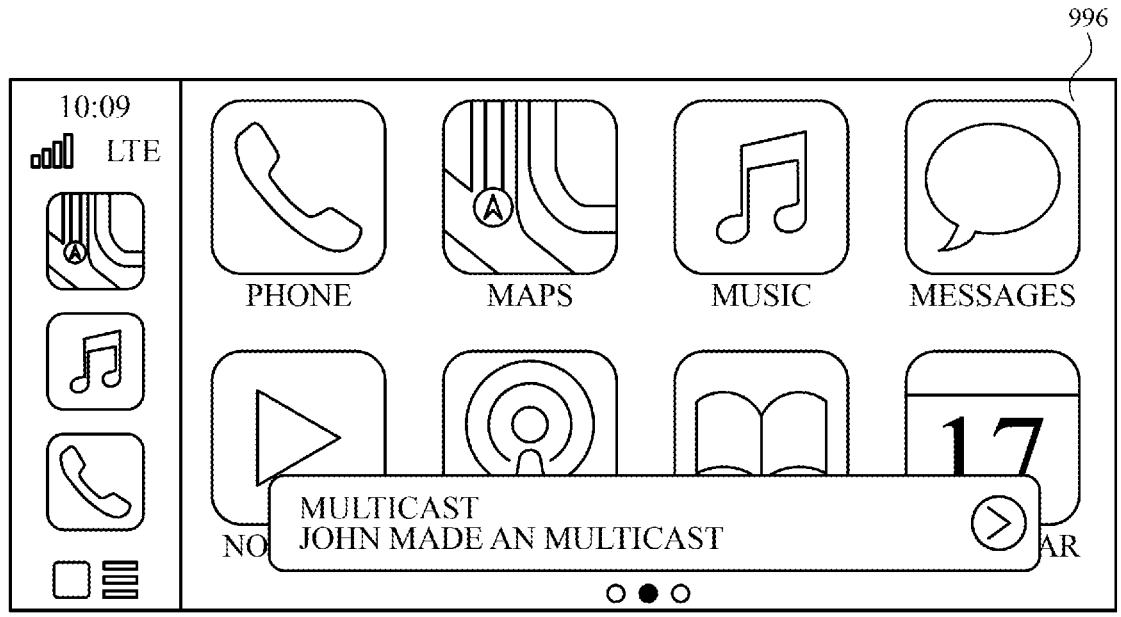
Figure 9X:
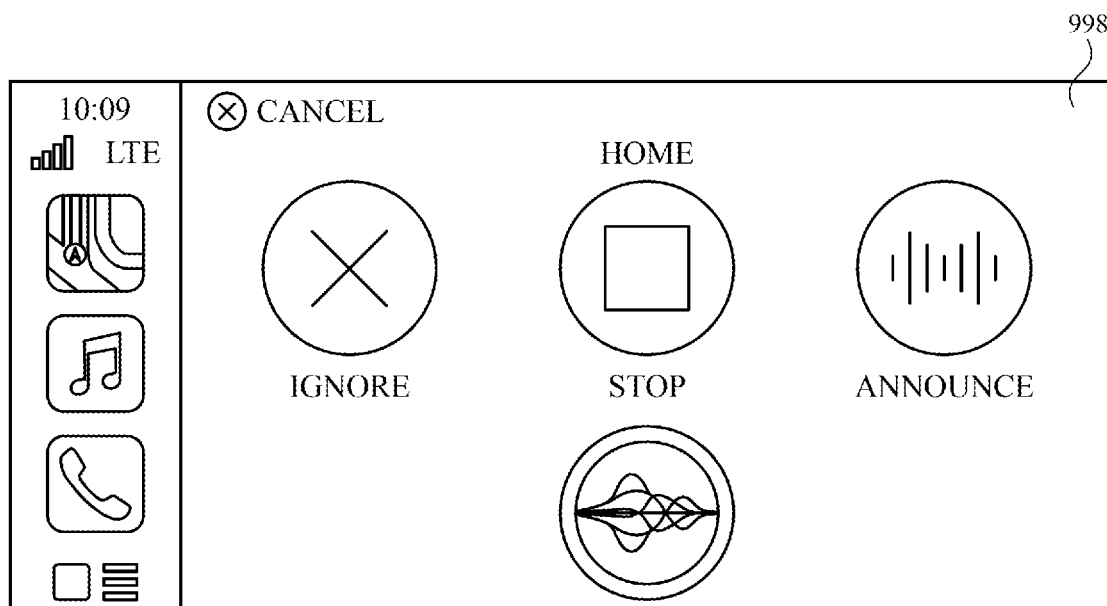
Figure 10:
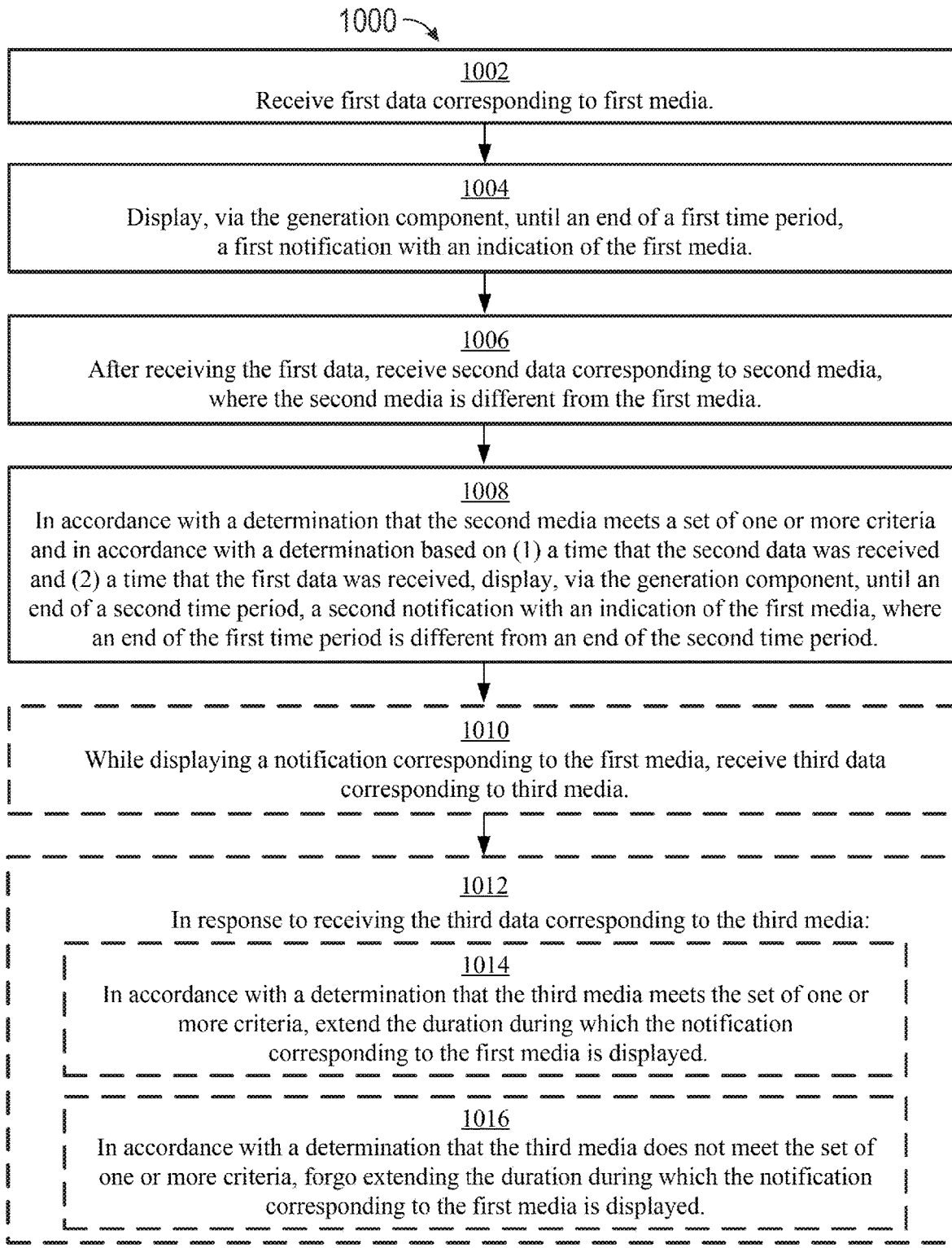
FIG. 10 is a flow diagram illustrating a method for displaying notifications in accordance with some embodiments.

FIGS. 9A-9X illustrate exemplary user interfaces for displaying notifications, in accordance with some embodiments. FIG. 10 is a flow diagram illustrating a method for displaying notifications, in accordance with some embodiments. The user interfaces in FIGS. 9A-9X are used to illustrate the processes described below, including the processes in FIG. 10.

Figure 11A:
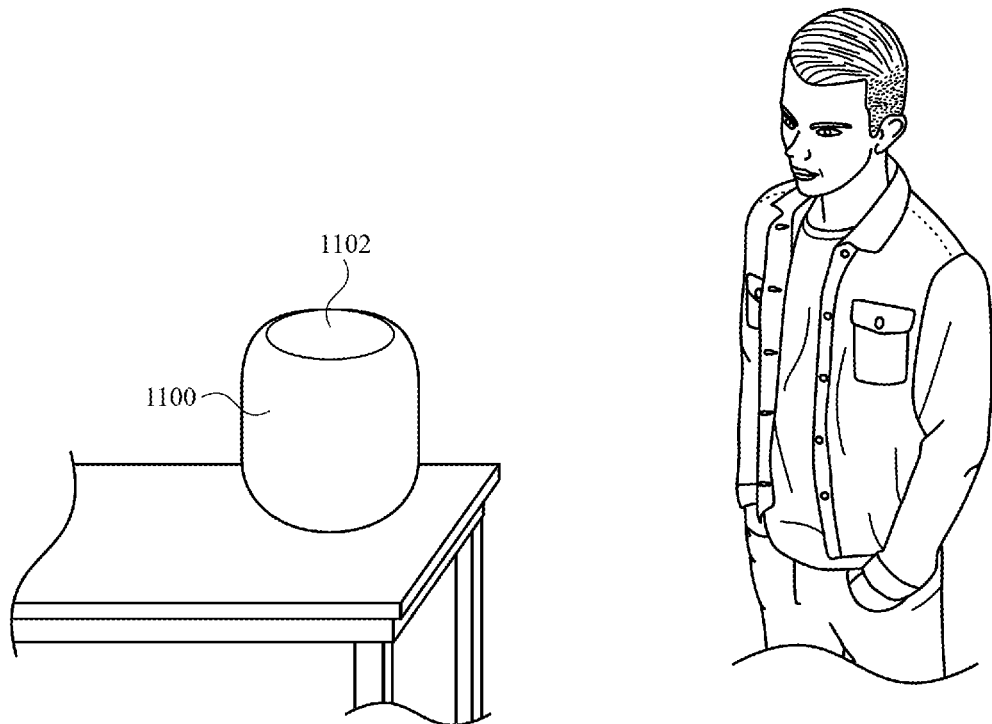
FIGS. 11A-11R illustrate exemplary user interfaces for displaying visual indications, in accordance with some embodiments.
Figure 11B:
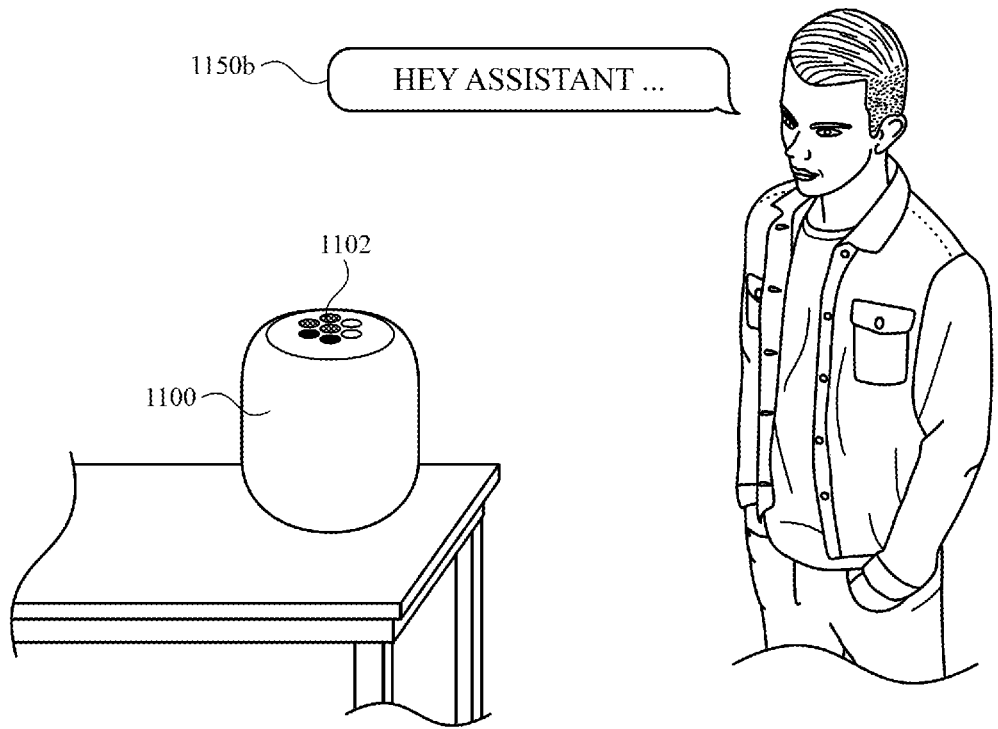
Figure 11C:
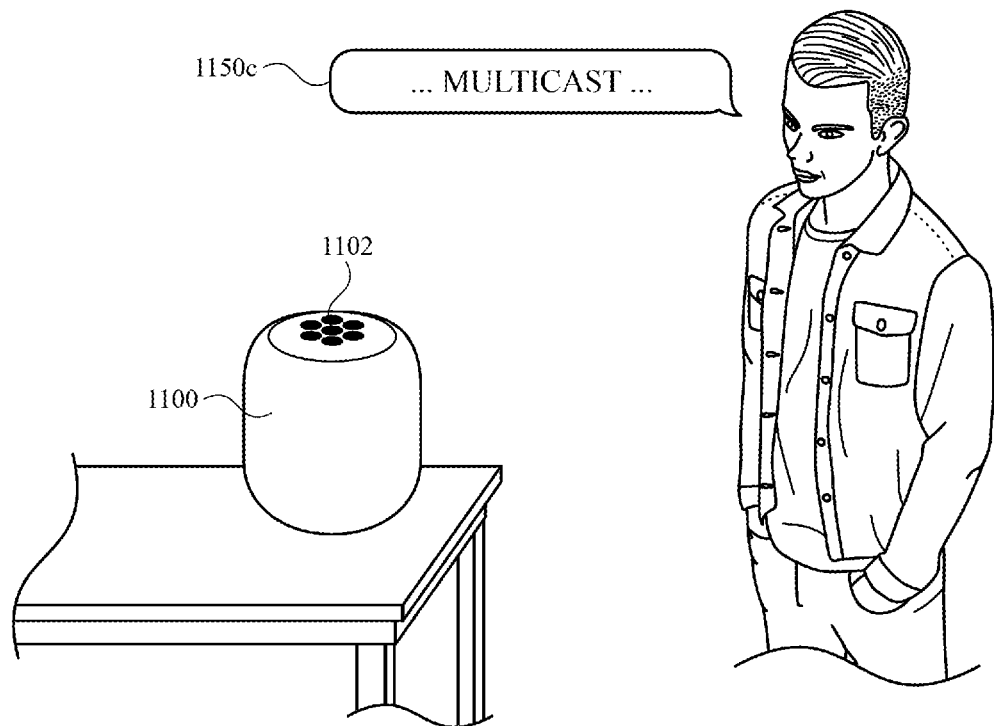
Figure 11D:
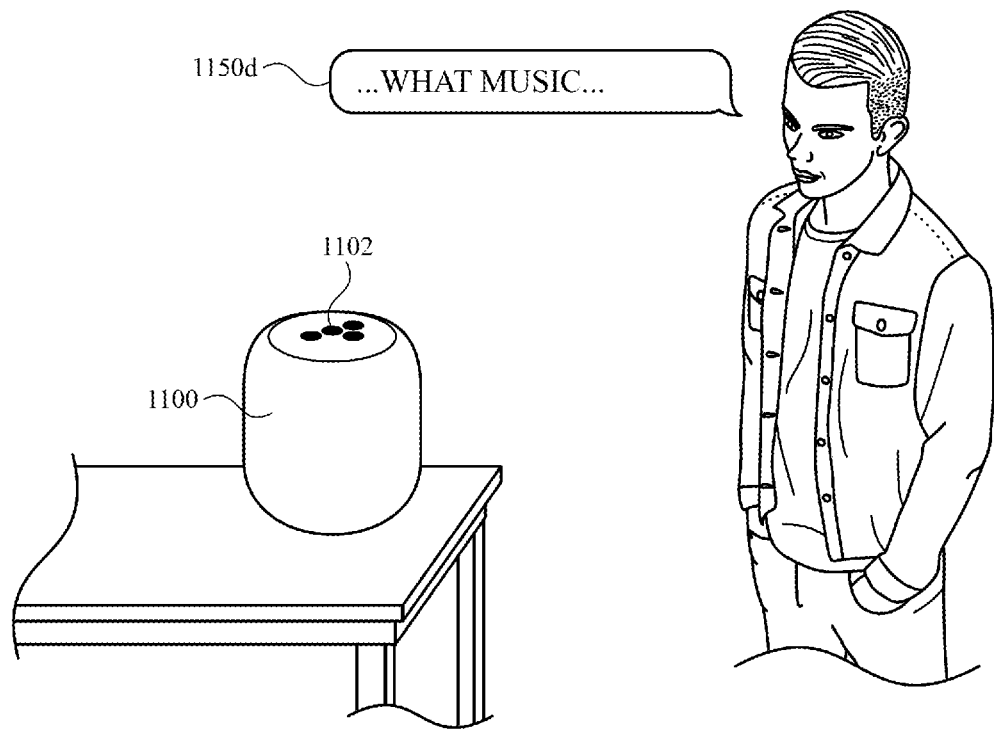
Figure 11E:
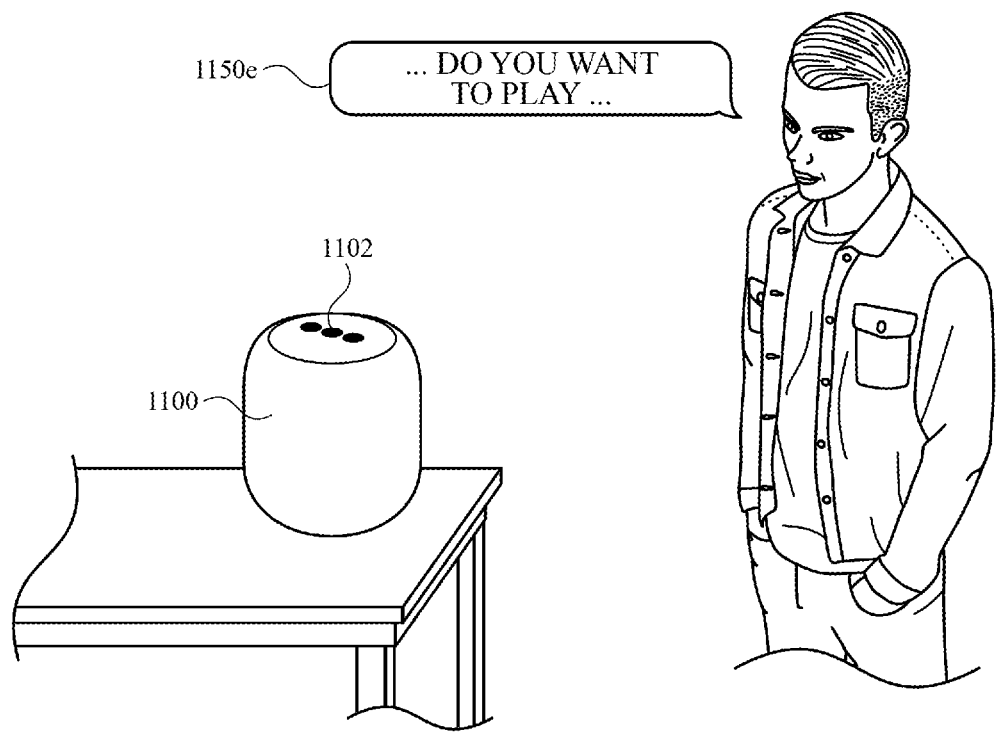
Figure 11F:
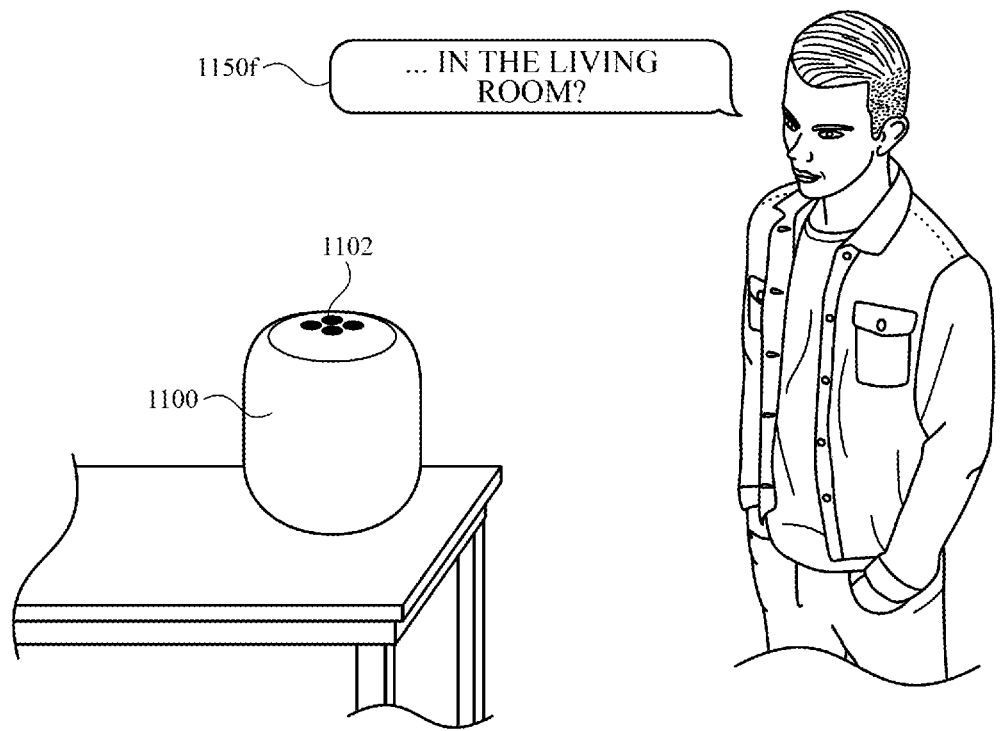
Figure 11G:
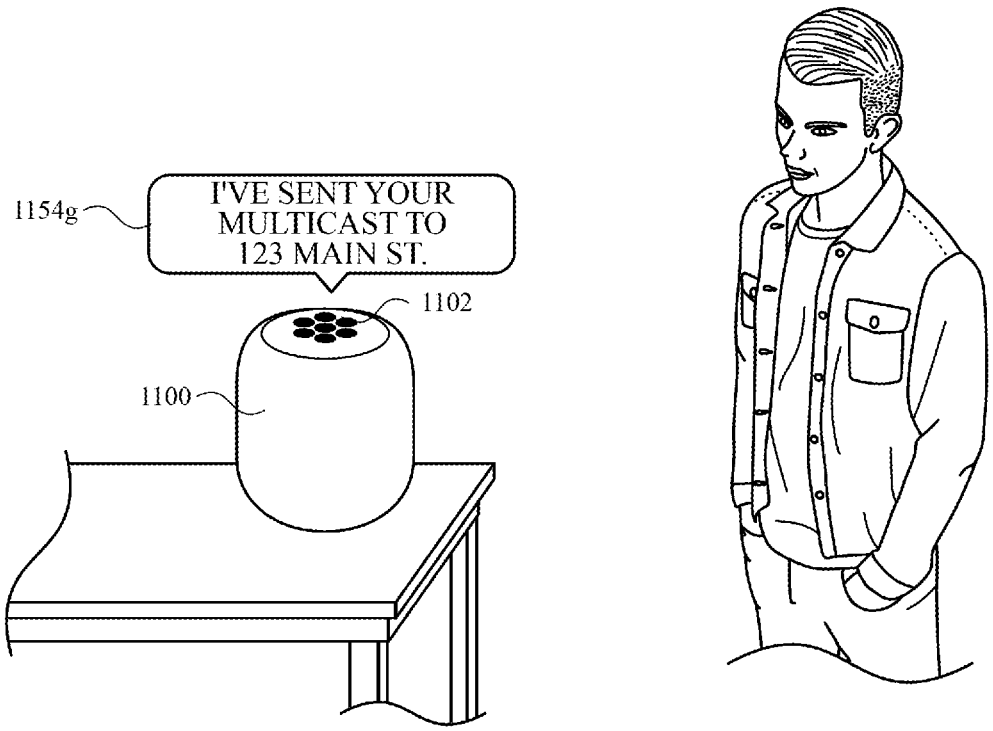
Figure 11H:
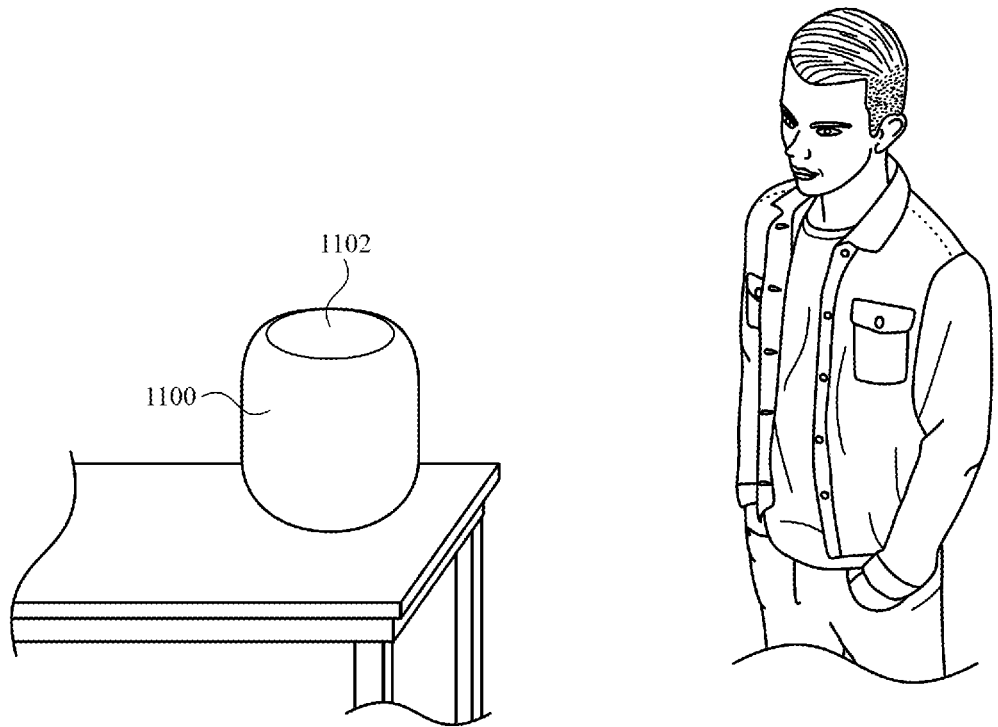
Figure 11I:
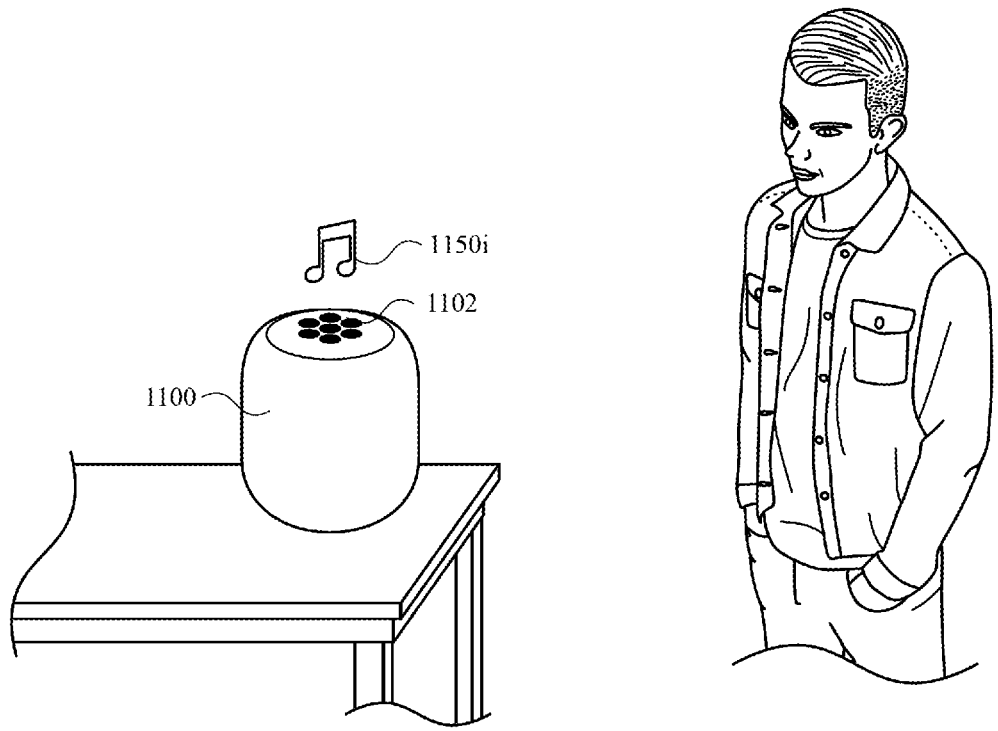
Figure 11J:
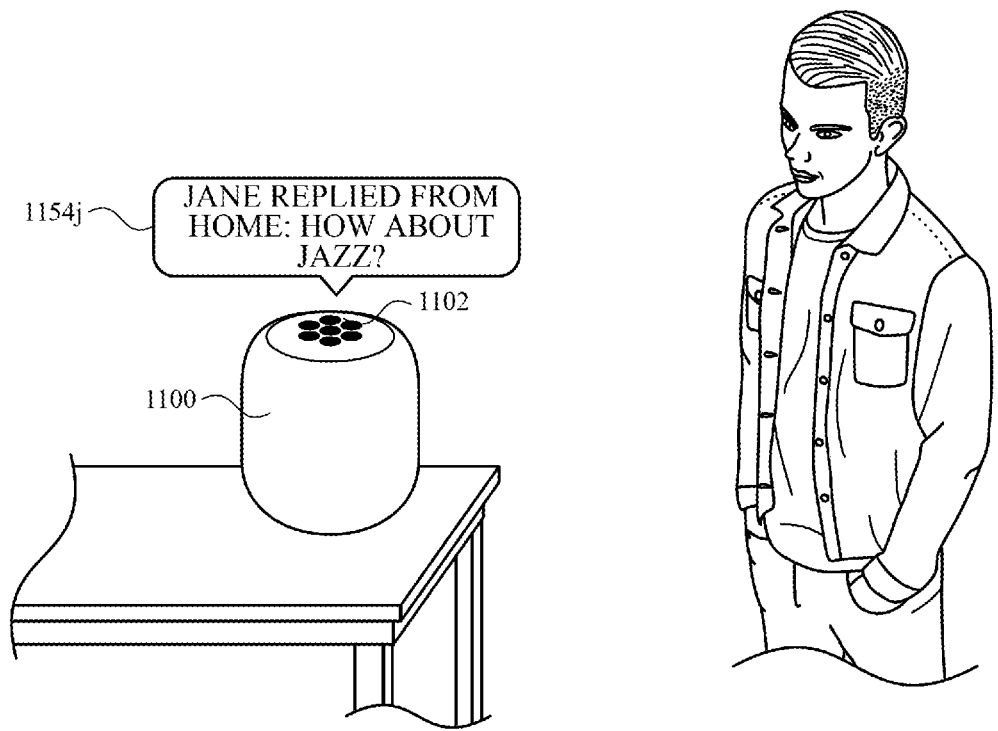
Figure 11K:
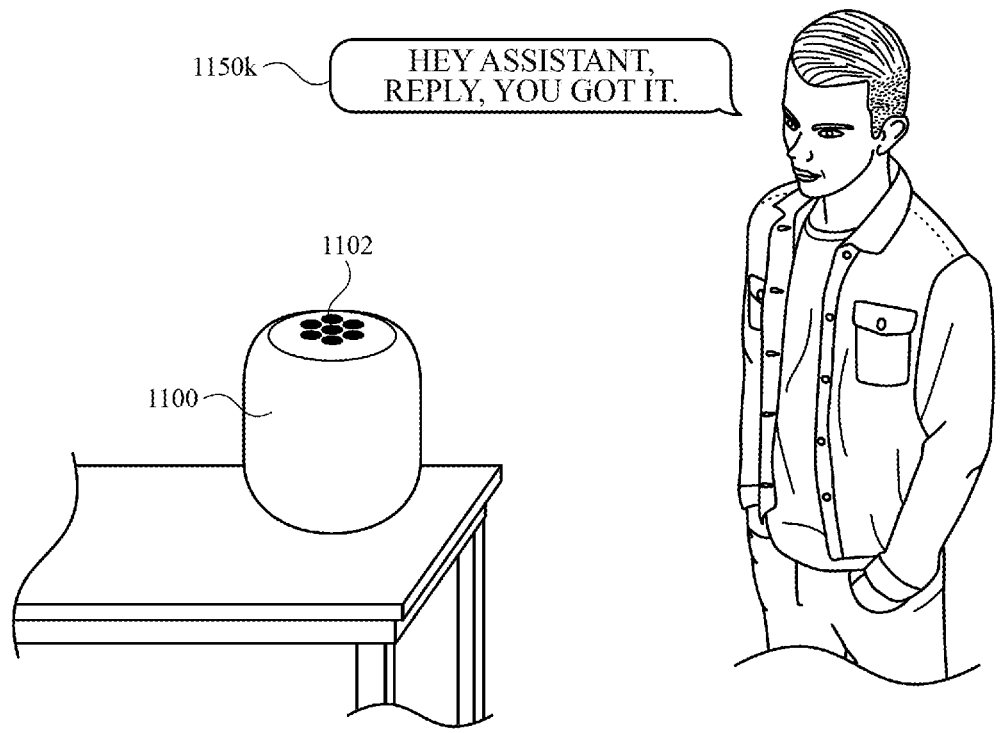
Figure 11L:
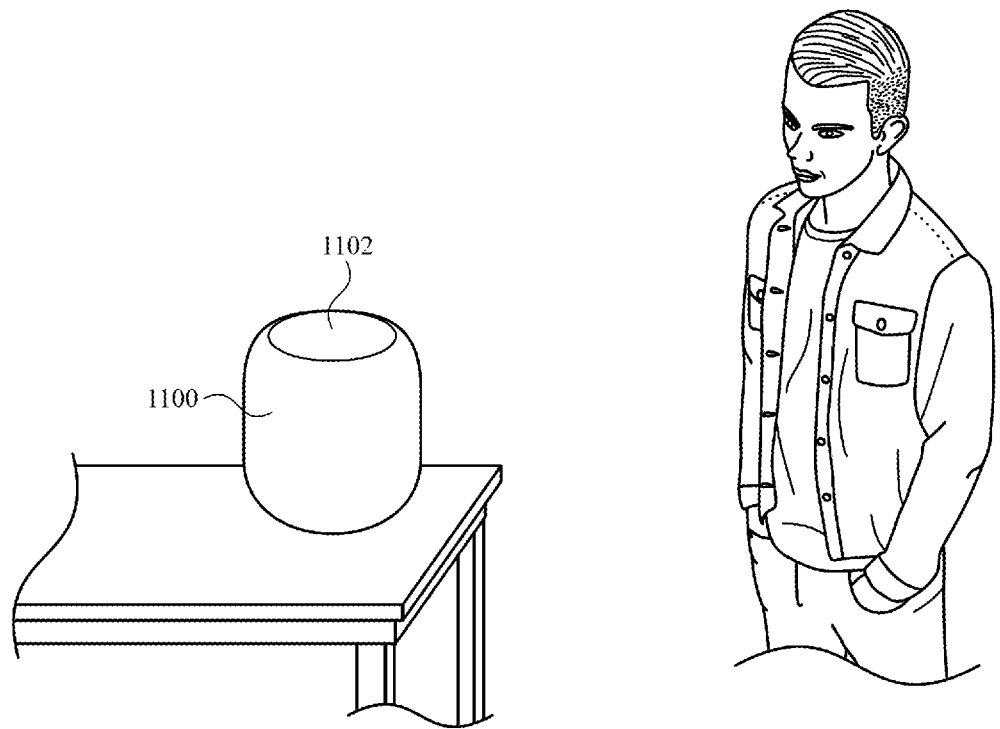
Figure 11M:
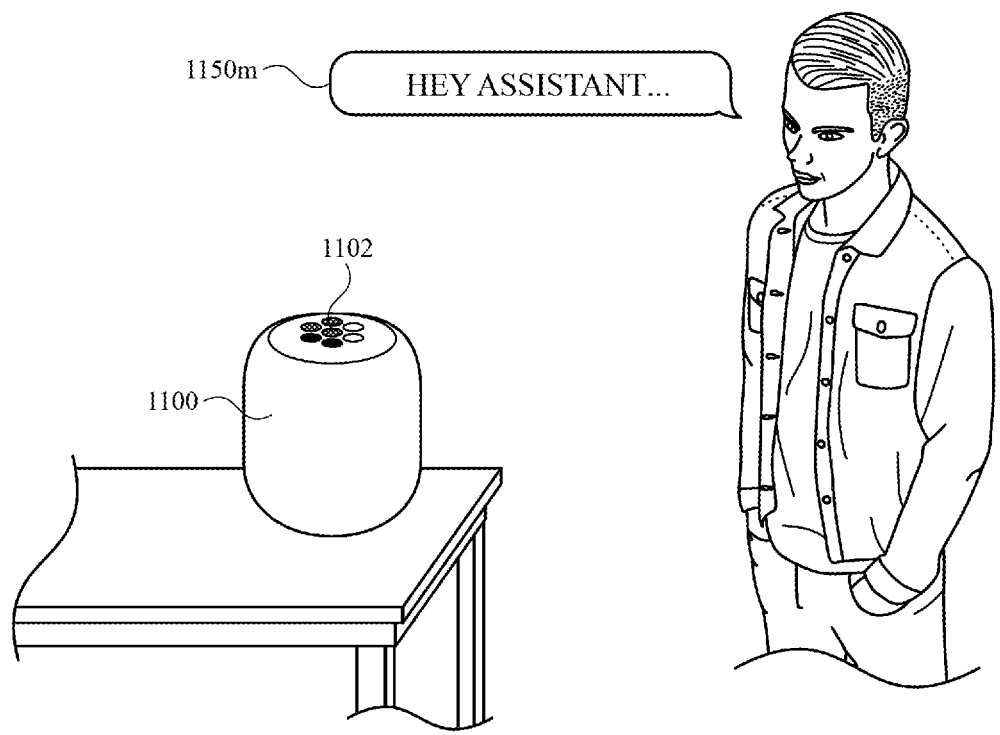
Figure 11N:
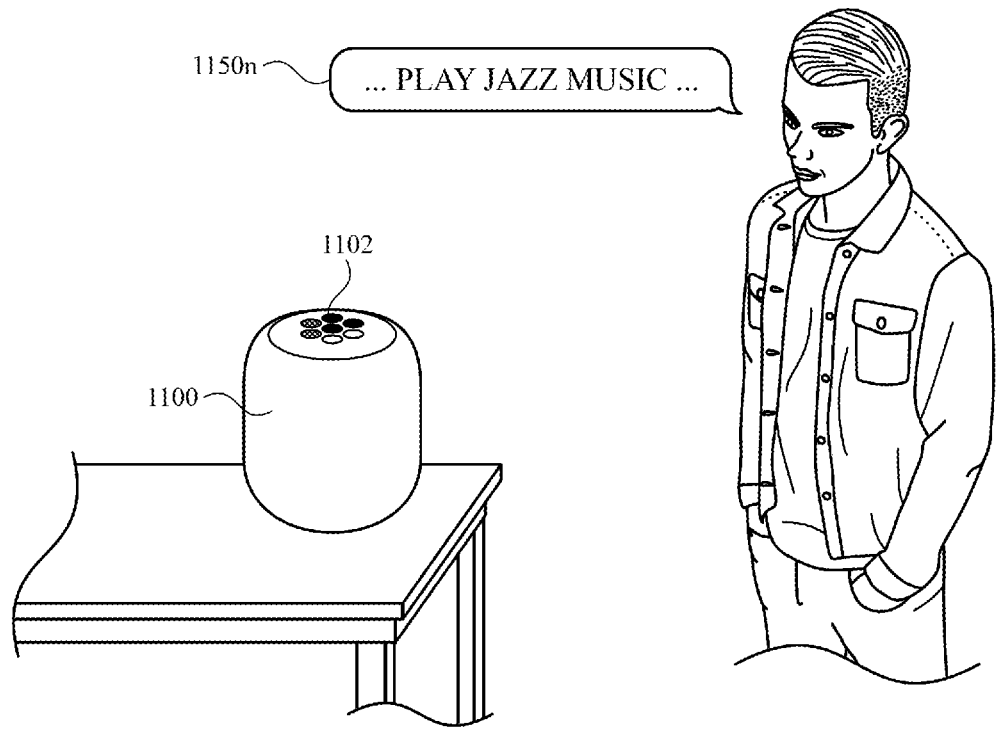
Figure 11O:
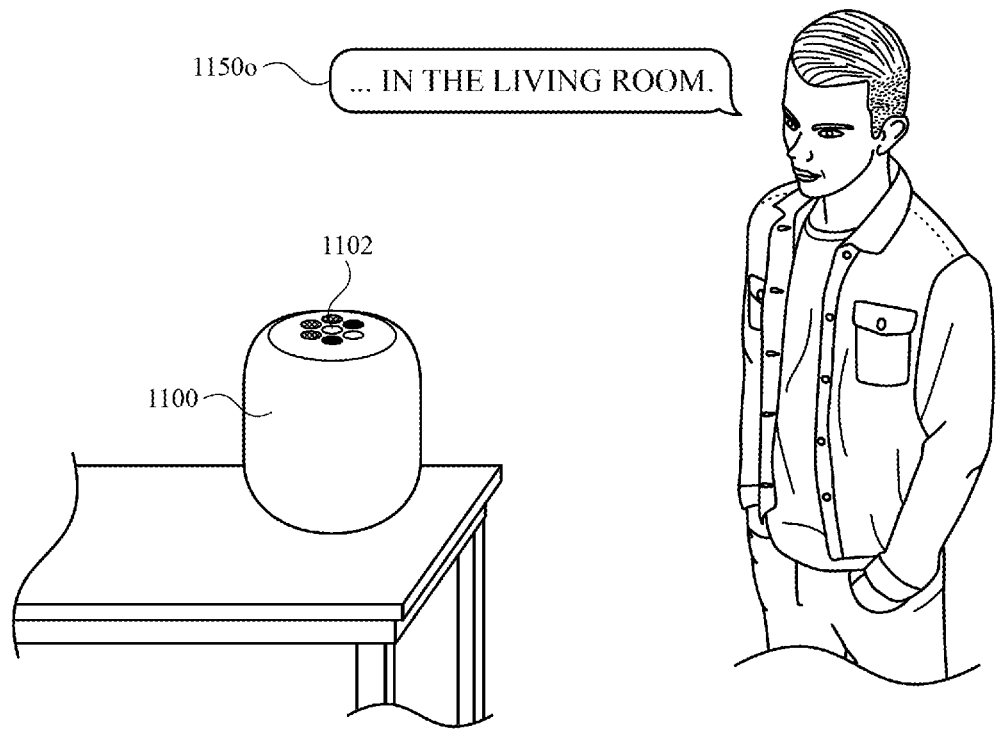
Figure 11P:
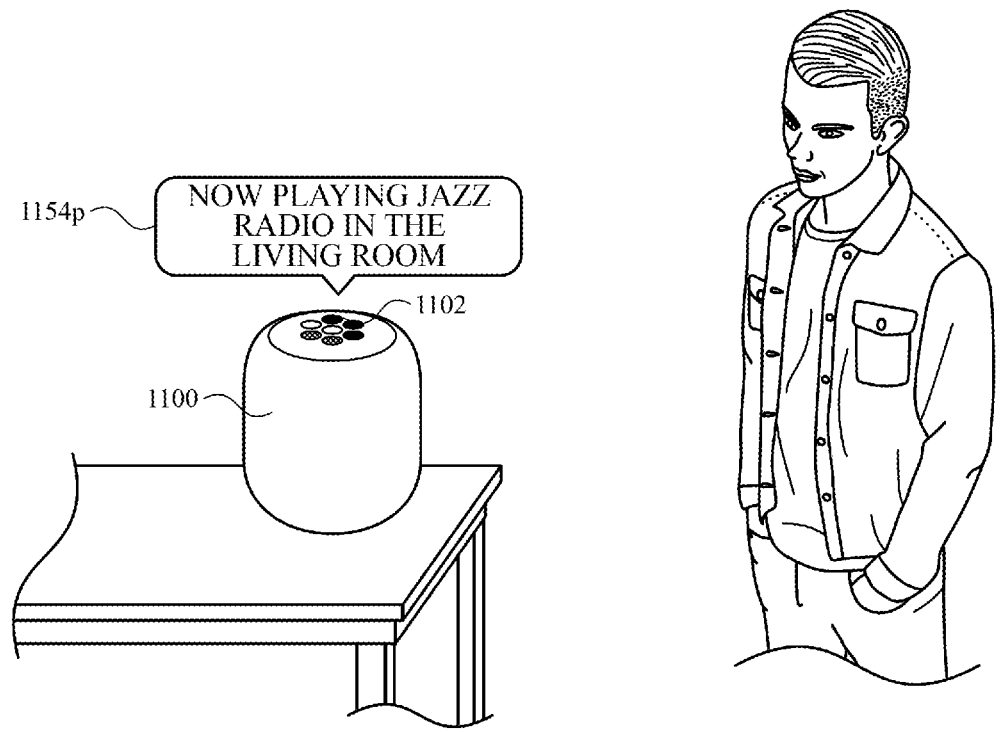
Figure 11Q:
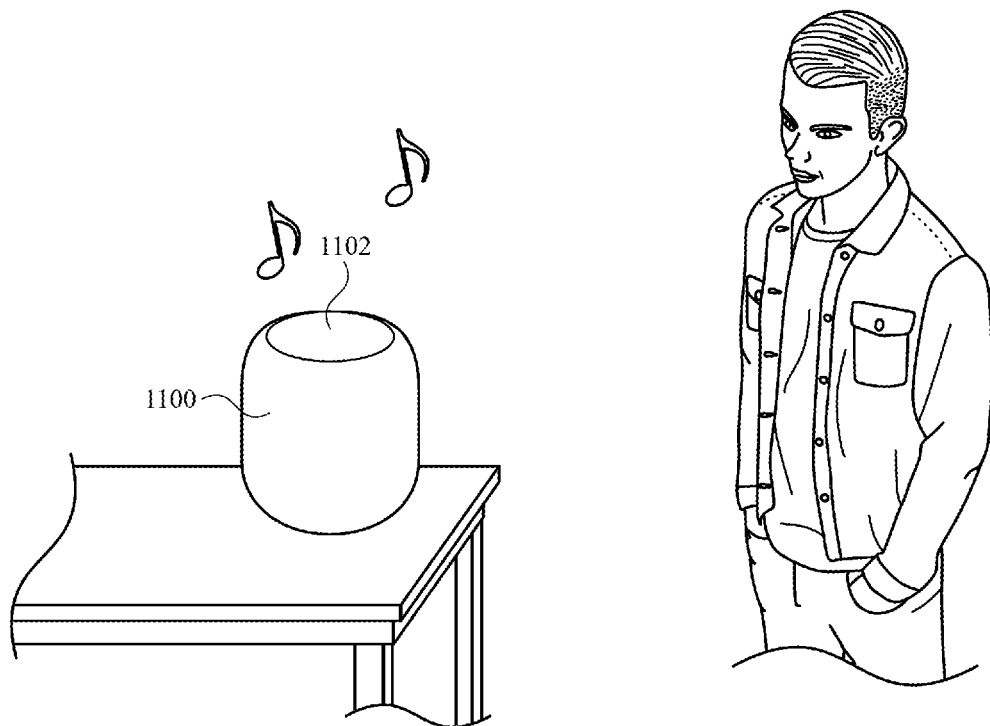
Figure 11R:
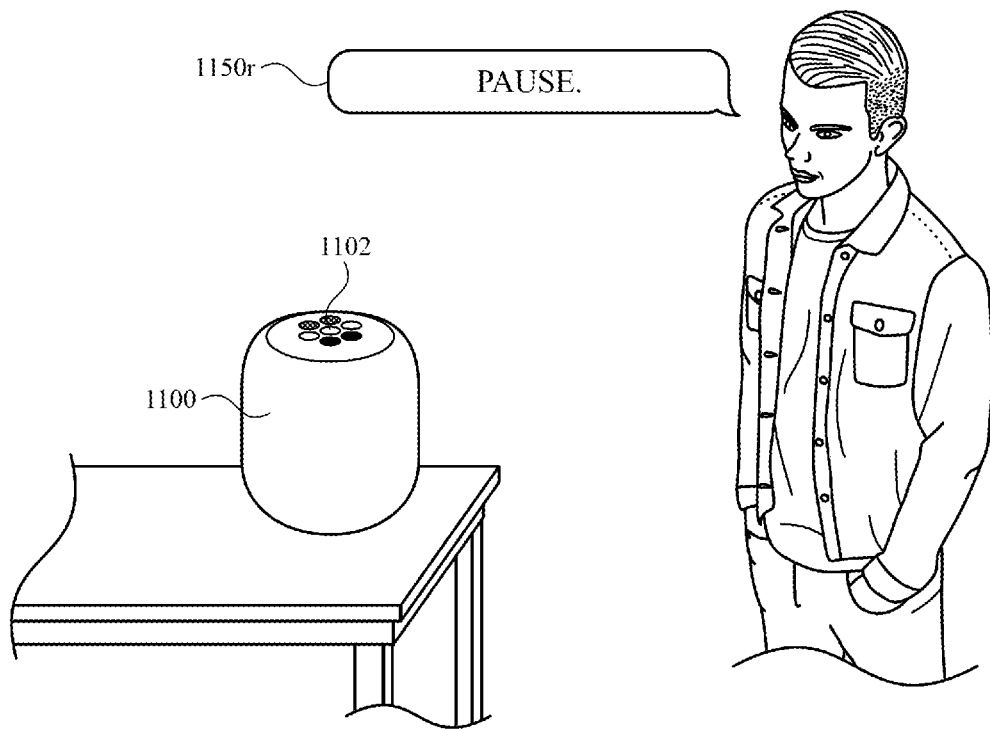
Figure 12:
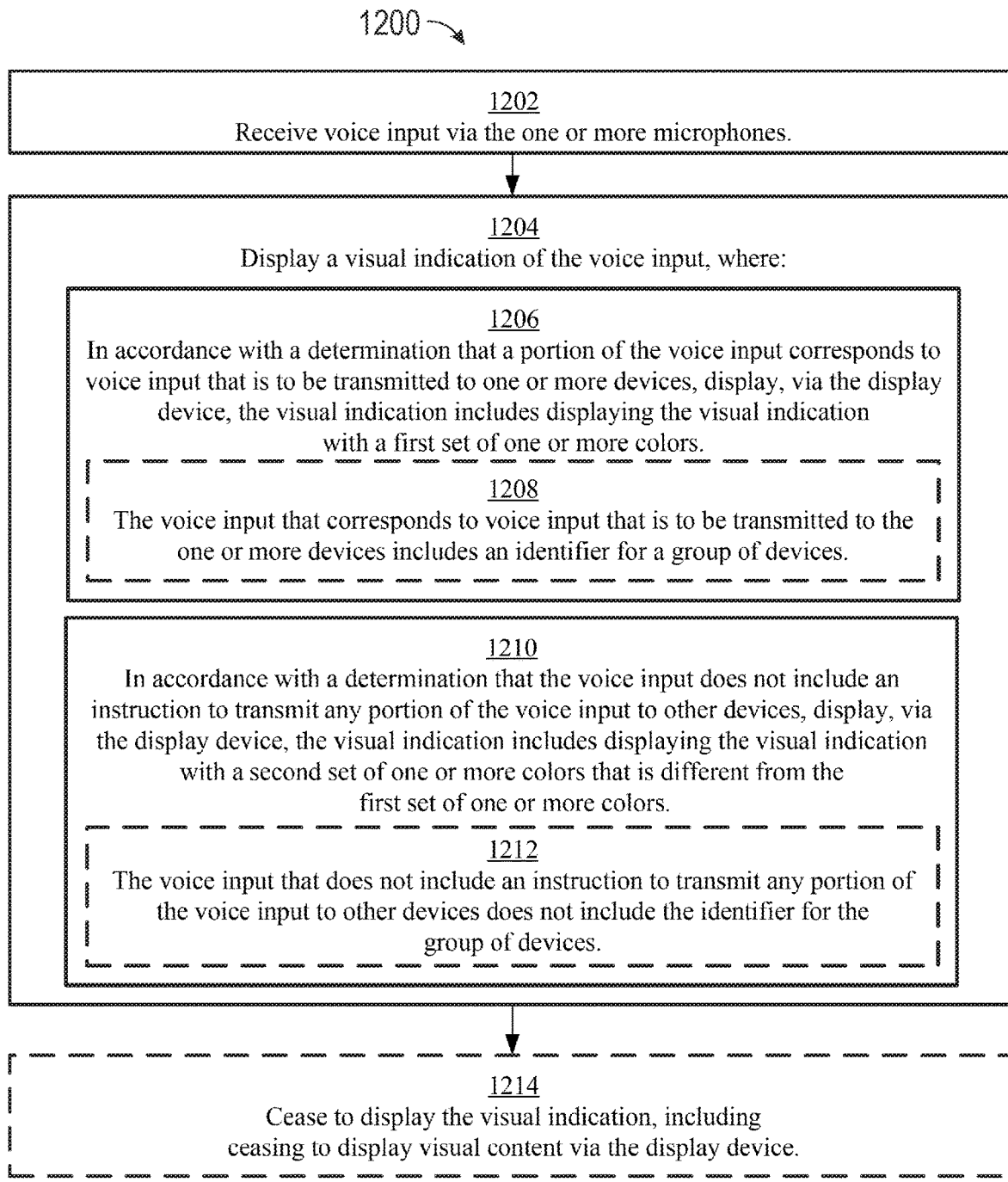
FIG. 12 is a flow diagram illustrating a method for displaying visual indications in accordance with some embodiments.

FIGS. 11A-11R illustrate exemplary user interfaces for displaying visual indications. FIG. 12 is a flow diagram illustrating a method for displaying visual indications. The user interfaces in FIGS. 11A-11R are used to illustrate the processes described below, including the processes in FIG. 12.

FIGS. 13A-13N illustrate exemplary user interfaces for managing statuses of devices. FIG. 14 is a flow diagram illustrating a method for managing statuses of devices. The user interfaces in FIGS. 13A-13N are used to illustrate the processes described below, including the processes in FIG. 14.

Figure 15D:
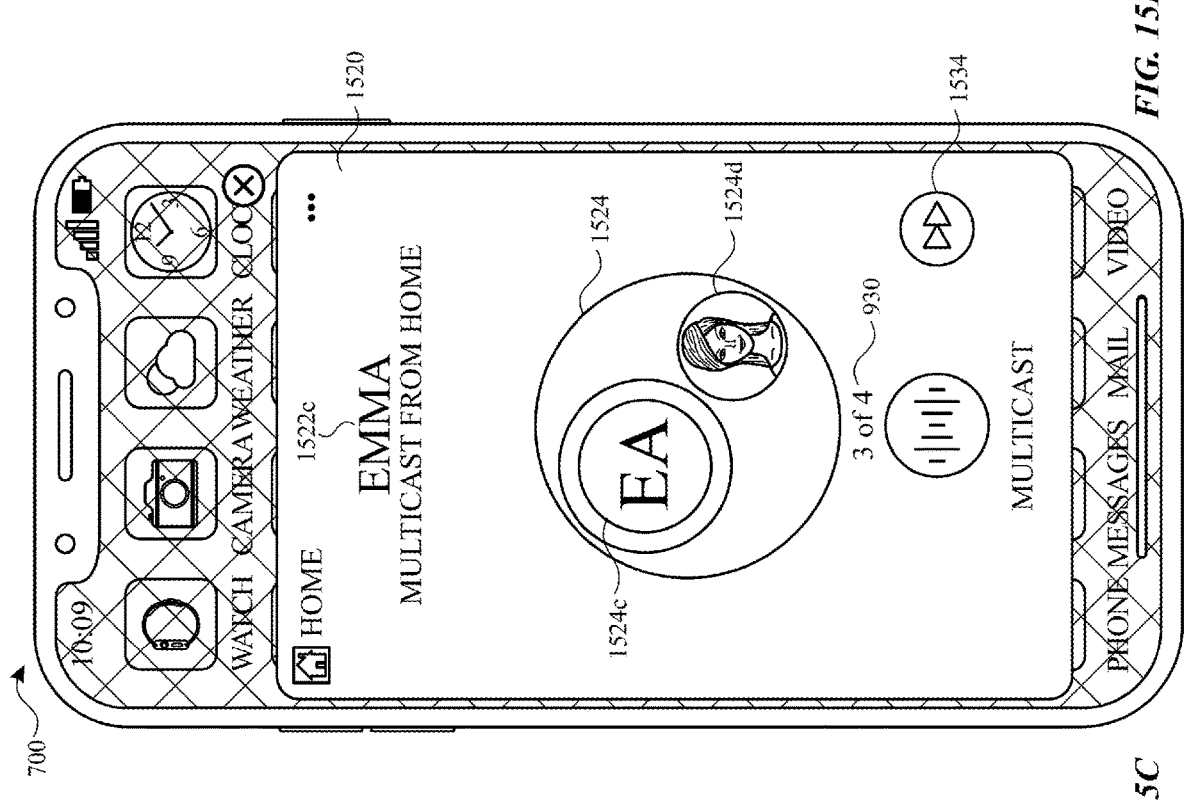
Figure 15C:
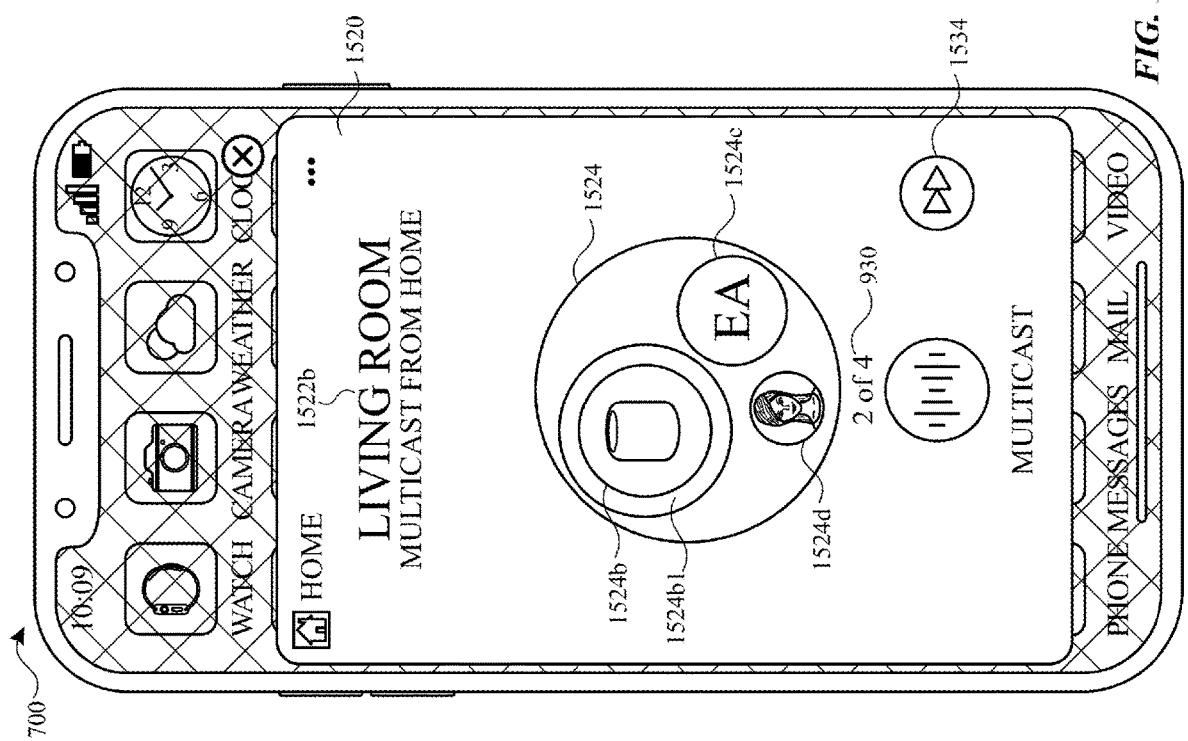
Figure 16:
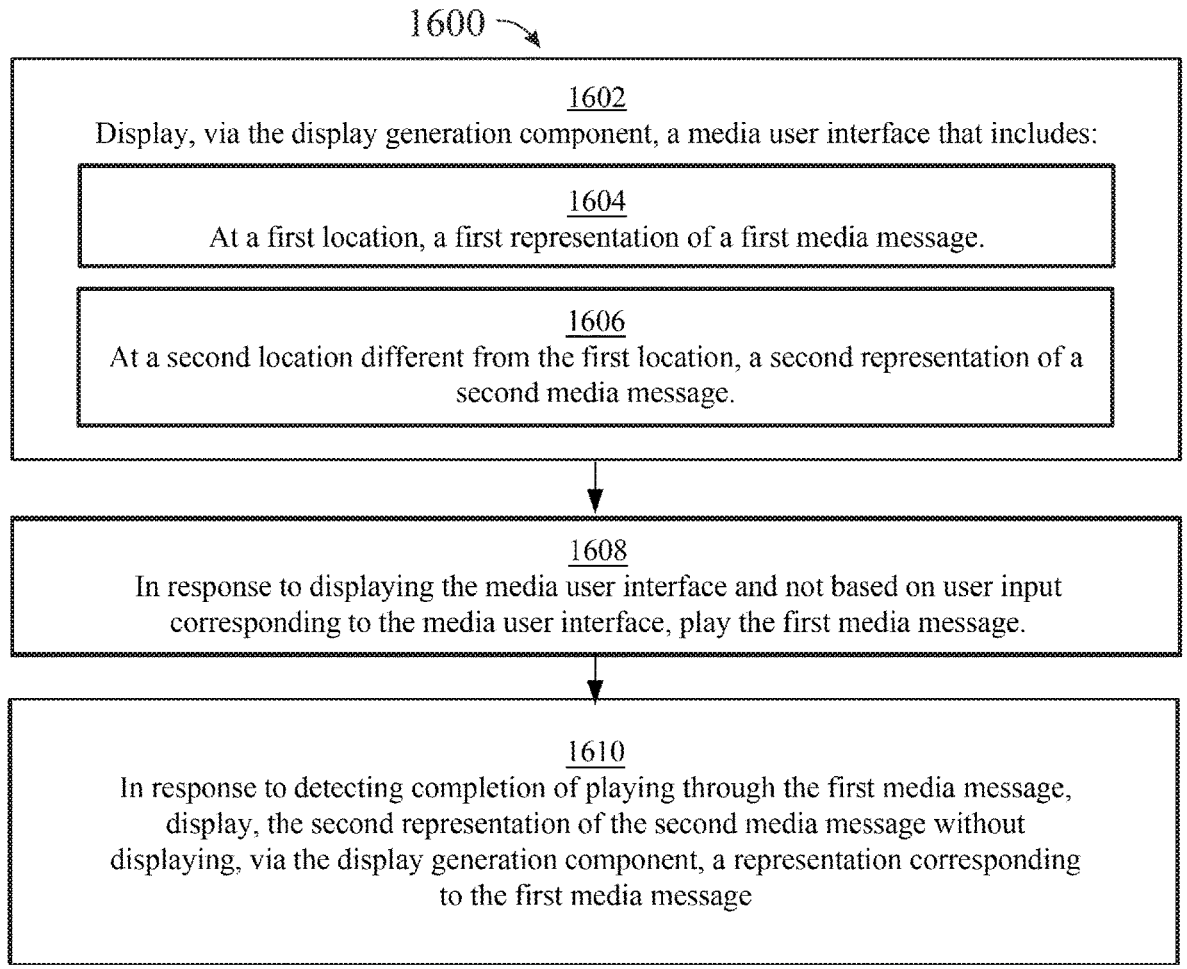
FIG. 16 is a flow diagram illustrating a method for playing back audio messages in accordance with some embodiments.

FIGS. 15A-15F illustrate exemplary user interfaces for playing back audio messages in accordance with some embodiments. FIG. 16 is a flow diagram illustrating a method for playing back audio messages in accordance with some embodiments. The user interfaces in FIGS. 15A-15F are used to illustrate the processes described below, including the processes in FIG. 16.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
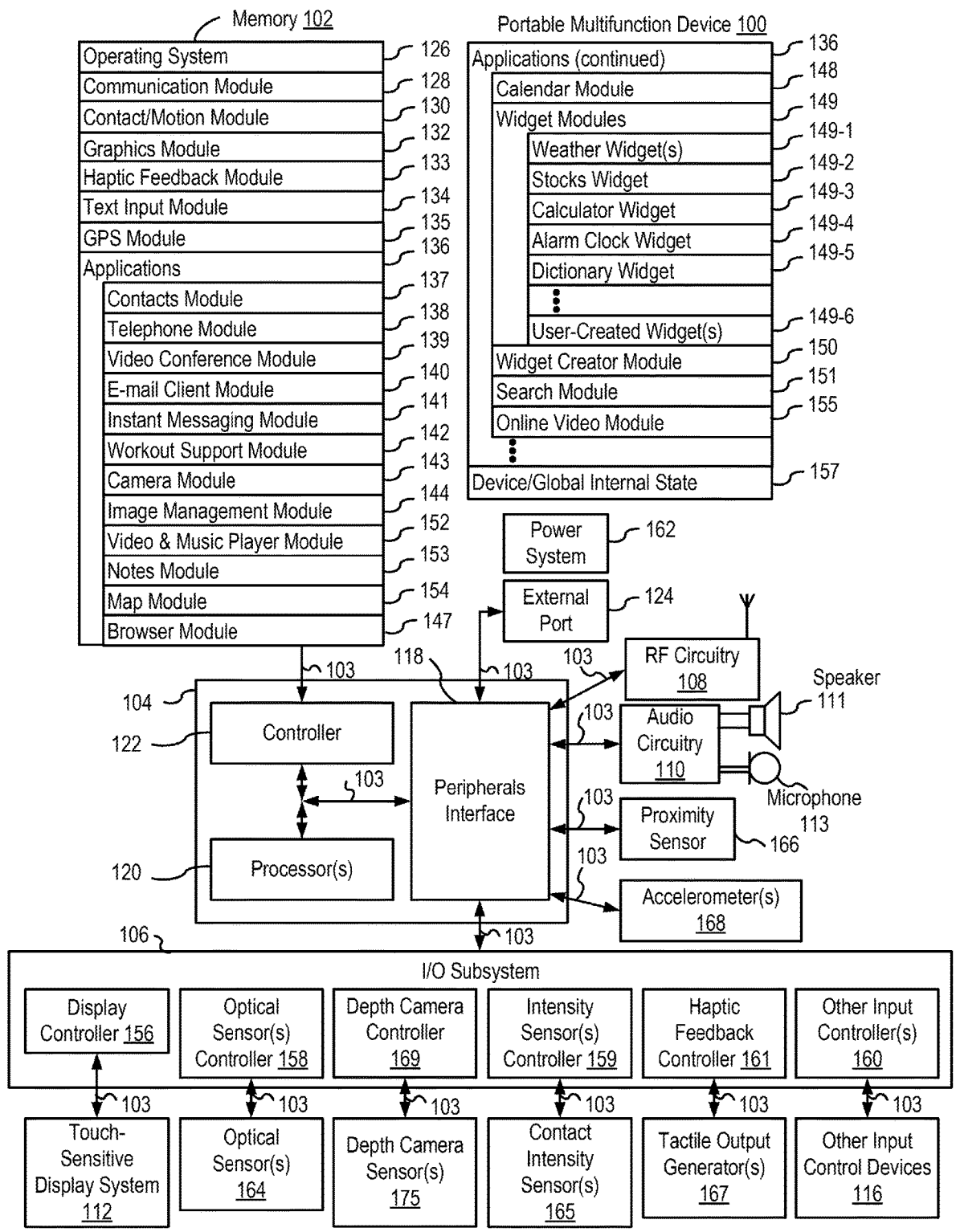
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
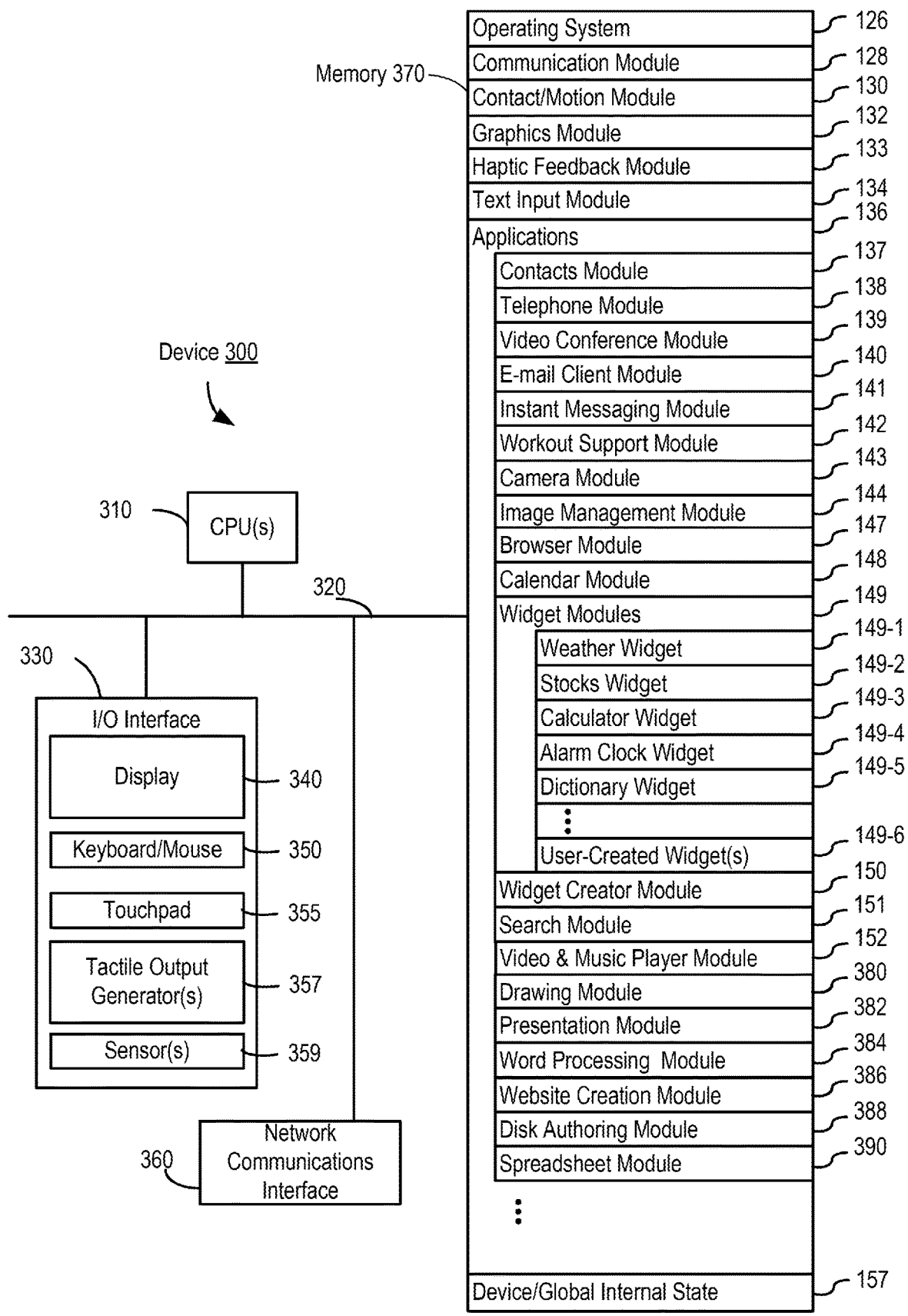
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/ motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;

Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
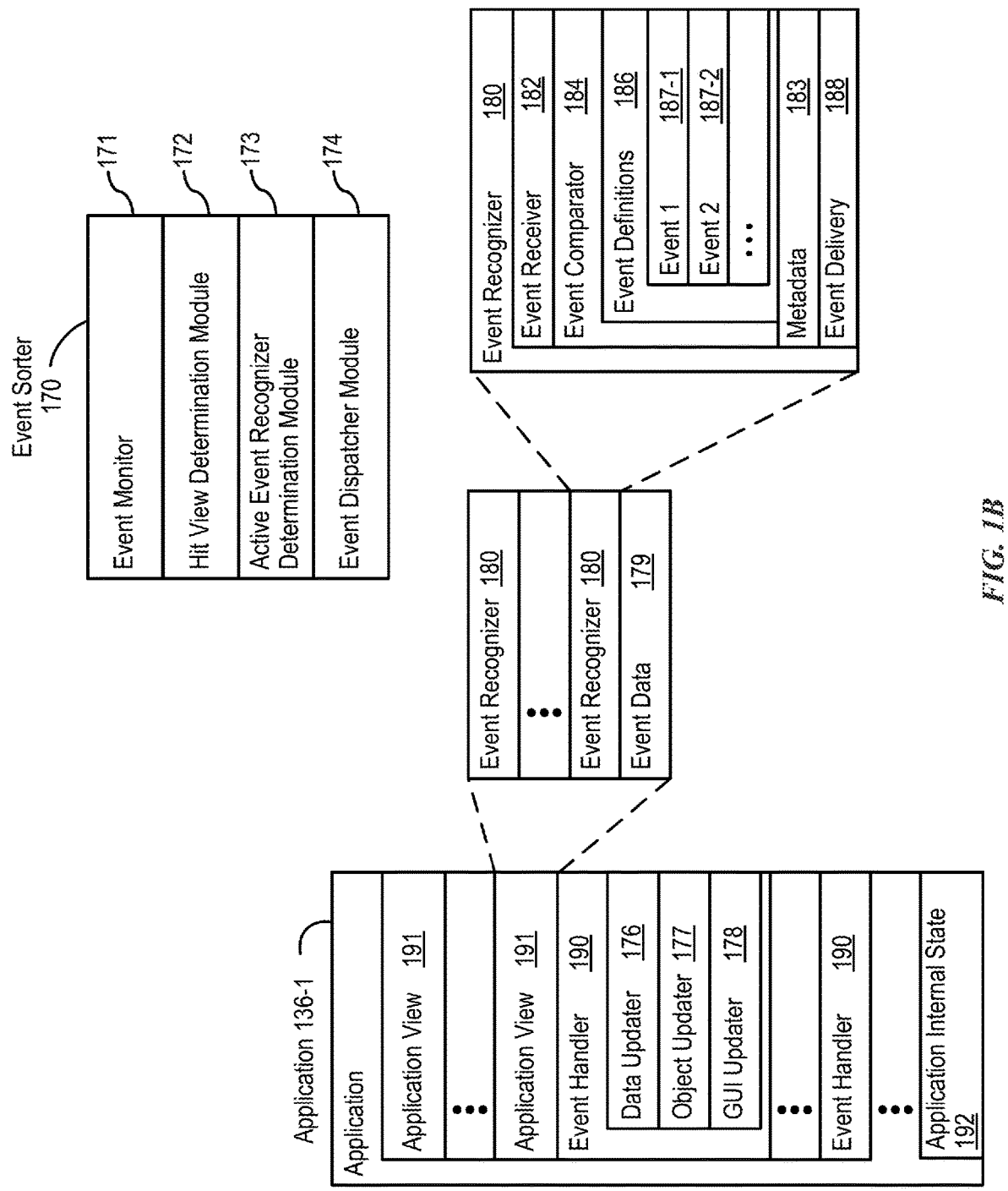
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113

(through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
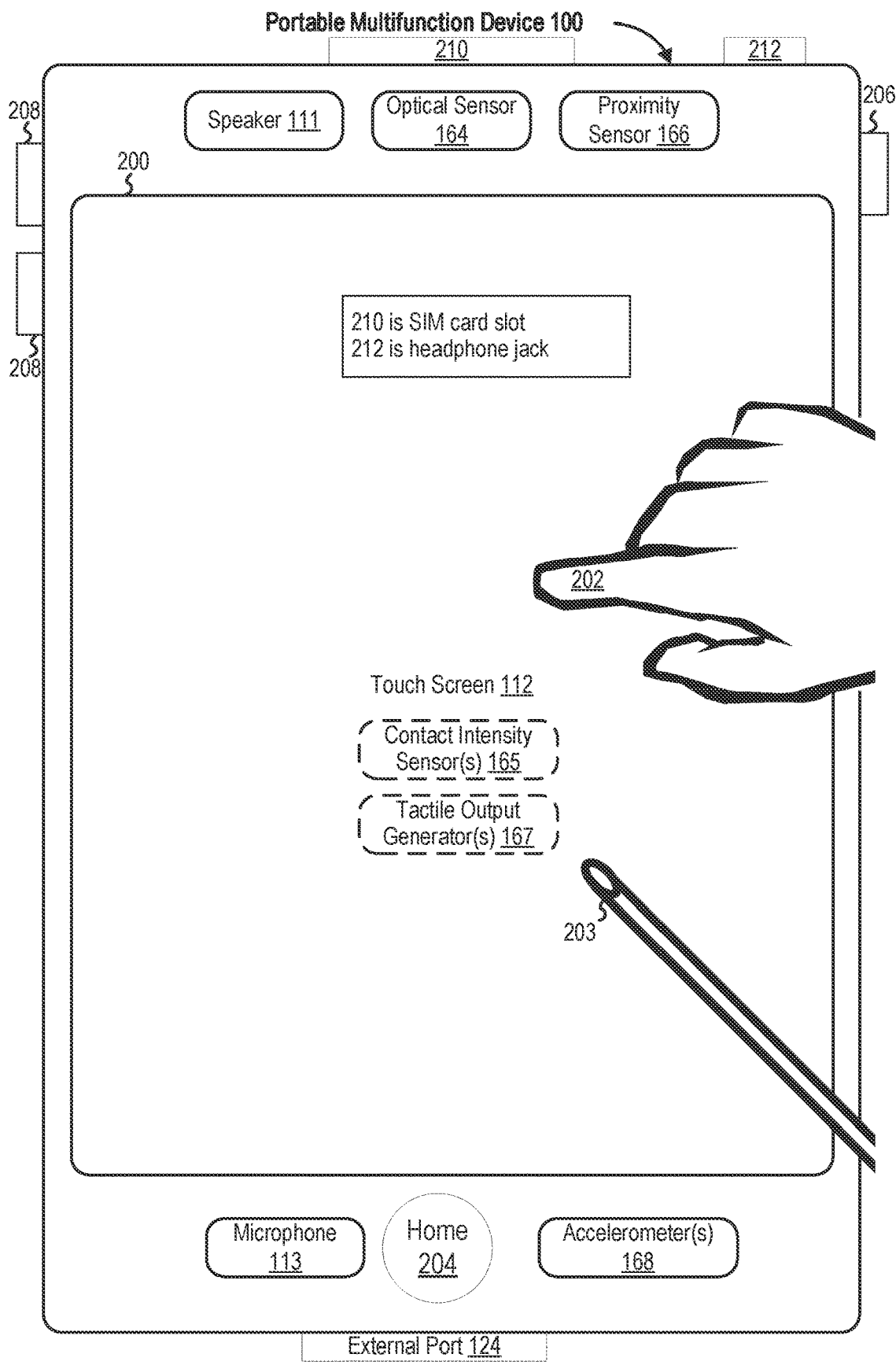
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
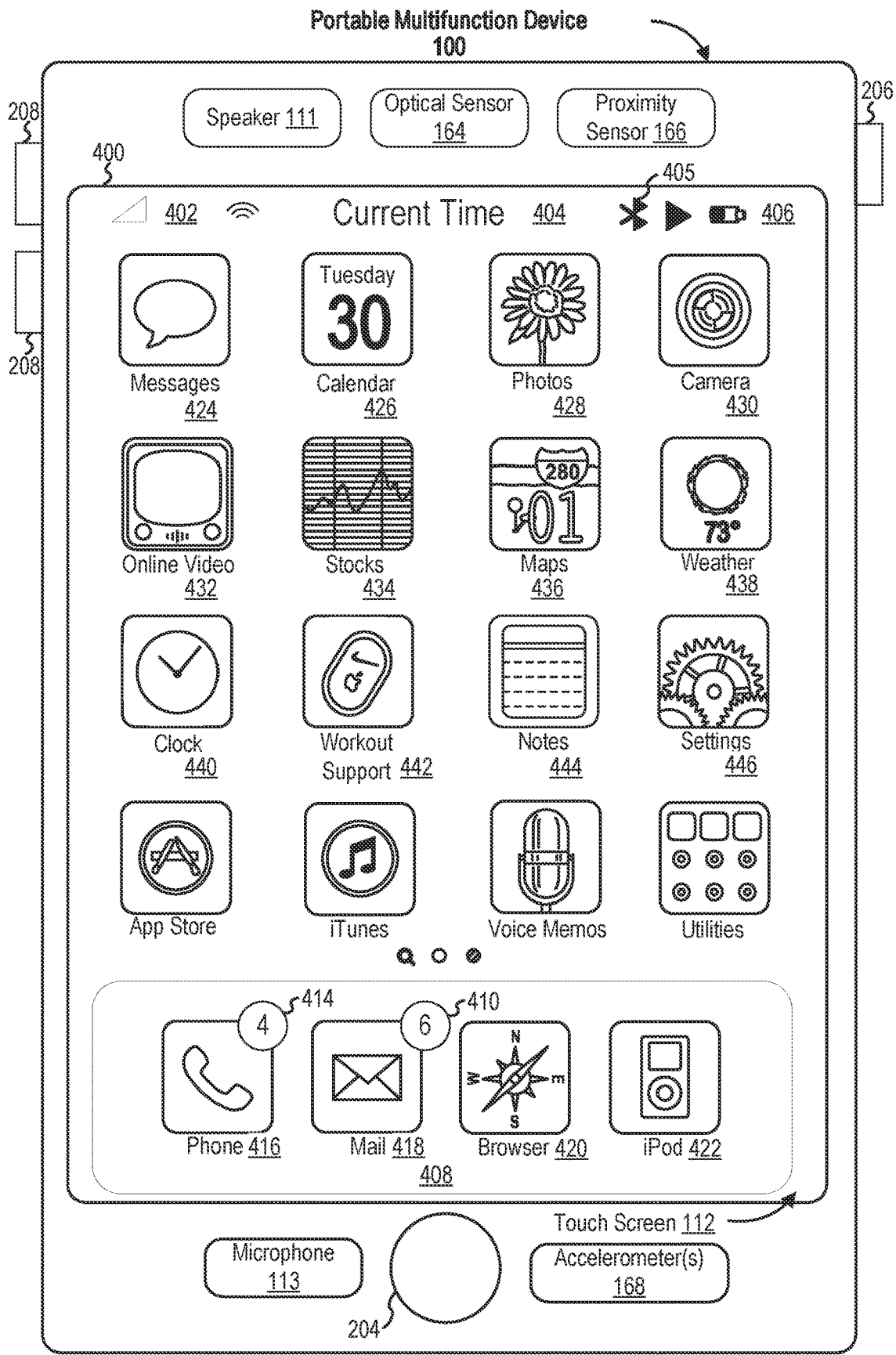
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
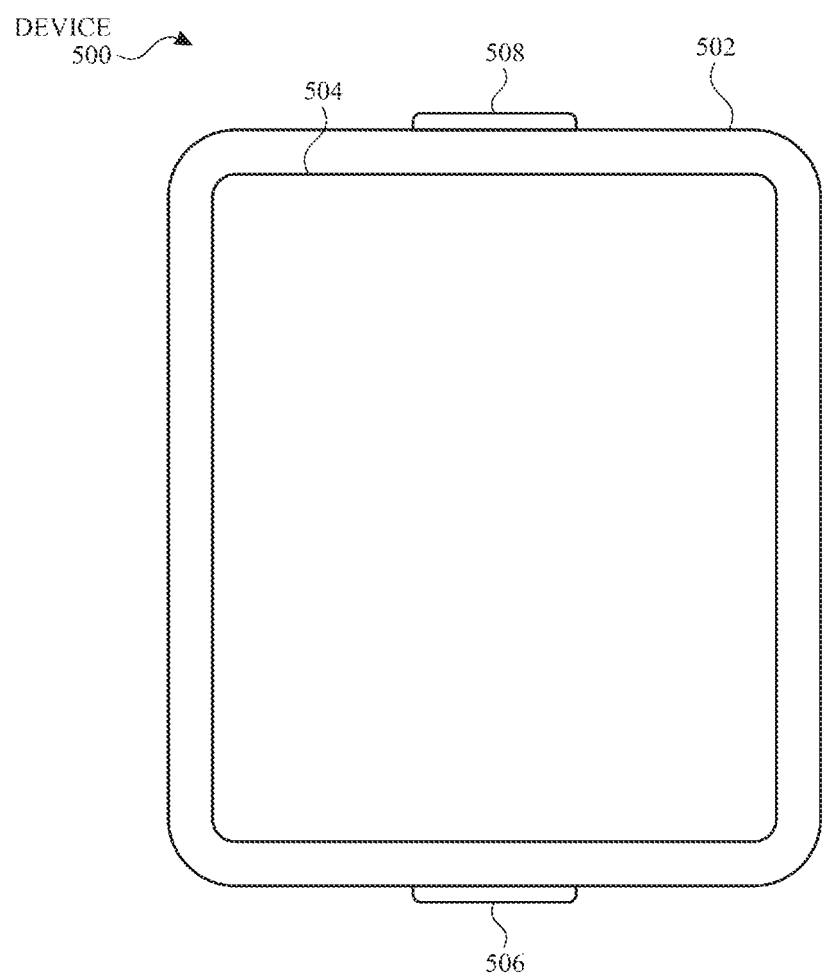
FIG. 5A illustrates a personal electronic device in accordance with some embodiments.
Figure 6:
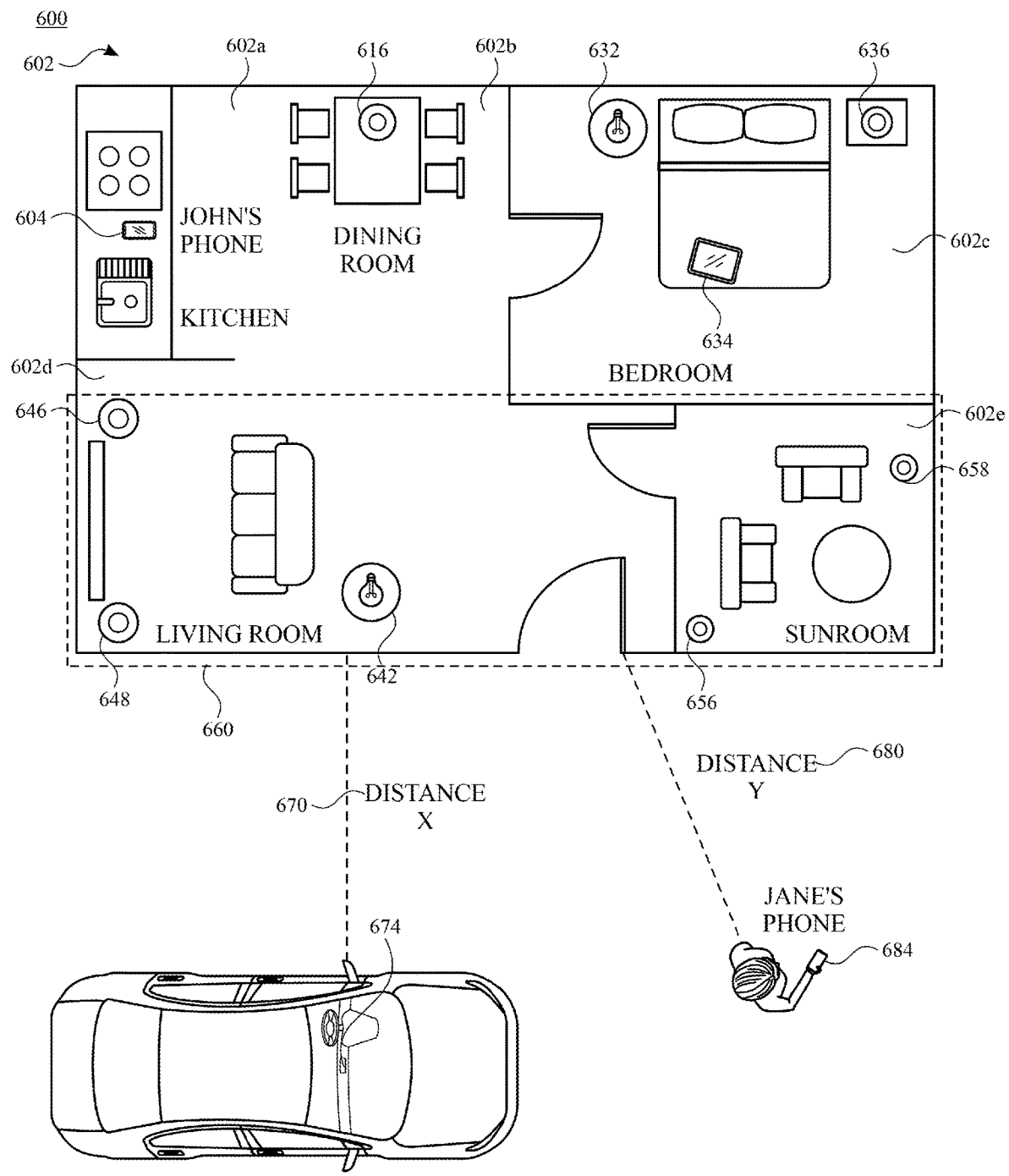
FIG. 6 is a diagram illustrating a physical structure and an exemplary set of devices in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
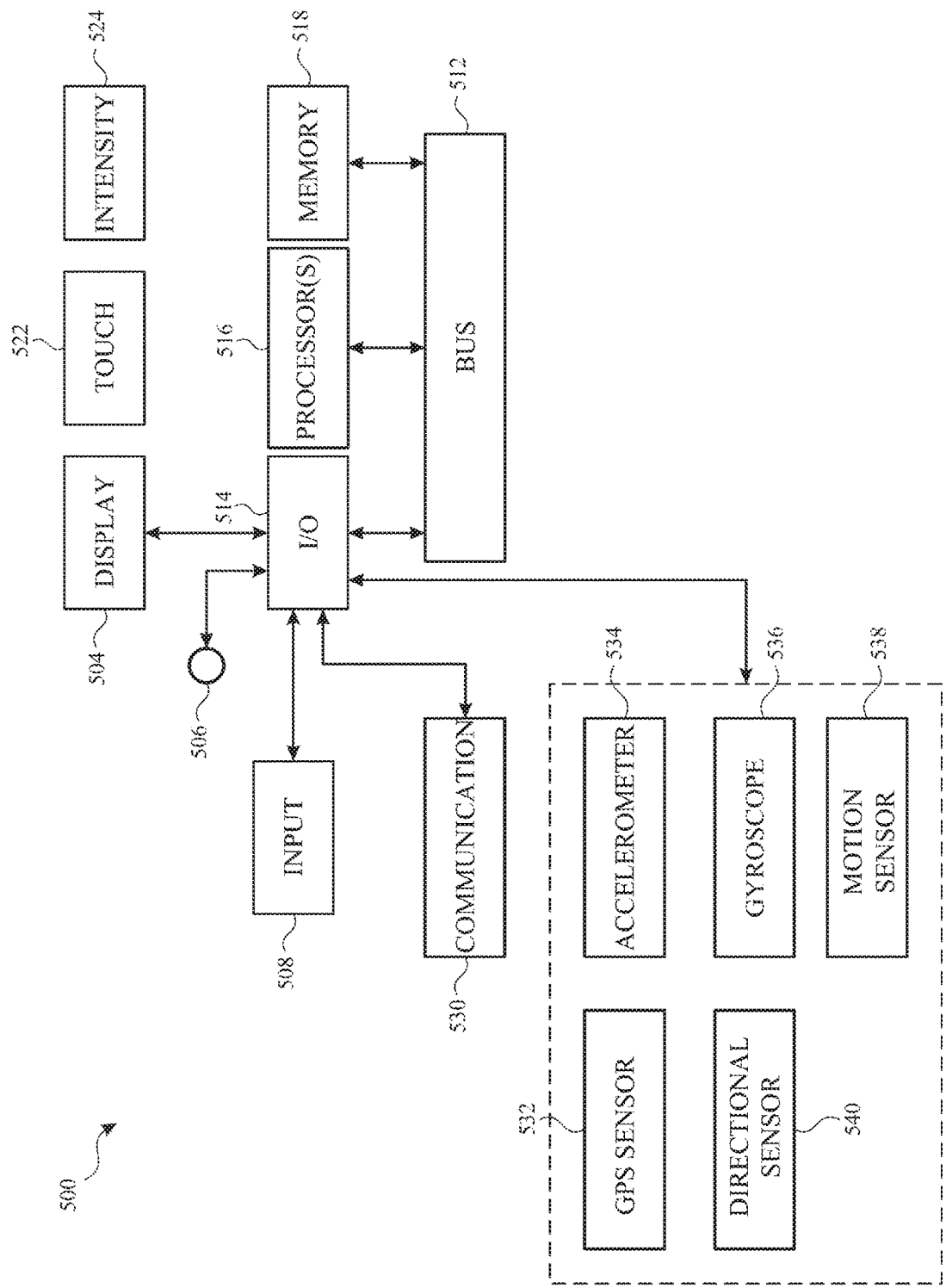
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 800 (FIGS. 8A-8B), 1000 (FIG. 10), 1200 (FIG. 12), 1400 (FIG. 14), and 1600 (FIG. 16). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5D:
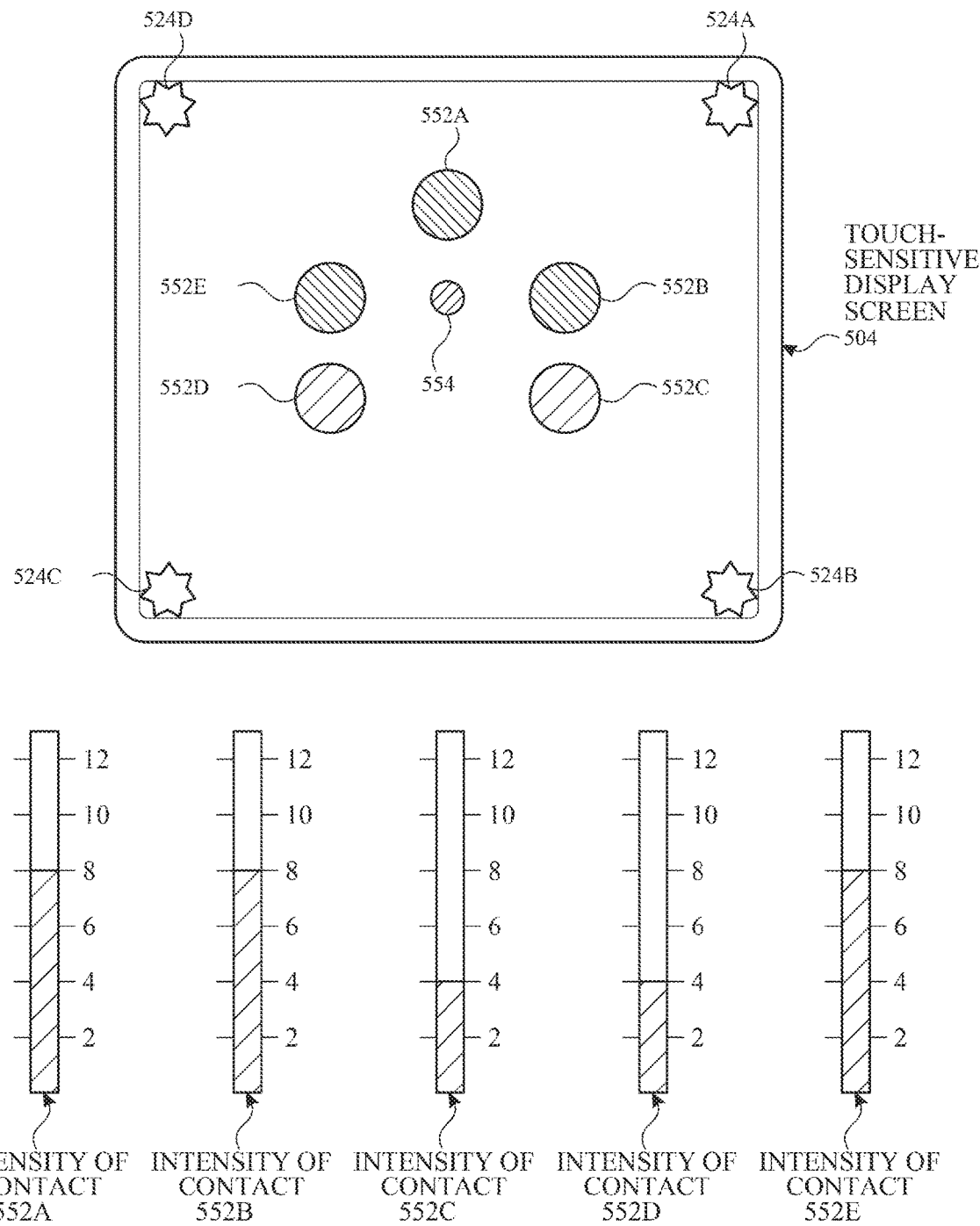

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, Ij=A·(Dj/ΣDi), where Dj is the distance of the respective contact j to the center of force, and ΣDi is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 5I:
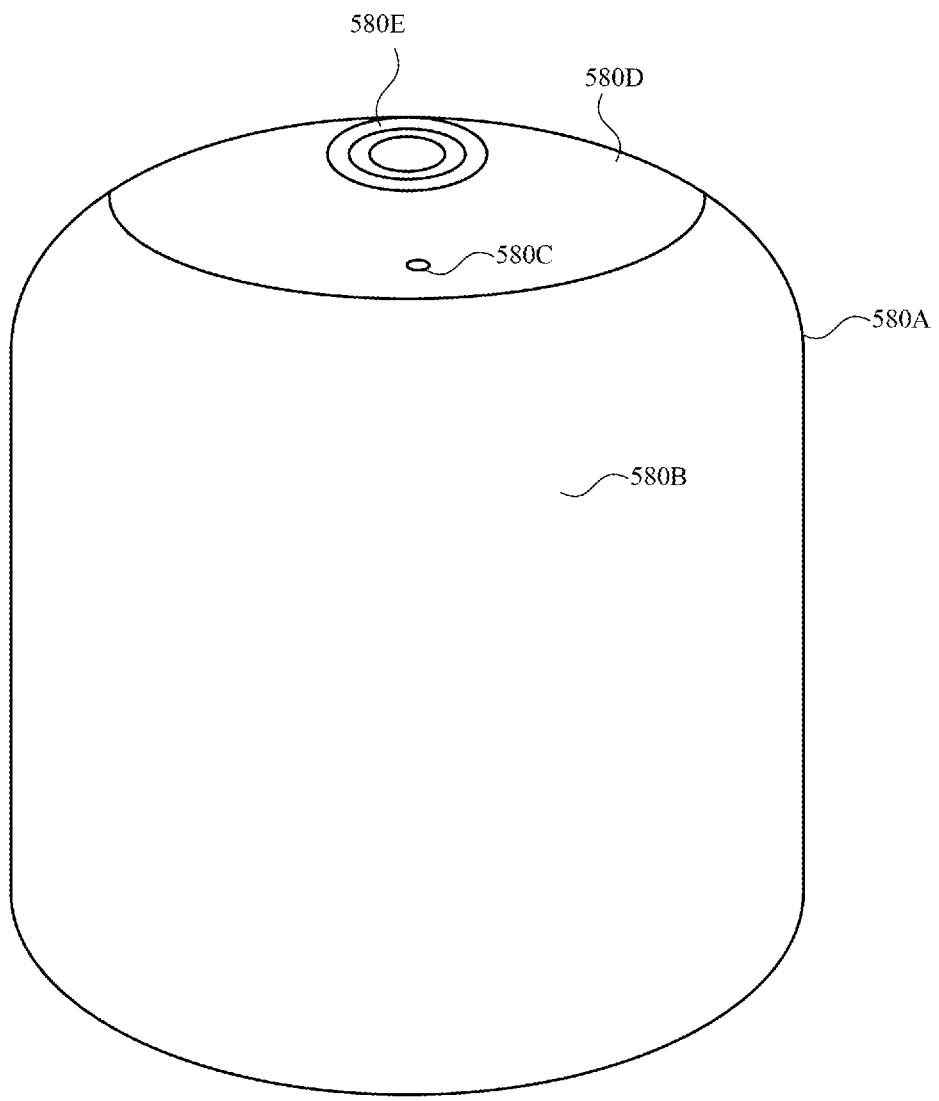
FIG. 5I illustrates an electronic device in accordance with some embodiments.

FIG. 5I illustrates exemplary electronic device 580. Device 580 includes body 580A. In some embodiments, device 580 can include some or all of the features described with respect to devices 100, 300, and 500 (e.g., FIGS. 1A-5B). In some embodiments, device 580 has one or more speakers 580B (concealed in body 580A), one or more microphones 580C, one or more touch-sensitive surfaces 580D, and one or more displays 580E. Alternatively, or in addition to a display and touch-sensitive surface 580D, the device has a touch-sensitive display (also referred to as a touchscreen). As with devices 100, 300, and 500, in some embodiments, touch-sensitive surface 580D (or the touch screen) optionally includes one or more intensity sensors for detecting intensity of contacts (e.g., touches) being applied. The one or more intensity sensors of touch-sensitive surface 580D (or the touchscreen) can provide output data that represents the intensity of touches. The user interface of device 580 can respond to touches based on their intensity, meaning that touches of different intensities can invoke different user interface operations on device 580. In some embodiments, the one or more displays 580E are one or more light-emitting diodes (LEDs). For example, a display can be a single LED, an LED cluster (e.g., a red, a green, and a blue LED), a plurality of discrete LEDs, a plurality of discrete LED clusters, or other arrangement of one or more LEDs. For example, the display 580E can be an array of nine discrete LED clusters arranged in a circular shape (e.g., a ring). In some examples, the one or more displays are comprised of one or more of another type of light-emitting elements.

Figure 5J:
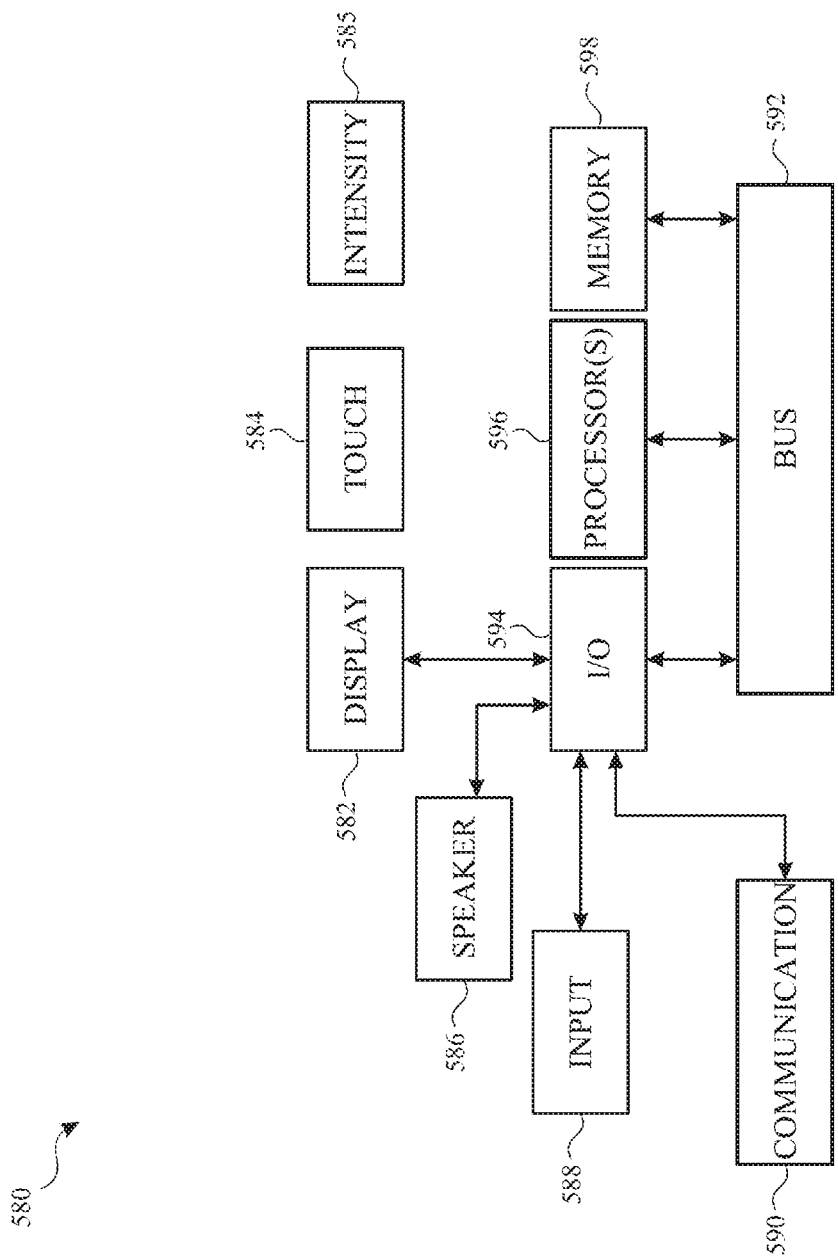
FIG. 5J is a block diagram illustrating an electronic device in accordance with some embodiments.

FIG. 5J depicts exemplary personal electronic device 580. In some embodiments, device 580 can include some or all of the components described with respect to FIGS. 1A, 1B, 3, and 5A-5B. Device 580 has bus 592 that operatively couples I/O section 594 with one or more computer processors 596 and memory 598. I/O section 594 can be connected to display 582, which can have touch-sensitive component 584 and, optionally, intensity sensor 585 (e.g., contact intensity sensor). In some embodiments, touch-sensitive component 584 is a separate component than display 582. In addition, I/O section 594 can be connected with communication unit 590 for receiving application and operating system data, using Wi-Fi, Bluetooth, near field communication (NFC), cellular, and/or other wireless communication techniques. Device 580 can include input mechanisms 588. Input mechanism 588 is, optionally, a button, in some examples. Input mechanism 588 is, optionally, a microphone, in some examples. Input mechanism 588 is, optionally, a plurality of microphones (e.g., a microphone array).

Electronic device 580 includes speaker 586 for outputting audio. Device 580 can include audio circuitry (e.g., in I/O section 594) that receives audio data, converts the audio data to an electrical signal, and transmits the electrical signal to speaker 586. Speaker 586 converts the electrical signal to human-audible sound waves. The audio circuitry (e.g., in I/O section 594) also receives electrical signals converted by a microphone (e.g., input mechanism 588) from sound waves. The audio circuitry (e.g., in I/O section 594) converts the electrical signal to audio data. Audio data is, optionally, retrieved from and/or transmitted to memory 598 and/or RF circuitry (e.g., in communication unit 590) by I/O section 594.

Memory 598 of personal electronic device 580 can include one or more non-transitory computer-readable storage mediums, for storing computer-executable instructions, which, when executed by one or more computer processors 596, for example, can cause the computer processors to perform the techniques described below, including processes 800 (FIGS. 8A-8B), 1000 (FIG. 10), 1200 (FIG. 12), 1400 (FIG. 14), and 1600 (FIG. 16). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 580 is not limited to the components and configuration of FIG. 5J, but can include other or additional components in multiple configurations.

Attention is now directed towards embodiments of user interfaces ("UI") and associated processes that are implemented on an electronic device, such as portable multifunction device 100, device 300, or device 500.

FIG. 6 includes diagram 600, illustrating a physical structure and an exemplary set of devices in accordance with some embodiments. FIG. 6 is used to illustrate the processes described below, including the processes in FIGS. 8A-8B, FIG. 10, and FIG. 12.

Diagram 600 includes home 602 and a set of devices (e.g., device 646, device 604, etc.). Home 602 includes multiple rooms, such as kitchen 602a, dining room 602b, bedroom 602c, living room 602d, and sunroom 602e. Kitchen 602a is in the upper left portion of home 602 and dining room 602b is between kitchen 602a and bedroom 602c, where bedroom 602c is to the right of dining room 602b. Kitchen 602a and dining room 602b do not have a wall between them while dining room 602b and bedroom 602c have a wall between them. Living room 602d is in the bottom left portion of home 602 and sunroom 602e is in the bottom right portion of home 602. In some embodiments, home 602 includes other rooms than those depicted in FIG. 6 and/or excludes rooms that are depicted in FIG. 6. While diagram 600 depicts a home, it should be recognized that this is merely an example and techniques described herein can work with other types of physical structures, such as an office building, a hotel, an apartment, etc.

As illustrated in FIG. 6, each room in home 602 has at least one device. However, in some embodiments, a room in home 602 has no devices.

As illustrated in FIG. 6, John's phone 604 is in kitchen 602a, lying on a counter between a stove and a sink. In dining room 602b, dining room speaker 616 is sitting on a dining room table. In bedroom 602c, personal tablet 634 is lying on a bed, bedroom speaker 636 is sitting on a nightstand that is adjacent to the bed, and bedroom light 632 is positioned on the opposite side of the bed. In living room 602d, living room speaker 646 and living room speaker 648 are on opposite sides of a television, and living room lamp 642 is positioned in front of the television screen. In sunroom 602e, sunroom speaker 656 and sunroom speaker 658 are positioned on opposite sides of the room.

As illustrated in FIG. 6, computer device 674 and Jane's phone 684 are outside of home 602. Computer device 674 is position within the dashboard of a car that is distance 670 from home 602; and Jane's phone 684 is distance 680 away from home 602 and is currently in the possession of Jane. In some embodiments, computer device 674 is connected to an electronic device, such as a cellphone (e.g., a personal phone that is similar to John's phone 604 and/or Jane's phone 684), and the electronic device provides instructions to computer device 674 that causes the computer device 674 to display visual content. Distance 670 and 680 are more than a threshold distance away (e.g., 1, 5, 10 meters) from the home, such that computer device 674 and Jane's phone 684 are not considered to be in locations that correspond to home 602 (e.g., are not within a geofence of the home or are not connected to a wireless network associated with (e.g., set up within) home 602)).

In this example, the speakers (e.g., dining room speaker 616, bedroom speaker 636, living room speaker 646, living room speaker 648, sunroom speaker 656, and sunroom speaker 658), lights (e.g., bedroom light 632 and living room lamp 642), and personal devices (e.g., John's phone 604, tablet 634, computer device 674, and Jane's phone 684) shown in FIG. 6 are assigned to (e.g., programmatically mapped (e.g., by a user account associated with home 602, such as John's user account or Jane's user account) to a group that corresponds to) home 602.

In addition, each individual speaker and light are also assigned to (e.g., mapped to a group that corresponds to) a room in which it is positioned. For example, dining room speaker 616 is assigned to (e.g., programmatically mapped to a group that corresponds to) dining room 602b; bedroom speaker 636 and bedroom light 632 are assigned to bedroom 602c; living room lamp 642, living room speaker 646, and living room speaker 648 are assigned to living room 602d; and sunroom speaker 656 and sunroom speaker 658 assigned to sunroom 602e. In some embodiments, each group that corresponds to each room is also assigned to home 602. Thus, devices that are mapped to a room of home 602 are also concurrently mapped to home 602.

An external device cannot be assigned to two different groups of devices that correspond to different rooms. For example, dining room speaker 616 cannot be assigned to kitchen 602a (e.g., a group corresponding to kitchen 602a) and dining room 602b at the same time. However, two groups of devices that are each assigned to respective rooms can be mapped to a (same) zone. In this example, entertainment zone 660 is assigned to living room 602d in FIG. 6 and sunroom 602e in FIG. 6. In this example, entertainment zone 660 is not a physical room in home 602c; however, the entertainment zone is programmatically defined as being assigned to sunroom living room 602d and sunroom 602e. In some embodiments, two different zones share a group of devices (e.g., include some overlapping devices and each include some non-overlapping devices). For example, the group of devices that are assigned to sunroom 602e can be mapped to entertainment zone 660 and an eating zone (e.g., where the eating zone is assigned to a group of devices that are assigned to dining room 602b and sunroom 602e).

In this example, the personal devices (e.g., John's phone 604, tablet 634, and Jane's phone 684) are not programmatically mapped to a group that corresponds to a room and only are mapped to a group that corresponds to a home.

In some embodiments, the speakers, lights, and personal devices (e.g., John's phone 604, tablet 634, Jane's phone 684) shown in FIG. 6 are smart devices that are directly connected to each other or indirectly connected to each other via one or more networks (e.g., wireless networks (e.g., Bluetooth, NFC, Wi-Fi, 4G, etc.)). In some embodiments, other smart devices, such as smart appliances, smart thermostats, smart plug outlets, etc. are connected to the one or more networks. In some embodiments, the one or more personal devices can also include other types of personal devices, such as smartwatches, laptops, desktops, etc.

FIGS. 7A-7AH illustrate exemplary electronic devices and user interfaces for sending an audio message in accordance with some embodiments. The user interfaces in these figures are used to illustrate the processes described below, including the processes in FIGS. 8A-8B.

FIG. 7A illustrates electronic device 700 displaying user interface 702. In FIG. 7A, electronic device 700 is a portable multifunction device and has one or more components described above in relation to one or more of devices 100, 200, 300, and 500. With respect to the figures below, in some embodiments, device 700 is operating at a location that is less than a predetermined distance away from home 602; however, in other embodiments, device 700 is operating at a location that is greater than a predetermined distance away from home 602. In some embodiments, device 700 is connected to a network (e.g., wireless network) that is associated with home 602, such that device 700 is connected to the same wireless network to which at least one the devices (e.g., speakers, lights) located in home 602 are connected. In some embodiments, more than one wireless network is associated with home 602. In some embodiments, device 700 is connected to at least one of those networks. In some embodiments, device 700 is not connected to the one or more networks that is associated with home 602. Thus, device 700 can send audio multicast messages and communicate with devices within home 602, irrespective of the distance that device 700 is from home 602 or the network to which device 700 is connected.

While this description often refers to messages as multicast messages (or audio multicast messages), it should be recognized that such messages are optionally sent using (1) a multicast communication, (2) a broadcast communication, (3) a unicast communication, (4) or any combination thereof (e.g., (1) a first device (e.g., a controller) sends a unicast communication to a second device (e.g., a hub in a home) and (2) the second device sends either a multicast or a broadcast communication (e.g., including content from the unicast communication) to one or more third devices (e.g., one or more accessory devices within the home and/or one or more personal devices). In some embodiments, a multicast communication is a communication sent to multiple receipts. In some embodiments, a broadcast communication is a communication transmitted to devices on a channel or network. In some embodiments, a broadcast communication is a communication transmitted to all devices on a channel or network. In some embodiments, a unicast communication is a communication transmitted to a single recipient. In such embodiments, multiple unicast communications are sent when content needs to be sent to multiple devices.

In some embodiments, a broadcast communication is a communication transmitted to all devices on a channel or network. In such embodiments, multiple unicast communications are sent when content needs to be sent to multiple devices.

As illustrated in FIG. 7A, user interface 702 includes applications icons 704, such as home application icon 704a. Each of application icons 704 corresponds to an application, such that, when an application icon is selected, the selection will cause device 700 to display a user interface of a respective application. For example, home application icon 704a corresponds to a home application. At FIG. 7A, device 700 detects a tap gesture 750a (e.g., a selection) at a location that corresponds to home application icon 704a.

As illustrated in FIG. 7B, in response to detecting tap gesture 750a, device 700 displays user interface 710 of the home application. User interface 710 is a user interface for controlling multiple external devices assigned to home 602. User interface 710 includes home location identifier 712, status information 714, macro controls 716, external device controls 718, navigations controls 722, home multicast instruction 724, and home multicast affordance 726 (e.g., selectable user interface object).

Home location identifier 712 is a name that corresponds to home 602. In this example, the location identifier is part of the address (e.g., "123 Main Street") of home 602. In some embodiments, the location identifier is an alias, such as an alias assigned to the home. In some embodiments, the alias is a system-created alias. In some embodiments, the alias is a user-created alias. In some embodiments, the location identifier is set by a user of device 700 or an external device. In some embodiments, the location identifier is a graphical user interface object, such as an image.

Status information 714 includes information concerning the current status of some of the devices assigned to home 602. Here, status information 714 indicates that at least one light is on in the home 602. In some embodiments, status information 714 includes information concerning the status of multiple devices (e.g., "bedroom fan on").

As illustrated in FIG. 7B, there are two rows of macro controls 716 below home location identifier 712 and status information 714. Macro controls 716 are affordances (e.g., selectable user interface objects) for initiating a respective macro. In some embodiments, the respective macro causes one or more externals devices to perform an action. For example, the "Good Night" macro control, when selected, cause one or more lights to turn off, one or more speakers to stop playback media, and/or one or more deadbolt locks to lock.

Additionally, in FIG. 7B, user interface 710 includes rows for external device controls 718 below macro controls 716. In FIG. 7B, the two rows of external device controls 718 extend across three columns, so there is a total of six displayed (e.g., where three device controls are on each respective row). In some embodiments, a user may have fewer external devices to control requiring fewer external device controls 718. In other embodiments, a user may have more external devices to control requiring more external device controls 718. In some embodiments, when there are more external device controls 718 to display than screen space available, the screen scrolls (e.g., up and down or left and right) to display all external device controls. External device controls 718 include dining room speaker control 718a, living room lamp control 718b, living room speakers control 718c, sunroom speakers control 718d, bedroom speaker control 718e, and bedroom light control 718f Additionally, each of external device controls 718 include status information that is representative of the current state of each respective external device. For example, the status information for dining room speaker control 718a indicates that dining room speaker 616 is currently playing media (which is not represented by status information 714 in this example) and the status information for living room lamp control 718b indicates that living room lamp 642 is currently off (which is represented by status information 714 in this example).

Each of external device controls 718, when selected, control at least one device assigned to home 602. For example, dining room speaker control 718a, when selected, causes dining room speaker 616 to play or pause music. In some embodiments, when dining room speaker control 718a is selected, the status information on dining room speaker control 718a changes to show that dining room speaker 616 has paused the playback of media (e.g., as shown by bedroom speaker control 718e) or stopped the playback of media. Some of external device controls 718 control multiple devices when selected. For example, sunroom speakers control 718d, when selected, causes sunroom speakers 656 and 658 to play or pause the playback of media and the status information displayed on sunroom speakers control 718d changes accordingly. Some of external device controls 718 are not speaker device controls. For example, external device controls 718 includes living room lamp control 718b that, when selected, causes living room lamp 642 to turn on/off and the status information displayed on living room lamp control 718b changes accordingly.

In some embodiments, external device controls 718 are selected from a group of other external controls that are also assigned to home 602. For example, the six controls that are shown in FIG. 7B can be selected from a group of 10, 20, or 50 (or any other number greater than 6) external controls that are also assigned to home 602. In some embodiments, external device controls 718 are selected based on a determination that each of these external device controls are a favorite control. In some embodiments, the determination of whether an external device is a favorite control is based on whether the external device control (or the external device) was most recently used, most frequently used, newly added, designated as a favorite, important external device control (e.g., via the detection of one or more inputs), etc., or any combination thereof.

At the bottom of user interface 710 are navigation controls 722. Navigation controls 722 include home navigation control 722a, room navigation control 722b, and automation navigation control 722c. Each of navigation controls 722, when selected, causes device 700 to display a different user interface for the home application.

As illustrated in FIG. 7B, user interface 710 includes home multicast instruction 724 that is adjacent to home multicast affordance 726. In FIG. 7B, home multicast instruction 724 indicates that a user should select (e.g., "tap") home multicast affordance 726 in order to send an audio message that will be multicast to one or more devices assigned to home 602. At FIG. 7B, device 700 detects tap gesture 750b at a location that corresponds to home multicast affordance 726.

In response to detecting tap gesture 750b, device 700 initiates a process for sending an audio multicast message to one or more devices assigned to home 602. In some embodiments, the process includes displaying user interfaces depicted in FIGS. 7C, 7D, and 7E, as described below. In some embodiments, the process includes displaying user interface depicted in FIG. 7C1, as described below.

As illustrated in FIG. 7C, in response to detecting tap gesture 750b, user interface 730 includes home destination identifier 732, exit affordance 734, and multicast recording affordance 736. Home destination identifier 732 indicates that the audio multicast message is directed to a group of devices assigned to home 602 (e.g., will receive an audio multicast message). Exit affordance 734 is an affordance for exiting out of user interface 730. In some embodiments, when exit affordance 734 is selected, device 700 ceases to display user interface 730 and re-displays user interface 710, as depicted in FIG. 7B. At FIG. 7C, device 700 detects tap gesture 750c at a location that corresponds to multicast recording affordance 736.

As illustrated in FIG. 7D, in response to detecting tap gesture 750c, device 700 displays user interface 740. User interface 740 includes home destination identifier 732 and exit affordance 734, which were also included in user interface 730. In addition, user interface 740 also includes audio status bar 742 and audio wave 744a.

Additionally, at FIG. 7D, device 700 also starts recording an audio multicast message in response to detecting tap gesture 750c. The audio for the audio multicast message is detected via one or more microphones of device 700. The audio for the audio multicast message is detected from one or more external sources (e.g., such as a user voice). Here, the recorded audio is represented by audio wave 744a, which is filling up audio status bar 742 over a period of time as more audio input is received by device 700.

As illustrated in FIG. 7D, in response to detecting tap gesture 750c, device 700 displays multicast recording stop affordance 746 at the position that multicast recording affordance 736 was previously displayed in FIG. 7C. At FIG. 7D, device 700 detects tap gesture 750d at a location that corresponds to multicast stop recording affordance 746.

As illustrated in FIG. 7E, in response to detecting tap gesture 750d, device 700 displays user interface 750. At FIG. 7E, in response to detecting tap gesture 750d, device 700 has ceased recording or capturing audio from the one or more external sources. As such, user interface 750 includes audio status bar 742 that is mostly filled by audio wave 744a, which represents at least a portion of the recorded audio multicast message. As illustrated in FIG. 7E, user interface 750 includes audio multicast message playback affordance 752 and audio multicast message deletion affordance 754 (e.g., in addition to including home destination identifier 732, exit affordance 734, audio status bar 742, audio wave 744a). In some embodiments, in response to detecting a selection of audio multicast message playback affordance 752, device 700 will initiate playback of the audio multicast message. In some embodiments, in response to detecting a selection of audio multicast message deletion affordance 754, device 700 will delete the audio multicast message. In some embodiments, in response detecting a selection of audio multicast message deletion affordance 754, device 700 re-displays user interfaces 710, 730, and/or 740.

As illustrated in FIG. 7E, in response to detecting tap gesture 750d, device 700 displays multicast send affordance 756 at the position that multicast stop recording affordance 746 was previously displayed in FIG. 7D (that is also the position in which multicast recording affordance 736 was displayed in FIG. 7C).

As an alternative to the flow described in FIGS. 7C, 7D, and 7E, device 700 can display the user interface illustrated in FIG. 7C1 in response to detecting tap gesture 750b in FIG. 7B. As illustrated in FIG. 7C1, in response to detecting tap gesture 750b, device 700 displays user interface 741 and automatically starts recording an audio multicast message (e.g., without detecting any further gestures, such as tap gesture 750c). As illustrated in FIG. 7C1, user interface 741 includes home destination identifier 732, exit affordance 734, audio wave 744a, multicast send affordance 747, which device 700 displays using similar techniques to those described above in relation to FIGS. 7C, 7D, and 7E. For example, in FIG. 7C1, audio wave 744a is dynamic and changes over time with respect to one or more characteristics (e.g., volume level, pitch, tone) of audio that is currently being recorded over the length of time that audio is being record. In some embodiments, audio wave 744a moves to the left as audio is being recorded over the length of time that audio is being record.

In some embodiments, audio is recorded using user interface 710 of FIG. 7B or user interface 741 of FIG. 7C1, instead of through the flow described in FIGS. 7C, 7D, and 7E and/or through the flow described in FIG. 7C. For example, in response to detecting a hold gesture on home multicast affordance 726, device 700 starts recording an audio multicast message. In such an example, the recording is stopped when the hold gesture is terminated (e.g., released), causing replacement of home multicast affordance 726 with a send affordance (e.g., similar to multicast send affordance 756). In some embodiments, when the hold gesture is terminated, the audio is automatically sent as a multicast message. In some embodiments, when the hold gesture is terminated, home multicast instruction 724 is replaced with an affordance to play the audio (e.g., similar to audio status bar 742) and an affordance to delete the audio (e.g., similar to audio multicast message deletion affordance 754). In another example, in response to detecting a tap gesture on home multicast affordance 726, home multicast affordance 726 operates similar to multicast recording affordance 736 (e.g., replaced with a stop affordance (similar to multicast recording stop affordance 746)). In such an example, in response to detecting a tap gesture on the stop affordance, (1) the stop affordance is replaced with a send affordance (e.g., similar to multicast send affordance 756) and (2) home multicast instruction 724 is replaced with an affordance to play the audio (e.g., similar to audio status bar 742) and an affordance to delete the audio (e.g., similar to audio multicast message deletion affordance 754). At FIG. 7E, device 700 detects tap gesture 750e at a location that corresponds to multicast send affordance 756, or device 700, at FIG. 7C1, device detects tap gesture 750c1 at a location that corresponds to multicast send affordance 747.

As illustrated in FIG. 7F, in response to detecting tap gesture 750e or tap gesture 750c1 (or a tap gesture on a send affordance, as described in the previous paragraph), device 700 causes the audio multicast message to be multicast (sent) to a set of external devices that are assigned to home 602. Such sending optionally includes (1) sending a message including the audio multicast message to another device (e.g., a device located within the home) and (2) the other device sending the audio multicast message to the set of external devices (in some embodiments, the other device identifies the set of external devices instead of device 700). Table 706 is provided to illustrate the external devices to which the audio multicast message is directed. For example, a checkmark in the "received audio multicast message" column indicates that the audio multicast message was directed to (e.g., sent to) the external device on the respective row of the checkmark and a dash in the "received audio multicast message" column indicates that the audio multicast message was not directed to (e.g., not sent to) the external device on the respective row of the dash.

In FIG. 7F, table 706 shows that the audio multicast message was directed to (and received by) each speaker (e.g., dining room speaker 616, bedroom speaker 636, living room speaker 646, living room speaker 648, sunroom speaker 656, and sunroom speaker 658). Notably, the audio multicast message was also directed to the personal devices (e.g., John's phone 604, tablet 634, and Jane's phone 684). In some embodiments, the audio multicast message is directed to the personal device irrespective of whether the personal device was at a location that corresponds to the home or not (e.g., independent of whether distances 670 and 680 exceed the threshold distance). For example, the audio multicast message was directed to John's phone 604 and tablet 634, which in FIG. 6 are located inside of home 602. In addition, the audio multicast message was also directed to computer device 674 and Jane's phone 684, which are outside of home 602 (respectively distance 670 and distance 680 away from home 602). In some embodiments, the audio multicast message is directed to the personal device dependent on whether the personal device is included in a network of the home (e.g., the audio multicast message is directed to the personal device when the personal device is included in the network of the home).

Table 706 in FIG. 7F also indicates that the audio multicast message was not directed to some external devices (and thus did not received the audio multicast message), although they are assigned to home 602. For example, table 706 shows that the audio multicast message was not directed to bedroom light 632 and living room lamp 642. In some embodiments, audio multicast messages are not directed to some types of external devices, irrespective of whether the external devices are assigned to a group of devices to which the audio multicast message is being sent. In some embodiments, these types of external devices include devices that do not have one or more audio input devices (e.g., microphones) and/or one or more audio output devices (e.g., speakers). In some embodiments, these types of external devices include devices that are inactive, not powered, or not functional at the time (or before the time) that the audio message is sent.

As illustrated in FIG. 7F, at some point after detecting tap gesture 750e or tap gesture 750c1 (or a tap gesture on a send affordance, as described above), device 700 re-displays user interface 710. In some embodiments, user interface 710 is displayed without device 700 detecting any additional inputs after detecting tap gesture 750e or tap gesture 750c1 (e.g., after a predetermined period of time after detecting tap gesture 750e or tap gesture 750c1) (or a tap gesture on a send affordance, as described above (e.g., after a predetermined period of time after detecting the tap gesture)). In some embodiments, user interface 710 is displayed when one or more additional inputs are detected, such as a tap gesture input that is detected on exit affordance 734 in FIG. 7E.

In some embodiments, in response to detecting tap gesture 750f1 at a location that corresponds to living room lamp control 718b, device 700 will send instructions that causes living room lamp 642 to turn on (or off if current state was on). In some embodiments, in response to detecting tap gesture 750f2 at a location that corresponds to living room speaker control 718c, device 700 will send instructions that cause living room speakers 646 and 648 (or at least one of them) to initiate playback of media (e.g., or pause playback of media if current state was playing). At FIG. 7F, device 700 detects tap gesture 750f3 at a location that corresponds to room navigation affordance 722b.

As illustrated in FIG. 7G, in response to detecting tap gesture 750f3, device 700 displays user interface 760 of home application and indicates that room navigation control 722b is selected (e.g., bold in FIG. 7G) instead of home navigation control 722a (e.g., not bold in FIG. 7G). User interface 760 is a user interface for controlling multiple external devices assigned to living room 602d, as indicated by living room location identifier 762. User interface 710 includes macro controls 766, external device controls 768, navigation controls 722, living room multicast instruction 774, and living room multicast affordance 776. These elements of user interface 760 are specific controls for devices of the living room as opposed to the elements of user interface 710 that were controls for devices of the entire home. In some embodiments, one or more of these elements of user interface 760 have a similar purpose or functionality to one or more of the elements of user interface 710 described above (e.g., in FIG. 7B). In some embodiments, user interface 760 includes status information that includes the current status of devices that are assigned to living room 602d. In some embodiments, device 700 displays user interface 760 of home application after receiving a swipe gesture on user interface 710.

Notably, the user interfaces (e.g., user interfaces 710 and 760) in the home application are laid out in a hierarchy. For example, user interface 710 is the top node of the hierarchy and includes controls for a group of external devices that are assigned to home 602. And, while displaying user interface 710, input (e.g., a single input (e.g., tap gesture 750f)) can be detected that causes device 700 to display user interface 760, which is a lower node in the hierarchy and includes controls for a group of external devices that are assigned to a respective room in home 602 (e.g., living room 602d) (and not other rooms).

As illustrated in FIG. 7G, external device controls 768 include living room speakers control 768a, living room lamp control 768b, living room switch (e.g. light switch) control 768c, and living television control 768d. In FIG. 7G, living room speakers control 768a and living room lamp control 768b causes each of their respective external device(s) to perform the same action(s), when selected, than the action(s) that living room lamp device control 718b and living room speakers device control 718c would cause their respective external device(s) to perform (e.g., in FIG. 7B). Thus, in this example, living room speakers control 768a and living room lamp control 768b are effectively the same controls as living room speakers device control 718c and living room lamp device control 718b, although they look visually different from each of their respective counterparts. In some embodiments, living room speakers control 768a and living room lamp control 768b do not look visually different from living room speakers device control 718c and living room lamp device control 718b.

When compared to external device controls 718 displayed in FIG. 7B, external device controls 768 include at least one external device control (e.g., living room speakers control 768a and living room lamp control 768b) that was displayed as a part of external device controls 718 in FIG. 7B and at least one external device control (e.g., living room switch control 768c and living room television controls 768d) that was not. In other words, at least one external device (e.g., living room speakers 646 and 648) can be controlled from user interfaces 710 and 760 and at least one external device (e.g., bedroom speaker 636 and living room television in user interface 760) can only be controlled from only one of user interface 710 and user interface 760. In some embodiments, in response to detecting tap gesture 750g1 at a location that corresponds to living room lamp control 768b, device 700 will send instructions that causes living room lamp 642 to turn on (or off if current state was on). In some embodiments, in response detecting tap gesture 750g2 at a location that corresponds to living room speaker control 768a, device 700 will send instructions that causes living room speakers 646 and 648 (or at least one of them) to initiate playback of media (e.g., or pause playback of media if current state was playing).

Additionally, while external device controls 718 were designated as being a favorite set of controls for home 602 in FIG. 7B, external device controls 768 are a set of all the controls that are assigned to living room 602d in FIG. 7G. In FIG. 7B, user interface 760 does not include any external devices that are not assigned to living room 602d. For example, dining room speaker device control 718a, sunroom speakers device control 718d, bedroom speaker device control 718e, and bedroom light device control 718f are not displayed on user interface 760. In some embodiments, a user interface for controlling multiple external devices for another room (e.g., such as the bedroom, sunroom, kitchen) is displayed in response to detecting tap gesture 750f3. In some embodiments, a user for controlling multiple external devices for another room is displayed in response to one or more inputs (e.g., a swipe input) that is detected at FIG. 7G.

As illustrated in FIG. 7G, user interface 760 includes living room multicast instruction 774 that is adjacent to living room multicast affordance 776. In FIG. 7G, living room multicast instruction 774 indicates that a user should select (e.g., "tap") living room multicast affordance 776 in order to send an audio multicast message that will be multicast to one or more devices assigned to living room 602d. Here, living room multicast affordance 776 does not look visually different from home multicast affordance 726 (e.g., in FIG. 7B) and is displayed in the same position on device 700 that home multicast affordance 726 was displayed in FIG. 7B. In some embodiments, living room multicast affordance 776 looks visually different from home multicast affordance 726. At FIG. 7G, device 700 detects tap gesture 750g3 at a location that corresponds to living room multicast affordance 776.

In response to detecting tap gesture 750g3, device 700 initiates a process for sending an audio multicast message to one or more devices assigned to living room 602d. In some embodiments, the process includes displaying user interface 780a, as depicted in FIG. 7H. In some embodiments, the process includes device 700 displaying a user interface, similar to user interface 741 of FIG. 7C1, that is displayed in response to detecting tap gesture 750g3. In some embodiments, the process includes device 700 displaying a user interface, similar to user interface 741 of FIG. 7C1, to record an audio multicast message to send to a group of devices that are assigned to living room 602d. In some embodiments, the process includes device 700 displaying user interfaces, as described below in FIGS. 7H-7J, where audio is recorded and sent to a group of devices that assigned to living room 602d.

As illustrated in FIG. 7H, in response to detecting tap gesture 750g3, user interface 780a is similar to user interface 730 in FIG. 7C, such that user interface 780a also includes exit affordance 734 and multicast recording affordance 736. However, user interface 780a includes living room destination identifier 782 instead of home destination identifier 732. Living room destination identifier 782 indicates that a group of devices that are assigned to living room 602d will receive a multicast message sent via user interface 780a. In some embodiments, user interface 780a does not list the individual names/identifiers of the devices that are part of the group. In some embodiments, one or more techniques discussed above in relation to user interface 730 can be applied to user interface 780a.

Turning to FIG. 7K, in some embodiments, user interface 780b is displayed in response to detecting tap gesture 750g3 and in accordance with a determination that one or more (or all) external devices (e.g., speakers) assigned to living room 602d are not available (e.g., are inactive or off). As illustrated in FIG. 7K, user interface 780b includes an unavailable indication 788 to indicate that one or more of the external devices assigned to living room 602d are unavailable (or all and not when less than all are unavailable) and multicast recording affordance 736 is displayed as being dimmed or greyed-out. At FIG. 7K, in response to detecting tap gesture 750k, device 700 continues to display user interface 780b (e.g., until the one or more external devices assigned to the living room 602d are available) because multicast recording affordance 736 is disabled. In some embodiments, a similar user interface to user interface 780b is displayed in response to device 700 detecting tap gesture 750c in FIG. 7C.

Turning back to FIG. 7H, device 700 receives tap gesture 750h at a location that corresponds to multicast recording affordance 736.

As illustrated in FIG. 7I, in response to receiving tap gesture 750h, device 700 starts recording audio (e.g., using a microphone of device 700) from one or more external sources and displays user interface 784, which is similar to user interface 740 in FIG. 7D. Like user interface 740, user interface 784 includes exit affordance 734, audio status bar 742, and multicast recording stop affordance 746. However, user interface 784 includes audio wave 744b that represents different audio that is being record from the audio recorded in FIG. 7D that was represented by audio wave 744a. User interface 784 also includes living room destination identifier 782 instead of home destination identifier 732. In some embodiments, one or more techniques discussed above in relation to user interface 740 can be applied to user interface 784. At FIG. 7I, device 700 detects tap gesture 750i at a location that corresponds to multicast stop recording affordance 746.

As illustrated in FIG. 7J, in response to detecting tap gesture 750i, device 700 displays user interface 786 and ceasing recording or capture audio from one or more external sources. User interface 786 is similar to user interface 750, except for audio wave 744b being displayed (instead of audio wave 744a) and living room destination identifier 782 being displayed (instead of home destination identifier 732). In some embodiments, one or more techniques discussed above in relation to user interface 750 can be applied to user interface 786. At FIG. 7J, device 700 detects tap gesture 750j at a location that corresponds to multicast send affordance 756 (or a tap gesture (e.g., similar to tap gesture 750c1) on a user interface that is similar to user interface 741 of FIG. 7C1 as described above).

In some embodiments, device 700 displays user interface 790 in response to detecting tap gesture 750j (or a tap gesture (e.g., similar to tap gesture 750c1) on a user interface that is similar to user interface 741 of FIG. 7C1 as described above), as illustrated in FIG. 7L. Device 700 displays user interface 790 when a determination that the audio multicast message cannot be deliver to one or more (or all) of the external devices assigned to living room 602*d*. User interface 790 includes not delivered indication 791 to indicate that the audio multicast message was not delivered to the targeted external devices. In some embodiments, a similar user interface to user interface 790 is displayed in response to device 700 detecting tap gesture 750*e* in FIG. 7E or tap gesture 750*c*1 in FIG. 7C1.

In some embodiments, one or more of user interface 730, 740, 750, 780*a*, 780*b*, 784, 786, and 790 include an affordance to swap the intended target of the recorded audio multicast message (e.g., change the destination identifier). For example, after initiating a process for sending an audio multicast message to a first group of device (e.g., devices assigned to home 602) (such as while showing FIG. 7J and before receiving input 750*j* or a tap gesture (e.g., similar to tap gesture 750*c*1) on a user interface that is similar to user interface 741 of FIG. 7C1 as described above), device 700 can detect a selection of the affordance to swap the intended target of the recorded audio multicast message (e.g., or multiple affordances to swap the intended target) from the first group of devices to a second group of device (e.g., devices assigned to dining room 602*b*).

In some embodiments, audio is recorded and sent from a user interface similar to user interface 741 of FIG. 7C1 that is displayed in response to detecting tap gesture 750*g*. In some embodiments, audio is recorded from user interface 760 in FIG. 7G, instead of through the flow described in FIGS. 7H-7J. For example, in response to detecting a hold gesture on living room multicast affordance 776, device 700 starts recording an audio multicast message. In such an example, the recording is stopped when the hold gesture is terminated (e.g., released), causing replacement of living room multicast affordance 776 with a send affordance (e.g., similar to multicast send affordance 756). In such an example, living room multicast instruction 774 is replaced with an affordance to play the audio (e.g., similar to audio status bar 742) and an affordance to delete the audio (e.g., similar to audio multicast message deletion affordance 754). In another example, in response to detecting a tap gesture on living room multicast affordance 776, living room multicast affordance 776 operates similar to multicast recording affordance 736 (e.g., replaced with a stop affordance (similar to multicast recording stop affordance 746)). In such an example, in response to detecting a tap gesture on the stop affordance, the stop affordance is replaced with a send affordance (e.g., similar to multicast send affordance 756) and living room multicast instruction 774 is replaced with an affordance to play the audio (e.g., similar to audio status bar 742) and an affordance to delete the audio (e.g., similar to audio multicast message deletion affordance 754).

As illustrated in Table 706 of FIG. 7M, in response to detecting tap gesture 750*j* (or a tap gesture on a send affordance, as described in the previous paragraph or a tap gesture (e.g., similar to tap gesture 750*c*1) on a user interface that is similar to user interface 741 of FIG. 7C1 as described above), device 700 causes the audio multicast message to be multicast (sent or directed to) to a set of external devices that are assigned to living room 602*d*. Such sending optionally includes (1) sending a message including the audio multicast message to another device (e.g., a device located with the living room) and (2) the other device sending the audio multicast message to the set of external devices (in some embodiments, the other device identifies the set of external devices instead of device 700). As shown by table 706, the audio multicast message is direct to only living room speakers 646 and 648, which receive the audio multicast message. Notably, the audio multicast message is not directed to the personal devices (e.g., John's phone 604, tablet 634, and Jane's phone 684) because personal devices are not assigned to groups that correspond to rooms (e.g., personal devices are not assigned to the group that corresponds to living room 602*d*). Additionally, the audio multicast message is not directed to living room lamp 642 because living room lamp 642 is not the type of external device that can receive audio multicast messages for similar reasons discussed above (e.g., in FIG. 7F).

At FIG. 7M, device 700 detects voice input 792*a* that includes the phrase "HEY ASSISTANT, MULTICAST HELLO." Sometime after detecting a portion of voice input 792*a*, device 700 displays user interface 794 with indication 794*a* (e.g., on the left side of user interface 794). Here, indication 794*a* is a response the portion of voice input 792*a*. Indication 794*a* is text that reads: "WHAT CAN I HELP YOU WITH?" In some embodiments, device 700 outputs media that includes an audible version of indication 794*a*.

At FIG. 7N, after displaying user interface 794 in FIG. 7M, device 700 displays indication 794*b* on the right side of user interface 794. In addition, device 700 displays indication 794*c* on the left side of user interface 794 and below indication 794*b*. Indication 794*b* is text that reads "HEY ASSISTANT, MULTICAST HELLO" which is the text that corresponds to the audible phrase included in voice input 792*a*. Additionally, indication 794*c* is text that reads "OK, I'VE SENT YOUR MULTICAST TO 123 MAIN ST." Notably, 123 Main St. is the identifier for home 602 (e.g., home location identifier 712 in FIG. 7B). In some embodiments, device 700 outputs media that includes an audible version of response 794*c*.

As shown by table 706 in FIG. 7N, after detecting voice input 792*a*, device 700 directs (e.g., sends) an audio multicast message to one or more devices assigned to home 602, as described above in relation to FIG. 7F. Table 706 shows that the audio multicast message (e.g., "Hello") is directed to each speaker (e.g., dining room speaker 616, bedroom speaker 636, living room speaker 646, living room speaker 648, sunroom speaker 656, and sunroom speaker 658) of the home and that the audio multicast message (e.g., "Hello") is directed to the personal devices (e.g., John's phone 604, tablet 634, Jane's phone 684) of the home, irrespective of whether a device was at a location that corresponds to the home or not and/or irrespective of whether the device is connected to the network associated with the home (as discussed above).

As illustrated in FIG. 7O, sometime after displaying user interface 794 in FIG. 7N, device 700 displays user interface 710. While displaying user interface 710, device 700 detects gesture 750*o* (e.g., a long press gesture) at a location that corresponds to bedroom speaker control 718*e* at FIG. 7O.

As illustrated in FIG. 7P, in response to detecting gesture 750*o*, device 700 displays user interface 796 that includes a plurality of setting affordances for controlling bedroom speaker 636 (e.g., a room setting (e.g., where bedroom is selected in FIG. 7P to show that bedroom speaker 636 is assigned to bedroom 602*c*), a favorites setting (e.g., where include in favorites is selected in FIG. 7P, which can cause bedroom speaker control 718*e* to be displayed on user interface 710)). As illustrated in FIG. 7P, one of the settings affordances is multicast setting affordance 796*a*, which includes an indication that bedroom speaker 636 is configured to receive multicast messages. At FIG. 7P, device 700 detects tap gesture 750p at a location that corresponds to multicast setting affordance 796a.

As illustrated in FIG. 7Q, in response to detecting tap gesture 750p, device 700 displays user interface 798, which includes multicast settings toggle 798a. In FIG. 7Q, multicast settings toggle 798a indicates that bedroom speaker 636 is configured to receive multicast messages (e.g., circle displayed to the right side of the settings toggle). At FIG. 7Q, device 700 detects tap gesture 750q at a location that corresponds to multicast setting affordance 798a.

As illustrated in FIG. 7R, in response to detecting tap gesture 750q, device 700 changes the state of multicast toggle 798a (e.g., moves circle to the left side of the settings toggle) to indicate that bedroom speaker 636 is not configured to receive multicast messages. In some embodiments, multicast setting affordance 796a in FIG. 7P is selectable to change a setting from on to off without navigating to a different user interface (e.g., user interface 798).

At FIG. 7S, device 700 detects voice input 792b that includes the phrase "HEY ASSISTANT, MULTICAST TO THE SUNROOM, HELLO." Sometime after detecting a portion of voice input 792b, device 700 displays user interface 794 with indication 794d (e.g., on the left side of user interface 794). Here, indication 794d is a response the portion of voice input 792b. Indication 794d is text that reads "WHAT CAN I HELP YOU WITH?" In some embodiments, device 700 outputs media that includes an audible version of indication 794d.

At FIG. 7T, after displaying user interface 794 in FIG. 7S, device 700 displays indication 794e on the right side of user interface 794 and displays indication 794f on the left side of user interface 794 (and below indication 794e). Indication 794e is text that reads, "HEY ASSISTANT, MULTICAST TO THE SUNROOM, HELLO," which is the text that corresponds to the audible phrase included in voice input 792b. Additionally, indication 794f is text that reads "OK, I'VE SENT YOUR MULTICAST TO THE SUNROOM." Notably, "sunroom" is an identifier for a group of devices that are assigned to sunroom 602e in FIG. 6.

As shown by table 706 in FIG. 7T, after detecting voice input 792b, device 700 directs (e.g., sends) an audio multicast message to one or more devices assigned to sunroom 602e. Table 706 shows that the audio multicast message (e.g., "Hello") is directed to sunroom speaker 656 and sunroom speaker 658 and the audio multicast message (e.g., "Hello") is not directed to the other devices. Notably, voice input 792b included an identifier (e.g., "sunroom") while voice 792a did not include an identifier. Thus, in some embodiments, when voice input is detected without an identifier, device 700 will send the audio multicast messages to the group of devices assigned to a default group. In some embodiments, the default group is a group that corresponds to a home (e.g., such has home 602), as described above in relation to FIG. 7N.

At FIG. 7U, device 700 detects voice input 792c that includes the phrase "HEY ASSISTANT, MULTICAST TO THE ENTERTAINMENT ZONE, HELLO." Sometime after detecting a portion of voice input 792c, device 700 displays user interface 794 with indication 794g (e.g., on the left side of user interface 794). Here, indication 794g is a response to a portion of voice input 792c. Indication 794g is text that reads, "WHAT CAN I HELP YOU WITH?" In some embodiments, device 700 outputs media that includes an audible version of indication 794g.

At FIG. 7V, sometime after displaying user interface 794 in FIG. 7U, device 700 displays indication 794i on the left side of user interface 794 (and below indication 794h).

Indication 794i is text that reads, "OK, I'VE SENT YOUR MULTICAST TO THE ENTERTAINMENT ZONE." A zone is an identifier for multiple groups of devices. Here, entertainment zone 660 is assigned to the group of devices that corresponds to sunroom 602e in FIG. 6 and the group of devices that corresponds to living room 602d in FIG. 6.

As shown by table 706 in FIG. 7V, after detecting voice input 792c, device 700 directs (e.g., sends) an audio multicast message to one or more devices assigned to the entertainment zone. Table 706 shows that the audio multicast message (e.g., "Hello") is directed to living room speaker 646, living room speaker 648, sunroom speaker 656, and sunroom speaker 658 and that the audio multicast message (e.g., "Hello") is not directed to the other devices.

As illustrated in FIG. 7V, device 700 also displays multicast notification 708a, which indicates that a new audio multicast message has been received from the group of devices assigned to sunroom 602e. The new audio multicast message is a reply to the audio multicast message sent in FIG. 7T.

At FIG. 7W, device 700 detects voice input 792d that includes the phrase "Hey Assistant, Multicast, we are going to leave soon."

At FIG. 7X, sometime after detecting voce input 792d, device 700 displays indication 794j on the left side of user interface 794 and under indication 794i. Indication 794j is text that reads: "HEY ASSISTANT, MULTICAST, WE ARE GOING TO LEAVE SOON." This text corresponds to the audible phrase included in voice input 792d. Here, voice input 792d does not include an identifier. Additionally, at FIG. 7X, device 700 also displays indication 794k on the right side of user interface 794 and under indication 794j. Indication 794k is text that reads: "OK, I'VE SENT YOUR MULTICAST TO THE SUNROOM."

As shown by table 706 in FIG. 7X, after detecting voice input 792d, device 700 initiates a process for sending the audio multicast message (e.g., "We are going to leave soon") to the group of devices assigned to sunroom. In particular, device 700 directs (e.g., sends) the audio multicast message to one or more devices assigned to sunroom 602e without voice input 792d including an identifier for the sunroom. Thus, because voice input 792d was detected within a predetermined period of time after receiving multicast notification 708a, device 700 intelligently directs the next detected audio multicast message to the sunroom instead of the default group (group corresponding to home 602). In some embodiments, device 700 intelligently routes the next detected audio multicast message to the sunroom, instead of the default group, because voice input 702d is received within a predetermined of time from when the previous multicast message was sent to the sunroom. In some embodiments, two different zones can share at least one group of devices (e.g., same group of devices assigned to a particular room).

As illustrated in FIG. 7X, device 700 also displays multicast notification 708b, which indicates that an audio multicast message has been received from the group of devices assigned to sunroom 602e. Here, device 700 receives this message at 10:19.

At FIG. 7Y, device 700 detects voice input 792e that includes the phrase "HEY ASSISTANT, MULTICAST, LET'S GO TO DINNER" and displays user interface 794 with indication 794l. Indication 794l reads: "WHAT CAN I HELP YOU WITH?" At FIG. 7Y, the time is now 10:30 (e.g., 11 minutes has gone by since the user interface in FIG. 7X was displayed.)

At FIG. 7Z, after displaying user interface 794 in FIG. 7Y, device 700 displays indication 794*m* on the right side of user interface 794 and displays indication 794*n* on the left side of user interface 794 (and below indication 794*m*). Indication 794*m* is text that reads "HEY ASSISTANT, MULTICAST, LET'S GO TO DINNER," which is the text that corresponds to the audio phrase included in voice input 792*e*. Additionally, indication 794*n* is text that reads "OK, I'VE SENT YOUR MULTICAST TO 123 MAIN ST."

As shown by table 706 in FIG. 7Z, after detecting voice input 792*e*, device 700 directs (e.g., sends) an audio multicast message (e.g., "Let's go to dinner") to one or more devices assigned to home 602, without voice input 792*e* including an identifier for home 602. Here, because more than a predetermined period of time has passed since multicast notification 708*b* was received, device 700 intelligently routes the next detected audio multicast message to the default group (group corresponding to home 602) instead of sunroom 602*e*. In some embodiments, device 700 intelligently routes the detected audio multicast message to the default group because voice input 702*e* is not received within a predetermined of time from when the previous multicast message was sent to sunroom 602*e*.

Further, as shown by table 706 in FIG. 7Z, the multicast message of FIG. 7Z (as opposed to FIG. 7N) was not directed to bedroom speaker 636 because the multicast setting for bedroom speaker 636 was turned off in response to detecting tap gesture 750*q* in FIG. 7Q.

At some time after displaying user interface 794 in FIG. 7Z, device 700 displays user interface 710 as illustrated in 7AA. At FIG. 7AA, device 700 detects tap gesture 750*aa* at a location that corresponds to home settings affordance 928, which is above home location identifier 712 in FIG. 7AA.

As illustrated in FIG. 7AB, in response to detecting tap gesture 750*aa*, device 700 displays user interface 797. User interface 797 includes a group of people 797*a* having one or more personal devices that are assigned to the home application (e.g., a group that corresponds to home 602*a*). User interface 797 also includes a multicast permissions affordance 797*b*. At FIG. 7AB, device 700 detects tap gesture 750*ab* at a location that corresponds to multicast permissions affordance 797*b*.

As illustrated in FIG. 7AC, in response to detecting tap gesture 750*ab*, device 700 displays user interface 799, which includes a plurality of options of when to allow audio multicast messages to be sent to a personal device. In FIG. 7AC, the options include never option 779*a*, at home option 779*b*, and anytime option 799*c*. In FIG. 7AC, anytime option 799*c* is selected. Thus, in some embodiments, device 700 is configured to receive multicast messages at any time, irrespective of the location of device 700. In some embodiments, in response to detecting tap gesture 750*c*1 at a location that corresponds to never option 779*a*, device 700 is configured to never receive multicast messages, irrespective of the location of device 700. In some embodiments, in response to detecting tap gesture 750*c*2 at a location that corresponds to at home option 799*b*, device 700 is configured to only receive multicast message while device 700 is at a location that corresponds to home 602 or within home 602 (e.g., within the threshold distance of the home or with respect to whether the device is connected to one or more networks associated with home 602). In some embodiments, when device 700 is distance 670 and distance 680 away from home, such as computer device 674 and Jane's Phone 684, device 700 would not receive an audio multicast message when at home option 799*b* is selected if those distances are greater than the threshold distance. In some embodiments, one or more options are selectable and displayed, such as an option to only receive message while the device is away from the home. In some embodiments, when device 700 is connected to the one or more networks associated with home 602 (e.g., connected to the home Wi-Fi network), device 700 would receive an audio multicast message when at home option 799*b* is selected; and when device 700 is not connected to the one or more networks associated with home 602 (e.g., not connected to the home Wi-Fi network), device 700 would not receive an audio multicast message when at home option 799*b* is selected (e.g., irrespective of the location of the device).

FIGS. 7AD-7AE illustrate exemplary user interfaces for displaying the user interfaces described above on a device with a bigger screen than device 700, such as tablet 634. User interface 711 in FIG. 7AD corresponds to user interface 710 discussed above. In addition, user interface 731 in FIG. 7AE corresponds to user interface 730 discussed above. However, any of the user interfaces discussed above, can be displayed and transitioned on tablet 634, using one or more similar techniques to those discussed above for FIGS. 7A-7AC.

FIGS. 7AF-7AH illustrate exemplary user interfaces for displaying the user interfaces described above on a device with a smaller screen than device 700, such as smartwatch 701. User interface 713 in FIG. 7AF corresponds to user interface 710 discussed above. Moreover, user interface 741 in FIG. 7AG corresponds to user interface 740 discussed above. Further, user interface 751 in FIG. 7AH corresponds to user interface 750 discussed above. However, any of the user interfaces discussed above, can be displayed and transitioned on smartwatch 701, using one or more similar techniques to those discussed above for FIGS. 7A-7AC.

FIGS. 8A-8B are a flow diagram illustrating a method for sending an audio message, in accordance with some embodiments. Method 800 is performed at a computer system (e.g., 100, 300, 500, 634, 674, 700, 701, 850) in communication with a display generation component (e.g., a touch-sensitive display). Some operations in method 800 are, optionally, combined, the orders of some operations are, optionally, changed, and some operations are, optionally, omitted.

As described below, method 800 provides an intuitive way for sending an audio message, in accordance with some embodiments. The method reduces the cognitive burden on a user for sending an audio message, thereby creating a more efficient human-machine interface. For battery-operated computing devices, enabling a user to send audio messages faster and more efficiently conserves power and increases the time between battery charges.

The computer system displays (802), via the display generation component, a first user interface (e.g., 730) (e.g., a user interface for controlling a set of external devices). The first user interface includes (e.g., includes display): a first selectable user interface object (e.g., 726), where selection of the first selectable user interface object initiates a process (e.g., user interfaces 730, 740, and 750) for recording (e.g., at the computer system via a microphone) and sending a first audio message to a set of external devices (e.g., 706 in FIG. 7F) (e.g. each external device in the set of external devices), wherein the set of external devices includes a first set of one or more external devices (e.g., 616) and a second set of one or more external devices (e.g., 646, 648). In some embodiments, while displaying the first selectable user interface object, the computer system receives input that corresponds to a selection of the first selectable user interface object and, in response to receiving the input that corresponds to the selection of the first selectable user interface object, the computer system displays a user interface for recording and sending an audio message to the first set of one or more devices and the second set of one or more devices (e.g., the set of external devices). In some embodiments, the first set of one or more devices is different from the second set of one or more devices. In some embodiments, the user interface for controlling the set of external devices includes displaying a plurality of representations and/or accessory control user interface objects that corresponds to the first set of one or more devices and the second set of one or more devices. In some embodiments, the plurality of accessory control user interface objects corresponds to the first set of one or more devices and the second set of one or more devices is a set of one or more selectable user interface objects. In some embodiments, each of the plurality of accessory control user interface objects, when selected, causes a respective accessory device in the set of external devices to perform one or more functions and/or change a state of the respective accessory device. In some embodiments, the set of external devices includes a type of external electronic device (e.g., a cellular phone, tablet computer) that is not in the first set of one or more devices (e.g., a smart speaker) or the second set of one or more devices (e.g., a smart speaker). In some embodiments, set of external devices is associated with a top-level location (or destination) (e.g., a location of a first type) (e.g., a home location, business, an office (e.g., a location that is a top-level location (e.g., a location that defines one or more locations (e.g., sub-locations) and/or one or more regions (or zones) that are within an area and/or perimeter that is defined by the location of the top-level location, a location that is at the top level of a hierarchy of locations, a location that is linked (e.g., programmatically) to one or more locations (e.g., sub-locations) and/or one or more regions (or zones)))). In some embodiments, set of external devices includes the first group of devices (e.g., a subgroup of devices) and the second group of devices (e.g., a subgroup of devices). In some embodiments, a sub-group of devices is associated with a sub-location (e.g., a room positioned (e.g., in the boundary, area, or perimeter of the top-level location; and/or defined, identified, and/or linked (e.g., programmatically linked) (e.g., by a user) to the top-level location) in a top-level location and/or a zone (e.g., a location that is defined by two or more sub-locations within (e.g., within the boundary, area, or perimeter of the top-level location and/or defined, identified, and/or linked (e.g., by a user)) the top-level location (e.g., an entertainment zone that includes a living room and a dining room within the top-level location, a personal zone that includes two or more bedrooms, living rooms, bathrooms within the top-level location) in the top-level location). In some embodiments, the target group is associated with the sub-group of devices and not the top-level group of devices.

The first user interface includes a first accessory control user interface object (e.g., one of 718) (e.g., a selectable user interface object) corresponding to a first external accessory device, where selection (e.g., 750/1, 750/2) of the first accessory control user interface object initiates a process to transmit an instruction (e.g., selection causes transmission of the instruction) to change a state of the first external accessory device (e.g., causes the door to lock or unlock, causes the light to turn on or off). In some embodiments, in response to receiving an input, the computer system initiates a process to transmit an instruction (e.g., selection causes transmission of the instruction) to change a state of the first external accessory device and the visual appearance of the first accessory control user interface object changes from a first visual appearance to a second visual appearance that is different from the first visual appearance (e.g., pressed to depressed state (or vice-versa), a first color to a second color, one or more difference characters (e.g., "on to "off" (or vice-versa))).

The computer system, while displaying the first user interface (e.g., and the first user interface), receives (804) an input (e.g., 750/3) (e.g., a single user input (e.g., a tap input on a selectable user interface object or icon that will navigate to the user interface for controlling the second set of one or more external device) or multiple user inputs that are received while the first selectable user interface object are displayed) that corresponds to a request to display a second user interface (e.g., 760) (e.g., a user interface for controlling the second set of one or more external devices (e.g., without controlling the first set of one or more external devices)). In some embodiments, the computer system receives the request to display the second user interface when the computer system receives selection of a selectable user interface object for displaying the second user interface.

In response to receiving the request to display the second user interface, the computer system displays (806) the second user interface (e.g., 760). The second user interface includes (e.g., includes displaying) a second selectable user interface object (812) (e.g., 776), where selection of the second selectable user interface object initiates a process (e.g., user interfaces 780a, 784, and 786a) for recording and sending a second audio message to the second set of one or more external devices (e.g., 646, 648) without sending the second audio message to the first set of one or more external devices (e.g., 706 in FIG. 7M). The second user interface includes a second accessory control user interface object (814) (e.g., one of 768) (e.g., a selectable user interface object) corresponding to a second external accessory device (e.g., 642, 646, 648) (e.g., without corresponding to the first set of one or more devices), where selection (e.g., 750g1, 750g2) of the second accessory control user interface object initiates a process to transmit an instruction (e.g., selection causes transmission of the instruction) to change a state of the second external accessory device. In some embodiments, in response to receiving an input, the computer system initiates a process to transmit an instruction (e.g., selection causes transmission of the instruction) to change a state of the second external accessory device and the visual appearance of the second accessory control user interface object changes from a first visual appearance to a second visual appearance that is different from the first visual appearance (e.g., pressed to depressed state (or vice-versa), a first color to a second color, one or more difference characters (e.g., "on to "off" (or vice-versa))). In some embodiments, in response to receiving the request to display the second user interface, the computer system ceases to display the first user interface and first user interface object. In some embodiments, the second selectable user interface object replaces the first selectable user interface object. In some embodiments, the second selectable user interface object is displayed at the same location as where the first selectable user interface object was previously displayed. In some embodiments, the second user interface replaces display of the first user interface. In some embodiments, the computer system cannot control (e.g., cannot cause an external device to change state) the first set of one or more external devices from the second user interface (e.g., an accessory control user interface object corresponds to one of the first set of one or more devices is not displayed). In some embodiments, the first user interface includes displaying a set of one or more representations and/or accessory control user interface objects that corresponds to the first set of one or more external devices (without display a set of one or more representations that corresponds to the second set of one or more external devices). In some embodiments, each of accessory control user interface objects, when selected, causes a respective device to perform one or more functions or change a state of the respective device. In some embodiments, while displaying the second selectable user interface object, the computer system receives input that corresponds to a selection of the second selectable user interface object and, in response to receiving the input that corresponds to the selection of the second selectable user interface object, the computer system displays a user interface for recording and sending an audio message to the second set of one or more external devices without sending the audio message to the first set of one or more external devices. In some embodiments, while displaying the second selectable user interface object, the computer system receives a user input (e.g., a swipe input) that corresponds to a request to display a user interface for controlling the first set of one or more external devices (e.g., without controlling the second set of one or more external devices) that includes displaying a selectable user interface object, that, when selected, initiates a process for recording and sending the audio message to the first set of one or more external devices without sending the audio message to the second set of one or more external devices. In some embodiments, an audio message includes audio that is recorded at the computer system. In some embodiments, the process for recording and sending an audio message to an external device includes recording the audio message using the computer system (e.g., using a microphone that is in communication with the computer system). In some embodiments, the audio message includes voice audio of the user of the computer system. Providing hierarchal user interfaces to control a hierarchal set of controls, where each user interface corresponds to a node in the respective hierarchy, provides a user with visual feedback concerning the sets of devices in the hierarchy of controls that can be controls via a respective user interface along with visual feedback concerning how the user can intuitively navigate to another respective user interface for controlling another respective set of devices. Providing improved visual feedback to the user enhances the operability of the computer system and makes the user-sys interface more efficient (e.g., by helping the user to provide proper inputs and reducing user mistakes when operating/interacting with the computer system) which, additionally, reduces power usage and improves battery life of the computer system by enabling the user to use the device more quickly and efficiently.

In some embodiments, the first external accessory device (e.g., 718*b*) is different from the second external accessory device (e.g., 768*c*). In some embodiments, the first external accessory device is an external device that is grouped under the "Home" group, but is not part of the "Dining Room" category (e.g., a light located in a bedroom) and the second external accessory device is an external device that is grouped under both the "Home" group the "Dining Room" category (e.g., a light located in the dining room). In contrast, in some embodiments, the first external accessory device is the same device as the second external accessory device (e.g., they are the same light located in the dining room, or they are the same smart speaker located in the dining room).

In some embodiments, the first selectable user interface object (e.g., 726) (e.g., while displayed as part of the first user interface) is displayed at a first location (e.g., location of 726 and 776) via the display generation component (e.g., on the display generation component) and the second selectable user interface object (e.g. 776) (e.g., while displayed as part of the second user interface) is displayed at the first location (e.g., location of 726 and 776) via the display generation component (e.g., on the display generation component). In some embodiments, the input received while displaying the first user interface causes the second selectable user interface object to replace display of the first selectable user interface object. Providing the first selectable user interface or the second selectable user interface objects at the same location when prescribed conditions are met allows the user to quickly locate a selectable user interface object for multicasting without having to identify any different operational characteristics (e.g., what particular set of devices will selectable the particular selectable user interface object send a record audio message to) of the selectable user interface object. Providing improved visual feedback to the user enhances the operability of the computer system and makes the user-system interface more efficient (e.g., by helping the user to provide proper inputs and reducing user mistakes when operating/interacting with the device) which, additionally, reduces power usage and improves battery life of the computer system by enabling the user to use the computer system more quickly and efficiently.

In some embodiments, the first external accessory device (e.g., 646, 648) (e.g., a smart speaker, wherein playback of music can be configured using the first accessory control user interface object) is included in the set of external devices (e.g., the first external accessory device can be configured from the first user interface and audio (recorded at the computer system) is sent to the first external accessory device using the first selectable user interface object). In some embodiments, the first user interface includes a third accessory control user interface object (e.g., 718*b*) (e.g., a selectable user interface object) corresponding to a third external accessory device (e.g., 642). In some embodiments, selection of the third accessory control user interface object initiates a process to transmit an instruction (e.g., selection causes transmission of the instruction) to change a state of the third external accessory device (e.g., causes the door to lock or unlock, causes the light to turn on or off). In some embodiments, the third external accessory device (e.g., 642) is not included in the set of external devices and selection of the first selectable user interface object (e.g., 776) does not initiate a process for sending (and/or recording) the first audio message to the third external accessory device (e.g., 706 in 7F). In some embodiments, the first user interface includes accessory control user interface objects for some external accessory devices that can be controlled (e.g., turned on/off), but that are not sent the first audio message (e.g., because the external accessory devices do not have a speaker for playback of the audio message) and the first user interface includes accessory control user interface objects for some external accessory devices that can be controlled (e.g., turned on/off) and that are sent the first audio message (e.g., because the external accessory devices have speakers for playback of the audio message). In some embodiments, the second user interface includes accessory control user interface objects for some external accessory devices that can be controlled (e.g., turned on/off), but that are not sent the second audio message (e.g., because the external accessory devices do not have a speaker for playback of the audio message) and the second user interface includes accessory control user interface objects for some external accessory devices that can be controlled (e.g., turned on/off) and that are sent the second audio message (e.g., because the external accessory devices have speakers for playback of the audio message). In some embodiments, the first set of one or more external devices (e.g., the device in the bedroom group to which the audio message is sent) does not include the first external accessory device (e.g., a light in the bedroom group to which the audio message is not sent) and the second set of external devices (e.g., the device in the dining room group to which the audio message is sent) does not include the second external accessory device (e.g., a light in the dining room group to which the audio message is not sent). Thus, in some embodiments, the audio message is not transmitted to all devices that can be controlled using the accessory control user interface objects which, when selected, cause a respective accessory device to perform one or more functions and/or change a state of the respective accessory device. In some embodiments, an external device that can be controlled (to perform one or more functions and/or change a state of the respective accessory device) using a respective accessory control user interface object is included in the set of external devices (e.g., the first or second set of external devices) and, thus, an audio message can be transmitted to that external device and that external device can be separately controlled.

In some embodiments, the first user interface corresponds to a top-level location (e.g., 602) (e.g., a structure, a home) and the second user interface corresponds to a first sub-location (e.g., 602d) of a first type (e.g., 602a-602e) (e.g., a room of the structure, a dining room in the home). In some embodiments, the second set of one or more external devices (e.g., 646, 648) correspond to the first sub-location (e.g., 602d) (e.g., the second set of one or more external devices have been assigned to the sub-location of the first type). In some embodiments, (e.g., any of) the second set of one or more external devices (e.g., 646, 648) cannot be made to correspond to a second sub-location (e.g., 602a, 602b, 602c, or 602e) (e.g., any sub-location (other than the first sub-location) of the first type (e.g., any other room of the structure) based on the second set of one or more external devices corresponding to the first sub-location (e.g., 602a-602e). In some embodiments, the first user interface corresponds to a top-level location and the second user interface corresponds to a sub-location (e.g., a room of the home) of the top-level location. In some embodiments, the first room and a second room are part of a zone (e.g., a collection of rooms grouped together). In some embodiments, the second set of one or more external devices are devices identified (e.g., by a user) of being located in the room to which the second user interface corresponds.

In some embodiments, the first user interface corresponds to a top-level location (e.g., a structure, a home) and the second user interface corresponds to a third sub-location of a second type (e.g., entertainment zone (e.g., 602d and 602e)) (e.g., a first zone, main floor) that corresponds to a plurality (e.g., 602a-602e) of sub-locations of a first type (e.g., 602a-602e) (e.g., a plurality of rooms). In some embodiments, the second set of one or more external devices corresponds to the third sub-location based on the second set of one or more external devices being included in the plurality of sub-locations of the first type (e.g., 602a-602e) (e.g., a plurality of rooms of the structure, including a first room (e.g., a dining room in the home) and a second room (e.g., a bedroom in the home)). In some embodiments, the first user interface corresponds to a top-level location and the second user interface corresponds to a sub-location (e.g., multiple rooms of the home) of the top-level location. In some embodiments, the second set of one or more external devices includes at least one device assigned to the first room and at least one device assigned to the second room. In some embodiments, the top-level location corresponds to at least one device to which the third sub-location does not correspond (e.g., the home includes some devices that are not included in the third sub-location).

In some embodiments, the second external accessory device is associated with (e.g., corresponds to) the third sub-location (e.g., entertainment zone (e.g., 602d and 602e)) (e.g., the first zone) of the second type. In some embodiments, the second external accessory device (e.g., 646, 648) is also associated with (e.g., corresponds to) a fourth sub-location (e.g., second zone) of the second type (e.g., entertainment zone (e.g., 602d and 602e)) that is different from the third sub-location. In some embodiments, the second zone is a sub-location (e.g., multiple rooms of the home). In some embodiments, the second zone is associated with an external accessory device that is not associated with the first zone. In some embodiments, the computer system can initiate processes for recording and sending messages to various zones. A first zone and a second zone can correspond to different sets of devices, some of which correspond to both the first zone and the second zone and some of which corresponds to only one of the first zone or the second zone.

In some embodiments, the second set of one or more external devices (e.g., 646, 648) is associated with a first location (e.g., 602d) (e.g., a room, a sub-location, a zone) and wherein the process for recording and sending the second audio message to the second set of one or more external devices without sending the second audio message to the first set of one or more external devices includes displaying an indication (e.g., textual indication, graphical indication) of the first location (e.g., 782) (e.g., text specifying the name of the room or zone that the audio message will be transmitted to). In some embodiments, processes for recording and sending audio messages include displaying an indication of the location that corresponds to the external devices to which the respective audio message will be sent. In some embodiments, the first user interface corresponds to a top-level location (e.g., a structure, such as a home) and the second user interface corresponds to a sub-location (e.g., a room of the home, a zone of the home) of the top-level location. In some embodiments, displaying the second user interface, the computer system detects selection of (e.g., tap on, press and hold on) the second selectable user interface object. In some embodiments, in response to detecting selection of the second selectable user interface object, the computer system displays a recording user interface (e.g., by replacing all or part of the second user interface) that concurrently includes: a record user interface object (e.g., a selectable record button), wherein selection of (e.g., tap on, press and hold on) the record user interface object causes recording of an audio message by recording audio detected by the computer system; and an indication (e.g., textual indication, graphical indication) of the sub-location (e.g., text specifying the name of the room or zone that the audio message will be transmitted to). In some embodiments, the second user interface includes the indication of the sub-location. Displaying an indication of a location that is associated with a group of devices to which an audio message is intended to be multicast provide the user with visual feedback concerning the state of the process for recording and sending the audio message. Providing improved visual feedback to the user enhances the operability of the computer system and makes the user-system interface more efficient (e.g., by helping the user to provide proper inputs and reducing user mistakes when operating/interacting with the device) which, additionally, reduces power usage and improves battery life of the computer system by enabling the user to use the computer system more quickly and efficiently.

In some embodiments, as a part of initiating a process for recording and sending an audio message to external devices, the computer system initiates, automatically (e.g., without intervening user input that corresponds to a request to initiate recording of the audio), the recording of a new audio message and displays a recording user interface (e.g., 741) that includes a dynamic indication (e.g., 744a) of the audio being recording.

In some embodiments, the computer system detects selection of (e.g., tap on, press and hold on) the record user interface object. In response to detecting selection of the record user interface object, the computer system records an audio message. Subsequent to recording the audio message (and prior to transmitting the audio message), the computer system provides an option to change the external devices to which the message will be transmitted. In some embodiments, the computer system receives activation of a drop-down affordance and, in response, displays one or more sub-locations (each of which correspond to a respective set of external devices). The computer system receives selection of one of the one or more sub-locations and a confirmation to transmit the audio message. In response, the computer system transmits the audio message to the respective set of external devices corresponding to the selected sub-location, rather than to the second set of one or more external devices corresponding to the second user interface.

In some embodiments, the set of external devices includes a personal mobile electronic device (e.g., 604, 634, 684) (e.g., a smart phone, a cell phone, a watch). In some embodiments, the personal mobile electronic device is not included in the first set of or more devices and is not included in the second set of one or more external devices. In some embodiments, the personal mobile electronic device is not assigned to any sub-location of the top-level location, but is a member of the top-level location. Thus, in some embodiments, selecting the first selectable user interface object initiates a process to record and send an audio message to the set of external devices, including the personal mobile electronic device (and any other personal mobile electronic devices that are members of the top-level location).

In some embodiments, the second set of one or more external devices does not include a personal mobile electronic device (e.g., 604, 634, 684) (e.g., a smart phone, a cell phone, a watch). In some embodiments, the personal mobile electronic device is not included in the first set of or more devices and is not included in the second set of one or more devices. In some embodiments, the set of external devices includes the personal mobile electronic device and, therefore, audio messages sent from the first user interface are transmitted to the personal mobile electronic device (and, optionally, other mobile devices that are part of the home). In some embodiments, audio messages sent from the second user interface (or any user interface corresponding to a sub-location) are not transmitted to the personal mobile electronic device (and, optionally, are also not transmitted to other mobile devices that are part of the home). In some embodiments, the computer system disallows assigning personal mobile electronic devices to any sub-location of the top-level location, but permits assigning personal mobile electronic devices to the top-level location. Thus, in some embodiments, selecting the second selectable user interface object initiates a process to record and send an audio message to the second set of one or more devices, which does not include the personal mobile electronic device (or any other personal mobile electronic devices that are members of the top-level location).

In some embodiments, the computer system, subsequent to displaying the second user interface, receives input (e.g., 750q) (e.g., user input; an input on a settings user interface) to disable sending audio messages to the second set of one or more external devices (e.g., 638). In some embodiments, in response to receiving the input to disable sending audio messages to the second set of one or more external devices, the computer system disables (e.g., 768a) sending of audio messages to the second set of one or more external devices via selection of the first selectable user interface object (e.g., 726) (e.g., without disabling sending of audio messages to the first set of one or more external devices via selection of the first selectable user interface object) and via selection of the second selectable user interface object (e.g., 776). In some embodiments, after disabling sending of audio messages to the second set of one or more external devices, navigating back to the first user interface and receiving selection of the first selectable user interface object initiates a process for recording and sending an audio message to the first set of one or more external devices without sending the audio message to the second set of one or more external devices. In some embodiments, in response to receiving the input to disable sending audio messages to the second set of one or more external devices, the computer system removes the second set of one or more external devices from the set of external devices. In some embodiments, after disabling sending of audio messages to the second set of one or more external devices, navigating back to the second user interface and receiving selection of the second selectable user interface object does not initiate a process for recording and sending an audio message to any devices. In some embodiments, after disabling sending of audio messages to the second set of one or more external devices, the second user interface does not include the second selectable user interface object (or includes a non-selectable/disabled version of the user interface object) such that the process for recording and sending an audio message to the second set of one or more external devices cannot be initiated.

In some embodiments, the first user interface corresponds to a top-level location (e.g., 602) (e.g., a structure, such as a home) and the second user interface corresponds to a sub-location (e.g., 602a-602d) (e.g., a room of the home, a zone of the home) of the top-level location (e.g., 602). In some embodiments, the computer system receives (808) (e.g., while not displaying the first user interface and not displaying the second user interface), at a microphone that is in communication with the computer system (e.g., a microphone of the computer system), audio input (e.g., 792a-792e) including a natural language request for a digital assistance, the audio input including: an instruction to initiate a process to transmit an audio message (e.g., including the term "multicast"), a location identifier (e.g., the top-level location, a sub-location), and an audio message (e.g., received subsequent to the instruction to initiate a process to transmit an audio message and/or received subsequent to the identifier of the location). In some embodiments, in accordance with a determination that the location identifier corresponds to the top-level location (e.g., 782a), the computer system transmits (810) (e.g., multicasting) the audio message, without establishing a two-way audio communication channel (e.g., without establishing a full-duplex audio communication channel) with any devices of the set of external devices, for playback at the set of external devices, including the first set of one or more external devices and the second set of one or more external devices. In some embodiments, in accordance with a determination that the location identifier corresponds to the sub-location (e.g., 792*b*, 792*c*): the computer system transmits (812) (e.g., multicasting) the audio message, without establishing a two-way audio communication channel with any devices of the set of external devices, for playback at the second set of one or more external devices and not for playback at the first set of one or more external devices. In some embodiments, the computer system transmits the location identifier along with the audio message such that a remote device (e.g., a service, an external device of the set of external devices) can distribute the audio message to the external devices corresponding to the respective external devices.

In some embodiments, as a part of initiating a process for recording and sending an audio message to external devices includes, the computer displays a recording user interface (e.g., 730, 740, 750) (e.g., by replacing all or part of the second user interface) that concurrently includes: a record user interface object (e.g., 736) (e.g., a selectable record button), wherein selection (e.g., 750*c*) of (e.g., tap on and then press end when audio message is complete, press and hold on while speaking audio message, tap on and allow the computer system to identify the end of the audio message) the record user interface object causes recording of an audio message by recording audio detected by the computer system; and a send user interface object (e.g., 756) (e.g., a selectable send button), wherein selection (e.g., 750*e*) of (e.g., tap on) the second user interface object causes the computer system to send the audio message to the external devices. In some embodiments, the recording user interface also concurrently includes an indication (e.g., textual indication, graphical indication) of the location (e.g., top-level location, sub-location; text specifying the name of the room or zone that the audio message will be transmitted to) corresponding to the external devices to which the audio message will be sent.

In some embodiments, the computer system is in communication with one or more input devices including a microphone. In some embodiments, as a part of the process (e.g., user interfaces 730, 740, 750) for recording and sending the first audio message to the set of external devices, the computer system receives, via the microphone, a second audio input. In some embodiments, the computer system transmits the first audio message to the set of external devices, wherein the first audio message is based on (e.g., includes a recording of) the second audio input.

Note that details of the processes described above with respect to method 800 (e.g., FIGS. 8A-8B) are also applicable in an analogous manner to the methods described below. For example, method 800 optionally includes one or more of the characteristics of the various methods described below with reference to methods 1000 and 1200. For example, the computer systems can be the same systems. For another example, the audio message sent in method 800 can be the media received in 1000. For another example, the voice input transmitted in method 1200 can be the same as the media received in method 1000. For brevity, these details are not repeated below.

FIGS. 9A-9X illustrate exemplary devices and exemplary user interfaces for displaying notifications in accordance with some embodiments. The user interfaces in these figures are used to illustrate the processes described below, including the processes in FIG. 10.

The phrases "multicast message" and/or "audio multicast message" are used generally herein with respect to FIGS. 9A-9X to refer to multicast messages that are sent from a device, using similar techniques as described in FIGS. 7A-7AH, 8A-8B, 11A-11F, and 12. However, multicast message and/or audio multicast message, as used herein, are not necessarily intended to include multicast communication that are sent using other features of device 700.

FIG. 9A illustrates electronic device 700 displaying user interface 900. In FIG. 9A, electronic device 700 is a portable multifunction device and has one or more components described above in relation to one or more of devices 100, 200, 300, and 500. With respect to the figures described below, in some embodiments, device 700 is operating at a location that is less than a threshold distance away from home 602; however, in other embodiments, device 700 is operating at a location that is greater than a threshold distance away from home 602.

As illustrated in FIG. 9A, user interface 900 is a settings user interface that corresponds to the home application, as discussed above (e.g., in FIG. 6 and FIGS. 7A-7AH). Here, the settings user interface is a settings page for Cam Appleseed, a person (e.g., user) who is registered to device 700 and a person who is recognized by the home application (e.g., group of people 797*a* in FIG. 7AB). As illustrated in FIG. 9A, device 700 is currently configured to receive multicast notifications, which is shown by the multicast option 900*a* being enabled in FIG. 9A. Since the multicast option 900*a* is enabled, the multicast notifications will be received by device 700 as illustrated in the FIGS. 9B-9X. In some embodiments, device 700 detects tap gesture 950*a* at a location that corresponds to multicast option 900*a*. In some embodiments, in response to detecting tap gesture 950*a* (or one or more subsequent tap gestures), device 700 changes multicast option 900*a* from being enabled to disabled and device 700 is not configured to receive multicast messages that are sent based on flows described herein. Thus, in some embodiments, device 700 does not receive multicast messages when multicast option 900*a* is disabled.

FIGS. 9B-9H illustrate multicast notifications and non-multicast notifications being displayed over a period of time, while multicast option 900*a* is enabled. In particular, FIGS. 9B-9H illustrate that multicast notifications (e.g., multicast message sent using the methods described herein) that are directed to (e.g., correspond to) a particular target group of devices decay or cease to be displayed (e.g., after a predetermined period of time) unless a new multicast notification that is also directed to the particular target group of devices is received within a with a predetermined period of time. In some embodiments, the particular target group of devices is a group of devices assigned to a home (e.g., home 602 in FIG. 6), a room (e.g., dining room 602*b*, bedroom 602*c* in FIG. 6), or a zone (e.g., "entertainment zone" as described, for example, in relation to FIG. 7U).

For example, in FIG. 9B, at 10:00 AM, device 700 receives data indicating updated content has been published by a news application.

As illustrated in FIG. 9B, in response to receiving the data, device 700 displays a user interface that includes news notification 902. In FIG. 9B, news notification 902 is not a multicast notification. Therefore, news notification 902 is displayed regardless of whether multicast option 900*a* is enabled or disabled. In other words, the state of multicast option 900*a* does not impact news notification 902 because it is not a multicast notification.

At 10:02 AM, device 700 receives data indicating that a new audio multicast message has been sent (e.g., directed to devices that include electronic device 700) to home 602 ("home target group"). In some embodiments, the data includes a target group identifier (e.g., "Home") as the receiver for the new audio multicast message.

As illustrated in FIG. 9C, in response to receiving the data, device 700 displays multicast notification 904, which is representative of the data received at 10:02 AM. In FIG. 9C, multicast notification 904 is displayed concurrently with news notification 902. Multicast notification 904 includes application indication 904a, notification type indication 904b, sender indication 904c, target indication 904d, and time of receipt indication 904e.

Application indication 904a indicates an application that is providing the notification. Here, application indication 904a includes a graphical representation icon that is assigned to a home application and is similar to home icon 704a in FIG. 7A.

Notification type indication 904b indicates the notification type of the notification. Here, the notification type is a multicast notification.

Sender indication 904c indicates the sender of the audio multicast message. Here, the sender is a person, John, who is registered with the device (e.g., a device that is in the home target group) that has initiated the process for sending the audio multicast message. In some embodiments, when the sender is a person, an identity of the sender is established by one or more devices analyzing voice input corresponding to the audio multicast messages, using one or more voice identification algorithms. In some embodiments, when the identity of the sender cannot be established as a person, sender indication 904c indicates that the sender is a device (e.g., "Living Speaker"), such as the device that sent the audio multicast message. In some embodiments, the sender is not established as a person, for example, a person is not established at the sender device when a person is not registered with the sender device that initiated the process for sending the audio multicast message and/or multiple people are registered with the device that initiated the process for sending the audio multicast message.

Target indication 904d indicates a target group of devices to which an audio multicast message corresponds. Here, target indication 904d is the home target group (e.g., "From Home"). In some embodiments, the target group (that corresponds to the audio multicast message) is the group identified by the sender of the audio multicast message, as described above in relation to FIGS. 7E-7F, 7J-7M, and 7S-7U. In some embodiments, the target group is identified by the sender of the audio multicast messages based on one or more user inputs (e.g., voice input (e.g., 792a-729d) and/or gestures (e.g., 750b and 750g3). In some embodiments, the target group is identified based on an initial audio multicast message when a reply message is received at device 700. For example, device 700 can receive a reply audio multicast message with a target group that corresponds to bedroom 602c in certain situations, such when device 700 has previously directed an initial audio multicast message to the group of devices assigned to bedroom 602c.

Time of receipt indication 904e indicates when the notification was displayed (or, in some embodiments, when data that corresponds to the notification was received). Here, time of receipt indication 904e shows that the notification was displayed "NOW" or at 10:02 AM.

As illustrated in FIG. 9D, at 10:09 AM, device 700 continues to display of news notification 902 and ceases to display multicast notification 904. In some embodiments, the notification 904 is not displayed on any user interface of device 700 after the multicast notification ceases to be displayed. In some embodiments, the notification 904 is not displayed on the user interface in FIG. 9D at any other time after the multicast notification ceases to be displayed. In some embodiments, the device receives user input to view pending notifications (e.g., notifications that have not been acted on by the user), and in response, displays news notification 902 without displaying multicast notification 904.

As illustrated in FIG. 9D, device 700 ceases to display multicast notification 904 (even when the display is on) because data corresponding to a new audio multicast message corresponding to the home target group was not received before the decay period (e.g., 1 second, 30 seconds, 60 seconds, 300 seconds, etc.) of multicast notification 904 ended (and/or within a predetermined period of time). On the other hand, device 700 continues to display news notification 902 because news notification 902 is not a multicast notification and does not cease to be displayed once a predetermined period of time elapses (and when the display is on).

FIGS. 9E-9H illustrate examples of the technique, in addition to the example described above in relation to FIGS. 9B-9D. In FIGS. 9B-9D, the decay period for a multicast notification (e.g., the predetermined period of time) is five minutes for illustrative purposes only. In some embodiments, the decay period is shorter or longer than five minutes.

At 10:10, device 700 receives three different sets of data. The first set of data indicates that a new audio multicast message corresponding to the home target group has been received. The second set of data indicates that a new audio multicast message corresponding to a group of devices assigned to bedroom 602c ("bedroom target group") has been received. The third set of data indicates that a new audio multicast message corresponding to a group of devices assigned to the entertainment zone ("the entertainment zone target group") (e.g., a combination of a group of devices assigned to living room 602d and sunroom 602e) has been received.

In some embodiments, the first set of data represents an initial audio multicast message or a reply audio multicast message (e.g., a reply to an initial audio multicast message that device 700 sent) corresponding to the home target group. In some embodiments, the second set of data and the third set of data represent reply audio multicast messages, that is, audio multicast messages that are received in response to initial audio multicast messages that were separately sent to each respective target group. In some embodiments, the second set of data and the third set of data are not initial messages that are received from their respective target group because device 700 is not assigned to zone or room target groups and cannot receive initial messages sent from those target groups, as discussed above (e.g., in relation to FIGS. 7M, 7T, 7V, and 7X).

As illustrated in FIG. 9E, in response to receiving the three sets of data, device 700 displays multicast notifications 906a, 908a, and 910. Device 700 also continues to display news notification 902. As illustrated in FIG. 9E, the notifications are displayed in a notification list. The oldest notification is displayed at the bottom of the list (e.g., news notification 902), and the newest notification is at the top of the list (e.g., multicast notification 910). Thus, while notifications 906a, 908a, and 910 were displayed at around the same time, notifications 906a, 908a, and 910 were respectively displayed in the order shown in FIG. 9E. In some embodiments, the notifications are displayed in a different order or in a different arrangement.

As illustrated in FIG. 9E, notification 906a indicates that an audio multicast message has been sent by "John" from the home target group; notification 908a indicates that an audio multicast message has been sent by "Jane" from the bedroom target group; and notification 910 indicates that an audio multicast message has been sent by "Emma" from the entertainment zone target group. As illustrated in FIG. 9E, all three of the new multicast notifications include a time receipt indication of "Now" because data was recently received (or they were recently displayed) at 10:10 AM. However, the time receipt indication for news notification 902 is "10 MINS AGO" because its data was received (or the notification was displayed) at 10:00.

At 10:11 AM, device 700 receives data indicating that a new audio multicast message corresponding to the home target group has been received.

As illustrated in FIG. 9F, in response to receiving the new data, device 700 displays multicast notification 906b because data indicating a new audio multicast message corresponding to the home target group was received (e.g., data received at 10:11) before the decay period for multicast notification 906a expired (e.g., within a predetermined period of time after displaying multicast notification 906a or receiving the first data in FIG. 9E). Notably, device 700 does not update the display of the notifications 906a and 910 and continues to display these notifications because data indicating a new audio multicast message corresponding to their respective target groups has not been received and their decay period has not expired (e.g., they have not been displayed for more than five minutes without receiving data that corresponds to a new multicast message for their target groups).

Multicast notification 906b is an updated version of multicast notification 906a, which device 700 has ceased to display in FIG. 9F. Looking back at FIG. 9E, multicast notification 906a indicates that John sent a multicast message that corresponds to the home target group. Turning back to FIG. 9F, multicast notification 906b also includes information (e.g., "John" in notification 906b) that John sent an earlier multicast message (the multicast message originally representation by notification 906a) that corresponds to the home target group. In addition, multicast notification 906b includes information that one other has sent a multicast message that corresponds to the home target group. Thus, multicast notification 906b includes information concerning two audio multicast messages, that is, multicast notification 906b includes information that is representative of the sender ("John") of the first audio multicast message that corresponds to the home target group and information that is representative of the sender (e.g., "one other") of the second audio multicast message that corresponds to the home target group.

As illustrated in FIG. 9F, multicast notification 906b is displayed at the top of the list with a time receipt indication of now because it is the most recent notification. Notably, multicast notification 906b's time receipt indication changes in FIG. 9F to reflect the time at which the new audio multicast message corresponding to the home target group was received (e.g., data received at 10:11), although multicast notification 906a first displayed (or data that corresponds to multicast notification 906a was first received) at 10:10 AM in FIG. 9E. In some embodiments, multicast notification 906a is displayed concurrently with multicast notification 906b. In some embodiments, when multicast notification 906a is displayed concurrently with multicast notification 906b, the time receipt indication of multicast notification 906a is updated to read, "NOW." In some embodiments, updating the time indication of multicast notification 906a extends the decay period of multicast notification 906a. In some embodiments, receiving the data at FIG. 9F extends the decay period of multicast notification 906a (e.g., or the content of multicast notification 906a because multicast notification 906b includes content representative of the audio multicast message represented by multicast notification 906a).

As illustrated in FIG. 9F, notifications 910, 908a, and 902, which are listed respectively from most recent to least recent, are below multicast notification 906b. In addition, the time receipt indications of notifications 910, 908a, and 902 have been updated in FIG. 9F to reflect the length of time that each has respectively been displayed (or the time that has passed since data has been received that corresponds to each respective notification).

At 10:12 AM, device 700 receives data indicating that a new audio multicast message corresponding to the bedroom target group has been received.

As illustrated in FIG. 9G, in response to receiving the data, device 700 displays multicast notification 908b because data indicating a new audio multicast message corresponding to the bedroom target group was received (e.g., data received at 10:12) before the decay period for multicast notification 908b expired (e.g., within a predetermined period of time after displaying multicast notification 906b or receiving the second data in FIG. 9E). Notably, device 700 does not update notifications 908b and 910 and continues to display the notifications 908b and 910 because data indicating a new audio multicast message corresponding to their respective target groups has not been received, and their decay period has not expired. In some embodiments, multicast notification 908b is displayed using similar techniques to those described above in FIG. 9F with respect to multicast notification 906b.

Multicast notification 908b is an updated version of multicast notification 908a, which device 700 has ceased to display in FIG. 9G. Looking back at FIG. 9E, multicast notification 908a indicates that Jane sent a multicast message that corresponds to the bedroom target group. Turning back to FIG. 9G, multicast notification 908b indicates that two multicast messages have been sent by Jane that correspond to the bedroom target group. Here, instead of multicast notification 908b including a new sender, multicast notification 908b displays content that is representative of an increased amount of notifications that were sent by the respective sender when compared to multicast notification 908a. In some embodiments, multicast notification 908a includes a representation of the amount of notifications that were received from the bedroom target group, irrespective of whether a different sender has sent the new multicast message.

As illustrated in FIG. 9H, multicast notification 908b is displayed at the top of the list, and notifications 906b, 910, and 902 are displayed under multicast notification 908b in order from most recent to least recent.

As illustrated in FIG. 9H, at 10:15 AM, device 700 ceases to display multicast notification 910 because the decay period for multicast notification 910 has expired. In other words, device 700 has not received data indicating a new audio multicast message corresponding to the target group of multicast notification 910 (e.g., "the entertainment zone") within a predetermined amount of time (or before the end of the decay period of notification 910) of when multicast notification 910 was initially displayed (or data indicating an audio multicast message corresponding to the entertainment target group was received). As such, with reference to FIG. 9E, device 700 continues to display content representative of the first set of data (e.g., John in multicast notification 906b)

and content representative of the second set of data (e.g., one of the multicasts in multicast notification 908b) and no longer displays content representative of the third set of data (e.g., multicast notification 910) because data corresponding to the respective target groups indicated in the first and second sets of data was received before each respective notification's decay period ended while data corresponding to the target group indicated in the third set of data was not received before the decay period of multicast notification 910 ended.

FIGS. 9I-9P illustrate user interfaces for playback of received audio multicast messages. In particular, FIGS. 9I-9K illustrate a scenario where multiple audio multicast messages are played back automatically in response to a single input. In addition, FIG. 9L-9P illustrate a scenario where one received audio multicast message is selected from a group of other received audio multicast messages and played back. At FIG. 9H, device 700 detects tap gesture 950h at a location that corresponds to multicast notification 906b.

As illustrated in FIG. 9I, in response to detecting tap gesture 950h, device 700 displays user interface 920. User interface 920 is a user interface for displaying the audio multicast messages that are indicated in multicast notification 906b, which are audio multicast messages that correspond to the home target group (as shown by "MULTICAST FROM HOME" in FIG. 9I). User interface 920 includes graphical sender indication 924a and graphical sender indication 924b, where each represents one of the audio multicast messages represented in multicast notification 906b. Here, graphical sender indication 924a is larger than graphical sender indication 924b and in the center of the user interface, which indicates that the audio multicast message that corresponds to graphical sender indication 924a is currently selected for playback. Graphical sender indication 924a is an image of a speaker device and representative of data corresponding to the audio multicast message sent by "one other" that was received at 10:11 AM in FIG. 9F. And graphical sender indication 924b is an image of John (i.e., 797a including an image of John A. in FIG. 7AB) and representative of data corresponds to the audio multicast message sent by John that was received at 10:10 AM in FIG. 9E. In some embodiments, the audio messages are displayed in the order that they were received (e.g., graphical sender indication 924b and graphical sender indication 924b are switched in FIG. 9E). User interface 920 further includes current sender indication 922a, which indicates a name that is assigned to the speaker or device that is displayed in the middle of the user interface (or the largest graphical sender indication). Here, current sender indication 922a indicates that the speaker has the name of "Living Room," and an audio multicast message from the sender is currently playing or can currently be played back by a selection of playback affordance 926. In addition, device 700 also displays remaining indication 928, which shows that the currently selected audio multicast message has a length of ten seconds that can be played back, and count indication 930, which represents that the selected audio multicast message is message 1 of 2 of the total number of audio multicast messages that correspond to the home target group. In some embodiments, when a setting is enabled to allow transcription of the audio multicast message, user interface 920 includes a textual representation of the currently selected audio multicast message.

As illustrated in FIG. 9I, device 700 receives data indicating that a new audio multicast message that corresponds to the bedroom target group has been received and displays multicast notification 940 in response to receiving the data. In some embodiments, device 700 updates the list of notifications based on this received data, as discussed in relation to FIG. 9L below. At FIG. 9I, device 700 receives tap gesture 950i at a location that corresponds to playback affordance 926.

As illustrated in FIGS. 9J-9K, in response to detecting tap gesture 950i, device 700 initiates playback of media. As illustrated in FIG. 9J, device 700 plays back the last received audio multicast message that corresponds to the home target group (e.g., received at 10:11 in FIG. 9F above). In FIG. 9J, while playing back the currently selected audio multicast message (e.g., audio multicast message from "one other" received at 10:11), device 700 displays time indication 932 and updates indications 928 and 930. As illustrated in FIG. 9K, device 700 is currently playing back the first audio multicast message that corresponds to the home target group (e.g., received at 10:10 from John in FIG. 9E above). Notably, device 700 plays back the first audio multicast message, automatically (e.g., without receiving additional input after detecting tap gesture 950i) after completing playback of the last audio multicast message that corresponded to the home target group.

As illustrated in FIG. 9L, sometime after displaying the user interface in FIG. 9K, device 700 re-displays the list of notifications. Here, notification 902b has ceased to be displayed. In some embodiments, notification 902b has ceased to be displayed because a gesture was detected at a location corresponding to the notification and/or one or more of the audio multicast messages were played back in FIGS. 9J-9K. In some embodiments, notification 902b ceases to be displayed because its decay period has ended (e.g., at 10:16 AM) before a new multicast corresponding to the home target group has been received.

In FIG. 9L, device 700 is also displaying multicast notification 908c and has ceased to display multicast notification 908b. Multicast notification 908c is an updated version of multicast notification 908b, which has been updated to reference data corresponding to the audio multicast message that was received in FIG. 9I, which was represented by multicast notification 940 in FIG. 9I. Thus, while multicast notification 908b included content indicating that two multicast notifications have been received that correspond to the bedroom target group, multicast notification 908c has been updated to include content indicating that three multicast notifications have been received that correspond to the bedroom target group. At FIG. 9L, device 700 detects press-and-hold gesture 950l at a location that corresponds to multicast notification 908c. In some embodiments, device 700 detects press-and-hold gesture 950l while the gesture continues to be detected (or held). In some embodiments, device 700 detects press-and-hold gesture after the gesture has been released.

As illustrated in FIG. 9M, in response to detecting press-and-hold gesture 950l, device 700 displays user interface 960 (e.g., after an end of press-and-hold gesture 950l, while continuing to detect press-and-hold gesture 950l). User interface 960 includes similar user interface elements to user interface 920 (as discussed above in relation to FIGS. 9I-9K). However, user interface 960 has less area than user interface 920. While user interface 960 is a user interface for playback audio multicast messages from the bedroom target group, device 700 can use one or more techniques as described above in relation to user interface 920. In some embodiments, in response to detecting user input 950m1 on open affordance 962, device 700 ceases to display user interface 960 and displays a user interface that is similar in size to user interface 920. At FIG. 9M, device 700 detects swipe gesture 950*m*2 at a location that corresponds to user interface 960.

As illustrated in FIG. 9N, in response to detecting a first gesture (e.g., swipe gesture 950*m*2), device 700 changes the currently selected audio multicast message from the last received audio multicast message corresponding to the bedroom target group (e.g., where its corresponding data was received in FIG. 9I) to the second-to-last received audio multicast message corresponding to the bedroom target group (e.g., where its corresponding data was received in FIG. 9G). At FIG. 9N, device 700 detects swipe gesture 950*n* at a location that corresponds to user interface 960.

As illustrated in FIG. 9O, in response to detecting a second gesture (e.g., swipe gesture 950*n*), device 700 changes the currently selected audio multicast message from the second-to-last received audio multicast message corresponding to the bedroom target group (e.g., where its corresponding data was received in FIG. 9F) to the first received audio multicast message corresponding to the bedroom target group (e.g., where its corresponding data was received in FIG. 9E). At FIG. 9O, device 700 detects tap gesture 950*o* at a location that corresponds to user interface 960 (e.g., on playback affordance 926).

As illustrated in FIG. 9P, in response to detecting tap gesture 950*o*, device 700 initiates playback of the first received audio multicast message (e.g., currently selected) corresponding to the bedroom target group without initiating playback of the other audio multicast messages. In some embodiments, at FIG. 9P (or 9I-9J), device 700 detects tap gesture 950*p* at a location that corresponds to multicast affordance 736; and, in response to detecting tap gesture 950*p* at a location that corresponds to multicast affordance 736, device 700 starts recording media, via one or more input devices, as described above (e.g., in FIGS. 7C and 7I). In some embodiments, at FIG. 9P, device 700 detects one or more voice inputs, such as voice input 720*a* (as described above), to send an audio multicast message corresponding to the bedroom target group in order to replay to Jane.

FIGS. 9Q-9V illustrate exemplary user interfaces for displaying the user interfaces described above on a device with a smaller display than device 700, such as smartwatch 701. Any of the user interfaces discussed above can be displayed and transitioned on smartwatch 701 (e.g., user interfaces 970, 972, 974, 976, 978, and 980) (or tablet 634), using one or more similar techniques to those discussed above for FIGS. 9A-9P.

FIGS. 9W-9X illustrate exemplary user interfaces for displaying the user interfaces described above on a device, such as computer device 674. As described above, computer device 674 is in communication with one or more devices that sends instructions for computer device 674 to display one or more user interfaces, in some embodiments. Any of the user interfaces discussed above can be displayed and transitioned on computer device 674 (e.g., user interfaces 996 and 998), using one or more similar techniques to those discussed above for FIGS. 9A-9P.

FIG. 10 is a flow diagram illustrating a method for displaying notifications using a computer system in accordance with some embodiments. Method 1000 is performed at a computer system (e.g., 100, 300, 500, 634, 674, 700, 701, 850) in communication with a display generation component. Some operations in method 1000 are, optionally, combined, the orders of some operations are, optionally, changed, and some operations are, optionally, omitted.

As described below, method 1000 provides an intuitive way for displaying notifications. The method reduces the cognitive burden on a user for view notifications, thereby creating a more efficient human-machine interface. For battery-operated computing devices, enabling a user to access notifications faster and more efficiently conserves power and increases the time between battery charges.

The computer system receives (1002) first data corresponding to first media.

The computer system displays (1004) (e.g., in response to receiving the first data), via the display generation component, until an end of a first time period (e.g., a predetermined first time period), a first notification (e.g., 906*a*, 908*a*, 910) with an indication of the first media (e.g., 904*b*, 904*c*) (e.g., a notification corresponding to the first data) (e.g., a notification selectable to initiate a process to play the first media).

The computer system, after receiving the first data (e.g., after the start of display of the first notification), receives (1006) second data corresponding to second media, wherein the second media (e.g., 932 in 9J) is different from the first media (e.g., 932 in 9K).

The computer system, in accordance with a determination that the second media meets a set of one or more criteria (and, in some embodiments, the one or more criteria includes a criterion that is met when the second media is directed to the same target group as the first media) and in accordance with a determination based on (1) a time that the second data was received and (2) a time that the first data was received (e.g., a determination that the second data was received within a predefined amount of time after the first data was received), displays (1008) (e.g., in response to receiving the second data), via the display generation component, until an end of a second time period. In some embodiments, the second time period is based on receipt of the second data. In some embodiments, the second time period is not based on receipt of the first data. In some embodiments, the second time period is a predetermined second time period), a second notification (e.g., 906*b*, 908*b*, 908*c*) with an indication (e.g., indication in 906*b* (e.g., "John"), 908*b* (e.g., "2")) of the first media (e.g., 932 in 9K) (e.g., a notification corresponding to at least the first data) (e.g., a notification selectable to initiate a process to play at least the first media) (e.g., a notification indicating receipt of at least the first data), where an end of the first time period is different from an end of the second time period. In some embodiments, the second notification is the first notification. In some embodiments, the second notification is different from the first notification (e.g., the second notification is a notification combining (1) information corresponding to the first media and (2) information corresponding to the second media). In some embodiments, the second notification is displayed (e.g., initially displayed) after the first time period. In some embodiments, when receipt of the second media is within a predetermined time of receipt of the first media, a length of time is extended for which information corresponding to the first media is displayed. In some embodiments, the second time period is determined based on a difference between the when the first data was received and when the second data was received. In some embodiments, the media (e.g., first media, second media) is an audio message that was recorded at another device and transmitted to a group of devices, including the computer system receiving the first data and the second data. In some embodiments, the set of one or more criteria includes a criterion that is met when the second media is received prior to an end of a display period (e.g., a duration during which the notification is valid, a duration during which the notification will be displayed in a collection of notifications) of the first media. In some embodiments, the set of one or more criteria includes a criterion that is met when the second media is received prior ceasing to display the first notification (e.g., via activation of the first notification, via receiving user input clearing the first notification). Dynamically displaying a second notification that includes an indication that is included in a first notification that was related to the second notification when certain criteria are met provides the user with feedback about the relationship between the second notification and the first notification while also allowing the indication that is included in the first notification to continue to be displayed even if the first notification has ceased to displayed. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the first notification (e.g., 906a) is being displayed at the time the second data is received (e.g., in accordance with the determination that the second media meets the set of one or more criteria). In some embodiments, as a part of displaying the second notification (e.g., 906b), the computer system ceases to display the first notification (e.g., in FIG. 9E). In some embodiments, in accordance with the determination that the second media meets the set of one or more criteria (and, in some embodiments, the one or more criteria includes a criterion that is met when the second media is directed to the same target group as the first media) and in accordance with a determination that the second data was received within a predefined amount of time after the first data was received, ceasing to display the first notification. Ceasing to display the first notification when a second notification includes information concerning the first notification provides the user with feedback about the information in the first notification without cluttering the user interface. Providing improved visual feedback to the user enhances the operability of the device and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the first media is a first audio message (e.g., 932 in 9K) (e.g., an audio message recorded (using a microphone) at an external device and transmitted by the external device to a group of devices, an audio message that was directed to (e.g., transmitted to) a plurality of external devices that includes the computer system). In some embodiments, the second audio message is a second audio message that was directed (or transmitted) to a second plurality of external devices (e.g., same as the plurality of external devices, different from the plurality of external devices). Displaying a notification that is associated with audio messages that have been multicast provides the user with visual feedback concerning the type of notification, which cause the user to identify that the notification will decay and needs to be responded to in a predetermined period of time. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the first notification (e.g., 904) includes an indication (e.g., 904d) of a group of a plurality of external devices to which the first media (e.g., 932 in 9K) was directed (e.g., to which the first data corresponding to the media was transmitted). In some embodiments, the first data identifies the group of the plurality of external devices to which the first media was directed. In some embodiments, the plurality of external devices includes the computer system. Displaying a notification that includes an indication of the group of devices in which the first media is directed provides the user with feedback about the devices that sent and/or will receive a replay message. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, in response to receiving the first data, the computer system adds the first notification (e.g., 906a) to a collection of notifications (e.g., notifications displayed in FIGS. 9B-9H) (e.g., a collection of notifications which are accessible for display, which are displayed in response to user input requesting to display the collection of notifications, a listing of recent notifications) until an end of the first time period (e.g., a predetermined first time period) In some embodiments, in accordance with reaching the end of the first time period, the computer system removes the first notification (e.g., 904) from the collection of notifications. In some embodiments, in accordance with receiving, prior to the end of the first time period, the second data that corresponds to the second media and in accordance with a determination that the second media meets the set of one or more criteria, the computer system removes the first notification (e.g., 906a) from the collection of notifications; and adds the second notification (e.g., 906b) to the collection of notifications. In some embodiments, in accordance with receiving, prior to the end of the first predetermined time period, data that corresponds to media and in accordance with a determination that the second media does not meet the set of one or more criteria: adding the second notification to the collection of notifications without removing the first notification from the collection of notifications. In some embodiments, the computer system removes the first notification from the collection of notifications in accordance with the end-of-display condition being met for the first notification. Choosing to remove a notification when no additional data (e.g., no updates or no new media) that is related to the notification has been received within a certain period of time allows the device to avoid providing stale notifications (e.g., old, non-relevant) to the user that would clutter the UI, without requiring the user to manually delete the notifications. Performing an optimized operation when a set of conditions has been met without requiring further user input enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the first data identifies a target group of a plurality of external devices to which the first media was directed (e.g., transmitted to). In some embodiments, while displaying a notification (e.g., 906a, 908a, 910) (e.g., the first notification) corresponding to the first media (e.g., and which, when the notification is activated, initiates a process for playing the first media (e.g., first audio message)), the computer system receives (1010) third data corresponding to third media. In some embodiments, in response to (1012) receiving the third data corresponding to the third media and in accordance with a determination that the third media meets the set of one or more criteria (wherein, in some embodiments, the one or more criteria includes a criterion that is met when the media is directed to the same target group of devices as the first media), the computer system extends (1014) the duration during which the notification (e.g., the first notification, the second notification) corresponding to the first media (e.g., and which, when the notification is activated, initiates a process for playing the first media (e.g., first audio message)) is displayed (e.g., 906b in FIG. 9F). In some embodiments, in response to (1012) receiving the third data corresponding to the third media and in accordance with a determination that the third media does not meet the set of one or more criteria (e.g., the third media is directed to a different set of target devices as compared to the first media), the computer system forgoes (1016) extending the duration during which the notification corresponding to the first media is displayed (e.g., 908a, 910 in FIG. 9F). In some embodiments, as the computer system receives additional data that corresponds to media that meet the set of one or more criteria, the device continues to extend the duration during which notifications are displayed via the display generation component as long as the immediately previous notification that was displayed in response to the media meeting the set of one or more criteria has not yet ceased to be displayed based on reaching the end of a time period. Thus, as audio messages are received directed to the same set of target devices (e.g., external devices), the notification for that chain of audio messages continues to be displayed as long as the most recently received audio message does not reach the corresponding predetermined time period for display. Choosing to whether to extend a decay period for a notification based on whether updated information related to the notification has been received for a predetermined period of time allows the device to providing fresh (e.g., new, relevant) notifications to the user while avoiding the provision of stale notifications (e.g., old, non-relevant) to the user that would clutter the UI, without requiring the user to manually update/delete the notifications. Performing an optimized operation when a set of conditions has been met without requiring further user input enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, in accordance with the determination that the second media meets the set of one or more criteria, the second notification (e.g., that meets the set of one or more criteria) includes an indicator (e.g., a number) that is based on (e.g., that indicates) a number (e.g., in 908a and 908b) of media, including the first media, (e.g., the number of audio messages) represented by the second notification. In some embodiments, each subsequent notification after the first notification in a chain of notifications includes an indication of the number of media (e.g., number of audio messages) represented by the notification being displayed. For example, if a notification is the 5th notification in the chain, the notification indicates that the notification corresponds to 5 received media (e.g., 5 audio messages). In some embodiments, in accordance with a determination that the second media does not meet the set of one or more criteria, the second notification (e.g., that meets the set of one or more criteria) does not include an indicator (e.g., a number) that is based on (e.g., that indicates) a number of media, including the first media, (e.g., the number of audio messages) represented by the second notification. Updating an indication of the number of media items (audio multicast message (e.g., an audio message that is multicast to one or more devices)) that has been received from a target group of devices provides the user with feedback about the current state the number of media items that have been received for the respected target group of devices. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the second notification includes the indication of the first media. In some embodiments, while displaying the second notification (e.g., 602b), the computer system receives input (e.g., 950h) directed to the second notification. In some embodiments, in response to receiving the input directed to the second notification (e.g., and in accordance with a determination that the second media meets the set of one or more criteria), the computer system initiates a process (e.g., 920, 922 in FIGS. 9I-9J) for playing back the first media and the second media (e.g., displaying a user interface for playing back the first media and the second media, starting playback of the first media and, subsequently, the second media). In some embodiments, initiating a process for playing back the first and the second media includes automatically (e.g., in response to receiving the input directed to the second notification without intervening user input) playing back the first media and, subsequently, the second media and displaying a user interface (e.g., 741) for playing back the first media. In some embodiments, in response to receiving the input directed to the second notification and in accordance with a determination that the second media does not meet the set of one or more criteria, as a part of initiating a process for playing back the second media without playing back the first media (e.g., displaying a user interface for playing back the second media and not the first media), the computer system starts playback of the second media and, not automatically subsequently playing back the first media. In some embodiments, in accordance with a determination that the second media does not meet the set of one or more criteria and while displaying the first notification, the computer system receives input directed to the first notification, and in response to receiving input directed to the first notification, initiates a process for playing back the first media without playing back the second media.

In some embodiments, the second media meets the set of one or more criteria (e.g., the second media is directed to the same external devices as the first media). In some embodiments, while displaying the second notification (e.g., 908c), the computer system receives input (e.g., 9501) directed to the second notification. In some embodiments, in response to receiving the input directed to the second notification (e.g., and in accordance with a determination that the second media meets the set of one or more criteria), the computer system displays a user interface (e.g., 960) for playing back the first media (e.g., as part of initiating a process for playing back the first media and the second media), wherein the user interface for playing back the first media includes a record user interface object (e.g., a selectable record button). In some embodiments, selection (e.g., 950*p*) of the record (e.g., 736) user interface object causes, in accordance with a determination that the first data identifies a first group (e.g., bedroom devices) of a plurality of external devices to which the first media was directed (e.g., transmitted), the computer system to initiate a process (e.g., 730, 740, 750) for transmitting an audio message to the first group of plurality of external devices (e.g., and not the second group). In some embodiments, selection (e.g., 950*p*) of the record (e.g., 736) user interface object causes, in accordance with a determination that the first data identifies a second group (e.g., home devices) of a plurality of external devices to which the first media was directed (e.g., transmitted), different from the first group, the computer system to initiate a process (e.g., 780*a*, 784, 786*a*) for transmitting an audio message to the second group of plurality of external devices (e.g., and not the first group). In some embodiments, the computer system detects selection of (e.g., tap on, press and hold on) the record user interface object, and in response to detecting selection of the record user interface object initiates the corresponding operation, as noted above. In some embodiments, the set of external devices is associated with a top-level location (or destination) (e.g., a location of a first type) (e.g., a home location, business, an office (e.g., a location that is a top-level location (e.g., a location that defines one or more locations (e.g., sub-locations) and/or one or more regions (or zones) that are within an area and/or perimeter that is defined by the location of the top-level location, a location that is at the top level of a hierarchy of locations, a location that is linked (e.g., programmatically) to one or more locations (e.g., sub-locations) and/or one or more regions (or zones)))). In some embodiments, initiating a process for transmitting an audio message includes recording an audio message by recording audio detected by the computer system. In some embodiments, the user interface for playing back the first media includes an indication (e.g., textual indication, graphical indication) of the group (e.g., a top-level location, sub-location) (e.g., text specifying the name of the room or zone that the audio message will be transmitted to).

In some embodiments, while displaying a user interface (e.g., 960) for playing back the first media (e.g., as part of initiating a process for playing back the first media and the second media), the computer system receives user input (e.g., 950*i*, 950*m*2, 950*n*) (e.g., via one or more input devices, using a touch-sensitive surface). In some embodiments, in response to receiving the user input and in accordance with a determination that the user input (e.g., 950*i*) is directed to selection of a play user interface object (e.g., a tap on a play button displayed as part of the user interface for playing back the first media), the computer system plays back the first media (and, optionally, automatically subsequently playing back the second media and switching to the user interface for playing back the second media). In some embodiments, in response to receiving the user input and in accordance with a determination that the user input is a swipe gesture (e.g., 950*m*2, 950*n*) directed to the user interface for playing back the first media (e.g., a left swipe gesture on the user interface for playing back the first media), the computer system replaces display of the user interface for playing back the first media with display of a user interface for playing back the second media (e.g., which includes a play button for playing the second media without playing the first media). In some embodiments, in response to receiving the user input and in accordance with a determination that the user input (e.g., 950*i*) is directed to selection of a play user interface object (e.g., a tap on a play button displayed as part of the user interface for playing back the first media), the computer system plays back the second media (e.g., the most recently received media corresponding to the notification) and subsequently plays back the first media.

In some embodiments, while displaying a user interface (e.g., 720 of FIGS. 15B-15E) for playing back the first media (e.g., as part of initiating a process for playing back the first media and the second media) and while playing back the first media, the computer system receives input. In some embodiments, in response to receiving the user input and in accordance with a determination that the user input is directed to a first location (e.g., location of 736 on user interface 720) on the user interface for playing back the first media, computer system displays a user interface (e.g., 741) for sending and recording new media (e.g., one or more audio multicast messages) (and, optionally, automatically starts to record audio for sending). In some embodiments, in response to receiving the user input and in accordance with a determination that the user input is directed to a second location (e.g., a location of 1534) on the user interface for playing back the first media, the computer system replaces display of the user interface for playing back the first media (e.g., that corresponds to 1524*a*) with display of a user interface for playing back the second media (e.g., that corresponds to 1524*b*), wherein the second location on the user interface for playing back the first media is different from the first location on the user interface for playback the first media. In accordance with a determination that the user input is directed to the first location and is a tap input, the computer system automatically records audio (e.g., via one or more microphones) until a subsequent input is detected (e.g., a subsequent input that is detected in the same location (or near the first location) as the first location). In accordance with a determination that the user input is directed to the first location and is a press-and-hold gesture, the computer system automatically records audio (e.g., via one or more microphones) until the end of the user input is detected. In some embodiments, while displaying the second notification, the computer system receives input (e.g., 950*h*) directed to the second notification. In some embodiments, in response to receiving the input directed to the second notification, the computer system ceases to display the second notification. In some embodiments, once the second notification is activated, the second notification is removed from a collection of notifications (e.g., that are user-accessible for display, that are displayed in response to user input requesting to display the collection of notifications, a listing of recent notifications received at the computer system). In some embodiments, the collection of notifications continues to include other notifications (e.g., email notifications, instant messaging notifications). Choosing to remove a notification when the notification has been interacted with allows the device to avoid providing stale notifications (e.g., old, non-relevant) to the user that would clutter the UI, without requiring the user to manually delete the notifications. Performing an optimized operation when a set of conditions has been met without requiring further user input enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the computer system displays a user interface for configuring whether to include the computer system in a group of plurality of external devices that receive data corresponding to media (e.g., device that receive audio messages directed to external devices of the home) directed to a location (e.g., a top-level location (a home), a sub-location (a room of the home), wherein the user interface for configuring whether to include the computer system in a group includes: a first option (e.g., 799*c*) to (e.g., always) include the computer system in the group of plurality of external devices that receive data corresponding to media (e.g., device that receive audio messages directed to external devices of the home) directed to the location, regardless of a current physical location of the computer system (e.g., as determined by a location sensor of the computer system); and a second option (e.g., 799*a*) to (e.g., never) not include the computer system in the group of plurality of external devices that receive data corresponding to media (e.g., device that receive audio messages directed to external devices of the home) directed to the location, regardless of the current physical location of the computer system (e.g., as determined by a location sensor of the computer system). In some embodiments, the user can configure the computer system to register/unregister to receive data corresponding to the media or to enabled/disable display of notifications based on received data corresponding to the media.

In some embodiments, the computer system displays a user interface for configuring whether to include the computer system in a group of plurality of external devices that receive data corresponding to media (e.g., device that receive audio messages directed to external devices of the home) directed to a location (e.g., a top-level location (a home), a sub-location (a room of the home), wherein the user interface for configuring whether to include the computer system in a group includes a third option (e.g., 77*b*) to include the computer system (e.g., 700) in the group of plurality of external devices that receive data corresponding to media (e.g., device that receive audio messages directed to external devices of the home) directed to the location when the computer system (e.g., 700) is currently at a physical location (e.g., within a geo-fenced perimeter of the home, within a particular room of the home, as determined by a location sensor of the computer system) corresponding to the location and not include the computer system (e.g., 700) in the group of plurality of external devices that receive data corresponding to media (e.g., device that receive audio messages directed to external devices of the home) directed to the location when the computer system (e.g., 700) is not currently at the physical location (e.g., within a geo-fenced perimeter of the home, within a particular room of the home, as determined by a location sensor of the computer system) corresponding to the location. In some embodiments, the user can provide input to configure the computer system to only receive data corresponding to media (and/or to only display notifications) directed to a group of devices of a location when the computer system is at that location (e.g., only get messages directed to the home when the computer system is in the home, only get messages directed to a room when the computer system is in that room).

Note that details of the processes described above with respect to method 1000 (e.g., FIG. 10) are also applicable in an analogous manner to the methods described below/above. For example, method 1000 optionally includes one or more of the characteristics of the various methods described above/below with reference to methods 800 and 1200. For example, the computer systems can be the same systems. For another example, the audio message sent in method 800 can be the media received in method 1000. For another example, the voice input transmitted in method 1200 can be the same as the media received in method 1000. For brevity, these details are not repeated below.

FIGS. 11A-11R illustrate electronic devices and exemplary user interfaces for managing visual displays. The user interfaces in these figures are used to illustrate the processes described below, including the processes in FIG. 12.

FIGS. 11A-11R illustrate scenarios where device 1100 displays a visual indication with visual content of a first type (e.g., single-colored lights) when device 1100 determines that a portion of the voice input should be transmitted to one or more external devices as an audio multicast message and where device 1100 displays a visual indication with visual content of a second type (e.g., multi-colored lights) when device 1100 cannot determine that a portion of the voice input should be transmitted to one or more external devices as an audio multicast message (e.g., determines that no portion of the voice input should be transmitted to one or more external devices as an audio multicast message). The first and second types of visual content are described below for exemplary purposes only. The first and second types of visual content are different to provide a visual indication to the user of whether uttered voice input will be potentially multicast to one or more external devices.

FIG. 11A illustrates electronic device 1100 in a position on a table that is located in front of a person. Device 1100 is a smart speaker and includes one or more features of device 580. For example, device 1100 includes one or more displays 1102 that includes one or more components of one or more displays 580E. Displays 1102 include a plurality of LEDs. In some embodiments, device 1100 includes one or more features of device 100, 300, or 500. In FIG. 11A, device 1100 is associated with home 602 and living room 602*d* for exemplary purposes only. Thus, in FIG. 11A, device 1100 is one of living room speakers 646 and 648, as described above in relation to FIG. 6. In some embodiments, device 1100 is associated with another room in home 602 (or another home).

As illustrated in FIG. 11A, device 1100 is in an inactive state (e.g., a sleep state, a low power state, a state where device 1100 is not displaying, via displays 1102, visual content), such that displays 1102 are not displaying visual content (e.g., a visual indication). In some embodiments, when device 1100 is not displaying visual content, the LEDs of displays 1102 are not lit.

FIGS. 11A-11L illustrate device 1100 displaying visual content in response to receiving voice input that includes information that is to be multicast to one or more target group of devices. In some embodiments, one or more similar techniques described above in relation to device 700 receiving voice input FIGS. 7M-7N and 7S-7Z can be applied to device 1100 receiving voice input, as described below (or vice-versa).

FIGS. 11B-11F illustrate device 1100 receiving voice input from the person standing in front of device 1100. The voice input received by device 1100 in FIGS. 11B-11F is "HEY ASSISTANT, MULTICAST, WHAT MUSIC DO YOU WANT TO PLAY IN THE LIVING ROOM?" The voice input received in FIGS. 11B-11F can be received in a natural speaking way or another way. FIGS. 11B-11F are illustrated to provide an exemplary embodiment of how device 1100 may react to different portions of the voice input.

At FIG. 11B, device 1100 receives, via one or more microphones of device 1100, voice input portion 1150*b* from the person standing in front of device 1100. Here, the person has uttered the phrase, "HEY ASSISTANT."

As illustrated in FIG. 11B, in response to receiving voice input portion 1150*b*, device 1100 changes to be in an active state (e.g., an awake state, a powered state, a state where displays 1102 are displayed visual content), such that device 1100 displays, via displays 1102, visual content. In FIG. 11B, device 1100 displays visual content (e.g., a visual indication) (e.g., lights) that is multi-colored, which is represented by the different types of discs on displays 1102 (e.g., the black discs, white discs, and patterned discs of 1102 in FIG. 11B). At FIG. 11B, device 1100 displays visual content that is multi-colored because device 1100 has not determined that a portion of the voice input should be transmitted to one or more external devices as an audio multicast message.

At FIG. 11C, device 1100 receives, via one or more microphones of device 1100, voice input portion 1150*c* from the person standing in front of device 1100. Here, the person has uttered the phrase, "MULTICAST."

As illustrated in FIG. 11C, in response to receiving voice input portion 1150*c*, device 1100 remains in the active state. In FIG. 11C, device 1100 displays visual content that is a single color (e.g., the black discs of 1102 in FIG. 11B without there being any other types of discs) because device 1100 has determined that a portion of the voice input should be transmitted to one or more external devices as an audio multicast message. Here, device 1100 determines that the portion of the voice input should be transmitted (e.g., multicast) as an audio multicast message because device 1100 detected an instruction (e.g., "MULTICAST") phrase that indicates that the person is issuing a multicast command (e.g., a command to multicast an audio message).

At FIG. 11D, device 1100 receives, via one or more microphones of device 1100, voice input portion 1150*d* from the person standing in front of device 1100. Here, the person has uttered the phrase, "WHAT MUSIC."

As illustrated in FIG. 11D, in response to receiving voice input portion 1150*d*, device 1100 remains in the active state. In FIG. 11D, device 1100 continues to display visual content that is a single color based on the determination that a portion of the voice input should be transmitted to one or more external devices as an audio multicast message (e.g., as described above in relation to FIG. 11C). In some embodiments, device 1100 determines that a portion of the voice input should be transmitted to one or more devices assigned to home 602 (e.g., for similar reasons as described above in relation to FIGS. 7M-7N). In some embodiments, device 1100 determines the one or more devices to transmit a portion of the voice input based on whether a portion of the voice input is assigned to a group of devices based on the voice input corresponds to a group identifier (e.g., "Home," "Living Room," "Entertainment Zone," "to Dining Room").

Notably, when compared to FIG. 11C, the pattern of the visual content displayed by device 1100 in FIG. 11D is different from the pattern of the visual content displayed by device 1100 in FIG. 11C. As illustrated in FIGS. 11C-11D, device 1100 displays, via displays 1102, different visual content that reacts to the voice of the person. In other words, because "MULTICAST" and "WHAT MUSIC" are different phrases, device 1100 changes the pattern of the visual content. In some embodiments, device 1100 changes the pattern of the visual content based on the speed, sharpness, volume, pitch, tone, and/or rhythm (e.g., beat) of the portion of the voice content, such that portions of voice content that are different produce a different pattern of visual content. In some embodiments, device 1100 changes the color saturation, brightness, size, or position of the visual content based on the speed, sharpness, volume, pitch, tone, and/or rhythm (e.g., beat) of the portion of the voice content. In some embodiments, device 1100 does not change the pattern of the visual content and/or is not reactive to the voice of the person.

At FIG. 11E, device 1100 continues to receive, via one or more microphones of device 1100, voice input portion 1150*e* from the person standing in front of device 1100. Here, the person has uttered the phrase, "DO YOU WANT TO PLAY."

As illustrated in FIG. 11E, in response to receiving voice input portion 1150*e*, device 1100 remains in the active state. In FIG. 11E, device 1100 continues to display visual content that is a single color based on the determination that a portion of the voice input should be transmitted to one or more external devices. In addition, device 1100 changes the pattern of visual content because voice input portion 1150*e* is different from voice input portion 1150*d*.

At FIG. 11F, device 1100 continues to receive, via one or more microphones of device 1100, voice input portion 1150*f* from the person standing in front of device 1100. Here, the person has uttered the phrase, "IN THE LIVING ROOM?"

As illustrated in FIG. 11F, in response to receiving voice input portion 1150*f*, device 1100 remains in the active state. In FIG. 11F, device 1100 continues to display visual content that is a single color based on the determination that a portion of the voice input should be transmitted to one or more external devices. In addition, device 1100 changes the pattern of visual content because voice input portion 1150*f* is different from voice input portion 1150*e*.

At FIG. 11F, device 1100 detects an end of the voice input received in FIGS. 11B-11F. At FIG. 11F, in response to detecting the end of the voice input, device 1100 sends one or more portions of the voice input to one or more external devices as an audio multicast message. In some embodiments, the audio multicast message includes 1150*c*-1150*d* (e.g., "WHAT MUSIC DO YOU WANT TO PLAY IN THE LIVING ROOM?"). In some embodiments, the audio multicast message does not include voice input portions 1150*b* ("HEY, ASSISTANT") and/or 1150*c* ("MULTICAST") because of a determination that voice input portions 1150*b* and/or 1150*c* correspond to a command portion of the voice input. In some embodiments, when the input includes a portion that corresponds to a target group identifier (e.g., "Home" or "Living Room"), the target group identifier (not the portion of the voice input that corresponds to the target group identifier) is transmitted along with the audio multicast message (e.g., as plain text) but is not output as audio by the one or more external devices. In some embodiments, the audio multicast message that is output by the one or more external devices sounds like the person (is a recording that is played back of the person who uttered the voice input) and is not computer-generated speech via a device.

As illustrated in FIG. 11G, device 1100 provides (e.g., outputs) output 1154*g*, which indicates that a portion of the voice input has been sent to the target group identifier that corresponds to home 602 (e.g., "123 Main St." as described above in relation to home location identifier 712). When outputting output 1154*g*, device 1100 displays visual content that is a single color because of the determination that a portion of the voice input (e.g., received in FIGS. 11B-11F) should be transmitted to one or more external devices as an audio multicast message. In some embodiments, device 1100 displays multi-colored visual content when outputting audio confirmation 1154g, irrespective of this determination.

As illustrated in FIG. 11H, device 1100 changes to an inactive state. At FIG. 11I, device 1100 receives data corresponding to an audio multicast message from Jane, via one or more of the external devices assigned to home 602.

As illustrated in FIG. 11I, in response to receiving the audio multicast message (and without (independent of) receiving user input), device 1100 provides output 1154i, which is an introductory tone or chime. As illustrated in FIG. 11J, after providing output 1154i, device 1100 provides output 1154j, which corresponds to the audio multicast message that was received at FIG. 11I.

As illustrated in FIGS. 11I-11J, device 1100 displays visual content that is the single color when providing output 1150i and output 1150j. Device 1100 displays visual content that is a single color because device 1100 is outputting an audio multicast message. As illustrated in FIGS. 11I-11J, device 1100 also displays visual content that is the same pattern. Thus, in FIGS. 11I-11J, device 1100 does not change the visual content based on the different content of outputs 1150i and output 1150j. In some embodiments, device 1100 does change the visual content based on the different content of output 1150i and output 1150j. In some embodiments, device 1100 provides output 11541150i and/or output 1150j at the current volume level (e.g., system volume level) of the device 1100. In some embodiments, one of output 1154i and/or output 1150j are provided at the volume level of device 1100 while the other one is not. In some embodiments, device 1100 receives multiple audio multicast messages within a period of time and outputs the same (or different) introductory tone before each of the audio multicast messages is played. In some embodiments, device 1100 receives multiple audio multicast messages within a period of time and outputs the same (or different) introductory tone before each group (e.g., grouped by target group of devices) of audio multicast messages that are played.

As illustrated in FIG. 11J, the audio message provided by device 1100 says, "JANE REPLIED FROM HOME: HOW ABOUT JAZZ?" Here, the audio message provided by device 1100 includes a target identifier; in some embodiments, it does not.

At FIG. 11K, device 1100 receives, via one or more microphones of device 1100, voice input portion 1150k from the person standing in front of device 1100. Here, the person has uttered the phrase, "HEY ASSISTANT, REPLY, YOU GOT IT."

As illustrated in FIG. 11K, device 1100 displays visual content that is a single color (e.g., the black discs of 1102 in FIG. 11K) because device 1100 has determined that a portion of voice input portion 1150k should be transmitted to one or more external devices as an audio multicast message. In some embodiments, device 1100 makes this determination because voice input portion 1150k was received within a predetermined time (e.g., 1, 2, 30, 60 seconds) after device 1100 provided output 1150j (e.g., audio multicast message received in FIG. 11J). In some embodiments, device 1100 makes this determination because voice input portion 1150k includes the phrase, "Reply," and/or includes the phrase, "Reply," within a second predetermined amount of time after device 1100 provided output 1150j. In some embodiments, the second predetermined period of time is greater than the first predetermined period of time.

As illustrated in FIG. 11L, device 1100 changes to an inactive state.

FIGS. 11M-11R illustrate device 1100 displaying visual content in response to receiving voice input that does not include information that is to be multicast to one or more target group of devices.

FIGS. 11M-11O illustrated device 1100 receiving voice input from the person standing in front of device 1100. The voice input received by device 1100 in FIGS. 11M-11O is "HEY ASSISTANT, PLAY JAZZ MUSIC IN THE LIVING ROOM." The voice input received in FIGS. 11M-11O can be received in a natural speaking way or another way. FIGS. 11M-11O are illustrated to provide an exemplary embodiment of how device 1100 may react to different portions of the voice input.

At FIG. 11M, device 1100 receives, via one or more microphones of device 1100, voice input portion 1150m from the person standing in front of device 1100. Here, the person has uttered the phrase, "HEY ASSISTANT." As illustrated in FIG. 11M, in response to receiving voice input portion 1150m, device 1100 changes to an active state, using one or more techniques similar to those described above in FIG. 11B. In addition, device 1100 displays visual content (e.g., lights) that is multi-colored because device 1100 has not determined that a portion of the voice input should be transmitted to one or more external devices as an audio multicast message.

At FIG. 11N, device 1100 receives, via one or more microphones of device 1100, voice input portion 1150n from the person standing in front of device 1100. Here, the person has uttered the phrase, "PLAY JAZZ MUSIC." As illustrated in FIG. 11N, in response to receiving voice input portion 1150n, device 1100 displays visual content (e.g., lights) that is multi-colored because device 1100 has not determined that a portion of the voice input should be transmitted to one or more external devices as an audio multicast message.

At FIG. 11O, device 1100 receives, via one or more microphones of device 1100, voice input portion 1150o from the person standing in front of device 1100. Here, the person has uttered the phrase, "IN THE LIVING ROOM." As illustrated in FIG. 11O, in response to receiving voice input portion 1150o, device 1100 displays visual content (e.g., lights) that is multi-colored because device 1100 has not determined that a portion of the voice input should be transmitted to one or more external devices as an audio multicast message.

In FIGS. 11M-11O, device 1100 the visual content is not reactive to the voice input. In some embodiments, device 1100 does not change the pattern of the visual content when device 1100 has not determined that a portion of the voice input should be transmitted to one or more external devices as an audio multicast message. In some embodiments, device 1100 changes the pattern of the visual content to be reactive to different voice input portions, irrespective of this determination.

As illustrated in FIG. 11P, device 1100 provides (e.g., outputs) output 1154p, which indicates that device 1100 is now playing jazz radio. When providing output 1154g, device 1100 displays visual content (e.g., visual indication) that is multi-colored because of the determination that a portion of the voice input (e.g., received in FIGS. 11M-11O) should not be transmitted to one or more external devices as an audio multicast message. At FIG. 11P, device 1100 also outputs jazz music.

As illustrated in FIG. 11Q, while outputting jazz music, device 1100 changes to an inactive state.

As illustrated in FIG. 11R, device 1100 receives, via one or more microphones of device 1100, voice input portion 1150r from the person standing in front of device 1100.

Here, the person has uttered the phrase, "PAUSE." As illustrated in FIG. 11R, in response to receiving voice input portion 1150*r*, device 1100 displays visual content (e.g., lights) that is multi-colored because device 1100 has not determined that a portion of the voice input should be (e.g., has determined that no portion of the voice input should be) transmitted to one or more external devices as an audio multicast message. At FIG. 11R, device 1100 also stops outputting the jazz music and pauses the media corresponding to the jazz music, in response to receiving the "PAUSE" instruction.

FIG. 12 is a flow diagram illustrating a method for displaying visual indications using an electronic device in accordance with some embodiments. Method 1200 is performed at a device (e.g., 100, 300, 500, 634, 674, 700, 701, 850) having one or more microphones, one or more speakers, and one or more display devices. Some operations in method 1200 are, optionally, combined, the orders of some operations are, optionally, changed, and some operations are, optionally, omitted.

As described below, method 1200 provides an intuitive way for displaying visual indications. The method reduces the cognitive burden on a user for determining a type of command given to a device, thereby creating a more efficient human-machine interface. For battery-operated computing devices, enabling a user to recognize the type of command faster and more efficiently conserves power and increases the time between battery charges.

The electronic device receives (1202) voice input (e.g., 1150*a*-1150*r*) via the one or more microphones.

The electronic device displays (1204) a visual indication (e.g., lights displayed via 1102) of the voice input, where: in accordance with a determination that a portion of the voice input (e.g., 1150*b*-1150*f*, 1150*r*) corresponds to voice input that is to be transmitted to one or more devices (e.g., and/or transmitted (e.g., multicast) to a plurality of devices) (e.g., and, in some embodiments, another portion (e.g., a portion of the voice input that is not transmitted) of the voice input corresponds to a first type of command (e.g., command that initiates a process for transmitting at least some of the voice input to a plurality of external devices (e.g., personal device (e.g., cellular phone), external accessory devices (e.g., smart home accessory device (e.g., a smart (e.g., intelligent) light bulbs, thermostat, door lock, door opener (e.g., garage door opener), speaker, television, electric outlet, power strip, camera, appliance (e.g., a refrigerator, stove))))), displays (1206), via the one or more display devices, the visual indication (e.g., 1102 in 11B-11F, 11K) includes displaying the visual indication with a first set of one or more colors; and in accordance with a determination that the voice input (e.g., 1150*m*-1150*o*, 1150*r*) does not include an instruction to transmit (e.g., an instruction to multicast) any portion of the voice input to other devices (e.g., to output a part of the voice input, such as by speakers of the other devices (e.g. a plurality of other devices)) (e.g., another portion of the voice input is a second type of command), displays (1210), via the one or more display devices, the visual indication (e.g., 1102 in FIGS. 11M-11O, 11R) includes displaying the visual indication with a second set of one or more colors that is different from the first set of one or more colors. In some embodiments, the first type of command is a command that initiates a process for transmitting at least some of the voice input (e.g., the portion of the voice input that is to be transmitted) to a plurality of external devices. In some embodiments, transmitting at least some of the voice input to the plurality of devices causes two or more of the plurality of external devices to output (e.g., automatically (e.g., without intervening user input) output) some of the voice input. In some embodiments, the plurality of external devices includes different types (e.g., a personal device, an external accessory device) of external electronic device. In some embodiments, the plurality of devices are associated with a first group that is associated with a top-level location (or destination) (e.g., a location of a first type) (e.g., a home location, business, an office (e.g., a location that is a top-level location (e.g., a location that defines one or more locations (e.g., sub-locations) and/or one or more regions (or zones) that are within an area and/or perimeter that is defined by the location of the top-level location, a location that is at the top level of a hierarchy of locations, a location that is linked (e.g., programmatically) to one or more locations (e.g., sub-locations) and/or one or more regions (or zones)))). In some embodiments, the first group of devices can include a plurality of subgroups of devices. In some embodiments, a sub-group of devices is associated with a sub-location (e.g., a room positioned (e.g., in the boundary, area, or perimeter of the top-level location; and/or defined, identified, and/or linked (e.g., programmatically linked) (e.g., by a user) to the top-level location) in a top-level location and/or a zone (e.g., a location that is defined by two or more sub-locations within (e.g., within the boundary, area, or perimeter of the top-level location and/or defined, identified, and/or linked (e.g., by a user)) the top-level location (e.g., an entertainment zone that includes a living room and a dining room within the top-level location, a personal zone that includes two or more bedrooms, living rooms, bathrooms within the top-level location) in the top-level location). In some embodiments, the first user interface is a control user interface. In some embodiments, the plurality of devices is associated with a plurality of subgroups of devices. In some embodiments, the visual indication continues to be displayed while receiving voice input via the one or more microphones. In some embodiments, the visual indication ceases to displays after initially being displayed while receiving voice input via the one or more microphones. In some embodiments, the second type of command is not a command that initiates a process for transmitting at least some of the voice input to a plurality of external device (e.g., speakers, personal device (e.g., cellular phone). In some embodiments, the visual indication continues to be displayed while receiving voice input via the one or more microphones. In some embodiments, the visual indication ceases to displays after initially being displayed while receiving voice input via the one or more microphones. Displaying a visual indication with a first set of colors when it is determined that a portion of the voice input is to be transmitted to one or more devices provides the user with feedback regarding whether a portion of the voice input will be played back at external electronic devices, such that a user can be aware that their utterances can be potentially heard by other people. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Displaying a visual indication with a second set of one or more colors (e.g., that is different from the first set of one or more colors) when it is determined that that the user's voice input does not include an instruction to transmit any portion of the voice input to other devices provides the user with reassurances that the user's utterances will not be heard by individuals at other external devices. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, voice input (e.g., 1150*m*-1150*o*) requesting for the electronic device to retrieve information (e.g., retrieve information, such as the weather, answers to one or more queries) or change one or more states (e.g., change one or more of an audio state (e.g., answering/placing a phone call, adjusting a volume), a state of media playback (e.g., pausing, playing, fast-forwarding, rewinding, skipping, shuffling media), an on/off state) of the electronic device is the voice input that does not include an instruction to transmit any portion of the voice input to other devices.

In some embodiments, the voice input that corresponds (e.g., 1150*b*-1150*f*, 1150*k*) to voice input that is to be transmitted to the one or more devices includes (1208) an identifier (e.g., a location, a sub-location, a location that corresponds to a group ("home") or category (e.g., "dining room," "living room," "sunroom" within the group) for a group of devices. In some embodiments, the voice input includes the identifier for the group of devices and an audio message that will be transmitted to the group of devices. In some embodiments, the voice input (e.g., 1150*m*-1150*o*, 1150*r*) that does not include an instruction to transmit any portion of the voice input to other devices does not include (1212) the identifier for the group of devices. In some embodiments, the voice input does not include an identifier for a group of devices and an audio message is not transmitted to the group of devices.

In some embodiments, the first set of one or more colors (e.g., 1102 in FIGS. 11C-11F) is a solid color and the second set of one or more colors (e.g., 1102 in FIGS. 11M-11O) is a plurality of colors. In some embodiments, the solid color is not included in the plurality of colors. Applying different visual effects to the electronic device when different prescribed conditions are met allows the user to quickly recognize whether their utterances will be transmitted and played back by external electronic devices. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, as a part of displaying the visual indication (e.g., 1102 in FIGS. 11C-11F) with the first set of one or more colors, the electronic device displays an animation (e.g., 1102 in FIGS. 11C-11F) (e.g., of a pattern (e.g., a spatial pattern) of lights) that changes (e.g., in size, brightness, saturation, and/or position) over a period of time (e.g., 1, 5, 10 seconds) (e.g., based on the amount of time that the voice input is received) based on the voice input (e.g., based on a variation in a value for an input parameter (such as a volume, tone, and/or pitch) of the voice input).

In some embodiments, as a part of displaying the animation (e.g., 1102 in FIGS. 11C-11F), the electronic device changes (e.g., increasing or decreasing) one or more of the brightness, size, color saturation, or position of the visual indication (e.g., 1102 in FIGS. 11C-11F) based on one or more of a volume or pitch of the voice input. In some embodiments, as the volume and/or pitch of the voice input increases/decreases the one or more of the brightness, size, color saturation of the visual indication. In some embodiments, as the rhythm (e.g., or beat) of the voice input increases/decreases the rhythm (or beat) of the animation increases/decreases. In some embodiments, as the volume and/or pitch of the voice input increases/decreases the visual indication takes up more/less of the area of the display device. Updating the visual characteristics (e.g., brightness, size, color saturation, or position) of the visual indication to reflect a change in the user's voice input (e.g., change in volume or pitch of voice input) provides the user with visual feedback regarding various characteristics of the user's voice input. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the electronic receives data corresponding to a plurality of audio messages for playback. In some embodiments, the data corresponding to the plurality of audio messages for playback includes an identifier (e.g., a location that corresponds to a group ("home") or category (e.g., "dining room," "living room," "sunroom" within the group) for a group of devices. In some embodiments, the plurality of audio messages are for a plurality of identifiers, where each identifier corresponds to a different group or category. In some embodiments, in response to receiving the data corresponding to the plurality of audio message for playback, the electronic device outputs an introductory tone (e.g., 1154*i*) (e.g., a dinging or ringing sound, the introductory tone or chime for all audio messages) before (e.g., and before outputting an identifier for the group of devices) outputting each respective audio message of the plurality of audio messages. In some embodiments, the identifier is output before a group of audio messages that corresponds to the identifier (e.g., that identifies a target group of devices) are output. Outputting same introductory tone before outputting different audio messages that have been multicast alerts recipients that the audio message is a multicast type of audio message. Providing improved audio feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the electronic device receives data corresponding to an audio message (e.g., an audio multicast message) for playback. In some embodiments, the data corresponding to the audio message for playback includes an identifier (e.g., a location that corresponds to a group ("home") or category (e.g., "dining room," "living room," "sunroom" within the group) associated with a group of devices. In some embodiments, in response to receiving the data, the electronic device, automatically, without user input, outputs (e.g., 1154*j*) (e.g., via a speaker of the electronic device) the audio message. In some embodiments, outputting the audio message includes outputting an identifier (e.g., a location that corresponds to a group ("home") or category (e.g., "dining room," "living room," "sunroom" within the group) for a group of devices.

In some embodiments, before outputting the audio message, displaying a second visual indication (e.g., 1102 in 11I)

in response to receiving the data. In some embodiments, the second visual indication has a first visual appearance (e.g., color, size, brightness) when the audio message is an audio message transmitted to multiple devices (e.g., a group of devices). In some embodiments, the second visual indication has a second visual appearance that is different from the first visual appearance when the audio message is an audio message transmitted to the electronic device and not to other devices.

In some embodiments, the electron device receives data corresponding to an audio message (e.g., an audio multicast message) for playback. In some embodiments, the data corresponding to the audio message for playback includes an identifier (e.g., a location that corresponds to a group ("home") or category (e.g., "dining room," "living room," "sunroom" within the group) associated with a group of devices. In some embodiments, outputs the audio message (e.g., automatically, in response to a user request). In some embodiments, while outputting the audio message, the electronic device concurrently displays a visual indication (e.g., 1102 in FIG. 11J) that does not change based on one or more characteristics (e.g., volume, pitch, tone, rhythm (e.g., beat)) of the audio message.

In some embodiments, the audio message is output (e.g., 1154*j*) based on the volume level (e.g., a system-level audio level) (e.g., a current volume level) of the electronic device. In some embodiments, the electronic device is not displaying visual content (e.g., 1102 in FIG. 11A) (e.g., any lights (e.g., no LEDs are turned on)) before the visual indication (e.g., 1102 in FIGS. 11B-11F) is displayed. In some embodiments, the electronic device is in an inactive display state (e.g., LEDs are not lit) before the visual indication is displayed. In some embodiments, while displaying the visual indication, the electronic device is in an active display state (e.g., some LEDs are lit). Not displaying visual content when no voice input is being received provides the user with visual feedback that no voice input is being received and that any utterances by the user are not being transmitted and played back by other external devices. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the electronic device ceases (1214) to display the visual indication (e.g., 1102 in FIG. 11G), including ceasing to display visual content (e.g., 1102 in FIG. 11H) via the one or more display devices. In some embodiments, the electronic device is in an inactive display state after ceasing to display the visual content. Not displaying visual content when no voice input is being received provides the user with visual feedback that no voice input is being received and extends the battery life of the device because the device is in an inactive state. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the visual indication (e.g., 1102 in FIG. 11G) is not displayed concurrently with another visual indication (e.g., a visual indication that corresponds to a status or a process that is different from the status or process that the visual indication corresponds to (e.g., a multicast process or a process for sending/receiving audio multicast messages)) (e.g., or other visual content). Providing only one visual indication at a time provides the user with clarity regarding the status of the electronic device and whether the user's utterances are being transmitted and played back by other external devices. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the visual indication (e.g., 1102 in FIG. 11G) is a light (e.g., LEDs of 1102) indication that provides different lights based on a status (e.g., a status for a multicast process or a process for sending/receiving audio multicast messages, a process associated with a state of the electronic device, a process associated with a state of the electronic device) of one or more applications in communication with (e.g., executing on the electronic device or one or more external applications that send data to or receive data from the electronic device) the electronic device.

Note that details of the processes described above with respect to method 1200 (e.g., FIG. 12) are also applicable in an analogous manner to the methods described above. For example, method 1200 optionally includes one or more of the characteristics of the various methods described above with reference to methods 800 and 1000. For example, the computer systems can be the same systems. For another example, the audio message sent in method 800 can be the media received in method 1000. For another example, the voice input transmitted in method 1200 can be the same as the media received in method 1000. For brevity, these details are not repeated below.

FIGS. 13A-13N illustrate exemplary electronic devices and user interfaces for managing external devices in accordance with some embodiments. The user interfaces in these figures are used to illustrate the processes described below, including the processes in FIG. 14.

FIG. 13A illustrates electronic device 700 displaying user interface 710. In some embodiments, device 700 can be related to (e.g., in communication with or not in communication with one or more networks in relation to, positioned at a physical location relative to, interact with one or more devices assigned to, etc.) home 602 as described above (e.g., in FIGS. 7A-7AH). User interface 710 is a user interface for controlling multiple external devices assigned to home 602. User interface 710 includes home location identifier 712, macro controls 716, external device controls 718, navigations controls 722, home multicast instruction 724, and home multicast affordance 726 (e.g., selectable user interface object), which have one or more characteristics and can be responded to in a manner as described above in relation to FIGS. 7A-7AH.

User interface 710 also includes status indicators 1314. Each of the status indicators includes information concerning the current status of some of the devices currently assigned to home 602 (e.g., some of which have been described above in relation to FIG. 6). As illustrated in FIG. 13A, status indicators 1314 include carbon monoxide status indicator 1314*a*, alarm status indicator 1314*b*, account error status indicator 1314*c*, update available status indicator 1314*d*, and a portion of timer status indicator 1314*e* (respectively, from left-to-right). Carbon monoxide status indicator 1314*a* indicates that one or more carbon monoxide detectors or sensors have detected the presence of carbon monoxide in home 602 and, thus, the one or more carbon monoxide detectors or sensors are in a carbon monoxide detected state, e.g., alert "on" state, detecting a carbon monoxide leak. Alarm status indicator 1314*b* indicates that one or more alarms have been tripped that are related to home 602 and, thus, the one or more alarms are in an active, e.g., triggered or alerting, state. Account error status indicator 1314*c* indicates that device 700 is currently having issues with an account associated with home 602, such as device 700 not being currently logged into the account associated with home 602 or device 700 having issues connecting to one or more known external devices assigned to home 602. Update available status indicator 1314*d* indicates that updated software is available to be installed on one or more external devices and/or device 700 (e.g., software that contains one or more functions corresponding to the home application). Timer status indicator 1314*e* indicates that one or more timers are currently active. In addition, timer status indicator 1314*e* indicates that at least one timer (or an aggregate of the total time of multiple timers) is in a state where about 0% of the time has elapsed from the time that the timer (or multiple timers) was originally set. In particular, this state is represented by remaining time indication 1314*e*1, which covers approximately 100% of the perimeter of timer status indicator 1314*e*.

Each status indicator contains a name (e.g., "carbon monoxide) associated with the status indicator (e.g., carbon monoxide status indicator 1314*a*) and can be displayed with at least one particular visual characteristic (e.g., a color (e.g., red, greyed-out, etc.), a pattern, a shape, etc.). In some embodiments, one or more of the status indicators include a representation of a number of devices of a certain type (e.g., carbon monoxide detector or sensor) that are in the state (e.g., active, alerting, or needing attention) that is represented by the status indicators. Each status indicator may also include a quick visual representation of the status indicator's state.

In FIG. 13A, each status indicator is within (e.g., included, a part of, or belongs to) a particular status indicator category, and the status indicators are displayed in order based on the respective status indicator category to which each of the respective status indicators corresponds. In FIG. 13A, the particular status indicator category of a status indicator denotes the urgency (or importance) of the status indicator. Status indicators that are within one status indicator category can have one or more characteristics that are different from the one or more characteristics of status indicators that are within a different status indicator category. As illustrated in FIG. 13A, carbon monoxide status indicator 1314*a* and alarm status indicator 1314*b* are in a first status indicator category (e.g., a most urgent category, an alarm category) and are displayed with a first color (e.g., red, as indicated by the vertical hatching). In some embodiments, the first status indicator category indicates that the external devices associated with a particular status indicator should be addressed as soon as possible. Next, in FIG. 13A, account error status indicator 1314*c* and update available status indicator 1314*d* are in a second status indicator category (e.g., a second-most urgent category, a status indicator category that is less urgent than the first status indicator category, an action required category) and are displayed with a different color (e.g., as indicated by no hatching) from the color of the status indicators in the first category). In FIG. 13A, timer status indicator 1314*e* is in a third status indicator category (e.g., a third-most urgent category, a status indicator category that is less urgent than the second status indicator category). Timer status indicator 1314*e* includes one or more dynamic components (e.g., remaining time indication 1314*e*1) that are relevant to the state of the timer that corresponds to timer status indicator 1314*e*. In some embodiments, the one or more dynamic components (e.g., remaining time indication 1314*e*1) are updated in real-time (e.g., as further explained below with reference to FIG. 13B). In some embodiments, status indicators that are in the first and/or second status indicator categories do not have one or more dynamic components that are relative to the particular state of the one or more external devices that correspond to the respective status indicator.

In some embodiments, when a determination is made that a new status indicator will need to be displayed, device 700 will display the new status indicator after (or before or among) the status indicators in the same status indicator category as the new status indicator. For example, when a determination is made that a new status indicator should be displayed and the new status indicator is in the second status indicator category, device 700 displays the new status indicator between update available status indicator 1314*d* and timer status indicator 1314*e* (e.g., instead of appending the new status indicator at the beginning and/or end of all of the displayed status indicators 1314). Thus, the new status indicator is displayed on device 700 at a position that is relevant to the urgency of the status indicator to allow the user to identify and/or interact with the new status indicator based on the new status indicator's relevant urgency as compared to the relevant urgency of the other displayed status indicators. At FIG. 13A, device 700 detects gesture 1350*a* at a location that corresponds to status indicators 1314.

At FIG. 13B, device 700 determines that gesture 1350*a* is a leftward swipe gesture. As illustrated in FIG. 13B, because device 700 has determined that gesture 1350*a* is a swipe gesture, device 700 displays additional status indicators if there are more status indicators than can be displayed (e.g., within the same region as status indicators 1314) on device 700 at one time. In particular, device 700 moves status indicators 1314 that were previously displayed on FIG. 13A to the left (e.g., in the direction of gesture 1350*a*), such that carbon monoxide status indicator 1314*a*, alarm status indicator 1314*b*, and account error status indicator 1314*c* cease to be displayed, update available status indicator 1314*d* and timer status indicator 1314*e* have respectively replaced carbon monoxide status indicator 1314*a* and alarm status indicator 1314*b*, and climate status indicator 1314*f*, door lock status indicator 1314*g*, and a portion of light status indicator 1314*h* are newly displayed at FIG. 13B.

As illustrated in FIG. 13B, timer status indicator 1314*e* includes a dynamic component, remaining time indication 1314*e*1. When looking at FIG. 13A-13B, remaining time indication 1314*e*1 moves (e.g., not in response to user input but rather in response to time passing) from being around roughly 100% of the perimeter of timer status indicator 1314*e* in FIG. 13A to being around roughly 75% of the perimeter of timer status indicator 1314*e* in FIG. 13B since the timer starts at 13 minutes in FIG. 13A and runs until it has approximately 10 minutes left in FIG. 13B.

In FIG. 13B, climate status indicator 1314*f* is in the third status indicator category, which is the same status category that timer status indicator 1314*e* is in as discussed above in relation to FIG. 13A. Climate status indicator 1314*f* represents a status indicator that corresponds to the states of multiple different types (e.g., air quality sensors, temperature, humidity sensors) of external devices. Climate status indicator 1314*f* indicates that an average temperature detected by one or more climate control devices (or in which one or more climate control devices are set) is 68 degrees, the average humidity detected by one or more humidity sensors is 40%, and the average air quality detected by one or more air quality sensors is good. Moreover, status indicator 1314*f* also indicates that the thermostat control is causing a heating system to be activated (e.g., a room is being heated by a device that the thermostat control is controlling), which is indicated by the upward point arrow on status indication 1314*f*. In some embodiments, when status indicator 1314*f* includes a downward pointing arrow, status indicator 1314*f* indicates that the thermostat control is causing an air conditioning system to be activated (e.g., a room is being cooled by a device that the thermostat control is controlling). In some embodiments, when status indicator 1314*f* includes a dash, status indicator 1314*f* indicates that the thermostat control is not causing an air-conditioning system or a heating system to be activated (e.g., a room is detected being at the specified temperature to which the thermostat is set). At FIG. 13B, device 700 detects gesture 1350*b* at a location that corresponds to status indicators 1314.

At FIG. 13C, device 700 determines that gesture 1350*b* is a leftward swipe gesture. As illustrated in FIG. 13C, because device 700 has determined that gesture 1350*b* is a swipe gesture, device 700 displays additional status indicators. In particular, device 700 moves status indicators 1314 that were previously displayed on FIG. 13B to the left, such that update available status indicator 1314*d*, timer status indicator 1314*e*, and climate status indicator 1314*f* cease to be displayed, door lock status indicator 1314*g*, light status indicator 1314*h* has slid to the left, and open window status indicator 1314*i*, door sensor status indicator 1314*j*, and motion sensor status indicator 1314*k* are newly displayed at FIG. 13C. In embodiments where gesture 1350*b* is determined to be a rightward swipe gesture, device 700 moves the status indicators to right to display one or more of the previously displayed status indicators (e.g., carbon monoxide status indicator 1314*a*, alarm status indicator 1314*b* displayed in FIG. 13A).

At FIG. 13C, door lock status indicator 1314*g*, light status indicator 1314*h*, and open window status indicator 1314*i* are in a fourth status indicator category (e.g., a fourth-most urgent category, a status indicator category that is less urgent than the third status indicator category, a quick action status indicator category). Although, as described, the categories for certain status types are pre-defined, in some embodiments, the category for a specific type of status indicator can be specified via one or more user inputs. In some embodiments, device 700 displays one or more settings for a particular type of device (e.g., lights) and/or a particular type of status indicator that allow the user to set the status category of a status indicator related to the particular type of device and/or the particular type of status indicator (e.g., most important, second-most important, third-most urgent, etc.)

A status indicator in the fourth status indicator category indicates that a number of external devices of a certain type are in a certain state. For example, as illustrated in FIG. 13B, door lock status indicator 1314*g* indicates that two door locks are in an unlocked state. As another example, in FIG. 13C, light status indicator 1314*h* indicates that five lights are in an active (or on) state and open window status indicator 1314*i* indicates that seven window blinds (e.g., coverings, shades) are in an open state. Notably, the status indicator in the fourth status indicator category excludes information concerning devices of the same type that are in a different state. For example, the living room desk lamp assigned to home 602 is off (e.g., as indicated by living room desk lamp control 718*g*). In FIG. 13C, light status indicator 1314*h* does not include information concerning the living room desk lamp because the living room desk lamp is off (as explained in further detail below with respect to in FIGS. 13D-13F).

FIGS. 13C-13H illustrate different gestures detected by device 700 that are directed to a status indicator (e.g., a status indicator in the fourth status indicator category). In particular, FIGS. 13C-13H illustrate different gestures being directed to light status indicator 1314*h*. However, similar techniques, as described herein, could be applied to gestures being directed to other status indicators, such as door lock status indicator 1314*g* and open window status indicator 1314*i*. At FIG. 13C, device 700 detects gesture 1350*c* directed to (e.g., on, at a location corresponding to) light status indicator 1314*h*.

At FIG. 13D, device 700 determines that gesture 1350*c* is a press-and-hold gesture (e.g., a gesture that is detected for more than a predetermined period of time). As illustrated in FIG. 13D, because device 700 has determined that gesture 1350*c* is a press-and-hold gesture, device 700 displays user interface 1340 (e.g., as opposed to displaying additional status indicator when it was determined that gesture 1350*b* was a swipe gesture). As shown in FIG. 13D, user interface 1340 has replaced user interface 710 that was previously displayed in FIG. 13C.

As illustrated in FIG. 13D, user interface 1340 includes the external device controls 718 for the lights (e.g., lighting devices) that are assigned to home 602 because light status indicator 1314*h* indicates a status of one or more lights assigned to home 602. As illustrated in FIG. 13D, external device controls 718 displayed on user interface 1340 are ordered by a room or a portion of home 602 (e.g., "bedroom," "dining room," "living room," "porch") to which each respective external device control is assigned. For example, bedroom light control 718*f* and bedroom night light control 718*h* are assigned to the bedroom (e.g., 602*c*) of home 602 and are under a "BEDROOM" heading on user interface 1340, dining room light control 718*i* is assigned to the dining room (e.g., 602*b*) of home 602 and is under a "DINING ROOM" heading on user interface 1340, living room lamp control 718*b* and living room desk lamp control 718*g* is assigned to the living room (e.g., 602*d*) of home 602 and is under a "LIVING ROOM" heading on user interface 1340, and porch light control 718*j* is assigned to the porch of home 602 and is under a "PORCH" heading on user interface 1340.

Notably, as illustrated in FIG. 13D, bedroom light control 1718*f*, bedroom night light control 718*h*, dining room light control 718*i*, living room lamp control 718*b*, and porch light control 718*j* each indicate that the respective devices (e.g., light bulbs) to which they correspond are on or activated. In other words, the devices corresponding to bedroom light control 1718*f*, bedroom night light control 718*h*, dining room light control 718*i*, living room lamp control 718*b*, and porch light control 718*j* are on and are indicative of one of the "five lights on" indication as shown by light status indicator 1314*h* in FIG. 13C. Moreover, when looking at light status indicator 1314*h*, there is no indication of a sixth light and/or the status of a sixth light, although six lights are shown on user interface 1340. Even though only five lights are on or active and identified in the light status indicator 1314*h*, the home may have more lights, e.g., lights that are inactive or off, to which the home is associated. In some implementations, user interface 1340 shows the detailed status of all lights when displaying detailed statuses of lights. In FIG. 13D, the living room desk lamp is displayed with a different visual indication than the other lights (e.g., indicating living room desk lamp control 718g is off). In some embodiments, user interface 1340 does not include living room desk lamp control 718g at FIG. 13D because the living room desk lamp is not in the same state of the other light controls that are represented by light status indicator 1314h in FIG. 13C. In some embodiments, when user interface 1340 does not include living room lamp control 718g at FIG. 13D, device 700 can display living room lamp control 718g on user interface 1340 in response to receiving an indication that the state of the living room desk lamp has changed to on (e.g., when someone has physically turned on the living room desk lamp) or the same state of the other light controls that are represented by light status indicator 1314h. At FIG. 13D, device 700 detects tap gesture 1350d directed to bedroom light control 718f.

At FIG. 13E, in response to detecting tap gesture 1350d, device 700 transmits an instruction that causes bedroom light 632 to change state (e.g., turn off) and updates the visual appearance of bedroom light control 718f. As illustrated in FIG. 13E, bedroom light control 718f indicates that the bedroom light (e.g., bedroom light 632) corresponding to bedroom light control 718f is off, e.g., in an inactive state, as opposed to being on, e.g., in an active state, as shown in FIG. 13D. Notably, the other light controls displayed on user interface 1340 have not changed at FIGS. 13D-13E. In response to detecting tap gesture 1350d, device 700 sends an instruction that causes bedroom light 632 to change state without causing the other lights represented by the other light controls to change state. Thus, user interface 1340 allows a user to cause each device represented by each respective control to individually perform an action (e.g., change the state of the device) without causing the other devices to perform the action. At FIG. 13E, device 700 detects tap gesture 1350e directed to done affordance 1342.

As illustrated in FIG. 13F, in response to detecting tap gesture 1350e, device 700 ceases to display user interface 1340 and re-displays user interface 710 that has status indicators 1314. As illustrated in FIG. 13F, light status indicator 1314h is updated to reflect that four lights are on in home 602 as opposed to five lights being on as indicated by light status indicator 1314h in FIG. 13C. Thus, some status indicators are updated to indicate the number of devices that are currently in a particular state (e.g., whether a device has changed from that particular state or whether a device has changed to that particular state). Moreover, at FIG. 13F, bedroom light control 718f has also changed on user interface 710 to reflect that the bedroom light is off while the other light controls (e.g., living room lamp control 718b and living room desk lamp control 718g) displayed on user interface 710 have not changed when compared to their respective appearances as illustrated on FIG. 13C. Therefore, the device controls displayed on user interface 710 are also updated in response to device 700 detecting gestures (e.g., gesture 1350d) directed to device controls displayed via user interface 1340. At FIG. 13F, device 700 detects gesture 1350f directed to light status indicator 1314h.

At FIG. 13G, device 700 determines that gesture 1350f is a tap gesture (e.g., a gesture that is detected for less than a predetermined period of time, a gesture that is different from gestures 1350a-1350c). At FIG. 13G, because device 700 has determined that gesture 1350f is a tap gesture, device 700 transmits an instruction that causes the four lights indicated as on by light status indicator 1314h in FIG. 13F to turn off (or change state). Thus, bedroom night light control 718h, dining room light control 718i, living room lamp control 718b, and porch light control 718j are off in FIG. 13G. As illustrated in FIG. 13G, because device 700 has determined that gesture 1350f is a tap gesture, device 700 changes the visual appearance of light status indicator 1314h (e.g., shown by the newly introduced hatching in FIG. 13G as compared to no hatching in FIG. 13F) and updates light status indicator 1314h to indicate that the four lights have been turned off. Notably, as illustrated in FIG. 13G, living room lamp control 718b and living room desk lamp control 718g are also changed to indicate that their respective corresponding devices have been turned off. Thus, at FIG. 13G, device 700 changes the state of multiple devices (e.g., devices assigned to different rooms) in response to a single gesture (e.g., a tap) on a status indicator, which is different from device 700 only changing the state of one device in response to the same type of gesture (e.g., a tap) on an external device control (e.g., as described above in relation to gesture 1350d in FIG. 13D). Moreover, at FIG. 13G, device 700 causes the multiple devices to change state by performing the same action (e.g., turning lights on, locking door, close blinds) that is based on the type of device (e.g., lights, door locks, window blinds adjusters) indicated by the status indicator to which the tap gesture was directed. As illustrated in FIG. 13G, because gesture 1350f in FIG. 13H is a tap gesture that was directed to light status indicator 1314h, device 700 does not change the status of the other status indicators, does not transmit an instruction that causes other devices corresponding to the other status indicators to change state, and maintains the appearance of the other status indicators (e.g., when comparing FIGS. 13F-13G).

At FIG. 13H, device 700 determines that a predetermined period of time has passed since gesture 1350f was detected without device 700 detecting another gesture directed to light status indicator 1314h. As illustrated in FIG. 13H, because the determination is made that the predetermined period of time has passed since gesture 1350f was detected, device 700 ceases to display light status indicator 1314h and moves open window status indicator 1314i, door sensor status indicator 1314j, and motion sensor status indicator 1314k to the left in order to fill the space previously occupied by light status indicator 1314h. For example, open window status indicator 1314i was adjacent to light status indicator 1314h in FIG. 13G, and open window status indicator 1314i occupies the location vacated by light status indicator 1314h in FIG. 13H. Because some of the status indicators have shifted to the left, an additional status indicator, light sensor status indicator 1314k, is newly displayed. Door sensor status indicator 1314j, motion sensor status indicator 1314k and light sensor status indicator 1314k are in a fifth status indicator category (e.g., a fifth-most urgent category, a status indicator category that is less urgent than the fourth status indicator category, a sensor status indicator category). Door sensor status indicator 1314j indicates that a door sensor assigned to home 602 has detected that a door is ajar. Motion sensor status indicator 1314k indicates that motion has been detected by one or more motion sensors assigned to home 602. Light sensor status indicator 1314l indicates that one or more door sensors have detected that one or more doors that are assigned to home 602 are opened. In some embodiments, when a gesture directed to light status indicator 1314h is detected before the predetermined period of time has elapsed, device 700 transmits an instruction that causes the four lights to change back to being in the on state and updates light status indicator 1314h to indicate that the four lights are on (e.g., as shown in FIG. 13F). This ability to still view a status indicator for a predetermined period of time after accessories associated with the status indicator have changed from an urgent or active state provides the user with the opportunity to easily undo a state change of accessories. In some embodiments, when the gesture directed to light status indicator 1314h is detected before the predetermined period of time has elapsed, device 700 maintains display of light status indicator 1314h, irrespective of the amount of time that passes before an additional gesture is received. In some of these embodiments, device 700 maintains display of light status indicator 1314h because light status indicator 1314h is indicating that one or more of the lights are back in the original state that the one or more lights were in when light status indicator 1314h was first displayed on user interface 710 (e.g., in FIG. 13B). At FIG. 13H, device 700 detects tap gesture 1350h on room navigation control 722b.

As illustrated in FIG. 13I, in response to detecting tap gesture 1350h, device 700 displays user interface 1360 of the home application and indicates that room navigation control 722b is selected (e.g., as indicated by being bold). User interface 1360 is a user interface for controlling multiple external devices assigned to bedroom 602c, as indicated by bedroom identifier 1368. In some embodiments, device 700 can use one or more techniques as described above in relation to displaying user interface 760 of FIG. 7G in order to display user interface 1360 of FIG. 13I. In some embodiments, user interface 1360 can be alternatively displayed in response to detecting tap gesture 750f/3 in FIG. 7F and/or user interface 760 can be alternatively displayed in response to detecting tap gesture 1350h in FIG. 13H.

As illustrated in FIG. 13I, user interface 1360 includes a reduced set of status indicators than the status indicators that were displayed in FIGS. 13A-13C and 13F-13H. User interface 1360 includes a reduced set of status indicators because a determination is made that the respective status indicators displayed on user interface 1360 correspond to at least one device assigned to the bedroom 602. In other words, when displaying user interface 1360 for controlling multiple external devices assigned to bedroom 602c, device 700 ceases to display status indicators that do not correspond to at least one device that is assigned to bedroom 602c.

As illustrated in FIG. 13I, the reduced set of status indicators include carbon monoxide status indicator 1314a, climate status indicator 1314f, and open window status indicator 1314i. Notably, climate status indicator 1314f of FIG. 13I indicates a temperature related to a thermostat that is assigned to the bedroom but does not indicate the humidity and/or air quality information that climate status indicator 1314f of FIG. 13B indicated. Here, climate status indicator 1314f of FIG. 13I does not indicate the humidity and/or air quality information because no humidity and air quality sensors are assigned to the bedroom. However, climate status indicator 1314f of FIG. 13I indicates the temperature related to a thermostat control because at least one thermostat is assigned to the bedroom. Moreover, status indicator 1314f of FIG. 13I also continues to indicate (e.g., when compared to 1314f of FIG. 13B) that the thermostat control is causing a heating system to be activated (e.g., a room is being heated by a device that the thermostat control is controlling), which is indicated by the upward point arrow on status indication 1314f of FIG. 13I. Thus, status indicators that correspond to multiple devices of the same type can cease to display information concerning one or more of the types of devices when navigating to user interfaces that correspond to different portions or rooms of home 602. Moreover, open window status indicator 1314i of FIG. 13I has changed to indicate that one window is opened as opposed to indicating that seven windows are opened, as illustrated in FIG. 13H. Open window status indicator 1314i of FIG. 13I has changed to indicate that one window is opened because only one bedroom window has a window blinds adjuster device that is assigned to bedroom 602c. At FIG. 13I, device 700 detects press-and-hold gesture 1350i that is directed to open window status indicator 1314i.

Figure 13K:
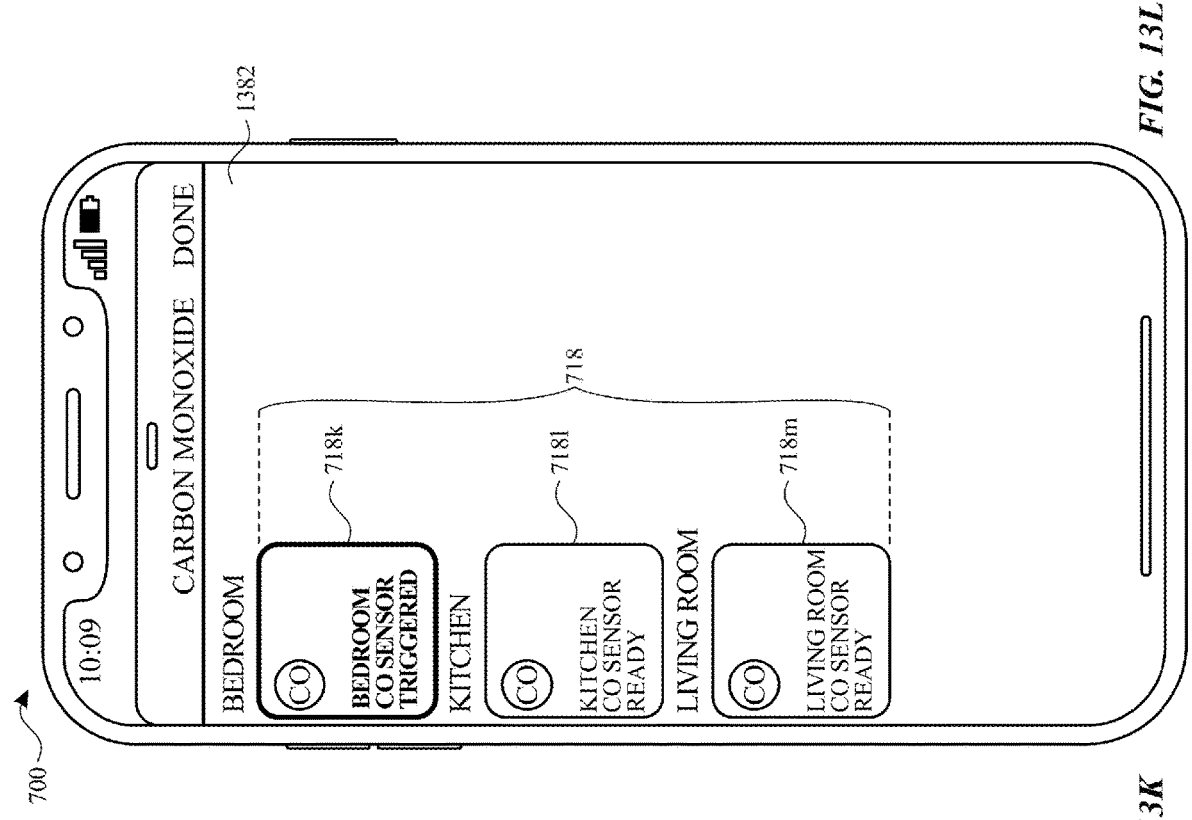
FIGS. 13A-13N illustrate exemplary user interfaces for managing external devices in accordance with some embodiments.

As illustrated in FIG. 13J, in response to detecting press-and-hold gesture 1350i, device 700 displays user interface 1370 that includes window blinds adjustable control 1318i. At FIG. 13J, device 700 detects gesture 1350j (a swipe down gesture) on window blinds adjustable control 1318i. As illustrated in FIG. 13K, in response to detecting gesture 1350j, device 700 transmits an instruction to a window blinds adjuster device assigned to bedroom 602b that causes the windows blinds adjuster to change from being 100% (as indicated by indication 1372 of FIG. 13J) opened to being 58% opened (e.g., as indicated by indication 1372 of FIG. 13K).

Notably, at FIG. 13J, device 700 displays window blinds adjustable control 1318i, where a selection of window blinds adjustable control 1318i changes the state of a window blinds adjuster device to a state that is different from the state (e.g., "open," 100% open) indicated by window blinds adjustable control 1318i and a state (e.g., "closed," 0% open) that is opposite of the state (e.g., "open") indicated by window blinds adjustable control 1318i. Thus, selection of window blinds adjustable control 1318i allows a user to change the window blinds adjuster device to a state that is different from the state in which a user can change the window blinds adjuster device by directing a tap gesture toward open window status indicator 1314i in FIG. 13I. In some embodiments, device 700 displays a user interface similar to user interface 1340 of FIG. 13D when open window status indicator 1314i of FIG. 13I indicates that more than the predetermined number of devices. Thus, when there are more than a predetermined number of devices indicated by window status indicator 1314i of FIG. 13I, multiple controls are displayed that control multiple devices, and selection of one of the respective controls causes the device to change in the opposite state (e.g., on/off state, open/closed state, locked/unlocked state). In some embodiments, device 700 displays controls that allow a user to have more (or different) control over the one or more devices when there are less than a predetermined number of devices than when there are more than the predetermined number of devices indicated by a status indicator. In some embodiments, when there are less than a predetermined number of devices indicated by a status indicator and a tap-and-hold gesture is detected on the status indicator, device 700 displays more controls for controlling a particular device than the number of controls that are displayed for the particular device when more than the predetermined number of devices are indicated to be in a particular state by a status indicator.

Figure 13L:
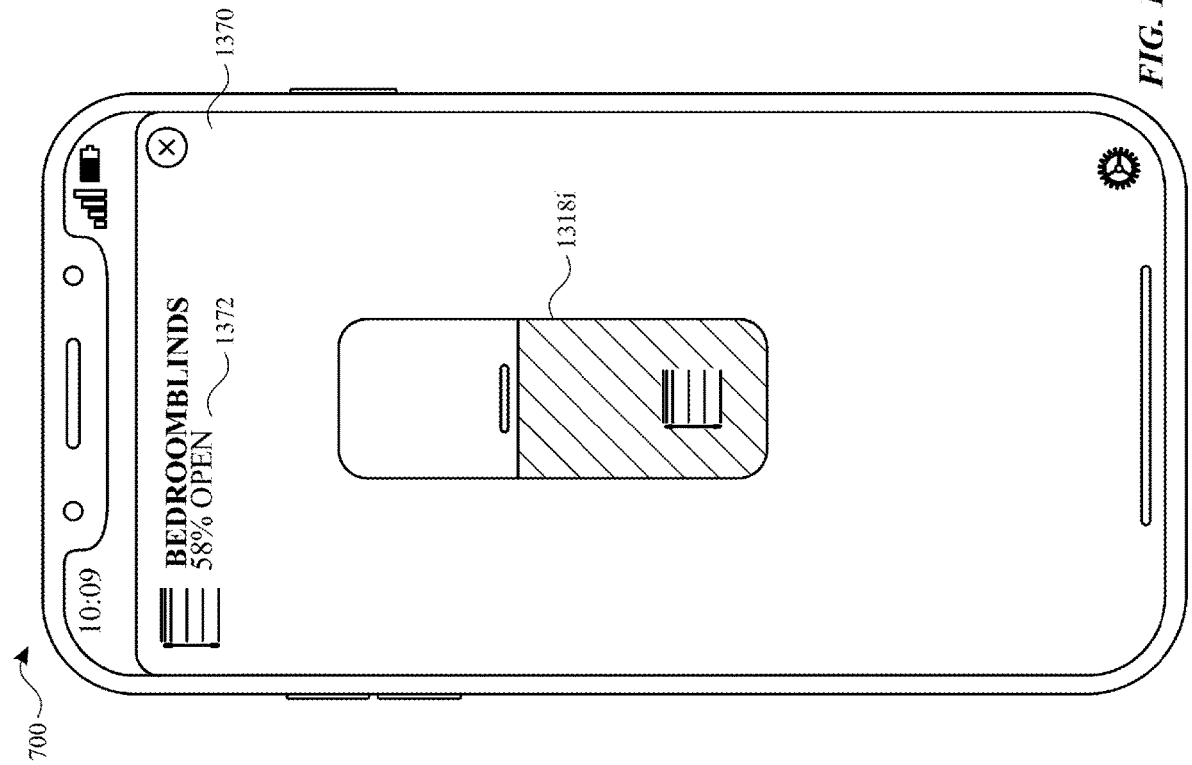

FIGS. 13L-13N illustrate exemplary user interfaces that are displayed in response to detecting gestures directed to other status indicators. In some embodiments, the gesture directed to the other status indicators can be the same type of gesture as gesture 1350c (e.g., press-and-hold gesture) or the same type of gesture as gesture 1350f (e.g., a tap gesture) to display the respective user interfaces of FIGS. 13L-13N. Thus, in some embodiments, device 700 displays the respective user interface of FIGS. 13L-13N in response to detecting either type of gesture (e.g., a press-and-hold gesture or a tap gesture).

FIG. 13L illustrates device 700 displaying user interface 1382. User interface 1370 is displayed in response to device 700 detecting a gesture directed to carbon monoxide status indicator 1314*a* of FIG. 13A. As illustrated in FIG. 13L, user interface 1382 includes external device controls 718, where each external device control indicates the status of a carbon monoxide device assigned to home 602. As shown by user interface 1382, the bedroom carbon monoxide sensor is trigged (e.g., as indicated by bedroom carbon monoxide control 718*k*) and kitchen carbon monoxide sensor and living room carbon monoxide sensor are not trigged (as indicated by carbon monoxides controls 7181-718*m*). Thus, in response to device 700 detecting a gesture directed to a status indicator in a status indicator category other than the fourth status indicator category (e.g., carbon monoxide status indicator 1314*a*), device 700 displays the device controls of the particular type that corresponds to the status indicator of the respective category, where the device controls have one or more visual appearances that are indicative of a state that a device corresponding to a respective control is in. In some embodiments, user interface 1370 is displayed using similar techniques to those described above in relation to FIGS. 13D-13E.

FIG. 13M illustrates device 700 displaying user interface 1384. User interface 1384 is displayed in response to device 700 detecting a gesture directed to climate status indicator 1314*f* in FIG. 13B. As illustrated in FIG. 13L, user interface 1384 includes controls corresponding to multiple types of devices because climate status indicator 1314*f* indicates the status of multiple types of devices (e.g., as described above in relation to FIG. 13B). For example, in FIG. 13L, user interface 1384 includes controls for controlling thermostat devices (e.g., bedroom thermostat control 718*n* and living room thermostat control 718*r*), controls for controlling air quality sensors (e.g., kitchen air quality sensor control 718*o* and living room air quality sensor control 718*r*), and a control for controlling a humidity sensor (e.g., kitchen humidity sensor control 718*p*).

FIG. 13N illustrates device 700 displaying user interface 1386. User interface 1386 is displayed in response to device 700 detecting a gesture directed to motion sensor status indicator 1314*k* in FIG. 13H. As illustrated in 13N, user interface 1386 includes controls corresponding to motion sensors that are assigned to home 602. User interface 1386 is displayed using similar techniques to those described above in relation to FIGS. 13D-13E and 13L.

FIG. 14 is a flow diagram illustrating a method for managing external devices using a computer system in accordance with some embodiments. Method 1400 is performed at a computer system (e.g., 100, 300, 500, 634, 674, 700, 701, 850) in communication with a display generation component (e.g., a display) and one or more inputs devices (e.g., a touch-sensitive display screen). Some operations in method 1400 are, optionally, combined, the orders of some operations are, optionally, changed, and some operations are, optionally, omitted.

As described below, method 1400 provides an intuitive way for managing external devices. The method reduces the cognitive burden on a user for managing external devices, thereby creating a more efficient human-machine interface. For battery-operated computing devices, enabling a user to recognize device status faster and more efficiently conserves power and increases the time between battery charges.

The computer system displays (e.g., 1402), via the display generation component, a first status indicator (e.g., 1314*g*, 1314*h*, 1314*i*) (e.g., as a part of displaying a first user interface (e.g., a user interface for controlling a set of accessory devices) that includes (e.g., includes displaying)) that indicates (e.g., a graphical representation and corresponding text (e.g., 2 light bulbs are on)) that a plurality of accessory devices of a first accessory type (e.g., light bulbs, windows, switches, outlets, locks (e.g., door locks, window locks), televisions) are in a first state (e.g., on, off, open, closed, locked, unlocked). The plurality of accessory devices of the first accessory type includes a first accessory device (1404) that is the first accessory type and is in the first state and a second accessory device (1406) that is the first accessory type and is in the first state, where the second accessory device is different from the first accessory device. In some embodiments, the first status indicator does not indicate that an accessory device of the first accessory type that is not in the first state (e.g., in a second state) (e.g., the first status indicator does not indicate or control (e.g., when selected) one or more devices of the first accessory type that are not in the first state (e.g., in the second state)). In some embodiments, the first status indicator does not indicate an accessory device of an accessory type that is not the first accessory type, irrespective of the current state of the accessory device of the accessory type that is not the first accessory type.

The computer system, while displaying the first status indicator, the computer system detects (1408) a gesture (e.g., 1350*a*-1350*c*, 1350*f*) (e.g., via one or more input devices).

In response to (1410) detecting the gesture and in accordance with a determination that the gesture is a first type of gesture (e.g., 1350*f*) (e.g., a tap gesture) and is directed to (e.g., on, at a location corresponding to) the first status indicator (e.g., 1350*h*), the computer system causes (1412) (e.g., via initiating a process (and, in some embodiments, the process includes transmitting one or more instructions to one or more devices (e.g., a server, a hub device that is in communication with a plurality of devices that includes the first accessory device and the second accessory device, first accessory device, second accessory device))) the first accessory device (e.g., to perform an action that changes the state of first accessory device) and the second accessory device (e.g., to perform an action that changes the state of the second accessory device) to change to a second state that is different (e.g., an opposite of (e.g., on/off, locked/unlocked, open/closed)) from the first state. In some embodiments, as a part of causing the first accessory device and the second accessory device to be in the second state, the computer system does not cause one or more accessory devices that are in the second state (or any state that is different from the first state) (e.g., before the gesture was detected) to perform any actions and/or to change state.

In response to (1410) detecting the gesture and in accordance with a determination that the gesture is a second type of gesture (e.g., 1350*c*) (e.g., a long press gesture) that is different from the first type of gesture and is directed to the first status indicator (e.g., 1314*h*), the computer system displays (1414), via the display generation component, a first accessory control user interface object (e.g., 718*b*, 718*f*-718*j*) (e.g., as a part of displaying a second user interface) corresponding to the first accessory device, where selection (e.g., 1350*d*) (e.g., via a gesture that is the first type of gesture (e.g., a tap gesture)) of the first accessory control user interface object causes (e.g., via initiating a process (and, in some embodiments, the process includes transmitting an instruction to one or more devices (e.g., a server, a hub device that is in communication with a plurality of accessory devices (e.g., that includes the first and second accessory devices)), first accessory device (not the second accessory device)) the first accessory device (e.g., to perform the action that changes a state of the first accessory device) to change to the second state without causing the second accessory device to change to the second state (e.g., the second accessory device continues to be in the first state after causing the first accessory device to be in the first state is completed). In some embodiments, while displaying the first accessory control user interface object corresponding to the first accessory device, the computer system detects a gesture (e.g., a gesture of the first type directed to the first accessory control user interface object) directed to the first accessory control user interface object; and, in response to detecting the gesture directed to the first accessory control user interface object, the computer system causes the first accessory device (e.g., to perform the action that changes the first accessory device) to be in the second state without causing the second accessory device to be in the second state (e.g., the second accessory device continues to be in the first state after the causing the first accessory device to be in the first state is completed). In some embodiments, in response to detecting the gesture directed to the first status indicator and in accordance with the determination that the gesture is the second gesture (e.g., a long press gesture) that is different from the first gesture, the computer system displays, via the display generation component, a third accessory control user interface object corresponding to a third accessory device, where the third accessory device is the first accessory device type and is not in the first state (e.g., is in the second state); and in response to detecting a gesture directed to the third accessory control user interface object, the computer system causes the third accessory device to be in the first state (e.g., to perform the action that changes the third accessory device) without changing the state of the first accessory device and the second accessory device (e.g., without causing the first accessory device and the second accessory device to be in the second state). In some embodiments, the second user interface does not include an (e.g., or any) accessory control user interface object corresponding to an accessory device that is not of the first type (e.g., of a second accessory type that is different from the first accessory type). In some embodiments, in response to detecting the gesture directed to the first status indicator and in accordance with the determination that the gesture is the second gesture (e.g., a long press gesture) that is different from the first gesture, the computer system does not display accessory control user interface objects that are of an accessory type that is different from the first accessory type are displayed via the second user interface). In some embodiments, in response to detecting the gesture directed to the first status indicator and in accordance with the determination that the gesture is the second gesture (e.g., a long press gesture) that is different from the first gesture, the computer system ceases to display the first status indicator. Performing different operations, when a gesture is directed to the first status indicator, based on the type of gesture detected provides the user with more control options without cluttering the user interface. Providing additional control of the system without cluttering the UI with additional displayed controls enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. Causing the first accessory device and the second accessory device to change to a second state that is different from the first state provides the user with one control that causes multiple devices to change state, which reduces the number of inputs needed to cause the multiple devices to change state. Reducing the number of inputs needed to perform an operation enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, in accordance with the determination that the gesture is the second type of gesture (e.g., 1350*c*) that is different from the first type of gesture and is directed to the first status indicator (e.g., 1314*h*), the computer system displays, via the display generation component and concurrently with the first accessory control user interface object (e.g., 718*b*, 718*f*-718*j*), a second accessory control user interface object (e.g., 718*b*, 718*f*-718*j*) corresponding to the second accessory device. In some embodiments, selection (e.g., via a gesture that is the first type of gesture (e.g., a tap gesture)) of the second accessory control user interface object causes (e.g., via a process (and, in some embodiments, the process includes transmitting an instruction to one or more devices (e.g., a server, a hub device that is in communication with a plurality of accessory devices (e.g., that includes the first and second accessory devices)), second accessory device (not the first accessory device)) the second accessory device to change to the second state without causing the first accessory device to change to the second state. In some embodiments, while displaying the second accessory control user interface object corresponding to the second accessory device, the computer system detects a gesture (e.g., a gesture of the first type directed to the first accessory control user interface object) directed to the first accessory control user interface object; and, in response to detecting the gesture directed to the second accessory control user interface object, the computer system causes the second accessory device (e.g., to perform the action that changes the second accessory device) to be in the second state without causing the first accessory device to be in the second state (e.g., the first accessory device continues to be in the first state after the causing the second accessory device to be in the first state is completed). In some embodiments, in response to detecting the gesture directed to the second accessory control user interface object, the second accessory control user interface object is modified from having a first visual appearance (e.g., text, size, color, pressed state (e.g., depressed, pressed)) to a second visual appearance (e.g., text, size, color, pressed state (e.g., depressed, pressed)) that is different from the first visual appearance. Displaying a second accessory control user interface object corresponding to the second accessory device concurrently with the first accessory control corresponding to the first accessory device (e.g., in accordance with the determination that the gesture is the second type of gesture that is different from the first type of gesture and is directed to the first status indicator) provides the user with more control options to control individual accessory devices without cluttering the user interface. Providing additional control of the system without cluttering the UI with additional displayed controls enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the gesture is detected while concurrently displaying, with the first status indicator, a second status indicator (e.g., 1314g, 1314i) that indicates that a plurality of accessory devices of a second accessory type, different from the first accessory type, is in a third state, the plurality of accessory devices of the second accessory type including a third accessory device that is the second accessory type and is in the third state (e.g., a different state than the first state and the second state) and a fourth accessory device that is the second accessory type and is in the third state. In some embodiments, the third accessory device that is the second accessory type and is in the second state and the fourth accessory device that is the second accessory type and is in the second state is different from the first accessory device and the second accessory device. In some embodiments, in accordance with a determination that the gesture is the first type of gesture (e.g., similar to 1350f) (e.g., a tap gesture) and is directed to (e.g., on, at a location corresponding to) the second status indicator (e.g., 1314g, 1314i), the computer system causes (e.g., via a process initiating a process (and, in some embodiments, the process includes transmitting one or more instructions to one or more devices (e.g., a server, a hub device that is in communication with a plurality of devices that includes the first accessory device, the second accessory device, the third accessory device, and the fourth accessory device))) the third accessory device and the fourth accessory device to change to a fourth state that is different from the third state (e.g., without causing the first accessory device and the second accessory device to change to a different state (e.g., the second state that is different (e.g., an opposite of (e.g., on/off, locked/unlocked, open/closed)) from the first state). In some embodiments, in accordance with a determination that the gesture is the second type of gesture (e.g., similar to 1350c) (e.g., a press-and-hold gesture) and is directed to (e.g., on, at a location corresponding to) the second status indicator (e.g., 1314g, 1314i), the computer system displays, via the display generation component, a third accessory control user interface object (e.g., as a part of displaying a second user interface) corresponding to the third accessory device. In some embodiments, selection (e.g., via a gesture that is the first type of gesture (e.g., a tap gesture)) of the third accessory control user interface object causes (e.g., via a process (and, in some embodiments, the process includes transmitting an instruction to one or more devices (e.g., a server, a hub device that is in communication with a plurality of accessory devices (e.g., that includes the first, second, third, and fourth accessory devices)), third accessory device (not the fourth accessory device)) the third accessory device (e.g., to perform the action that changes a state of the first accessory device) to change to the fourth state without causing the fourth accessory device to change to the fourth state (and, in some embodiments, without displaying, via the display generation component, the first accessory control user interface object (e.g., as a part of displaying the second user interface) corresponding to the first accessory device and/or the second accessory control user interface object) (e.g., the fourth accessory device continues to be in the third state after causing the third accessory device has been caused to be in the fourth state). In some embodiments, in accordance with a determination that the gesture is the second type of gesture (e.g., a press-and-hold gesture) and is directed to (e.g., on, at a location corresponding to) the second status indicator, the computer system displays a fourth accessory control user interface object concurrently with the third accessory control user interface object. In some embodiments, when the fourth accessory control user interface object is selected, the computer system causes (e.g., via a process (and, in some embodiments, the process includes transmitting an instruction to one or more devices (e.g., a server, a hub device that is in communication with a plurality of accessory devices (e.g., that includes the first, second, third, fourth accessory devices)), fourth accessory device (not the third accessory device)) the fourth accessory device to change to the fourth state without causing the third accessory device to change to the fourth state. Performing different operations based on the status indicator to which the gesture is directed and the type of gesture detected provides the user with more control options to control different accessory device types without cluttering the user interface. Providing additional control of the system without cluttering the UI with additional displayed controls enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. Causing the third accessory device and the fourth accessory device to change to a fourth state provides the user with one control that causes multiple devices to change state and reduces the number of inputs needed to cause the multiple devices to change state. Reducing the number of inputs needed to perform an operation enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, in accordance with a determination that a fifth accessory device (e.g., device represented by 718b in FIG. 13A) is the first accessory device type and the fifth accessory device (e.g., device represented by 718b in FIG. 13A) is in the first state, the plurality of accessory devices of the first accessory type includes (e.g., as indicated by 1314h) the fifth accessory device (e.g., that is different from the first accessory device and the second accessory device). In some embodiments, in accordance with a determination that the fifth accessory device (e.g., device represented by 718g in FIG. 13A) is the first accessory device type and the fifth accessory device (e.g., device represented by 718g in FIG. 13A) is not in the first state, the plurality of accessory devices of the first accessory type does not include (e.g., as indicated by 1314h) the fifth accessory device. In some embodiments, in accordance with a determination that the fifth accessory device is not the first accessory device type and the fifth accessory device is in the first state, the plurality of accessory devices of the fifth accessory type does not include the fifth accessory device. In some embodiments, in accordance with a determination that the fifth accessory device is not the first accessory device type and the fifth accessory device is not in the first state, the plurality of accessory devices of the first accessory type does not include the fifth accessory device. Providing a status indicator that controls accessory devices of a first accessory device type that are in a first state and does not control accessory devices of the first accessory device type that are not in the first state automatically provides the user with a status indicator that will control accessory devices that meet certain prescribed conditions. Performing an operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the first type of gesture is a tap gesture (e.g., 1350*f*) (e.g., a gesture that is detected (e.g., via the one or more input devices) for less than a predetermined period of time). In some embodiments, the second type of gesture is a press-and-hold gesture (e.g., 1350*c*) (e.g., a gesture that is detected (e.g., via the one or more input devices) for more than a predetermined period of time).

In some embodiments, in response to detecting the gesture and in accordance with a determination that the gesture is a third type of gesture (e.g., 1350*a*) (e.g., a swipe gesture, a gesture that moves in a direction (e.g., a lateral direction)) (e.g., and is directed to the first status indicator), the computer system displays (e.g., by scrolling the status indicators) a status indicator (e.g., 1314*f* in FIG. 13B) that was not previously displayed (e.g., the status indicator that was not previously displayed indicates that a plurality of accessory devices of an accessory that is different from the first accessory device type are in the same state). In some embodiments, in accordance with a determination that the gesture is the third type of gesture, ceasing to display the first status indicator (e.g., by scrolling the first status indicator out of view). In some embodiments, in accordance with a determination that the gesture is a third type of gesture, moving (e.g., in the direction (e.g., left, right, up, down, etc.) of the gesture) a plurality of displayed status indicators such that, after the plurality of status indicators are moved, the first status indicator ceases to be displayed while one or more status indicators that were not displayed before detecting the third type of gesture are displayed. In some embodiments, one or more controls that are not status indicators (e.g., scene control, external accessory device controls) remain displayed after the gesture is detected. Performing different operations when a third type of gesture is directed to the first status indicator provides the user with more control options (e.g., more status indicators) without cluttering the user interface. Providing additional control of the system without cluttering the UI with additional displayed controls enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, as a part of causing the first accessory device and the second accessory device to change to the second state, the computer system causes the first accessory device and the second accessory device to perform a type of action (e.g., turn off lights, unlock door locks, open blinds a certain percentage, turn off ac/heat) that is based on the first accessory type (e.g., lights, door locks, blinds, temperature controls). Causing the first accessory device and the second accessory device to perform a type of action that is based on the first accessory type allows the computer system to cause a particular action to be performed that is based on certain prescribed conditions. Performing an operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, before detecting the gesture, the computer system displays a third status indicator (e.g., 1314*b*) (e.g., that indicates that a plurality of accessory devices of a second accessory type (e.g., that is different from the first accessory type) are in a third state) adjacent to the first status indicator and a fourth status indicator (e.g., 1314*c*) (e.g., that indicates that a plurality of accessory devices of a third accessory type (e.g., that is different from the second accessory type and the first accessory type) are in a fourth state) adjacent to the third status indicator (e.g., 1314*e*). In some embodiments, the first status indicator, the third status indicator, and fourth status indicator are displayed in an order based on a respective status indicator category (e.g., alarms (e.g., co, co2, smoke, leak, alarm), action required (e.g., accessories not responding, account error, low battery, updated available), significant status (things that are important: home temperature, open doors or windows), quick actions (e.g., categories that will flip the state of accessory, doors unlocked, windows open, 5 lights on, 2 fans on), sensors (e.g., humidity level, light level "34 lux", etc.)) that corresponds to each respective status indicator (e.g., a respective status indicator category that each respective status indicator is in). In some embodiments, while displaying the first status indicator, the third status indicator, and the fourth status indicator in the order, the computer system receives an indication that a fifth status indicator should be displayed (e.g., the state of one or more of a different accessory device type (e.g., than the accessory device types that are indicated by the first status indicator, the second status indicator, and the third status indicator) has changed); and in response to receiving the indicator that the indication that the fifth status indicator should be displayed: (1) in accordance with a determination that the fifth status indicator is in a first status indicator category (e.g., same status indicator category as the first status indicator), the computer system displays the fifth status indicator at a first location (e.g., a location that is adjacent to the first status indicator); (2) in accordance with a determination that the fifth status indicator is in a second status indicator category (e.g., different status indicator category from the first status indicator category) (e.g., same status indicator category as the third status indicator), displaying the fifth status indicator at a second location (e.g., a location that is adjacent to the third status indicator) that is different from the first location; and (3) in accordance with a determination that the fifth status indicator is in a third status indicator category (e.g., different status indicator category from the first status indicator category and the third status indicator category) (e.g., same status indicator category as the fourth status indicator), displaying the fifth status indicator at the third location (e.g., a location that is adjacent to the fourth status indicator) that is different from the first location and the second location). Displaying status indicators in an order based on their respective categories provides the user with enhanced feedback concerning the importance or the category of a particular status indicator and allows a user to quickly recognize the category to which a particular status indicator corresponds. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the computer system detects a change in a state of a respective accessory device of the first accessory type. In some embodiments, in response to detecting the change in the state of the respective accessory device of the first accessory type and in accordance with a determination that a state of a respective accessory device has changed to a first state, the computer system adds the respective accessory device to the plurality of accessory devices of the first accessory type (e.g., light bulbs, windows, switches, outlets, locks (e.g., door locks, window locks), televisions) that are in the first state. In some embodiments, in response to detecting the change in the state of the respective accessory device of the first accessory type and in accordance with a determination that the state of the respective accessory device has changed to the second state (or, alternatively, has changed to not be the first state), the computer system removes the respective accessory device from the plurality of accessory devices of the first accessory type (e.g., light bulbs, windows, switches, outlets, locks (e.g., door locks, window locks), televisions) that are in the first state. Thus, as additional accessories of a respective type are detected to be in the respective state, the additional accessories are added to the respective status indicator, such that the additional accessories are controlled by activating the status indictor; as some accessories of a respective type are detected to no longer be in the respective state, the accessories are removed from the respective status indicator, such that the removed accessories are not controlled by activating the status indicator. Updating the plurality of accessory devices based on the status of accessories allows the system to enable the user to quickly change the status of the accessories of the same type and state, and to individually access the accessories (e.g., via a press-and-hold). Providing additional control of the system without cluttering the UI with additional displayed controls enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently In some embodiments, the first status indicator includes an indication of a number of accessory devices that are displayed (or updated) based on a current number of accessory devices of the first accessory type that are in the first state. In some embodiments, before detecting the gesture, the first status indicator includes an indication of a first number of accessory devices (e.g., that are the first accessory type and are in the first state). In some embodiments, in accordance with a determination that a tenth accessory device that is the first accessory device type and has changed to be in the first state, the computer system updates the first status indicator to include an indication of a second number of accessory devices (e.g., that are the second accessory type and are in the second state) that is different from the indication of the first number of accessory devices. In some embodiments, in accordance with a determination that the second accessory has changed to not be in the first state, the computer system updates the first status indicator to include an indication of a third number of accessory devices that is different from the indication of the first number of accessory devices and the indication of the second number of accessory devices. In some embodiments, the second number of accessory devices is greater than the first number of accessory devices, and the third number of accessory devices is less than the first number of accessory devices. Displaying a status indicator that includes an indication that is based on the current number of accessory devices allows the user to quickly recognize the number of devices to which the status indicated by the status indicator corresponds and provides the user with enhanced feedback concerning how many devices that input on the status indicator could potentially impact. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, in accordance with a determination that the gesture is the first type of gesture (e.g., 1350*f*) and is directed to the first status indicator (e.g., 1350*h*), the computer system ceases to display the first status indicator (e.g., 1350*h* in FIG. 13G has ceased to be displayed in FIG. 13H) after a predetermined period of time (e.g., 1 second, 5 seconds, 30 seconds) (e.g., a predetermined period of time after the gesture is detected). In some embodiments, in accordance with a determination that a second gesture that is the first type of gesture is received after receiving the gesture that is the first type and before the predetermined time, forgoing to cease to display the first status indicator. In some embodiments, in accordance with a determination the gesture is the first type of gesture and is directed to the first status indicator and in accordance with a determination that the status indicator that is in a first category, the computer system ceases to display the status indicator when the accessory devices represented by the status indicator have changed to a particular state (e.g., lights are off, doors are locked, alarms are not active, etc. after a second predetermined period of time) and/or after the predetermined period of time. In some embodiments, in accordance with a determination that the gesture is the first type of gesture and is directed to the first status indicator and in accordance with a determination the status indicator is in a second category that is different from the first category, the computer system does not cease to display the status indicator when the accessory devices represented by the status indicator have changed to a particular state (e.g., lights are off, doors are locked, alarms are not active, etc. after a second predetermined period of time) and/or after the predetermined period of time. Ceasing to display a status indicator after detecting an input of the first type of gesture provides the user with visual feedback that an action has been performed to change the state of the accessory devices controlled via the status indicator. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the first status indicator (e.g., 1314*h*) is displayed at a first location when the gesture is detected. In some embodiments, in accordance with a determination that the gesture is the first type of gesture (e.g., 1350*f*) and is directed to the first status indicator (e.g., 1314*h*), the computer system ceases to display the first status indicator (e.g., 1314*h*) at the first location and displays a sixth status indicator (e.g., 1314*i* in FIG. 13H) (e.g., that is different from the first status indicator) at the first location. In some embodiments, the sixth status indicator was adjacent to the first status indicator before the gesture was detected. In some embodiments, displaying the status indicator that is different from the first status indicator at the first location includes moving, via an animation, the status indicator that is different from the first status indicator from a third location to the first location. Ceasing to display a status indicator and displaying an adjacent status indicator in its place after detecting an input of the first type of gesture reduces the number of inputs that are needed to delete the status indicator and display new status indicator (e.g., the adjacent status indicator) on a display (e.g., via the display generation component). Reducing the number of inputs needed to perform an operation enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, in accordance with the determination that the gesture is the first type of gesture (e.g., 1350*i*) and is directed to the first status indicator (e.g., 1314*h*), the computer system visually updates the first status indicator (e.g., 1314*h* in FIG. 13G) such that the first status indicator is changed from indicating that the plurality of accessory devices of the first accessory type is in the first state (e.g., or being displayed with a first visual appearance) to indicate that the plurality of accessory devices of the first accessory type has changed state (e.g., are not in the first state, are in the second state (e.g., or to being displayed with a second visual appearance that is different from the first visual appearance)). In some embodiments, the first status indicator ceases to be displayed a predetermined period of time after visually updating. In some embodiments, in accordance with the determination that the gesture is the second type of gesture (or the third type of gesture) and is directed to the first status indicator, the computer system forgoes to update the first status indicator to indicate that the plurality of accessory devices of the first accessory type is in the second state (and/or maintaining the first status indicator (e.g., to) indicate that the plurality of accessory devices of the first accessory type are in the first state). Updating a status indicator to indicate that the plurality of accessory devices have changed state after detecting an input of the first type of gesture provides the user with visual feedback that an action has been performed to change the state of the accessory devices controlled via the status indicator. Providing improved visual feedback to the user enhances the operability of the computer system and makes the user-system interface more efficient (e.g., by helping the user to provide proper inputs and reducing user mistakes when operating/ interacting with the computer system) which, additionally, reduces power usage and improves battery life of the computer system by enabling the user to use the computer system more quickly and efficiently.

In some embodiments, the first status indicator (e.g., 1314*h*) is displayed on a first user interface (e.g., 710). In some embodiments, the computer system receives (e.g., while displaying the first status indicator on the first user interface) a request (e.g., 1350*h*) to display a second user interface (e.g., 1360) that is different from the first user interface (e.g., 710). In some embodiments, in response to receiving the request (e.g., 1350*h*) to display the second user interface, the computer system displays the second user interface (e.g., 1360) that includes a status indicator (e.g., 1350*i* in FIG. 13I) that indicates that one or more accessory devices of the first accessory type that are in the first state, where: in accordance with a determination that the second user interface (e.g., 1360) (e.g., user interface that is currently displayed) corresponds to a first group of accessory devices (e.g., a group of a devices that are assigned to a group representing a portion (e.g., room (e.g., bedroom, living room, office, garage), porch) of a building (e.g., a home))) and the first accessory device corresponds to the first group of accessory devices (e.g., and while the first accessory device is in the first state), the one or more accessory devices of the first accessory type includes the first accessory device; and in accordance with a determination that the second user interface (e.g., 1360) (e.g., user interface that is currently displayed) corresponds to the first group of accessory devices and the first accessory device does not correspond to the first group of accessory devices (e.g., and while the first accessory device is in the first state), the one or more accessory devices of the first accessory type does not include the first accessory device. In some embodiments, in response to receiving the request to display the second user interface, the computer system ceases to display the first user interface that includes the first user interface. Displaying a status indicator that indicates a state of a plurality of devices when certain prescribed conditions are met (e.g., based on whether the user interface that includes the status corresponds to a group of accessory devices and whether a particular device that is relevant (e.g., same state and accessory type) to the status indicator corresponds to the group of accessory devices) automatically provides the user with a status indicator that indicates a plurality of devices that are relevant to the user interface that corresponds to the particular group of accessory devices. Performing an operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. Displaying a status indicator that a state of a plurality of devices based on whether the user interface that includes the status corresponds to a group of accessory devices and whether a particular device that is relevant (e.g., same state and accessory type) to the status indicator corresponds to the group of accessory devices provides the user with visual feedback concerning the status indicators that indicate devices that are relevant to the particular user interfaces being displayed. Providing improved visual feedback to the user enhances the operability of the computer system and makes the user-system interface more efficient (e.g., by helping the user to provide proper inputs and reducing user mistakes when operating/ interacting with the computer system) which, additionally, reduces power usage and improves battery life of the computer system by enabling the user to use the computer system more quickly and efficiently.

In some embodiments, before detecting the gesture (e.g., 1350*a*-1350*c* and 1350*f*), an eighth status indicator that indicates that one or more accessory devices of a third accessory type are in a seventh state (e.g., on/off, open, closed) is displayed. In some embodiments, the one or more accessory devices include an eighth accessory device of the third accessory type. In some embodiments, in accordance with a determination that the gesture (e.g., 1350*f*, 1350*i*) is the second type of gesture (e.g., a press-and-hold gesture) and is directed to (e.g., on, at a location corresponding to) the eighth status indicator (e.g., 1314*h*) and in accordance with a determination that the eighth status indicator (e.g., 1314*h* in FIG. 13I) corresponds to (and/or indicates that) less than a predetermined number (e.g., less than 2) of accessory devices of the third accessory type that are in the seventh state (e.g., only 1 accessory of the third accessory type is in the seventh state), the computer system displays an eighth accessory control user interface object (e.g., 1318) (e.g., with more control and/or precision than the ninth accessory control user interface object) corresponding to the eighth accessory device. In some embodiments, selection of the eighth accessory control user interface object causes the eighth accessory device to change to an eighth state (e.g., 80% brightness, 20% brightness, 40% opened, 20% opened, a state that is not completely opposite of the seventh state, state that corresponds to a different characteristic (e.g., color (e.g., blue, red, green, yellow, white) of lights) that can be represented by the device than the characteristic (e.g., on/off) that corresponds to the seventh state). In some embodiments, in accordance with a determination that the gesture (e.g., 1350*f*, 1350*i*) is the second type of gesture (e.g., a press-and-hold gesture) and is directed to (e.g., on, at a location corresponding to) the eighth status indicator (e.g., 1314*h*) and in accordance with a determination that the eighth status indicator (e.g., 1314*h* in FIG. 13I) corresponds to (e.g., and/or indicates that) not less than the predetermined number (e.g., 2 or more) of the accessory devices of the third accessory type are in the seventh state, the computer system displays a ninth accessory control user interface object (e.g., control like, for example, 718*h*) corresponding to the eighth accessory device. In some embodiments, selection of the ninth accessory control user interface object causes the eighth accessory device to change to a ninth state (e.g., on/off, open/closed, an opposite state than the seventh state) that is different from the eighth state (e.g., without displaying the eighth accessory control user interface object). In some embodiments, the number of accessory user interface control objects that correspond to the eighth accessory device is greater when the determination is made that the eighth status indicator indicates that less than the predetermined number (e.g., 2) of accessory devices of the third accessory type are in the seventh state than when the determination is made that the eighth status indicator indicates that less than the predetermined number (e.g., 2) of the third accessory type is in the seventh state. In some embodiments, the eighth accessory control user interface object is larger than the ninth accessory control user interface object. Displaying controls that change, when selected, an accessory device differently based on the number of controls represented by the status indicator allows the device to provide additional or different controls in some situations without cluttering the UI. Providing additional control of the system without cluttering the UI with additional displayed controls enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, in accordance with a respective status indicator (e.g., the eighth status indicator) corresponding to a single accessory device, the respective status indicator includes a name (e.g., alphanumeric text) of the accessory device. In accordance with the respective status indicator (e.g., the eighth status indicator) corresponding to a plurality of accessory devices, the respective status indicator includes an indication (e.g., a numeric representation) of the number of accessory devices represented.

In some embodiments, the computer system detects a tap on another type of status indicator (e.g., 1314*a*-1314*f* and 1314*j*-1314*l*) (e.g., climate control, sensors (e.g., different types of sensors may be combined in a single status indicator)) and, in response to detecting the tap, displays a user interface (e.g., 1382, 1384, 1386) for controlling the plurality of a type of devices related to the other type of status indicator. In some embodiments, device 700 does not ceases to display the other type of control after detecting the tap on it.

Note that details of the processes described above with respect to method 1400 (e.g., FIG. 14) are also applicable in an analogous manner to the methods described above. For example, method 1400 optionally includes one or more of the characteristics of the various methods described above with reference to methods 800 and 1000. For another example, the audio message sent in method 800 can be change or more status indicators as described above in relation to method 1400. For brevity, these details are not repeated below.

FIGS. 15A-15F illustrate exemplary user interfaces for playing back audio messages in accordance with some embodiments. The user interfaces in these figures are used to illustrate the processes described below, including the processes in FIG. 16.

FIG. 15A illustrates device 700 displaying user interface 702 that includes affordances 704. As illustrated in FIG. 15A, multicast notification 1502 is displayed over a portion of user interface 702. Multicast notification 1502 indicates that audio multicast messages have been sent out from John and three others to a group of devices assigned to home 602, which includes device 700. In other words, because device 700 is assigned to home 602, device 700 has received the audio multicast messages from John and three others. Multicast notification 1502 includes play representation 1504. In some embodiments, play representation 1504 is selectable. In some embodiments, multicast notification 1502 can include one or more features, as described above in relation to the other multicast messages described above (e.g., multicast notification 708*a*, multicast notification 708, multicast notification 904, multicast notification 906*a*, multicast notification 906*b*, multicast notification 908*a*, multicast notification 908*b*, multicast notification 908*c*, multicast notification 910). In some embodiments, the other multicast messages described above can include one or more features (e.g., play representation 1504) of multicast notification 1502. At FIG. 15A, device 700 detects tap gesture 1550*a* on multicast notification 1502.

FIGS. 15B-15F illustrate exemplary user interfaces for playing back audio multicast messages (e.g., automatically). In some embodiments, the user interfaces described in relation to FIGS. 15B-15F can be displayed in lieu of one or more user interfaces described above, such as user interfaces of 9I-9J and/or user interfaces of 9M-9P.

As illustrated in FIG. 15B, in response to detecting tap gesture 1550*a*, device 700 displays user interface 1520 overlaid on to a portion of user interface 702 and automatically (e.g., without intervening user input after detecting tap gesture 1550*a*) initiates playback of an audio multicast message received from John, as indicated by current sender indication 1322*a*. In some embodiments, as a part of initiating playback of audio, device 700 outputs audio via one or more speakers that are electronically coupled to device 700.

As illustrated in FIG. 15B, user interface 1520 includes multicast home identifier 1532, which indicates that audio multicast messages that were sent to a group of devices associated with home 602 are being played back. User interface 1520 also includes multicast recording affordance 736, current sender indication 1522a, graphical sender indications 1524, and count indication 930. In some embodiments, device 700 uses one or more techniques described above to display and operate in view of multicast recording affordance 736, current sender indication 1522a, graphical sender indications 1524, and count indication 930 that device 700 uses to, respectively, display and operate in view of multicast recording affordance 736, current sender indication 922a-922b, graphical sender indications 924a-924b, and count indication 930 described above.

Looking back at FIG. 15A, notification 1502 indicated that four audio multicast messages were received (e.g., "John and 3 others") to be played back. Accordingly, in FIG. 15B, user interface 1520 includes graphical sender indications 1524 corresponding to a portion of the received messages. In FIG. 15B, graphical sender indications 1524 include graphical sender indications 1524a-1524c. Graphical indication 1524a corresponds to a first audio multicast message, which was received from "John." Graphical indication 1524b corresponds to a second audio multicast message that was received (or sent) after the first audio multicast message. Graphical indication 1524c corresponds to a third audio multicast message that was received (or sent) after the second audio multicast message. Notably, in FIG. 15A, user interface 1520 does not include a graphical indication that corresponds to the fourth audio multicast message because a determination has been made that no more than a predetermined number (e.g., three) graphical indications should be concurrently displayed.

Graphical indications 1524a-1524c correspond to different multicast messages that were sent by different users (or devices), which are illustrated by graphical indications 1524a-1524c depicting different representations. Graphical indication 1524a includes a visual representation of a sender (e.g., "John") (e.g., a determined sender) of the first audio multicast message. Graphical indication 1524b includes a visual representation of a device (e.g., a speaker) that recorded the second audio multicast message. Graphical indication 1524c includes a visual representation of text that corresponds to a sender (e.g., "EA," which stands for "Emma Appleseed," who is a person associated with home 602 as indicated in FIG. 7AB) of the third audio multicast message. Graphical indication 1524b includes a visual representation of a device instead of a visual representation of a sender because a person who produced the second audio multicast message could not be determined. Graphical indication 1524c includes a visual representation of text instead of a visual representation of a user because device 700 does not have access to a visual representation of a user (e.g., Emily). In some embodiments, multiple graphical indications include the same visual representations when a determination is made that the audio multicast messages corresponding to the graphical indications were sent by the same sender.

As illustrated in FIG. 15B, graphical indication 1524a is the largest graphical indication displayed on user interface 1520 and is displayed with audio indication 1524a1 (e.g., circles surrounding graphical indication 1524a). As indicated by current sender indication 1522a, the first audio multicast message from John is currently being played back. Accordingly, graphical indication 1524a is the largest graphical representation and is displayed with audio indication 1524a1 to indicate that the audio multicast message from John is currently being played back. In some embodiments, the audio indication 1524a1 is dynamic and varies in size in accordance with the first audio multicast message being played back. Graphical indication 1524b is the second largest graphical indication displayed on user interface 1520 because the second audio multicast message is the next audio multicast message in the queue to be played back by device 700. Graphical indication 1524c is the third largest graphical indication displayed on user interface 1520 because the third audio multicast message is the next audio multicast message in the queue to be played back by device 700 after the second audio multicast message. At FIG. 15B, device 700 determines that the first audio multicast message will end within a predetermined period of time (e.g., 0 second, 1 second) (or the next message (e.g., the second message) will begin within a predetermined period of time).

In response to determining that the first audio multicast message will end within a predetermined period of time (or has ended) (e.g., without user input, based on a tap gesture on skip affordance 1534), device 700 rotates graphical indications 1524b-1524c counter-clockwise and ceases to display graphical indication 1524a. As illustrated in FIG. 15C, in response to determining that the first audio multicast message will end within a predetermined period of time (or has ended), graphical indication 1524b is displayed at a position at which graphical representation 1524a was previously displayed in FIG. 15B, and graphical indication 1524c is displayed at a position at which graphical representation 1524b was previously displayed in FIG. 15B. As illustrated in FIG. 15C, graphical indication 1524a is displayed at the same size at which graphical indication 1524b was previously displayed in FIG. 15B, and graphical indication 1524c is displayed at the same size at which graphical indication 1524b was previously displayed in FIG. 15B.

As shown in FIG. 15C, current sender indication 1522b has replaced current sender indication 1522a, which was previously displayed in FIG. 15B. Thus, at FIG. 15C, device 700 is currently playing back the second audio multicast message because playback of the first audio multicast message has completed by the time that user interface 1520 of FIG. 15C is displayed. As shown in FIG. 15C, graphical indication 1524b is now displayed with audio indication 1524b1, which is displayed using similar techniques to those described above in relation to audio indication 1524a1. As illustrated in FIG. 15C, graphical indication 1524c does not have an audio indication surrounding graphical indication 1524c because device 700 is not currently outputting the third audio multicast message (e.g., an audio multicast message that corresponds to graphical indication 1524c). In some embodiments, device 600 displays an animation gradually increasing the sizes of graphical indications 1524b-1524c while transitioning between displaying user interface 1520 of 15B and displaying user interface 1520 of FIG. 15C.

As illustrated in FIG. 15C, because device 700 has ceased to display graphical indication 1524a (e.g., the first audio multicast message has ended), device 700 newly displays graphical indication 1524d, which corresponds to the fourth audio multicast message that was sent by Jane (as shown by current sender indication 1522d in FIG. 15E). Graphical indication 1524d is displayed at the same size of and in the same location as graphical indication 1524c of FIG. 15B (e.g., because graphical indication 1524d is now second in the queue for audio playback). At FIG. 15C, device 700 determines that the second audio multicast message will end within a predetermined period of time (e.g., 0-1 second) (or the next message (e.g., the third audio multicast message) will begin within a predetermined period of time) (or has ended).

In response to determining that the second audio multicast message will end within a predetermined period of time (or has ended), device 700 rotates graphical indications 1524c-1524d counter-clockwise and ceases to display graphical indication 1524b. As illustrated in FIG. 15D, in response to determining that the second audio multicast message will end within a predetermined period of time, graphical indication 1524c is displayed at a position and size at which graphical representation 1524b was previously displayed in FIG. 15C, and graphical indication 1524d is displayed at a position and a size at which graphical representation 1524c was previously displayed in FIG. 15C.

As shown in FIG. 15D, current sender indication 1522c has replaced current send indication 1522b, which was previously displayed in FIG. 15C. Thus, at FIG. 15D, device 700 is currently playing back the third audio multicast message because playback of the second audio multicast message has completed by the time that user interface 1520 of FIG. 15D is displayed. Device 700 plays back the third audio multicast message automatically, without intervening input, at a predetermined period of time after playback of the second audio multicast message ends. In some embodiments, device 700 plays a predetermined sound (e.g., a chime, a buzz, a tone) between multicast messages that are played back. For example, device 700 can play a first sound before automatically starting playback of the second audio multicast message and can play a second sound (e.g., the same chime) before automatically starting playback of the third audio multicast message. In some embodiments, device 600 transitions the user interfaces (e.g., user interface 1520 of FIG. 15C transitioning to the user interface 1520 of FIG. 15D) while (after or before) playing back the predetermined sound. In some embodiments, in response to detecting an input on skip affordance 1534 of FIG. 15C, device 700 ends playback of the second audio message (e.g., being played back in FIG. 15C) (before reaching the end of the second audio message) and starts playback of the third audio message and transitions the user interfaces (e.g., user interface 1520 of FIG. 15C transitioning to the user interface 1520 of FIG. 15D). At FIG. 15D, device 700 determines that the third audio multicast message will end within a predetermined period of time (e.g., 0-1 second) (or the next message (e.g., the fourth audio multicast message) will begin within a predetermined period of time) (or has ended).

In response to determining that the third audio multicast message will end within a predetermined period of time (or has ended), device 700 moves (e.g., changes the position of) and enlarges graphical indication 1524d counter-clockwise and ceases to display graphical indication 1524c. As illustrated in FIG. 15E, because graphical indication 1524d is the only displayed graphical indication, device 700 increase size of graphical indication 1524d to a size that is greater than the size at which graphical indication 1524c was previously displayed. In some embodiments, graphical indication 1524d is displayed at a different location in FIG. 15E (e.g., at a center of 1524) as compared to the location of graphical indication 1524a in FIG. 15B. As shown in FIG. 15E, current sender indication 1522d has replaced current send indication 1522c, which was previously displayed in FIG. 15D. Thus, at FIG. 15E, device 700 is currently playing back the fourth audio multicast message (e.g., the audio multicast message that corresponds to graphical indication 1524d) because playback of the third audio multicast message has completed by the time that user interface 1520 of FIG. 15E is displayed. Device 700 plays back the fourth audio multicast message automatically, without intervening input, at a predetermined period of time after playback of the third audio multicast message ends (e.g., once the third audio multicase message has ended).

As illustrated in FIG. 15F, after determining that playback of the fourth audio message has ended, device 700 updates user interface 1520 to include graphical indications 1524a-1524c without playing back additional media (or multicast audio messages). In addition to re-displaying graphical indication 1524a-1524c, device 700 displays playback affordance 926. In some embodiments, in response to detecting tap gesture 1550f1 on playback affordance 926, device 700 initiates playback of the first audio multicast message and repeats the flow described above in FIGS. 15B-15E. In some embodiments, in response to detecting tap gesture 1550f2 (or a press-and-hold gesture) on multicast affordance multicast recording affordance 736, device 700 displays a user interface for recording and send an audio message to the group of devices associated with home 602 (e.g., to reply to the group of devices to which the multicast audio messages (e.g., first, second, third, fourth audio multicast messages) were sent). Thus, in some embodiments, device 700 displays user interface 741 of FIG. 7C1, user interface 730 of FIG. 7C, or user interface 740 of FIG. 7D in response to detecting a tap gesture on multicast recording affordance 736. In some embodiments, a tap gesture on multicast recording affordance 736 starts audio recording until an end recording input (e.g., another tap gesture) is detected. Once the end recording input is detected, the recorded audio message is sent to the group of devices. In some embodiments, a press-and-hold gesture is detected on multicast recording affordance 736. When the press-and-hold gesture is detected, audio recording begins. Once an end (e.g., lift-off) of the press-and-hold gesture is detected, the audio recording ends, and the recorded audio message is sent to the group of devices. In some embodiments, detecting activation (e.g., tap gesture, tap-and-hold gesture) of multicast recording affordance 736 in any of the user interfaces in FIGS. 15B-15E causes playback of the currently playback message to stop and starting the process for recording an audio message to send to the group of devices.

FIG. 16 is a flow diagram illustrating a method for playing back audio messages using a computer system in accordance with some embodiments. Method 1600 is performed at a computer system (e.g., 100, 300, 500, 634, 674, 700, 701, 850) that is in communication with a display generation component (e.g., an integrated display, a connected display) and one or more inputs devices (e.g., a touch-sensitive surface). Some operations in method 1600 are, optionally, combined, the orders of some operations are, optionally, changed, and some operations are, optionally, omitted.

As described below, method 1600 provides an intuitive way for playing media content. The method reduces the cognitive burden on a user for playing media messages, thereby creating a more efficient human-machine interface. For battery-operated computing devices, enabling a user to play media content faster and more efficiently conserves power and increases the time between battery charges.

The computer system (e.g., 700) displays (1602), via the display generation component, a media user interface (e.g., 1520) that includes: at a first location, a first representation (1604) (e.g., 1524a in FIG. 15B) of a first media message (e.g., audio media; visual media; audiovisual media), and at a second location different from the first location, a second representation (1606) (e.g., 1524b in FIG. 15B) of a second media message. In some embodiments, the media user interface includes representations of a plurality of (e.g., some of, not all of) media messages of a group of media (e.g., the group of media being in an ordered set).

In response to displaying the media user interface and not based on user input corresponding to the media user interface (e.g., 1520), the computer system (e.g., 700) plays (1608) the first media message (e.g., outputting audio and/or video of the first media message).

In response to detecting completion of playing through the first media message (e.g., reaching an end of the first media message by playing through to the end of the first media message), the computer system (e.g., 700) displays (1610), the second representation (e.g., 1524b) of the second media message (e.g., as in FIG. 15C) without displaying, via the display generation component, a representation (e.g., 1524a) (e.g., any representation) corresponding to the first media message (e.g., as in FIG. 15C).

Displaying representations of various media message at different locations provides the user with feedback about the order of the media message and, for example, which media message is currently playing and which media message will play next. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the representations of the plurality of (e.g., some of, not all of, three of) media message are displayed with varying sizes based on the order of the ordered set. In some embodiments, the earlier the media message is in the ordered set the larger the representation of the corresponding media message (e.g., a representation of a currently playing media message is the largest, a representation of a media message to be played next is the next largest, etc). Thus, the order of the media message is reflected in the comparative sizes of their corresponding displayed representations.

In accordance with some embodiments, displaying, the first representation (e.g., 1524a in FIG. 15B) of the first media message (e.g., audio media; visual media; audiovisual media) at the first location includes displaying the first representation (e.g., 1524a) of the first media message (e.g., audio media; visual media; audiovisual media) at the first location and at a first size (e.g., as in FIG. 15B). In accordance with some embodiments, displaying the second representation (e.g., 1524b in FIG. 15B) of the second media message at the second location includes displaying the second representation (e.g., 1524b) of the second media message at the second location and at a second size different from (e.g., smaller than) the first size (e.g., as in FIG. 15B).

Displaying representations of various media message at different sizes provides the user with feedback about the order of the media message (e.g., bigger size is earlier in the ordered set) and, for example, which media message is currently playing and which media message will play next. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, the computer system (e.g., 700) displays, via the display generation component, concurrently with the first representation of the first media message at the first location and with the second representation of the second media message at the second location: at a third size (e.g., the same as the second size, smaller than the second size) different from the first size (and, optionally, different from the second size) and at a third location different from the first location and second location, a third representation (e.g., 1524c) of a third media message. In response to detecting completion of playing through the first media message (e.g., reaching an end of the first media message by playing through to the end of the first media message): the computer system (e.g., 700) displays, at the first size and at the first location, the second representation (e.g., 1524b) of the second media message (e.g., as in FIG. 15C) without displaying, via the display generation component, the first representation (e.g., 1524a) of the first media message; and the computer system (e.g., 700) displays, at the second size and at the second location, the third representation (e.g., 1524c) of the third media message (e.g., as in FIG. 15C).

Displaying representations of various media message at different locations and at different sizes provides the user with feedback about the order of the media message to be played. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, the computer system (e.g., 700) receives (e.g., via a wireless network) data (e.g., first, second, third, and fourth data) corresponding to media message (e.g., the group of media, the first, second, third, and fourth media message) including the first media message that is a first (e.g., audio) message (e.g., directed to a target group of devices (e.g., a plurality of devices of a home (e.g., a home automation system)), including the computer system) from a first remote user and the second media message that is a second (e.g., audio) message (e.g., directed to the target group of devices (e.g., the plurality of devices of the home (e.g., a home automation system)), including the computer system) from a second remote user that is different from the first remote user. The computer system (e.g., 700) displays (e.g., in response to receiving the data, until an end of a time period (as described in further detail above)), via the display generation component, a notification (e.g., 1502) corresponding to the media message. While displaying the notification (e.g., 1502), the computer system (e.g., 700) receives, via the one or more input devices, selection (e.g., 1550a) of the notification (e.g., activation of the notification displayed on a lock screen, the notification corresponding to the group of media, the group of media being in an ordered set). In some embodiments, displaying the media user interface occurs in response to receiving selection (e.g., 1550a) of the notification (e.g., 1502). In some embodiments, playing the first media message occurs in response to receiving selection (e.g., 1550a) of the notification (e.g., 1502).

Displaying the media user interface and automatically playing the first media message in response to a selection of a notification enables the computer system to perform two functions (display and playback) in response to the same input, thereby reducing the need for the computer system to receive additional inputs to start the playback. Reducing the number of inputs needed to perform an operation enhances the operability of the device and makes the user-device interface more efficient (e.g., by helping the user to provide proper inputs and reducing user mistakes when operating/ interacting with the device) which, additionally, reduces power usage and improves battery life of the device by enabling the user to use the device more quickly and efficiently.

In some embodiments, the first representation (e.g., 1524a), the second representation (e.g., 1524b), and the third representation (e.g., 1524c) are not displayed in a line (e.g., the first, second, and third locations are not all on a line). In some embodiments, the representations of media that are displayed (e.g., as representations removed and new representations are add) are not displayed in a line.

In accordance with some embodiments, the first size is larger than the second size. In some embodiments, the second size is larger than the third size. In some embodiments, the second size and the third size are the same size. In some embodiments, the representation (e.g., 1524a in FIG. 15B, 1524b in FIG. 15C) of the currently playing media file is displayed at a size that is larger than the size of multiple other (e.g., all) displayed representations of media message.

Displaying representations of various media message at increasingly larger sizes provides the user with feedback about the order of the media message. For example, the larger the representation the earlier the corresponding media message is in the ordered set of media message, with (for example) the largest representation being the currently playing media item. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, in response to detecting completion of playing through the first media message (e.g., reaching an end of the first media message by playing through to the end of the first media message), playing the second media message (e.g., outputting audio and/or video of the second media) without receiving (or requiring) further user input. In some embodiments, the second media message is played in conjunction with displaying, at the first size and at the first location, the second representation of the second media message.

Automatically playing the second media message in response completion of the first media message eliminates the need for the computer system to receive additional inputs to start the playback of the second media message. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to detecting completion of playing the second media message (e.g., reaching an end of the second media message; skipping the remainder of the first media), the computer system plays the third media message (e.g., outputting audio and/or video of the third media message) without receiving (or requiring) further user input. In some embodiments, the third media message is played in conjunction with displaying, at the first size and at the first location, the third representation of the third media message. In some embodiments, a fifth representation of a fifth media is not displayed after detecting completion of playing the second media message.

In accordance with some embodiments, prior to detecting completion of playing through the first media message, a fourth representation (e.g., 1524d) of a fourth media message (e.g., audio media; visual media; audiovisual media) is not concurrently displayed with the first representation of the first media (e.g., in the media user interface, as shown in FIG. 15B). After (e.g., in response to) detecting completion of playing through the first media message (e.g., reaching an end of the first media message by playing through to the end of the first media message) (In some embodiments, in response to detecting completion of playing the first media message), the computer system (e.g., 700) displays, via the display generation component, (e.g., at the third size and at the third location) the fourth representation (e.g., 1524d) of the fourth media message (e.g., in the media user interface (e.g., 1520)) (In some embodiments, the fourth media message is displayed concurrently with the second and third representations of media message).

Displaying representations of a first predetermined number of media message of the group of media message without displaying representations of additional media message in the group of media until media message is played and the representation of the played media message is removed provides the user with feedback that additional media message are available for playback without cluttering the user interface. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, when the media user interface is initially displayed (e.g., in response to selection of a displayed notification), the media user interface includes the first representation, the second representation, and the third representation without including the fourth representation.

In some embodiments, in response to detecting completion of playing the third media message (e.g., reaching an end of the third media message; skipping the remainder of the third media message), displaying, at a size different from (e.g., larger than) the first size and at a location different from the first location, the fourth representation (e.g., 1524d) of the fourth media message and playing the fourth media message without receiving (or requiring) user input (e.g., as shown in FIG. 15E).

In accordance with some embodiments, while playing the second media message, the computer system (e.g., 700) displays a next media user interface object (e.g., 1534) in the media user interface (e.g., 1520) that, when activated (e.g., detecting a tap on), causes completion of playing of the second media message (e.g., ceasing playing the currently playing media message; forgoing playing the remainder of the second media message; skipping past the remainder of the second media message) (and, optionally, begins playing the third media message). While playing the second media message, the computer system (e.g., 700) receives, via the one or more input devices, activation of (e.g., a tap on) the next media user interface object (e.g., 1534). In response to receiving activation of the next media user interface object (e.g., 1534), the computer system (e.g., 700) displays, via the display generation component, the third representation of the third media message at the first location (and, optionally, at the first size) without displaying, via the display generation component, the second representation of the second media message. In some embodiments, the third media message plays in conjunction with displaying the third representation of the third media message at the first location at the first size. In some embodiments, the next media user interface object, when activated, causes completion of the currently playing media message. In some embodiments, detecting completion of the currently playing media message causes (e.g., except when the currently playing media message is the final media message of the group of media) the technique to proceed to playing the next media message in the ordered set. In some embodiments, in response to receiving activation of the next media user interface object (e.g., 1534), the computer system ceases playing the second media message (e.g., without playing through to the end of the second media message) and plays the third media message.

Displaying a next media user interface object enables the computer system to receive user input to skip to playing the next media message without spending additional time playing the remainder of the currently playing media message. Providing the user with this additional control enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system does not display the previous media user interface object (e.g., concurrently with playing the second media) (e.g., in the media user interface) that, when activated (e.g., detecting a tap on), causes completion of playing the (e.g., second) media message and begins playing a previous (e.g., first) media message. In some embodiments, the computer system forgoes displaying the next media user interface object when a last (e.g., the fourth) media message (e.g., of the group of media) is playing (e.g., as in FIG. 15E).

In some embodiments, the first media message, the second media message, and the third media message are part of a group of media. In accordance with some embodiments, subsequent to (e.g., in response to detection of completion of) playing a final media message (e.g., after playing or skipping through all media message of the group of media), the computer system (e.g., 700) displays, via the display generation component, a replay user interface object (e.g., 926, at the first location, at the location at which the fourth representation of the fourth media message was displayed) in the media user interface that, when activated (e.g., 1550/1, detecting a tap on), plays the first media message (e.g., outputting audio and/or video of the first media message) before proceeding to playing subsequent media message (e.g., the second, third, and fourth media message). In some embodiments, activation of the replay user interface object restarts the process again to replay the media message of the group of media. In some embodiments, subsequent to playing the final media message (e.g., of the group of media), the computer system deletes (e.g., after a predefined duration of time has passed) the first, second, and third media message (and, optionally the fourth media message) from the computer system (or makes the media message otherwise inaccessible to the user).

Displaying a replay user interface object (e.g., a replay button) to replay the media message of the group of media message allows the user to replay (and re-listen to, re-watch) the media message without needing to individually select each media message to play back. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, the first media message, the second media message, and the third media message (and, optionally, the fourth media message) were directed to a target group of devices (e.g., a plurality of devices of a home (e.g., a home automation system)), including the computer system. In accordance with some embodiments, the computer system (e.g., 700) displays, via the display generation component, a multicast affordance (e.g., 736) in the media user interface that, when activated (e.g., 1550/2, detecting a tap on), initiates a process for sending an audio multicast message to the target group of devices. In some embodiments, the process for sending the audio multicast message includes displaying the user interface of FIG. 7C1 and is described with respect to FIG. 7C1. In some embodiments, the one or more devices are electronic devices that are part of a group of electronic device to which the first, second, and third media message were directed.

Displaying a multicast affordance to initiate a process for sending an audio multicast message to one or more devices provides the user with the ability to respond to the media message that include messages without the need to individually select which users/devices will receive the message, thereby reducing the number of inputs the user needs to provide to respond. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the process for sending the audio multicast message includes recording, at the computer system, an audio message. In some embodiments, the audio message is made available for playback at the computer system (e.g., as part of the group of media). In some embodiments, the computer system deletes the first, second, and third media message (and, optionally the fourth media message) from the computer system (or makes the media message otherwise inaccessible to the user) in conjunction with sending the audio multicast message.

In accordance with some embodiments, while playing a respective media message (e.g., the first media message, the second media message), the computer system (e.g., 700) displays, via the display generation component and in the media user interface, a name of a respective user (e.g., 1524a, 1524b. 1524c. 1524d) from which the respective media message was received. In some embodiments, as the media message that is playing changes, the name of the respective user is replaced (e.g., the previous name, the current name, the next name are displayed at the same location).

Displaying a name of a respective user from which the currently playing media was received provides the user with feedback about the source from which the computer system received the currently playing media message. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, a representation of a currently playing media message (e.g., 1524a in FIG. 15B, 1524b in FIG. 15C) is displayed with a first background color (e.g., green) that is different from the background color of respective displayed representations (e.g., 1524b and 1524c in FIG. 15B, 1524c and 1524d in FIG. 15C) of media message that are not currently playing.

In accordance with some embodiments, the media message are audio messages (e.g., multicast audio messages). In some embodiments, the audio message (e.g., first media message) is an audio message recorded (using a microphone) at an external device and transmitted by the external device to a group of devices and/or an audio message that was directed to (e.g., transmitted to) a plurality of external devices that includes the computer system). In some embodiments, the second media message is a second audio message that was directed (or transmitted) to a second plurality of external devices (e.g., same as the plurality of external devices, different from the plurality of external devices).

Automatically playing back multiple audio messages of a conversation (e.g., in order) enables the computer system to output a conversation (e.g., an audio conversation among multiple participants) without requiring the user to individually select particular audio messages to play back, thereby reducing the number of required inputs. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a total count (e.g., "4" in "1 of 4" of 930 in FIG. 15B) of media message in the group of media is displayed. In some embodiments, (e.g., along with the total count) a number (e.g., "1" in "1 of 4" of 930 in FIG. 15B, in the ordered set of the group of media) of the currently playing media is displayed (e.g., "3 of 4" as in FIG. 15D).

In some embodiments, a media message (e.g., the first media message) corresponds to a multi-user device (e.g., a device that is configured for multiple users, a device that is not configured for a particular user). In some embodiments, a media message (e.g., the second media message) corresponds to a single-user device (e.g., a device that is configured for a single user). In some embodiments, a visual indicator (e.g., 1522a, 1524a, 1522c, 1524c) of a corresponding user of a media message is displayed concurrent with playing the media message corresponding to the user. In some embodiments, a visual indictor (e.g., 1522b, 1524b) that indicates a multi-user device is displayed while playing the media message corresponding to the multi-user device.

Note that details of the processes described above with respect to method 1600 (e.g., FIG. 16) are also applicable in an analogous manner to the methods described above. For example, method 1600 optionally includes one or more of the characteristics of the various methods described above with reference to methods 800, 1000, and 1400. For another example, the audio message of method 800 can be the same as the audio message sent in method 1600. For another example, the displayed notifications described with respect to method 800 can be the same notification displayed in method 1600. For another example, voice input transmitted to one or more devices with respect to method 1200 can be the same audio message received and played at the computer system of method 1600. For brevity, these details are not repeated above.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of visual content (e.g., visual indications) or any other content that provides the user with information concerning whether voice input will be sent as an audio messages to one or more devices. The present disclosure contemplates that in some instances, this gathered data may include personal information data that uniquely identifies or can be used to contact or locate a specific person.

The present disclosure recognizes that the use of personal information data, in the present technology, can be used to the benefit of users. For example, the personal information data can be used to improve the display of an indication so that a respective user can determine whether voice input will be transmitted as an audio message. Accordingly, use of such personal information data enables users to have calculated control over sending audio messages. Further, other uses for personal information data that benefit the user are also contemplated by the present disclosure.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of receiving voice input from a user, the present technology can be configured to allow users to select to "opt in" or "opt out" of participation in the collection of personal information data during registration for services or anytime thereafter. In another example, users can choose not to provide voice input to be sent as an audio message based on the indication that is displayed. In yet another example, users can select to limit the content of the audio message that corresponds to the voice input based on the indication that is displayed. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, the visual indication can be displayed to users based on non-personal information data or a bare minimum amount of personal information, such as the content being requested by the device associated with a user, other non-personal information available to the audio message transmitting services, or publicly available information.

What is claimed is:

1. A computer system, comprising:
one or more processors, wherein the computer system is in communication with a display generation component; and
memory storing one or more programs configured to be executed by the one or more processors, the one or more programs including instructions for:
displaying, via the display generation component, a first user interface that includes:
a first selectable user interface object, wherein selection of the first selectable user interface object initiates a process for recording and sending a first audio message to be output by a set of external devices, wherein the set of external devices includes a first set of one or more external devices and a second set of one or more external devices; and
a first accessory control user interface object corresponding to a first external accessory device, wherein selection of the first accessory control user interface object initiates a process to transmit an instruction to change a state of the first external accessory device;
while displaying the first user interface, receiving an input that corresponds to a request to display a second user interface; and
in response to receiving the request to display the second user interface, displaying the second user interface, wherein the second user interface includes:
a second selectable user interface object, wherein selection of the second selectable user interface object initiates a process for recording and sending a second audio message to be output by the second set of one or more external devices without sending the second audio message to be output by the first set of one or more external devices; and
a second accessory control user interface object corresponding to a second external accessory device, wherein selection of the second accessory control user interface object initiates a process to transmit an instruction to change a state of the second external accessory device.

2. The computer system of claim 1, wherein the first external accessory device is different from the second external accessory device.

3. The computer system of claim 1, wherein the first selectable user interface object is displayed at a first location via the display generation component and the second selectable user interface object is displayed at the first location via the display generation component.

4. The computer system of claim 1, wherein:
the first external accessory device is included in the set of external devices;
the first user interface includes a third accessory control user interface object corresponding to a third external accessory device, wherein selection of the third accessory control user interface object initiates a process to transmit an instruction to change a state of the third external accessory device; and
the third external accessory device is not included in the set of external devices and selection of the first selectable user interface object does not initiate a process for sending the first audio message to be output by the third external accessory device.

5. The computer system of claim 1, wherein the first user interface corresponds to a top-level location and the second user interface corresponds to a first sub-location of a first type, wherein the second set of one or more external devices correspond to the first sub-location, and wherein the second set of one or more external devices cannot be made to correspond to a second sub-location of the first type based on the second set of one or more external devices corresponding to the first sub-location.

6. The computer system of claim 1, wherein the first user interface corresponds to a top-level location and the second user interface corresponds to a third sub-location of a second type that corresponds to a plurality of sub-locations of a first type, and wherein the second set of one or more external devices corresponds to the third sub-location based on the second set of one or more external devices being included in the plurality of sub-locations of the first type.

7. The computer system of claim 6, wherein the second external accessory device is associated with the third sub-location of the second type, and wherein the second external accessory device is also associated with a fourth sub-location of the second type that is different from the third sub-location.

8. The computer system of claim 1, wherein the second set of one or more external devices is associated with a first location and wherein the process for recording and sending the second audio message to be output by the second set of one or more external devices without sending the second audio message to be output by the first set of one or more external devices includes displaying an indication of the first location.

9. The computer system of claim 1, wherein the set of external devices includes a personal mobile electronic device.

10. The computer system of claim 1, wherein the second set of one or more external devices does not include a personal mobile electronic device.

11. The computer system of claim 1, the one or more programs further including instructions for:
subsequent to displaying the second user interface, receiving input to disable sending audio messages to be output by the second set of one or more external devices; and
in response to receiving the input to disable sending audio messages to be output by the second set of one or more external devices, disabling sending of audio messages to be output by the second set of one or more external devices via selection of the first selectable user interface object and via selection of the second selectable user interface object.

12. The computer system of claim 1, wherein the first user interface corresponds to a top-level location and the second user interface corresponds to a sub-location of the top-level location, the one or more programs further including instructions for:
receiving, at a microphone that is in communication with the computer system, audio input including a natural language request for a digital assistance, the audio input including:
an instruction to initiate a process to transmit an audio message;
a location identifier; and
an audio message;
in accordance with a determination that the location identifier corresponds to the top-level location:
transmitting the audio message, without establishing a two-way audio communication channel with any devices of the set of external devices, for playback at the set of external devices, including the first set of one or more external devices and the second set of one or more external devices; and in accordance with a determination that the location identifier corresponds to the sub-location:
transmitting the audio message, without establishing a two-way audio communication channel with any devices of the set of external devices, for playback at the second set of one or more external devices and not for playback at the first set of one or more external devices.

13. The computer system of claim 1, wherein initiating a respective process for recording and sending a respective audio message to be output by the set of external devices includes:
initiating, without further user input, the recording of a new audio message; and
displaying a recording user interface that includes one or more dynamic indications of audio being recorded.

14. The computer system of claim 1, wherein the computer system is in communication with one or more input devices including a microphone, and wherein the process for recording and sending the first audio message to be output by the set of external devices includes:
receiving, via the microphone, a second audio input; and
transmitting the first audio message to the set of external devices, wherein the first audio message is based on the second audio input.

15. The computer system of claim 1, wherein the first set of one or more external devices includes a first speaker capable of playing back of the first audio message and the second audio message, and wherein the second set of one or more external devices includes a second speaker capable of playing back the first audio message and the second audio message.

16. A non-transitory computer-readable storage medium storing one or more programs configured to be executed by one or more processors of a computer system, wherein the computer system is in communication with a display generation component, the one or more programs including instructions for:
displaying, via the display generation component, a first user interface that includes:
a first selectable user interface object, wherein selection of the first selectable user interface object initiates a process for recording and sending a first audio message to be output by a set of external devices, wherein the set of external devices includes a first set of one or more external devices and a second set of one or more external devices; and
a first accessory control user interface object corresponding to a first external accessory device, wherein selection of the first accessory control user interface object initiates a process to transmit an instruction to change a state of the first external accessory device;
while displaying the first user interface, receiving an input that corresponds to a request to display a second user interface; and
in response to receiving the request to display the second user interface, displaying the second user interface, wherein the second user interface includes:
a second selectable user interface object, wherein selection of the second selectable user interface object initiates a process for recording and sending a second audio message to be output by the second set of one or more external devices without sending the second audio message to be output by the first set of one or more external devices; and a second accessory control user interface object corresponding to a second external accessory device, wherein selection of the second accessory control user interface object initiates a process to transmit an instruction to change a state of the second external accessory device.

17. The non-transitory computer-readable storage medium of claim 16, wherein the first external accessory device is different from the second external accessory device.

18. The non-transitory computer-readable storage medium of claim 16, wherein the first selectable user interface object is displayed at a first location via the display generation component and the second selectable user interface object is displayed at the first location via the display generation component.

19. The non-transitory computer-readable storage medium of claim 16, wherein:
the first external accessory device is included in the set of external devices;
the first user interface includes a third accessory control user interface object corresponding to a third external accessory device, wherein selection of the third accessory control user interface object initiates a process to transmit an instruction to change a state of the third external accessory device; and
the third external accessory device is not included in the set of external devices and selection of the first selectable user interface object does not initiate a process for sending the first audio message to be output by the third external accessory device.

20. The non-transitory computer-readable storage medium of claim 16, wherein the first user interface corresponds to a top-level location and the second user interface corresponds to a first sub-location of a first type, wherein the second set of one or more external devices correspond to the first sub-location, and wherein the second set of one or more external devices cannot be made to correspond to a second sub-location of the first type based on the second set of one or more external devices corresponding to the first sub-location.

21. The non-transitory computer-readable storage medium of claim 16, wherein the first user interface corresponds to a top-level location and the second user interface corresponds to a third sub-location of a second type that corresponds to a plurality of sub-locations of a first type, and wherein the second set of one or more external devices corresponds to the third sub-location based on the second set of one or more external devices being included in the plurality of sub-locations of the first type.

22. The non-transitory computer-readable storage medium of claim 21, wherein the second external accessory device is associated with the third sub-location of the second type, and wherein the second external accessory device is also associated with a fourth sub-location of the second type that is different from the third sub-location.

23. The non-transitory computer-readable storage medium of claim 16, wherein the second set of one or more external devices is associated with a first location and wherein the process for recording and sending the second audio message to be output by the second set of one or more external devices without sending the second audio message to be output by the first set of one or more external devices includes displaying an indication of the first location.

24. The non-transitory computer-readable storage medium of claim 16, wherein the set of external devices includes a personal mobile electronic device.

25. The non-transitory computer-readable storage medium of claim 16, wherein the second set of one or more external devices does not include a personal mobile electronic device.

26. The non-transitory computer-readable storage medium of claim 16, the one or more programs further including instructions for:
subsequent to displaying the second user interface, receiving input to disable sending audio messages to be output by the second set of one or more external devices; and
in response to receiving the input to disable sending audio messages to be output by the second set of one or more external devices, disabling sending of audio messages to be output by the second set of one or more external devices via selection of the first selectable user interface object and via selection of the second selectable user interface object.

27. The non-transitory computer-readable storage medium of claim 16, wherein the first user interface corresponds to a top-level location and the second user interface corresponds to a sub-location of the top-level location, the one or more programs further including instructions for:
receiving, at a microphone that is in communication with the computer system, audio input including a natural language request for a digital assistance, the audio input including:
an instruction to initiate a process to transmit an audio message;
a location identifier; and
an audio message;
in accordance with a determination that the location identifier corresponds to the top-level location:
transmitting the audio message, without establishing a two-way audio communication channel with any devices of the set of external devices, for playback at the set of external devices, including the first set of one or more external devices and the second set of one or more external devices; and
in accordance with a determination that the location identifier corresponds to the sub-location:
transmitting the audio message, without establishing a two-way audio communication channel with any devices of the set of external devices, for playback at the second set of one or more external devices and not for playback at the first set of one or more external devices.

28. The non-transitory computer-readable storage medium of claim 16, wherein initiating a respective process for recording and sending a respective audio message to be output by the set of external devices includes:
initiating, without further user input, the recording of a new audio message; and
displaying a recording user interface that includes one or more dynamic indications of audio being recorded.

29. The non-transitory computer-readable storage medium of claim 16, wherein the computer system is in communication with one or more input devices including a microphone, and wherein the process for recording and sending the first audio message to be output by the set of external devices includes:
receiving, via the microphone, a second audio input; and
transmitting the first audio message to the set of external devices, wherein the first audio message is based on the second audio input.

30. The non-transitory computer-readable storage medium of claim 16, wherein the first set of one or more external devices includes a first speaker capable of playing back of the first audio message and the second audio message, and wherein the second set of one or more external devices includes a second speaker capable of playing back the first audio message and the second audio message.

31. A method, comprising:
at a computer system that is in communication with a display generation component:
displaying, via the display generation component, a first user interface that includes:
a first selectable user interface object, wherein selection of the first selectable user interface object initiates a process for recording and sending a first audio message to be output by a set of external devices, wherein the set of external devices includes a first set of one or more external devices and a second set of one or more external devices; and
a first accessory control user interface object corresponding to a first external accessory device, wherein selection of the first accessory control user interface object initiates a process to transmit an instruction to change a state of the first external accessory device;
while displaying the first user interface, receiving an input that corresponds to a request to display a second user interface; and
in response to receiving the request to display the second user interface, displaying the second user interface, wherein the second user interface includes:
a second selectable user interface object, wherein selection of the second selectable user interface object initiates a process for recording and sending a second audio message to be output by the second set of one or more external devices without sending the second audio message to be output by the first set of one or more external devices; and
a second accessory control user interface object corresponding to a second external accessory device, wherein selection of the second accessory control user interface object initiates a process to transmit an instruction to change a state of the second external accessory device.

32. The method of claim 31, wherein the first external accessory device is different from the second external accessory device.

33. The method of claim 31, wherein the first selectable user interface object is displayed at a first location via the display generation component and the second selectable user interface object is displayed at the first location via the display generation component.

34. The method of claim 31, wherein:
the first external accessory device is included in the set of external devices;
the first user interface includes a third accessory control user interface object corresponding to a third external accessory device, wherein selection of the third accessory control user interface object initiates a process to transmit an instruction to change a state of the third external accessory device; and
the third external accessory device is not included in the set of external devices and selection of the first selectable user interface object does not initiate a process for sending the first audio message to be output by the third external accessory device.

35. The method of claim 31, wherein the first user interface corresponds to a top-level location and the second user interface corresponds to a first sub-location of a first type, wherein the second set of one or more external devices correspond to the first sub-location, and wherein the second set of one or more external devices cannot be made to correspond to a second sub-location of the first type based on the second set of one or more external devices corresponding to the first sub-location.

36. The method of claim 31, wherein the first user interface corresponds to a top-level location and the second user interface corresponds to a third sub-location of a second type that corresponds to a plurality of sub-locations of a first type, and wherein the second set of one or more external devices corresponds to the third sub-location based on the second set of one or more external devices being included in the plurality of sub-locations of the first type.

37. The method of claim 36, wherein the second external accessory device is associated with the third sub-location of the second type, and wherein the second external accessory device is also associated with a fourth sub-location of the second type that is different from the third sub-location.

38. The method of claim 31, wherein the second set of one or more external devices is associated with a first location and wherein the process for recording and sending the second audio message to be output by the second set of one or more external devices without sending the second audio message to be output by the first set of one or more external devices includes displaying an indication of the first location.

39. The method of claim 31, wherein the set of external devices includes a personal mobile electronic device.

40. The method of claim 31, wherein the second set of one or more external devices does not include a personal mobile electronic device.

41. The method of claim 31, further comprising:
subsequent to displaying the second user interface, receiving input to disable sending audio messages to be output by the second set of one or more external devices; and
in response to receiving the input to disable sending audio messages to be output by the second set of one or more external devices, disabling sending of audio messages to be output by the second set of one or more external devices via selection of the first selectable user interface object and via selection of the second selectable user interface object.

42. The method of claim 31, wherein the first user interface corresponds to a top-level location and the second user interface corresponds to a sub-location of the top-level location, further comprising:
receiving, at a microphone that is in communication with the computer system, audio input including a natural language request for a digital assistant, the audio input including:
an instruction to initiate a process to transmit an audio message;
a location identifier; and
an audio message;
in accordance with a determination that the location identifier corresponds to the top-level location:
transmitting the audio message, without establishing a two-way audio communication channel with any devices of the set of external devices, for playback at the set of external devices, including the first set of one or more external devices and the second set of one or more external devices; and in accordance with a determination that the location identifier corresponds to the sub-location:
transmitting the audio message, without establishing a two-way audio communication channel with any devices of the set of external devices, for playback at the second set of one or more external devices and not for playback at the first set of one or more external devices.

43. The method of claim 31, wherein initiating a respective process for recording and sending a respective audio message to be output by the set of external devices includes:
initiating, without further user input, the recording of a new audio message; and
displaying a recording user interface that includes one or more dynamic indications of audio being recorded.

44. The method of claim 31, wherein the computer system is in communication with one or more input devices including a microphone, and wherein the process for recording and sending the first audio message to be output by the set of external devices includes:
receiving, via the microphone, a second audio input; and
transmitting the first audio message to the set of external devices, wherein the first audio message is based on the second audio input.

45. The method of claim 31, wherein the first set of one or more external devices includes a first speaker capable of playing back of the first audio message and the second audio message, and wherein the second set of one or more external devices includes a second speaker capable of playing back the first audio message and the second audio message.

* * * * *